US009060246B1

(12) United States Patent
Fujisaki

(10) Patent No.: US 9,060,246 B1
(45) Date of Patent: Jun. 16, 2015

(54) COMMUNICATION DEVICE

(71) Applicant: Iwao Fujisaki, Tokyo (JP)

(72) Inventor: Iwao Fujisaki, Tokyo (JP)

( * ) Notice: Subject to any disclaimer, the term of this patent is extended or adjusted under 35 U.S.C. 154(b) by 0 days.

(21) Appl. No.: 13/659,901

(22) Filed: Oct. 24, 2012

Related U.S. Application Data

(63) Continuation of application No. 12/245,713, filed on Oct. 4, 2008, now Pat. No. 8,340,726, which is a continuation of application No. 12/164,218, filed on Jun. 30, 2008, now abandoned.

(51) Int. Cl.

*H04M 1/00* (2006.01)
*H04W 4/02* (2009.01)
*H04N 21/431* (2011.01)
*G06F 3/0481* (2013.01)
*H04N 1/00* (2006.01)
*G06F 3/0484* (2013.01)

(52) U.S. Cl.

CPC ............. *H04W 4/02* (2013.01); *G06F 3/04817* (2013.01); *H04N 1/00411* (2013.01); *G06F 3/0484* (2013.01); *H04N 21/4312* (2013.01)

(58) Field of Classification Search

CPC .......... H04N 21/4316; H04N 21/4312; H04N 21/8126; H04N 1/00411; G06F 3/04817; H04W 4/02

USPC ............ 455/566, 456.1–456.6; 345/156, 173, 345/87, 88; 715/762, 763, 767, 838, 846, 715/64, 810, 835, 836, 864

See application file for complete search history.

(56) References Cited

U.S. PATENT DOCUMENTS 4,934,773 A 6/1990 Becker
5,173,881 A 12/1992 Sindle
5,272,638 A 12/1993 Martin et al.
5,345,272 A 9/1994 Ersoz et al.
5,353,376 A 10/1994 Oh et al.
5,388,147 A 2/1995 Grimes
5,405,152 A 4/1995 Katanics et al.
5,414,461 A 5/1995 Kishi et al.
5,418,837 A 5/1995 Johansson et al.
5,438,357 A 8/1995 McNelley
5,442,453 A 8/1995 Takagi et al.
5,446,904 A 8/1995 Belt et al.
5,479,476 A 12/1995 Finke-Anlauff
5,530,472 A 6/1996 Bregman et al.
5,539,810 A 7/1996 Kennedy et al.
5,550,754 A 8/1996 McNelley et al.
5,559,554 A 9/1996 Uekane et al.

(Continued)

FOREIGN PATENT DOCUMENTS

GB 2386027 A1 9/2003
JP 2196373 A1 8/1990

(Continued)

OTHER PUBLICATIONS

Fehily "Windows XP: Visual QuickStart Guide" published by Peachpit Press in 2003.

(Continued)

*Primary Examiner* — Olumide T Ajibade Akonai

(57) ABSTRACT

The communication device comprising a voice communication implementer, a first software program implementer, a second software program implementer, an area dependent shortcut icon modification implementer, and a weather dependent shortcut icon modification implementer.

18 Claims, 1 Drawing Sheet

Communication Device 200
Input Device 210
LCD 201
CCD Unit 214
Vib. 217
Input I/F 209
CPU 211
Video Processor 202
Data Bus 203
Signal Processor 208
ROM 207
RAM 206
Sound Processor 205
Antenna 218
Indicator 212
213
204
A/D
D/A
Mic. 215
216
Speaker

(56) References Cited

U.S. PATENT DOCUMENTS 5,566,073 A 10/1996 Margolin
5,625,675 A 4/1997 Katsumaru et al.
5,629,741 A 5/1997 Hopper
5,687,331 A 11/1997 Volk et al.
5,758,280 A 5/1998 Kimura
5,772,586 A 6/1998 Heinonen et al.
5,778,304 A 7/1998 Grube et al.
5,786,846 A 7/1998 Hiroaki
5,796,338 A 8/1998 Mardirossian
5,825,408 A 10/1998 Yuyama et al.
5,844,824 A 12/1998 Newman et al.
5,902,349 A 5/1999 Endo et al.
5,903,706 A 5/1999 Wakabayashi et al.
5,918,180 A 6/1999 Dimino
5,924,040 A 7/1999 Trompower
5,940,139 A 8/1999 Smoot
5,959,661 A 9/1999 Isono
6,009,336 A 12/1999 Harris et al.
6,034,715 A 3/2000 Ishida et al.
6,069,648 A 5/2000 Suso et al.
6,073,034 A 6/2000 Jacobsen et al.
6,081,265 A 6/2000 Nakayama et al.
6,085,112 A 7/2000 Kleinschmidt et al.
6,094,237 A 7/2000 Hashimoto
6,115,597 A 9/2000 Kroll et al.
6,128,594 A 10/2000 Gulli et al.
6,144,848 A 11/2000 Walsh et al.
6,148,212 A 11/2000 Park et al.
6,161,134 A 12/2000 Wang et al.
6,167,283 A 12/2000 Korpela et al.
6,192,343 B1 2/2001 Morgan et al.
6,195,089 B1 * 2/2001 Chaney et al. .................. 725/56
6,198,942 B1 3/2001 Hayashi et al.
6,202,060 B1 3/2001 Tran
6,216,013 B1 4/2001 Moore et al.
6,216,158 B1 4/2001 Luo et al.
6,222,482 B1 4/2001 Gueziec
6,225,944 B1 5/2001 Hayes
6,241,612 B1 6/2001 Heredia
6,243,039 B1 6/2001 Elliot
6,253,075 B1 6/2001 Beghtol et al.
6,265,988 B1 7/2001 LeMense et al.
6,282,435 B1 8/2001 Wagner et al.
6,285,317 B1 9/2001 Ong
6,285,757 B1 9/2001 Carroll et al.
6,292,666 B1 9/2001 Siddiqui et al.
6,311,077 B1 10/2001 Bien
6,366,651 B1 4/2002 Griffith et al.
6,385,465 B1 5/2002 Yoshioka
6,385,654 B1 5/2002 Tanaka
6,405,033 B1 6/2002 Kennedy, III et al.
6,411,198 B1 6/2002 Hirai et al.
6,421,470 B1 7/2002 Nozaki et al.
6,421,602 B1 7/2002 Bullock et al.
6,438,380 B1 8/2002 Bi et al.
6,442,404 B1 8/2002 Sakajiri
6,445,802 B1 9/2002 Dan
6,487,422 B1 11/2002 Lee
6,507,643 B1 1/2003 Groner
6,510,325 B1 1/2003 Mack, II et al.
6,512,919 B2 1/2003 Ogasawara
6,518,956 B1 2/2003 Sato
6,519,566 B1 2/2003 Boyer et al.
6,526,293 B1 2/2003 Matsuo
6,528,533 B2 3/2003 Lauffer
6,529,742 B1 3/2003 Yang
6,542,750 B2 4/2003 Hendrey et al.
6,549,215 B2 4/2003 Jouppi
6,549,756 B1 4/2003 Engstrom
6,553,309 B2 4/2003 Uchida et al.
6,587,547 B1 7/2003 Zirngibl et al.
6,615,186 B1 9/2003 Kolls
6,618,704 B2 9/2003 Kanevsky et al.
6,630,958 B2 10/2003 Tanaka et al.
6,647,251 B1 11/2003 Siegle et al.
6,650,877 B1 11/2003 Tarbouriech et al.
6,650,894 B1 11/2003 Berstis et al.
6,658,272 B1 12/2003 Lenchik et al.
6,658,461 B1 12/2003 Mazo
6,662,023 B1 12/2003 Helle
6,665,711 B1 12/2003 Boyle et al.
6,668,177 B2 * 12/2003 Salmimaa et al. ............ 455/566
6,678,366 B1 1/2004 Burger et al.
6,681,120 B1 1/2004 Kim
6,687,515 B1 2/2004 Kosaka
6,690,932 B1 2/2004 Barnier et al.
6,694,143 B1 2/2004 Beamish et al.
6,701,148 B1 3/2004 Wilson et al.
6,701,162 B1 3/2004 Everett
6,707,942 B1 3/2004 Cortopassi et al.
6,711,399 B1 3/2004 Granier
6,725,022 B1 4/2004 Clayton et al.
6,728,533 B2 4/2004 Ishii
6,763,226 B1 7/2004 McZeal, Jr.
6,772,174 B1 8/2004 Pettersson
6,775,361 B1 8/2004 Arai et al.
6,779,030 B1 8/2004 Dugan et al.
6,782,412 B2 8/2004 Brophy et al.
6,788,332 B1 9/2004 Cook
6,788,928 B2 9/2004 Kohinata et al.
6,795,715 B1 9/2004 Kubo et al.
6,812,954 B1 11/2004 Priestman et al.
6,813,501 B2 11/2004 Kinnunen et al.
6,819,939 B2 11/2004 Masamura
6,820,055 B2 11/2004 Saindon et al.
6,850,209 B2 2/2005 Mankins et al.
6,865,372 B2 3/2005 Mauney et al.
6,870,828 B1 3/2005 Giordano, III
6,876,379 B1 4/2005 Fisher
6,883,000 B1 4/2005 Gropper
6,888,927 B1 5/2005 Cruickshank et al.
6,891,525 B2 5/2005 Ogoro
6,895,084 B1 5/2005 Saylor et al.
6,895,259 B1 5/2005 Blank nee Keller et al.
6,898,321 B1 5/2005 Knee et al.
6,901,383 B1 5/2005 Ricketts et al.
6,905,414 B2 6/2005 Danieli et al.
6,912,544 B1 6/2005 Weiner
6,922,212 B2 7/2005 Nakakubo et al.
6,937,868 B2 8/2005 Himmel et al.
6,947,728 B2 9/2005 Tagawa et al.
6,954,645 B2 10/2005 Tsai et al.
6,958,675 B2 10/2005 Maeda et al.
6,961,559 B1 11/2005 Chow et al.
6,970,178 B2 11/2005 Tanioka et al.
6,970,703 B2 11/2005 Fuchs et al.
6,973,628 B2 * 12/2005 Asami ........................... 715/838
6,992,699 B1 1/2006 Vance et al.
6,999,757 B2 2/2006 Bates et al.
7,003,598 B2 2/2006 Kavanagh
7,007,239 B1 2/2006 Hawkins et al.
7,012,999 B2 3/2006 Ruckart
7,019,770 B1 3/2006 Katz
7,028,077 B2 4/2006 Toshimitsu et al.
7,030,880 B2 4/2006 Tanioka et al.
7,035,666 B2 4/2006 Silberfenig et al.
7,058,356 B2 6/2006 Slotznick
7,065,525 B1 6/2006 Sasaki et al.
7,076,052 B2 7/2006 Yoshimura
7,081,832 B2 7/2006 Nelson et al.
7,085,578 B2 8/2006 Barclay et al.
7,085,739 B1 8/2006 Winter et al.
7,089,298 B2 8/2006 Nyman et al.
7,106,846 B2 9/2006 Nguyen et al.
7,107,081 B1 9/2006 Fujisaki
7,113,981 B2 9/2006 Slate
7,117,152 B1 10/2006 Mukherji et al.
7,126,951 B2 10/2006 Belcea et al.
7,127,238 B2 10/2006 Vandermeijden et al.
7,127,271 B1 10/2006 Fujisaki
7,130,630 B1 10/2006 Moton, Jr. et al.
7,139,555 B2 11/2006 Apfel
7,142,810 B2 11/2006 Oesterling
7,142,890 B2 11/2006 Irimajiri et al.

(56) References Cited

U.S. PATENT DOCUMENTS 7,146,179 B2 12/2006 Parulski et al.
7,148,911 B1 12/2006 Mitsui et al.
7,174,171 B2 2/2007 Jones
7,224,792 B2 5/2007 Fusco
7,224,851 B2 5/2007 Kinjo
7,224,987 B1 5/2007 Bhela et al.
7,231,231 B2 6/2007 Kokko et al.
7,233,781 B2 6/2007 Hunter et al.
7,233,795 B1 6/2007 Ryden
7,240,093 B1 7/2007 Danieli et al.
7,245,293 B2 * 7/2007 Hoshino et al. ............... 345/173
7,251,255 B1 7/2007 Young
7,254,408 B2 8/2007 Kim
7,260,416 B2 8/2007 Shippee
7,266,186 B1 9/2007 Henderson
7,277,711 B2 10/2007 Nyu
7,321,783 B2 1/2008 Kim
7,324,823 B1 1/2008 Rosen et al.
7,346,373 B2 3/2008 Kim
7,372,447 B1 5/2008 Jacobsen et al.
7,383,067 B2 6/2008 Phillips et al.
7,418,346 B2 8/2008 Breed et al.
7,433,845 B1 10/2008 Flitcroft et al.
7,444,168 B2 10/2008 Nakagawa et al.
7,450,709 B2 11/2008 Gonzalez et al.
7,451,084 B2 11/2008 Funakura
7,532,879 B1 5/2009 Fujisaki
7,551,899 B1 6/2009 Nicolas et al.
7,642,929 B1 1/2010 Pinkus et al.
7,643,037 B1 1/2010 Langmacher et al.
7,657,252 B2 2/2010 Futami
7,686,693 B2 3/2010 Danieli et al.
7,707,592 B2 4/2010 Wesslen et al.
7,707,602 B2 4/2010 Cragun et al.
7,725,077 B2 5/2010 Jung et al.
7,752,188 B2 * 7/2010 Lagerstedt et al. ........... 707/705
7,769,364 B2 8/2010 Logan et al.
7,787,857 B2 8/2010 Peterman
7,787,887 B2 8/2010 Gupta et al.
7,853,295 B1 12/2010 Fujisaki
7,853,297 B1 12/2010 Fujisaki
7,865,567 B1 1/2011 Hendricks et al.
7,873,349 B1 1/2011 Smith et al.
7,890,089 B1 2/2011 Fujisaki
7,899,410 B2 3/2011 Rakshani et al.
7,922,086 B2 4/2011 Jung et al.
7,941,141 B2 5/2011 Shoykhet et al.
7,953,439 B2 5/2011 Rofougaran
7,970,414 B1 6/2011 Werden et al.
8,099,108 B2 * 1/2012 Camp et al. ................ 455/456.3
8,117,266 B2 2/2012 Moore
8,126,400 B2 2/2012 Jung et al.
8,145,040 B2 3/2012 Toyoshima
8,208,954 B1 6/2012 Fujisaki
8,433,300 B1 4/2013 Fujisaki
8,559,983 B1 10/2013 Fujisaki
8,825,026 B1 9/2014 Fujisaki
2001/0005826 A1 6/2001 Shibuya
2001/0011293 A1 8/2001 Murakami et al.
2001/0028350 A1 10/2001 Matsuoka et al.
2001/0029425 A1 10/2001 Myr
2001/0035829 A1 11/2001 Yu et al.
2001/0048364 A1 12/2001 Kalthoff et al.
2001/0049470 A1 12/2001 Mault et al.
2002/0002044 A1 1/2002 Naruse et al.
2002/0002705 A1 1/2002 Byrnes et al.
2002/0006804 A1 1/2002 Mukai et al.
2002/0009978 A1 1/2002 Dukach et al.
2002/0016724 A1 2/2002 Yang et al.
2002/0019225 A1 2/2002 Miyashita
2002/0026348 A1 2/2002 Fowler et al.
2002/0028690 A1 3/2002 McKenna et al.
2002/0031120 A1 3/2002 Rakib
2002/0034292 A1 3/2002 Tuoriniemi et al.
2002/0036231 A1 3/2002 Monaghan et al.
2002/0037738 A1 3/2002 Wycherley et al.
2002/0038219 A1 3/2002 Yanay et al.
2002/0039914 A1 4/2002 Hama et al.
2002/0041262 A1 4/2002 Mukai et al.
2002/0047787 A1 4/2002 Mikkola et al.
2002/0049630 A1 4/2002 Furuta et al.
2002/0052754 A1 5/2002 Joyce et al.
2002/0054068 A1 5/2002 Ellis et al.
2002/0055872 A1 5/2002 LaBrie et al.
2002/0061767 A1 5/2002 Sladen et al.
2002/0065037 A1 5/2002 Messina et al.
2002/0066115 A1 5/2002 Wendelrup
2002/0068558 A1 6/2002 Janik
2002/0068585 A1 6/2002 Chan et al.
2002/0068599 A1 6/2002 Rodriguez et al.
2002/0072395 A1 6/2002 Miramontes
2002/0077808 A1 6/2002 Liu et al.
2002/0080163 A1 6/2002 Morey
2002/0085700 A1 7/2002 Metcalf
2002/0094806 A1 7/2002 Kamimura
2002/0097984 A1 7/2002 Abecassis
2002/0098857 A1 7/2002 Ishii
2002/0102960 A1 8/2002 Lechner
2002/0103872 A1 8/2002 Watanabe
2002/0104095 A1 8/2002 Nguyen et al.
2002/0110246 A1 8/2002 Gosior et al.
2002/0115469 A1 8/2002 Rekimoto et al.
2002/0120718 A1 8/2002 Lee
2002/0123336 A1 9/2002 Kamada
2002/0127997 A1 9/2002 Karlstedt et al.
2002/0128000 A1 9/2002 do Nascimento
2002/0133342 A1 9/2002 McKenna
2002/0137470 A1 9/2002 Baron et al.
2002/0137503 A1 9/2002 Roderique
2002/0137526 A1 9/2002 Shinohara
2002/0141086 A1 10/2002 Lang et al.
2002/0142763 A1 10/2002 Kolsky
2002/0147645 A1 10/2002 Alao et al.
2002/0151326 A1 10/2002 Awada et al.
2002/0151327 A1 10/2002 Levitt
2002/0160724 A1 10/2002 Arai et al.
2002/0164975 A1 11/2002 Lu
2002/0164996 A1 11/2002 Dorenbosch
2002/0165850 A1 11/2002 Roberts et al.
2002/0173344 A1 11/2002 Cupps et al.
2002/0177407 A1 11/2002 Mitsumoto
2002/0178225 A1 11/2002 Madenberg et al.
2002/0183045 A1 12/2002 Emmerson et al.
2002/0183098 A1 12/2002 Lee et al.
2002/0191951 A1 12/2002 Sodeyama et al.
2002/0198017 A1 12/2002 Babasaki et al.
2002/0198813 A1 12/2002 Patterson, Jr. et al.
2002/0198936 A1 12/2002 McIntyre et al.
2003/0003967 A1 1/2003 Ito
2003/0005056 A1 1/2003 Yamamoto et al.
2003/0006879 A1 1/2003 Kang et al.
2003/0007556 A1 1/2003 Oura et al.
2003/0013483 A1 1/2003 Ausems et al.
2003/0014286 A1 1/2003 Cappellini
2003/0016189 A1 1/2003 Abe et al.
2003/0017857 A1 1/2003 Kitson et al.
2003/0018744 A1 1/2003 Johanson et al.
2003/0025788 A1 2/2003 Beardsley
2003/0032406 A1 2/2003 Minear et al.
2003/0037265 A1 2/2003 Sameshima et al.
2003/0038800 A1 2/2003 Kawahara
2003/0038893 A1 2/2003 Rajamaki et al.
2003/0045311 A1 3/2003 Larikka et al.
2003/0045329 A1 3/2003 Kinoshita
2003/0052964 A1 3/2003 Priestman et al.
2003/0055994 A1 3/2003 Herrmann et al.
2003/0061606 A1 3/2003 Hartwig et al.
2003/0063580 A1 4/2003 Pond
2003/0063732 A1 4/2003 Mcknight
2003/0065784 A1 4/2003 Herrod
2003/0065805 A1 4/2003 Barnes, Jr.
2003/0069693 A1 4/2003 Snapp et al.
2003/0070162 A1 4/2003 Oshima et al.
2003/0073432 A1 4/2003 Meade, II

(56) References Cited

U.S. PATENT DOCUMENTS

2003/0083055 A1 5/2003 Riordan et al.
2003/0084104 A1 5/2003 Salem et al.
2003/0084121 A1 5/2003 De Boor et al.
2003/0093503 A1 5/2003 Yamaki et al.
2003/0093790 A1 5/2003 Logan et al.
2003/0099367 A1 5/2003 Okamura
2003/0107580 A1 6/2003 Egawa et al.
2003/0110450 A1 6/2003 Sakai
2003/0117376 A1 6/2003 Ghulam
2003/0119479 A1 6/2003 Arima et al.
2003/0119485 A1 6/2003 Ogasawara
2003/0119562 A1 6/2003 Kokubo
2003/0120784 A1 6/2003 Johnson et al.
2003/0125008 A1 7/2003 Shimamura
2003/0132928 A1 7/2003 Kori
2003/0135563 A1 7/2003 Bodin et al.
2003/0137970 A1 7/2003 Odman
2003/0144024 A1 7/2003 Luo
2003/0148772 A1 8/2003 Ben-Ari
2003/0149662 A1 8/2003 Shore
2003/0153355 A1 8/2003 Warren
2003/0156208 A1 8/2003 Obradovich
2003/0166399 A1 9/2003 Tokkonen et al.
2003/0169329 A1 9/2003 Parker et al.
2003/0201982 A1 10/2003 Iesaka
2003/0204562 A1 10/2003 Hwang
2003/0208541 A1 11/2003 Musa
2003/0220835 A1 11/2003 Barnes, Jr.
2003/0222762 A1 12/2003 Beigl et al.
2003/0222982 A1 12/2003 Hamdan et al.
2003/0223554 A1 12/2003 Zhang
2003/0224760 A1 12/2003 Day
2003/0227570 A1 12/2003 Kim et al.
2003/0229900 A1 12/2003 Reisman
2003/0236709 A1 12/2003 Hendra et al.
2003/0236866 A1 12/2003 Light
2004/0003307 A1 1/2004 Tsuji
2004/0004616 A1 1/2004 Konya et al.
2004/0027369 A1 2/2004 Kellock et al.
2004/0029640 A1 2/2004 Masuyama et al.
2004/0033795 A1 2/2004 Walsh et al.
2004/0034692 A1 2/2004 Eguchi et al.
2004/0052504 A1 3/2004 Yamada et al.
2004/0060061 A1 3/2004 Parker
2004/0068399 A1 4/2004 Ding
2004/0072595 A1 4/2004 Anson et al.
2004/0082321 A1 4/2004 Kontianinen
2004/0087326 A1 5/2004 Dunko et al.
2004/0092255 A1 5/2004 Ji et al.
2004/0103303 A1 5/2004 Yamauchi et al.
2004/0107072 A1 6/2004 Dietrich et al.
2004/0114732 A1 6/2004 Choe et al.
2004/0117108 A1 6/2004 Nemeth
2004/0128359 A1 7/2004 Horvitz et al.
2004/0137893 A1 7/2004 Muthuswamy et al.
2004/0139208 A1 7/2004 Tuli
2004/0142678 A1 7/2004 Krasner
2004/0150725 A1 8/2004 Taguchi
2004/0157664 A1 8/2004 Link
2004/0166832 A1 8/2004 Portman et al.
2004/0166879 A1 8/2004 Meadows et al.
2004/0174863 A1 9/2004 Caspi et al.
2004/0183937 A1 9/2004 Viinikanoja et al.
2004/0185865 A1 9/2004 Maanoja
2004/0189827 A1 9/2004 Kim et al.
2004/0198374 A1 10/2004 Bajikar
2004/0203520 A1 10/2004 Schirtzinger et al.
2004/0203904 A1 10/2004 Gwon et al.
2004/0203909 A1 10/2004 Koster
2004/0204018 A1 10/2004 Kuo
2004/0204035 A1 10/2004 Raghuram et al.
2004/0204126 A1 10/2004 Reyes et al.
2004/0216037 A1 10/2004 Hishida et al.
2004/0218738 A1 11/2004 Arai et al.
2004/0219951 A1 11/2004 Holder
2004/0223049 A1 11/2004 Taniguchi et al.
2004/0235520 A1 11/2004 Cadiz et al.
2004/0242240 A1 12/2004 Lin
2004/0248586 A1 12/2004 Patel et al.
2004/0252197 A1 12/2004 Fraley et al.
2004/0259537 A1 12/2004 Ackley
2004/0264662 A1 12/2004 Silver
2004/0266418 A1 12/2004 Kotzin
2004/0267628 A1 12/2004 Stillman
2005/0004749 A1 1/2005 Park
2005/0032527 A1 2/2005 Sheha et al.
2005/0036509 A1 2/2005 Acharya et al.
2005/0046584 A1 3/2005 Breed
2005/0048987 A1 3/2005 Glass
2005/0070257 A1 3/2005 Saarinen et al.
2005/0075097 A1 4/2005 Lehikoinen et al.
2005/0090768 A1 4/2005 Brattesani et al.
2005/0113080 A1 5/2005 Nishimura
2005/0113113 A1 5/2005 Reed
2005/0120225 A1 6/2005 Kirsch et al.
2005/0136949 A1 6/2005 Barnes, Jr.
2005/0144560 A1 6/2005 Gruen et al.
2005/0151877 A1 7/2005 Fisher
2005/0159189 A1 7/2005 Iyer
2005/0163289 A1 7/2005 Caspi et al.
2005/0164684 A1 7/2005 Chen et al.
2005/0165871 A1 7/2005 Barrs et al.
2005/0166242 A1 7/2005 Matsumoto et al.
2005/0186954 A1 8/2005 Kenney
2005/0192030 A1 9/2005 Asthana et al.
2005/0207555 A1 9/2005 Lee et al.
2005/0227731 A1 10/2005 Kall
2005/0235312 A1 10/2005 Karaoguz et al.
2005/0261945 A1 11/2005 Mougin et al.
2005/0272504 A1 12/2005 Eguchi et al.
2005/0282582 A1 12/2005 Slotznick
2006/0003813 A1 1/2006 Seligmann et al.
2006/0031407 A1 2/2006 Dispensa et al.
2006/0033809 A1 2/2006 Farley
2006/0035628 A1* 2/2006 Miller et al. ............... 455/414.3
2006/0041923 A1 2/2006 McQuaide
2006/0052100 A1 3/2006 Almgren
2006/0059038 A1 3/2006 Iuchi et al.
2006/0084413 A1 4/2006 Myoung
2006/0114100 A1 6/2006 Ghabra et al.
2006/0121986 A1 6/2006 Pelkey et al.
2006/0126284 A1 6/2006 Moscovitch
2006/0133590 A1 6/2006 Jiang
2006/0140173 A1 6/2006 Hoover
2006/0140387 A1 6/2006 Boldt
2006/0143655 A1 6/2006 Ellis et al.
2006/0166650 A1 7/2006 Berger et al.
2006/0167677 A1 7/2006 Bitzer
2006/0206913 A1 9/2006 Jerding et al.
2006/0229114 A2 10/2006 Kim
2006/0234693 A1 10/2006 Isidore et al.
2006/0234758 A1 10/2006 Parupudi et al.
2006/0262911 A1 11/2006 Chin et al.
2006/0276172 A1 12/2006 Rydgren et al.
2006/0284732 A1 12/2006 Brock-Fisher
2007/0005809 A1 1/2007 Kobayashi et al.
2007/0015550 A1 1/2007 Kayanuma
2007/0037605 A1 2/2007 Logan
2007/0050832 A1 3/2007 Wright et al.
2007/0061845 A1 3/2007 Barnes
2007/0097879 A1 5/2007 Bleckert et al.
2007/0099703 A1 5/2007 Terebilo
2007/0109262 A1 5/2007 Oshima et al.
2007/0135145 A1 6/2007 Lee et al.
2007/0135150 A1 6/2007 Ushiki et al.
2007/0142047 A1 6/2007 Heeschen et al.
2007/0190944 A1 8/2007 Doan et al.
2007/0191029 A1 8/2007 Zarem et al.
2007/0204014 A1 8/2007 Greer et al.
2007/0216760 A1 9/2007 Kondo et al.
2007/0218891 A1 9/2007 Cox
2007/0262848 A1 11/2007 Berstis et al.
2007/0293240 A1 12/2007 Drennan
2008/0014917 A1 1/2008 Rhoads et al.

(56) References Cited

U.S. PATENT DOCUMENTS

| | | | | |
|---|---|---|---|---|
| 2008/0016534 | A1 | 1/2008 | Ortiz et al. | |
| 2008/0058005 | A1 | 3/2008 | Zicker et al. | |
| 2008/0070588 | A1 | 3/2008 | Morin | |
| 2008/0082930 | A1* | 4/2008 | Omernick et al. | 715/765 |
| 2008/0104544 | A1* | 5/2008 | Collins et al. | 715/846 |
| 2008/0109840 | A1 | 5/2008 | Walter et al. | |
| 2008/0146272 | A1 | 6/2008 | Rao et al. | |
| 2008/0151696 | A1 | 6/2008 | Giroud et al. | |
| 2008/0172173 | A1 | 7/2008 | Chang et al. | |
| 2008/0176545 | A1 | 7/2008 | Dicke et al. | |
| 2008/0242271 | A1 | 10/2008 | Schmidt et al. | |
| 2008/0242283 | A1 | 10/2008 | Ruckart | |
| 2008/0254811 | A1 | 10/2008 | Stewart | |
| 2008/0299989 | A1 | 12/2008 | King et al. | |
| 2009/0047972 | A1 | 2/2009 | Neeraj | |
| 2009/0111486 | A1 | 4/2009 | Burstrom | |
| 2009/0124243 | A1* | 5/2009 | Routley et al. | 455/418 |
| 2009/0150807 | A1* | 6/2009 | George et al. | 715/763 |
| 2009/0153490 | A1 | 6/2009 | Nymark et al. | |
| 2009/0186628 | A1 | 7/2009 | Yonker et al. | |
| 2009/0221330 | A1 | 9/2009 | Tomimori | |
| 2009/0290369 | A1 | 11/2009 | Schofield et al. | |
| 2009/0319947 | A1* | 12/2009 | Wang et al. | 715/810 |
| 2010/0030557 | A1 | 2/2010 | Molloy et al. | |
| 2010/0062740 | A1 | 3/2010 | Ellis et al. | |
| 2010/0079267 | A1 | 4/2010 | Lin | |
| 2010/0145700 | A1 | 6/2010 | Kennewick et al. | |
| 2012/0059545 | A1 | 3/2012 | Furuno et al. | |
| 2013/0298059 | A1 | 11/2013 | Raskin | |

FOREIGN PATENT DOCUMENTS

| | | | |
|---|---|---|---|
| JP | H11/195137 | A1 | 7/1999 |
| JP | 2002/252691 | A1 | 9/2002 |
| JP | 2003/078977 | A1 | 3/2003 |
| JP | 2003/228726 | A1 | 8/2003 |
| JP | 2003/263656 | A1 | 9/2003 |
| JP | 2005/216149 | A1 | 8/2005 |
| WO | 03001457 | A1 | 1/2003 |
| WO | 03096660 | A1 | 11/2003 |

OTHER PUBLICATIONS

Casio, “Pocket PC User’s Guide” published on Feb. 3, 2000.

Audiovox, “Pocket PC Phone User Manual” published on Mar. 19, 2004.

Palm, “Using your Treo” published in Feb. 2004.

Palm, “Palm Treo 600 Support Knowledge Library, Solution ID 29492” published in Jan. 2004.

Dataviz, “Documents to Go included on Treo 600 Smartphone from palmOne” published in Nov. 2003.

Palm, “Treo 600 smartphone” published in 2003.

FCC’s wireless Enhanced 911 (E911) rules, Phase I and Phase II.

HI Corporation’s company history (http://www.hicorp.co.jp/english/corporate/history.html) Copyright notice on the web: (c) 2007-2011 HI Corporation. All Rights Reserved.

HI Corporation to Offer 3D Graphics to Motorola Mobile Phone Platform Customers (http://www.wirelessdevnet.com/news/2003/203/news7.html) Published on the web on: Jul. 21, 2003.

Development of NTT docomo Mova N504i—NEC Gi-Ho (Technology Magazine) vol. 56 No. May 2003, p. 144 Published in: May 2003.

Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

* cited by examiner

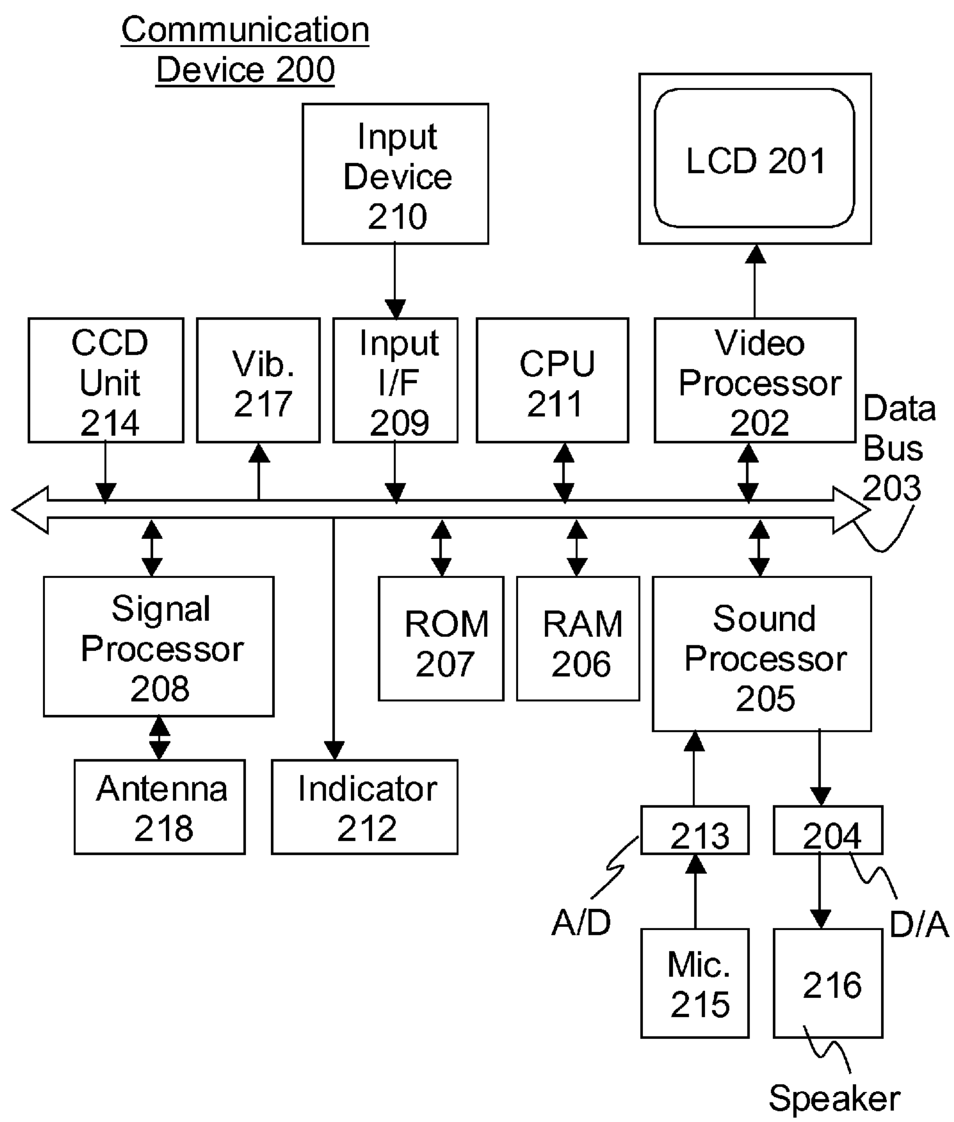
Communication Device 200
Input Device 210
LCD 201
CCD Unit 214
Vib. 217
Input I/F 209
CPU 211
Video Processor 202
Data Bus 203
Signal Processor 208
ROM 207
RAM 206
Sound Processor 205
Antenna 218
Indicator 212
213
204
A/D
D/A
Mic. 215
216
Speaker

COMMUNICATION DEVICE

CROSS REFERENCE TO RELATED APPLICATIONS

This application is a continuation of U.S. Ser. No. 12/245,713 filed 2008 Oct. 4, which is a continuation of U.S. Ser. No. 12/164,218 filed 2008 Jun. 30, all of which are hereby incorporated herein by reference in their entirety.

BACKGROUND OF INVENTION

The invention relates to communication device and more particularly to the communication device which is capable to communicate with another communication device in a wireless fashion.

U.S. Pat. No. 6,327,471 is introduced as prior art of the present invention of which the summary is the following: "A method and an apparatus is provided for acquiring satellite signals to establish the exact spatial position of a cellular radiotelephone, in order to perform a timely dropoff or smooth handoff to another base station or frequency. The cellular radiotelephone is equipped with its own positioning system which uses satellite data to determine its spatial position. The communication system is preferably a Code Division Multiple Access (CDMA) system, and the positioning system is preferably a Global Positioning System (GPS). The method of the present invention may be used to determine the base station closest to the cellular radiotelephone. In the alternative, it may be used to compute a distance between the cellular radiotelephone and a location where the quality level of the cellular radiotelephone communication signal is predicted to be less than the predetermined value, and to determine from the computed distance whether the cellular radiotelephone should be handed off." However, this prior art does not disclose the communication device comprising a voice communication implementer, a first software program implementer, a second software program implementer, an area dependent shortcut icon modification implementer, and a weather dependent shortcut icon modification implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

The present invention introduces the communication device comprising a voice communication implementer, a first software program implementer, a second software program implementer, an area dependent shortcut icon modification implementer, and a weather dependent shortcut icon modification implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This Paragraph [0024] illustrate(s) the elements of Communication Device 200. The elements of Communication Device 200 described in this Paragraph [0024] is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this Paragraph [0024] in this specification.

This Paragraph [0025] illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Caller's Area Dependent Ringtone Modifying Function>>

Paragraph [0028] through Paragraph [0055] illustrate the caller's area dependent ringtone modifying function, wherein when receiving a phone call from a caller's device, a caller's device current location which indicates the current geographic location of said caller's device is identified, if said caller's device current location indicates to be located in a 1st geographic area, a 1st ringtone audio data is output from said speaker with the sound volume indicated by a 1st ringtone sound volume data and a 1st ringtone visual data is displayed on said display, if said caller's device current location indicates to be located in a 2nd geographic area, a 2nd ringtone audio data is output from said speaker with the sound volume indicated by a 2nd ringtone sound volume data and a 2nd ringtone visual data is displayed on said display, and a caller's current location which indicates the current geographic location of said caller's device and a callee's current location which indicates the current geographic location of said communication device are indicated.

This Paragraph [0028] illustrates the storage area included in Host H (Paragraph [0025]). In the present embodiment, Host H (Paragraph [0025]) includes Caller's Area Dependent Ringtone Modifying Info Storage Area H721a of which the data and the software program(s) stored therein are described in Paragraph [0029].

This Paragraph [0029] illustrates the storage area(s) included in Caller's Area Dependent Ringtone Modifying Info Storage Area H721a (Paragraph [0028]). In the present embodiment, Caller's Area Dependent Ringtone Modifying Info Storage Area H721a includes Caller's Area Dependent Ringtone Modifying Data Storage Area H721b and Caller's Area Dependent Ringtone Modifying Software Storage Area H721c. Caller's Area Dependent Ringtone Modifying Data Storage Area H721b stores the data necessary to implement the present function on the side of Host H (Paragraph [0025]), such as the one(s) described in Paragraph [0030]. Caller's Area Dependent Ringtone Modifying Software Storage Area H721c stores the software program(s) necessary to implement the present function on the side of Host H (Paragraph [0025]), such as the one(s) described in Paragraph [0037].

This Paragraph [0030] illustrates the storage area(s) included in Caller's Area Dependent Ringtone Modifying Data Storage Area H721b (Paragraph [0029]). In the present embodiment, Caller's Area Dependent Ringtone Modifying Data Storage Area H721b includes Entire Current Location Data Storage Area H721b1, Entire Geographic Area Data Storage Area H721b2, Entire Ringtone Audio Data Storage Area H721b3, Entire Ringtone Sound Volume Data Storage Area H721b4, Entire Ringtone Visual Data Storage Area H721b5, Map Data Storage Area H721b6, Entire Current Location Icon Data Storage Area H721b7, and Work Area H721b8. Entire Current Location Data Storage Area H721b1 stores the data described in Paragraph [0031]. Entire Geographic Area Data Storage Area H721b2 stores the data described in Paragraph [0032]. Entire Ringtone Audio Data Storage Area H721b3 stores the data described in Paragraph [0033]. Entire Ringtone Sound Volume Data Storage Area H721b4 stores the data described in Paragraph [0034]. Entire Ringtone Visual Data Storage Area H721b5 stores the data described in Paragraph [0035]. Map Data Storage Area H721b6 stores the map data which is the image data indicating a map. Entire Current Location Icon Data Storage Area H721b7 stores the data described in Paragraph [0036]. Work Area H721b8 is utilized as a work area to perform calculation and temporarily store data to implement the present function.

This Paragraph [0031] illustrates the storage area(s) included in Entire Current Location Data Storage Area H721b1 (Paragraph [0030]). In the present embodiment, Entire Current Location Data Storage Area H721b1 includes Caller's Current Location Data Storage Area H721b1a and Callee's Current Location Data Storage Area H721b1b. Caller's Current Location Data Storage Area H721b1a stores the caller's current location data which indicates the current geographic location of the caller's device (not shown) in (x,y,z,) format. Callee's Current Location Data Storage Area H721b1b stores the callee's current location data which indicates the current geographic location of the callee's device, i.e., Communication Device 200, in (x,y,z,) format.

This Paragraph [0032] illustrates the storage area(s) included in Entire Geographic Area Data Storage Area H721b2 (Paragraph [0030]). In the present embodiment, Entire Geographic Area Data Storage Area H721b2 includes 1st Geographic Area Data Storage Area H721b2a and 2nd Geographic Area Data Storage Area H721b2b. 1st Geographic Area Data Storage Area H721b2a stores the 1st geographic area data which indicates a certain geographic area (e.g., Sacramento Calif.). Here, the certain geographic area may be as small as the geographic area of 50 cm radius or as large as that of 500 km radius. 2nd Geographic Area Data Storage Area H721b2b stores the 2nd geographic area data which indicates another certain geographic area (e.g., San Jose Calif.). Here, the certain geographic area may be as small as the geographic area of 50 cm radius or as large as that of 500 km radius.

This Paragraph [0033] illustrates the storage area(s) included in Entire Ringtone Audio Data Storage Area H721b3 (Paragraph [0030]). In the present embodiment, Entire Ringtone Audio Data Storage Area H721b3 includes 1st Ringtone Audio Data Storage Area H721b3a and 2nd Ringtone Audio Data Storage Area H721b3b. 1st Ringtone Audio Data Storage Area H721b3a stores the 1st ringtone audio data which is the audio data output as a ringtone from Speaker 216 (FIG. 1). 2nd Ringtone Audio Data Storage Area H721b3b stores the 2nd ringtone audio data which is another audio data output as a ringtone from Speaker 216 (FIG. 1).

This Paragraph [0034] illustrates the storage area(s) included in Entire Ringtone Sound Volume Data Storage Area H721b4 (Paragraph [0030]). In the present embodiment, Entire Ringtone Sound Volume Data Storage Area H721b4 includes 1st Ringtone Sound Volume Data Storage Area H721b4a and 2nd Ringtone Sound Volume Data Storage Area H721b4b. 1st Ringtone Sound Volume Data Storage Area H721b4a stores the 1st ringtone sound volume data which indicates the sound volume of the ringtone output from Speaker 216 (FIG. 1). 2nd Ringtone Sound Volume Data Storage Area H721b4b stores the 2nd ringtone sound volume data which indicates another sound volume of the ringtone output from Speaker 216 (FIG. 1).

This Paragraph [0035] illustrates the storage area(s) included in Entire Ringtone Visual Data Storage Area H721b5 (Paragraph [0030]). In the present embodiment, Entire Ringtone Visual Data Storage Area H721b5 includes 1st Ringtone Visual Data Storage Area H721b5a and 2nd Ringtone Visual Data Storage Area H721b5b. 1st Ringtone Visual Data Storage Area H721b5a stores the 1st ringtone visual data which is the visual data displayed as a visual ringtone on LCD 201 (FIG. 1). 2nd Ringtone Visual Data Storage Area H721b5b stores the 2nd ringtone visual data which is another visual data displayed as a visual ringtone on LCD 201 (FIG. 1).

This Paragraph [0036] illustrates the storage area(s) included in Entire Current Location Icon Data Storage Area H721b7 (Paragraph [0030]). In the present embodiment, Entire Current Location Icon Data Storage Area H721b7 includes Caller's Current Location Icon Data Storage Area H721b7a and Callee's Current Location Icon Data Storage Area H721b7b. Caller's Current Location Icon Data Storage Area H721b7a stores the caller's current location icon data which is the image of the icon utilized to indicate the caller's current location data on the map data. Callee's Current Location Icon Data Storage Area H721b7b stores the callee's current location icon data which is the image of the icon utilized to indicate the callee's current location data on the map data.

This Paragraph [0037] illustrates the software program(s) stored in Caller's Area Dependent Ringtone Modifying Software Storage Area H721c (Paragraph [0029]). In the present embodiment, Caller's Area Dependent Ringtone Modifying Software Storage Area H721c stores Callee's Current Location Data Producing Software H721c1, 1st Ringtone Audio Data Outputting Software H721c2, and 2nd Ringtone Audio Data Outputting Software H721c3. Callee's Current Location Data Producing Software H721c1 is the software program described in Paragraph [0049]. 1st Ringtone Audio Data Outputting Software H721c2 is the software program described in Paragraph [0050]. 2nd Ringtone Audio Data Outputting Software H721c3 is the software program described in Paragraph [0051].

This Paragraph [0038] illustrates the storage area included in RAM 206 (FIG. 1) of Communication Device 200. In the present embodiment, RAM 206 includes Caller's Area Dependent Ringtone Modifying Info Storage Area 206721a of which the data and the software program(s) stored therein are described in Paragraph [0040].

The data and/or the software program(s) necessary to implement the present function may be downloaded from Host H (Paragraph [0025]) to Communication Device 200.

This Paragraph [0040] illustrates the storage area(s) included in Caller's Area Dependent Ringtone Modifying Info Storage Area 206721a (Paragraph [0038]). In the present embodiment, Caller's Area Dependent Ringtone Modifying Info Storage Area 206721a includes Caller's Area Dependent Ringtone Modifying Data Storage Area 206721b and Caller's Area Dependent Ringtone Modifying Software Storage Area 206721c. Caller's Area Dependent Ringtone Modifying Data Storage Area 206721b stores the data necessary to implement the present function on the side of Communication Device 200, such as the one(s) described in Paragraph [0041]. Caller's Area Dependent Ringtone Modifying Software Storage Area 206721c stores the software program(s) necessary to implement the present function on the side of Communication Device 200, such as the one(s) described in Paragraph [0048].

This Paragraph [0041] illustrates the storage area(s) included in Caller's Area Dependent Ringtone Modifying Data Storage Area 206721b (Paragraph [0040]). In the present embodiment, Caller's Area Dependent Ringtone Modifying Data Storage Area 206721b includes Entire Current Location Data Storage Area 206721b1, Entire Geographic Area Data Storage Area 206721b2, Entire Ringtone Audio Data Storage Area 206721b3, Entire Ringtone Sound Volume Data Storage Area 206721b4, Entire Ringtone Visual Data Storage Area 206721b5, Map Data Storage Area 206721b6, Entire Current Location Icon Data Storage Area 206721b7, and Work Area 206721b8. Entire Current Location Data Storage Area 206721b1 stores the data described in Paragraph [0042]. Entire Geographic Area Data Storage Area 206721b2 stores the data described in Paragraph [0043]. Entire Ringtone Audio Data Storage Area 206721b3 stores the data described in Paragraph [0044]. Entire Ringtone Sound Volume Data Storage Area 206721b4 stores the data described in Paragraph [0045]. Entire Ringtone Visual Data Storage Area 206721b5 stores the data described in Paragraph [0046]. Map Data Storage Area 206721b6 stores the map data which is the image data indicating a map. Entire Current Location Icon Data Storage Area 206721b7 stores the data described in Paragraph [0047]. Work Area 206721b8 is utilized as a work area to perform calculation and temporarily store data to implement the present function.

This Paragraph [0042] illustrates the storage area(s) included in Entire Current Location Data Storage Area 206721b1 (Paragraph [0041]). In the present embodiment, Entire Current Location Data Storage Area 206721b1 includes Caller's Current Location Data Storage Area 206721b1a and Callee's Current Location Data Storage Area 206721b1b. Caller's Current Location Data Storage Area 206721b1a stores the caller's current location data which indicates the current geographic location of the caller's device (not shown) in (x,y,z,) format. Callee's Current Location Data Storage Area 206721b1b stores the callee's current location data which indicates the current geographic location of the callee's device, i.e., Communication Device 200, in (x,y,z,) format.

This Paragraph [0043] illustrates the storage area(s) included in Entire Geographic Area Data Storage Area 206721b2 (Paragraph [0041]). In the present embodiment, Entire Geographic Area Data Storage Area 206721b2 includes 1st Geographic Area Data Storage Area 206721b2a and 2nd Geographic Area Data Storage Area 206721b2b. 1st Geographic Area Data Storage Area 206721b2a stores the 1st geographic area data which indicates a certain geographic area (e.g., Sacramento Calif.). Here, the certain geographic area may be as small as the geographic area of 50 cm radius or as large as that of 500 km radius. 2nd Geographic Area Data Storage Area 206721b2b stores the 2nd geographic area data which indicates another certain geographic area (e.g., San Jose Calif.). Here, the certain geographic area may be as small as the geographic area of 50 cm radius or as large as that of 500 km radius.

This Paragraph [0044] illustrates the storage area(s) included in Entire Ringtone Audio Data Storage Area 206721b3 (Paragraph [0041]). In the present embodiment, Entire Ringtone Audio Data Storage Area 206721b3 includes 1st Ringtone Audio Data Storage Area 206721b3a and 2nd Ringtone Audio Data Storage Area 206721b3b. 1st Ringtone Audio Data Storage Area 206721b3a stores the 1st ringtone audio data which is the audio data output as a ringtone from Speaker 216 (FIG. 1). 2nd Ringtone Audio Data Storage Area 206721b3b stores the 2nd ringtone audio data which is another audio data output as a ringtone from Speaker 216 (FIG. 1).

This Paragraph [0045] illustrates the storage area(s) included in Entire Ringtone Sound Volume Data Storage Area 206721b4 (Paragraph [0041]). In the present embodiment, Entire Ringtone Sound Volume Data Storage Area 206721b4 includes 1st Ringtone Sound Volume Data Storage Area 206721b4a and 2nd Ringtone Sound Volume Data Storage Area 206721b4b. 1st Ringtone Sound Volume Data Storage Area 206721b4a stores the 1st ringtone sound volume data which indicates the sound volume of the ringtone output from Speaker 216 (FIG. 1). 2nd Ringtone Sound Volume Data Storage Area 206721b4b stores the 2nd ringtone sound volume data which indicates another sound volume of the ringtone output from Speaker 216 (FIG. 1).

This Paragraph [0046] illustrates the storage area(s) included in Entire Ringtone Visual Data Storage Area 206721b5 (Paragraph [0041]). In the present embodiment, Entire Ringtone Visual Data Storage Area 206721b5 includes 1st Ringtone Visual Data Storage Area 206721b5a and 2nd Ringtone Visual Data Storage Area 206721b5b. 1st Ringtone Visual Data Storage Area 206721b5a stores the 1st ringtone visual data which is the visual data displayed as a visual ringtone on LCD 201 (FIG. 1). 2nd Ringtone Visual Data Storage Area 206721b5b stores the 2nd ringtone visual data which is another visual data displayed as a visual ringtone on LCD 201 (FIG. 1).

This Paragraph [0047] illustrates the storage area(s) included in Entire Current Location Icon Data Storage Area 206721b7 (Paragraph [0041]). In the present embodiment, Entire Current Location Icon Data Storage Area 206721b7 includes Caller's Current Location Icon Data Storage Area 206721b7a and Callee's Current Location Icon Data Storage Area 206721b7b. Caller's Current Location Icon Data Storage Area 206721b7a stores the caller's current location icon data which is the image of the icon utilized to indicate the caller's current location data on the map data. Callee's Current Location Icon Data Storage Area 206721b7b stores the callee's current location icon data which is the image of the icon utilized to indicate the callee's current location data on the map data.

This Paragraph [0048] illustrates the software program(s) stored in Caller's Area Dependent Ringtone Modifying Software Storage Area 206721c (Paragraph [0040]). In the present embodiment, Caller's Area Dependent Ringtone Modifying Software Storage Area 206721c stores Callee's Current Location Data Producing Software 206721c1, 1st Ringtone Audio Data Outputting Software 206721c2, and 2nd Ringtone Audio Data Outputting Software 206721c3. Callee's Current Location Data Producing Software 206721c1 is the software program described in Paragraph [0049] and Paragraph [0053]. 1st Ringtone Audio Data Outputting Software 206721c2 is the software program described in Paragraph [0050], and Paragraph [0054]. 2nd Ringtone Audio Data Outputting Software 206721c3 is the software program described in Paragraph [0051], and Paragraph [0055].

This Paragraph [0049] illustrate(s) Callee's Current Location Data Producing Software H721c1 (Paragraph [0037]) of Host H (Paragraph [0025]) and Callee's Current Location Data Producing Software 206721c1 (Paragraph [0048]) of Communication Device 200, which produce(s) the callee's current location data. In the present embodiment, CPU 211 (FIG. 1) identifies the current location of Communication Device 200 (S1). CPU 211 (FIG. 1) produces the callee's current location data by referring to the current location identified in the previous step and sends the data to Host H (Paragraph [0025]) in a wireless fashion (S2). Host H (Paragraph [0025]) receives the callee's current location data from Communication Device 200 and stores the data in Callee's Current Location Data Storage Area H721b1b (Paragraph [0031]) (S3). The foregoing sequence is repeated periodically.

This Paragraph [0050] illustrate(s) 1st Ringtone Audio Data Outputting Software H721c2 (Paragraph [0037]) of Host H (Paragraph [0025]) and 1st Ringtone Audio Data Outputting Software 206721c2 (Paragraph [0048]) of Communication Device 200, which output(s) the 1st ringtone audio data and the 1st ringtone visual data. In the present embodiment, Host H (Paragraph [0025]) periodically checks the incoming signal (S1). If the phone communicating request from the caller's device (not shown) is detected in the incoming signal, Host H (Paragraph [0025]) proceeds to the next step (S2). Here, the phone communicating request is the request to implement a phone communication with Communication Device 200. The phone communicating request includes the caller's current location data. Host H (Paragraph [0025]) retrieves the caller's current location data from the phone communicating request detected in the previous step (S3). Host H (Paragraph [0025]) stores the caller's current location data retrieved in the previous step in Caller's Current Location Data Storage Area H721b1a (Paragraph [0031]) (S4). Host H (Paragraph [0025]) retrieves the caller's current location data from Caller's Current Location Data Storage Area H721b1a (Paragraph [0031]) (S5). Host H (Paragraph [0025]) retrieves the 1st geographic area data from 1st Geographic Area Data Storage Area H721b2a (Paragraph [0032]) (S6). If the caller's current location data retrieved in S5 is within the 1st geographic area data retrieved in the previous step, Host H (Paragraph [0025]) proceeds to the next step (S7). Host H (Paragraph [0025]) retrieves the 1st ringtone audio data from 1st Ringtone Audio Data Storage Area H721b3a (Paragraph [0033]) and sends the data to Communication Device 200 (S8). CPU 211 (FIG. 1) receives the 1st ringtone audio data from Host H (Paragraph [0025]) in a wireless fashion (S9). Host H (Paragraph [0025]) retrieves the 1st ringtone sound volume data from 1st Ringtone Sound Volume Data Storage Area H721b4a (Paragraph [0034]) and sends the data to Communication Device 200 (S10). CPU 211 (FIG. 1) receives the 1st ringtone sound volume data from Host H (Paragraph [0025]) in a wireless fashion (S11). CPU 211 (FIG. 1) outputs the 1st ringtone audio data received in S9 with the sound volume indicated by the 1st ringtone sound volume data received in the previous step from Speaker 216 (FIG. 1) (S12). Host H (Paragraph [0025]) retrieves the 1st ringtone visual data from 1st Ringtone Visual Data Storage Area H721b5a (Paragraph [0035]) and sends the data to Communication Device 200 (S13). CPU 211 (FIG. 1) receives the 1st ringtone visual data from Host H (Paragraph [0025]) in a wireless fashion and displays the data on LCD 201 (FIG. 1) (S14). Host H (Paragraph [0025]) retrieves the map data from Map Data Storage Area H721b6 (Paragraph [0030]) and sends the data to Communication Device 200 (S15). CPU 211 (FIG. 1) receives the map data from Host H (Paragraph [0025]) in a wireless fashion and displays the data on LCD 201 (FIG. 1) (S16). Host H (Paragraph [0025]) retrieves the caller's current location data from Caller's Current Location Data Storage Area H721b1a (Paragraph [0031]) and sends the data to Communication Device 200 (S17). CPU 211 (FIG. 1) receives the caller's current location data from Host H (Paragraph [0025]) in a wireless fashion (S18). Host H (Paragraph [0025]) retrieves the caller's current location icon data from Caller's Current Location Icon Data Storage Area H721b7a (Paragraph [0036]) and sends the data to Communication Device 200 (S19). CPU 211 (FIG. 1) receives the caller's current location icon data from Host H (Paragraph [0025]) in a wireless fashion (S20). CPU 211 (FIG. 1) displays the caller's current location icon data received in the previous step at the location corresponding to the caller's current location data received in (S18 on the map data displayed in (S16 (S21). Host H (Paragraph [0025]) retrieves the callee's current location data from Callee's Current Location Data Storage Area H721b1b (Paragraph [0031]) and sends the data to Communication Device 200 (S22). CPU 211 (FIG. 1) receives the callee's current location data from Host H (Paragraph [0025]) in a wireless fashion (S23). Host H (Paragraph [0025]) retrieves the callee's current location icon data from Callee's Current Location Icon Data Storage Area H721b7b (Paragraph [0036]) and sends the data to Communication Device 200 (S24). CPU 211 (FIG. 1) receives the callee's current location icon data from Host H (Paragraph [0025]) in a wireless fashion (S25). CPU 211 (FIG. 1) displays the callee's current location icon data received in the previous step at the location corresponding to the callee's current location data received in S23 on the map data displayed in (S16 (S26). The foregoing sequence is repeated periodically.

This Paragraph [0051] illustrate(s) 2nd Ringtone Audio Data Outputting Software H721c3 (Paragraph [0037]) of Host H (Paragraph [0025]) and 2nd Ringtone Audio Data Outputting Software 206721c3 (Paragraph [0048]) of Communication Device 200, which output(s) the 2nd ringtone audio data and the 2nd ringtone visual data. In the present embodiment, Host H (Paragraph [0025]) periodically checks the incoming signal (S1). If the phone communicating request from the caller's device (not shown) is detected in the incoming signal, Host H (Paragraph [0025]) proceeds to the next step (S2). Here, the phone communicating request is the request to implement a phone communication with Communication Device 200. The phone communicating request includes the caller's current location data. Host H (Paragraph [0025]) retrieves the caller's current location data from the phone communicating request detected in the previous step (S3). Host H (Paragraph [0025]) stores the caller's current location data retrieved in the previous step in Caller's Current Location Data Storage Area H721b1a (Paragraph [0031]) (S4). Host H (Paragraph [0025]) retrieves the caller's current location data from Caller's Current Location Data Storage Area H721b1a (Paragraph [0031]) (S5). Host H (Paragraph [0025]) retrieves the 2nd geographic area data from 2nd Geographic Area Data Storage Area H721b2b (Paragraph [0032]) (S6). If the caller's current location data retrieved in S5 is within the 2nd geographic area data retrieved in the previous step, Host H (Paragraph [0025]) proceeds to the next step (S7). Host H (Paragraph [0025]) retrieves the 2nd ringtone audio data from 2nd Ringtone Audio Data Storage Area H721b3b (Paragraph [0033]) and sends the data to Communication Device 200 (S8). CPU 211 (FIG. 1) receives the 2nd ringtone audio data from Host H (Paragraph [0025]) in a wireless fashion (S9). Host H (Paragraph [0025]) retrieves the 2nd ringtone sound volume data from 2nd Ringtone Sound Volume Data Storage Area H721b4b (Paragraph [0034]) and sends the data to Communication Device 200 (S10). CPU 211 (FIG. 1) receives the 2nd ringtone sound volume data from Host H (Paragraph [0025]) in a wireless fashion (S11). CPU 211 (FIG. 1) outputs the 2nd ringtone audio data received in S9 with the sound volume indicated by the 2nd ringtone sound volume data received in the previous step from Speaker 216 (FIG. 1) (S12). Host H (Paragraph [0025]) retrieves the 2nd ringtone visual data from 2nd Ringtone Visual Data Storage Area H721b5b (Paragraph [0035]) and sends the data to Communication Device 200 (S13). CPU 211 (FIG. 1) receives the 2nd ringtone visual data from Host H (Paragraph [0025]) in a wireless fashion and displays the data on LCD 201 (FIG. 1) (S14). Host H (Paragraph [0025]) retrieves the map data from Map Data Storage Area H721b6 (Paragraph [0030]) and sends the data to Communication Device 200 (S15). CPU 211 (FIG. 1) receives the map data from Host H (Paragraph [0025]) in a wireless fashion and displays the data on LCD 201 (FIG. 1) (S16). Host H (Paragraph [0025]) retrieves the caller's current location data from Caller's Current Location Data Storage Area H721b1a (Paragraph [0031]) and sends the data to Communication Device 200 (S17). CPU 211 (FIG. 1) receives the caller's current location data from Host H (Paragraph [0025]) in a wireless fashion (S18). Host H (Paragraph [0025]) retrieves the caller's current location icon data from Caller's Current Location Icon Data Storage Area H721b7a (Paragraph [0036]) and sends the data to Communication Device 200 (S19). CPU 211 (FIG. 1) receives the caller's current location icon data from Host H (Paragraph [0025]) in a wireless fashion (S20). CPU 211 (FIG. 1) displays the caller's current location icon data received in the previous step at the location corresponding to the caller's current location data received in (S18 on the map data displayed in (S16 (S21). Host H (Paragraph [0025]) retrieves the callee's current location data from Callee's Current Location Data Storage Area H721b1b (Paragraph [0031]) and sends the data to Communication Device 200 (S22). CPU 211 (FIG. 1) receives the callee's current location data from Host H (Paragraph [0025]) in a wireless fashion (S23). Host H (Paragraph [0025]) retrieves the callee's current location icon data from Callee's Current Location Icon Data Storage Area H721b7b (Paragraph [0036]) and sends the data to Communication Device 200 (S24). CPU 211 (FIG. 1) receives the callee's current location icon data from Host H (Paragraph [0025]) in a wireless fashion (S25). CPU 211 (FIG. 1) displays the callee's current location icon data received in the previous step at the location corresponding to the callee's current location data received in S23 on the map data displayed in (S16 (S26). The foregoing sequence is repeated periodically.

Paragraph [0053] through Paragraph [0055] illustrate another embodiment wherein Communication Device 200 plays the major role in implementing the present function.

This Paragraph [0053] illustrate(s) Callee's Current Location Data Producing Software 206721c1 (Paragraph [0048]) of Communication Device 200, which produce(s) the callee's current location data. In the present embodiment, CPU 211 (FIG. 1) identifies the current location of Communication Device 200 (S1). CPU 211 (FIG. 1) produces the callee's current location data by referring to the current location identified in the previous step (S2). CPU 211 (FIG. 1) stores the callee's current location data produced in the previous step in Callee's Current Location Data Storage Area 206721b1b (Paragraph [0042]) (S3). The foregoing sequence is repeated periodically.

This Paragraph [0054] illustrate(s) 1st Ringtone Audio Data Outputting Software 206721c2 (Paragraph [0048]) of Communication Device 200, which output(s) the 1st ringtone audio data and the 1st ringtone visual data. In the present embodiment, CPU 211 (FIG. 1) periodically checks the incoming signal (S1). If the phone communicating request from the caller's device (not shown) is detected in the incoming signal, CPU 211 (FIG. 1) proceeds to the next step (S2). Here, the phone communicating request is the request to implement a phone communication with Communication Device 200. The phone communicating request includes the caller's current location data. CPU 211 (FIG. 1) retrieves the caller's current location data from the phone communicating request detected in the previous step (S3). CPU 211 (FIG. 1) stores the caller's current location data retrieved in the previous step in Caller's Current Location Data Storage Area 206721b1a (Paragraph [0042]) (S4). CPU 211 (FIG. 1) retrieves the caller's current location data from Caller's Current Location Data Storage Area 206721b1a (Paragraph [0042]) (S5). CPU 211 (FIG. 1) retrieves the 1st geographic area data from 1st Geographic Area Data Storage Area 206721b2a (Paragraph [0043]) (S6). If the caller's current location data retrieved in S5 is within the 1st geographic area data retrieved in the previous step, CPU 211 (FIG. 1) proceeds to the next step (S7). CPU 211 (FIG. 1) retrieves the 1st ringtone audio data from 1st Ringtone Audio Data Storage Area 206721b3a (Paragraph [0044]) (S8). CPU 211 (FIG. 1) retrieves the 1st ringtone sound volume data from 1st Ringtone Sound Volume Data Storage Area 206721b4a (Paragraph [0045]) (S9). CPU 211 (FIG. 1) outputs the 1st ringtone audio data retrieved in S8 with the sound volume indicated by the 1st ringtone sound volume data retrieved in the previous step from Speaker 216 (FIG. 1) (S10). CPU 211 (FIG. 1) retrieves the 1st ringtone visual data from 1st Ringtone Visual Data Storage Area 206721b5a (Paragraph [0046]) (S11). CPU 211 (FIG. 1) displays the 1st ringtone visual data retrieved in the previous step on LCD 201 (FIG. 1) (S12). CPU 211 (FIG. 1) retrieves the map data from Map Data Storage Area 206721b6 (Paragraph [0041]) (S13). CPU 211 (FIG. 1) displays the map data retrieved in the previous step on LCD 201 (FIG. 1) (S14). CPU 211 (FIG. 1) retrieves the caller's current location data from Caller's Current Location Data Storage Area 206721b1a (Paragraph [0042]) (S15). CPU 211 (FIG. 1) retrieves the caller's current location icon data from Caller's Current Location Icon Data Storage Area 206721b7a (Paragraph [0047]) (S16). CPU 211 (FIG. 1) displays the caller's current location icon data retrieved in the previous step at the location corresponding to the caller's current location data retrieved in (S15 on the map data displayed in (S14 (S17). CPU 211 (FIG. 1) retrieves the callee's current location data from Callee's Current Location Data Storage Area 206721b1b (Paragraph [0042]) (S18). CPU 211 (FIG. 1) retrieves the callee's current location icon data from Callee's Current Location Icon Data Storage Area 206721b7b (Paragraph [0047]) (S19). CPU 211 (FIG. 1) displays the callee's current location icon data retrieved in the previous step at the location corresponding to the callee's current location data retrieved in (S18 on the map data displayed in (S14 (S20). The foregoing sequence is repeated periodically.

This Paragraph [0055] illustrate(s) 2nd Ringtone Audio Data Outputting Software 206721c3 (Paragraph [0048]) of Communication Device 200, which output(s) the 2nd ringtone audio data and the 2nd ringtone visual data. In the present embodiment, CPU 211 (FIG. 1) periodically checks the incoming signal (S1). If the phone communicating request from the caller's device (not shown) is detected in the incoming signal, CPU 211 (FIG. 1) proceeds to the next step (S2). Here, the phone communicating request is the request to implement a phone communication with Communication Device 200. The phone communicating request includes the caller's current location data. CPU 211 (FIG. 1) retrieves the caller's current location data from the phone communicating request detected in the previous step (S3). CPU 211 (FIG. 1) stores the caller's current location data retrieved in the previous step in Caller's Current Location Data Storage Area 206721b1a (Paragraph [0042]) (S4). CPU 211 (FIG. 1) retrieves the caller's current location data from Caller's Current Location Data Storage Area 206721b1a (Paragraph [0042]) (S5). CPU 211 (FIG. 1) retrieves the 2nd geographic area data from 2nd Geographic Area Data Storage Area 206721b2b (Paragraph [0043]) (S6). If the caller's current location data retrieved in S5 is within the 2nd geographic area data retrieved in the previous step, CPU 211 (FIG. 1) proceeds to the next step (S7). CPU 211 (FIG. 1) retrieves the 2nd ringtone audio data from 2nd Ringtone Audio Data Storage Area 206721b3b (Paragraph [0044]) (S8). CPU 211 (FIG. 1) retrieves the 2nd ringtone sound volume data from 2nd Ringtone Sound Volume Data Storage Area 206721b4b (Paragraph [0045]) (S9). CPU 211 (FIG. 1) outputs the 2nd ringtone audio data retrieved in S8 with the sound volume indicated by the 2nd ringtone sound volume data retrieved in the previous step from Speaker 216 (FIG. 1) (S10). CPU 211 (FIG. 1) retrieves the 2nd ringtone visual data from 2nd Ringtone Visual Data Storage Area 206721b5b (Paragraph [0046]) (S11). CPU 211 (FIG. 1) displays the 2nd ringtone visual data retrieved in the previous step on LCD 201 (FIG. 1) (S12). CPU 211 (FIG. 1) retrieves the map data from Map Data Storage Area 206721b6 (Paragraph [0041]) (S13). CPU 211 (FIG. 1) displays the map data retrieved in the previous step on LCD 201 (FIG. 1) (S14). CPU 211 (FIG. 1) retrieves the caller's current location data from Caller's Current Location Data Storage Area 206721b1a (Paragraph [0042]) (S15). CPU 211 (FIG. 1) retrieves the caller's current location icon data from Caller's Current Location Icon Data Storage Area 206721b7a (Paragraph [0047]) (S16). CPU 211 (FIG. 1) displays the caller's current location icon data retrieved in the previous step at the location corresponding to the caller's current location data retrieved in (S15 on the map data displayed in (S14 (S17). CPU 211 (FIG. 1) retrieves the callee's current location data from Callee's Current Location Data Storage Area 206721b1b (Paragraph [0042]) (S18). CPU 211 (FIG. 1) retrieves the callee's current location icon data from Callee's Current Location Icon Data Storage Area 206721b7b (Paragraph [0047]) (S19). CPU 211 (FIG. 1) displays the callee's current location icon data retrieved in the previous step at the location corresponding to the callee's current location data retrieved in (S18 on the map data displayed in (S14 (S20). The foregoing sequence is repeated periodically.

<<Caller's Distance Dependent Ringtone Modifying Function>>

Paragraph [0058] through Paragraph [0085] illustrate the caller's distance dependent ringtone modifying function, wherein when receiving a phone call from a caller's device, a current distance which indicates the current distance between said caller's device and said communication device is identified, if said current distance is within a 1st distance range, a 1st ringtone audio data is output from said speaker with the sound volume indicated by a 1st ringtone sound volume data and a 1st ringtone visual data is displayed on said display, if said current distance is within a 2nd distance range, a 2nd ringtone audio data is output from said speaker with the sound volume indicated by a 2nd ringtone sound volume data and a 2nd ringtone visual data is displayed on said display, and a caller's current location which indicates the current geographic location of said caller's device and a callee's current location which indicates the current geographic location of said communication device are indicated.

This Paragraph [0058] illustrates the storage area included in Host H (Paragraph [0025]). In the present embodiment, Host H (Paragraph [0025]) includes Caller's Distance Dependent Ringtone Modifying Info Storage Area H722a of which the data and the software program(s) stored therein are described in Paragraph [0059].

This Paragraph [0059] illustrates the storage area(s) included in Caller's Distance Dependent Ringtone Modifying Info Storage Area H722a (Paragraph [0058]). In the present embodiment, Caller's Distance Dependent Ringtone Modifying Info Storage Area H722a includes Caller's Distance Dependent Ringtone Modifying Data Storage Area H722b and Caller's Distance Dependent Ringtone Modifying Software Storage Area H722c. Caller's Distance Dependent Ringtone Modifying Data Storage Area H722b stores the data necessary to implement the present function on the side of Host H (Paragraph [0025]), such as the one(s) described in Paragraph [0060]. Caller's Distance Dependent Ringtone Modifying Software Storage Area H722c stores the software program(s) necessary to implement the present function on the side of Host H (Paragraph [0025]), such as the one(s) described in Paragraph [0067].

This Paragraph [0060] illustrates the storage area(s) included in Caller's Distance Dependent Ringtone Modifying Data Storage Area H722b (Paragraph [0059]). In the present embodiment, Caller's Distance Dependent Ringtone Modifying Data Storage Area H722b includes Entire Current Location Data Storage Area H722b1, Entire Distance Data Storage Area H722b2, Current Distance Data Storage Area H722b3, Entire Ringtone Audio Data Storage Area H722b4, Entire Ringtone Sound Volume Data Storage Area H722b5, Entire Ringtone Visual Data Storage Area H722b6, Map Data Storage Area H722b7, Entire Current Location Icon Data Storage Area H722b8, and Work Area H722b9. Entire Current Location Data Storage Area H722b1 stores the data described in Paragraph [0061]. Entire Distance Data Storage Area H722b2 stores the data described in Paragraph Current Distance Data Storage Area H722b3 stores the current distance data which indicates the current distance between the caller's device and the callee's device, i.e., Communication Device 200. Entire Ringtone Audio Data Storage Area H722b4 stores the data described in Paragraph [0063]. Entire Ringtone Sound Volume Data Storage Area H722b5 stores the data described in Paragraph [0064]. Entire Ringtone Visual Data Storage Area H722b6 stores the data described in Paragraph [0065]. Map Data Storage Area H722b7 stores the map data which is the image data indicating a map. Entire Current Location Icon Data Storage Area H722b8 stores the data described in Paragraph [0066]. Work Area H722b9 is utilized as a work area to perform calculation and temporarily store data to implement the present function.

This Paragraph [0061] illustrates the storage area(s) included in Entire Current Location Data Storage Area H722b1 (Paragraph [0060]). In the present embodiment, Entire Current Location Data Storage Area H722b1 includes Caller's Current Location Data Storage Area H722b1a and Callee's Current Location Data Storage Area H722b1b. Caller's Current Location Data Storage Area H722b1a stores the caller's current location data which indicates the current geographic location of the caller's device (not shown) in (x,y,z,) format. Callee's Current Location Data Storage Area H722b1b stores the callee's current location data which indicates the current geographic location of the callee's device, i.e., Communication Device 200, in (x,y,z,) format.

This Paragraph [0062] illustrates the storage area(s) included in Entire Distance Data Storage Area H722b2 (Paragraph [0060]). In the present embodiment, Entire Distance Data Storage Area H722b2 includes 1st Distance Data Storage Area H722b2a and 2nd Distance Data Storage Area H722b2b. 1st Distance Data Storage Area H722b2a stores the 1st distance data which indicates a certain distance between Communication Device 200 and the caller's device (e.g., 100 meters). 2nd Distance Data Storage Area H722b2b stores the 2nd distance data which indicates another certain distance between Communication Device 200 and the caller's device (e.g., 200 meters).

This Paragraph [0063] illustrates the storage area(s) included in Entire Ringtone Audio Data Storage Area H722b4 (Paragraph [0060]). In the present embodiment, Entire Ringtone Audio Data Storage Area H722b4 includes 1st Ringtone Audio Data Storage Area H722b4a and 2nd Ringtone Audio Data Storage Area H722b4b. 1st Ringtone Audio Data Storage Area H722b4a stores the 1st ringtone audio data which is the audio data output as a ringtone from Speaker 216 (FIG. 1). 2nd Ringtone Audio Data Storage Area H722b4b stores the 2nd ringtone audio data which is another audio data output as a ringtone from Speaker 216 (FIG. 1).

This Paragraph [0064] illustrates the storage area(s) included in Entire Ringtone Sound Volume Data Storage Area H722b5 (Paragraph [0060]). In the present embodiment, Entire Ringtone Sound Volume Data Storage Area H722b5 includes 1st Ringtone Sound Volume Data Storage Area H722b5a and 2nd Ringtone Sound Volume Data Storage Area H722b5b. 1st Ringtone Sound Volume Data Storage Area H722b5a stores the 1st ringtone sound volume data which indicates the sound volume of the ringtone output from Speaker 216 (FIG. 1). 2nd Ringtone Sound Volume Data Storage Area H722b5b stores the 2nd ringtone sound volume data which indicates another sound volume of the ringtone output from Speaker 216 (FIG. 1).

This Paragraph [0065] illustrates the storage area(s) included in Entire Ringtone Visual Data Storage Area H722b6 (Paragraph [0060]). In the present embodiment, Entire Ringtone Visual Data Storage Area H722b6 includes 1st Ringtone Visual Data Storage Area H722b6a and 2nd Ringtone Visual Data Storage Area H722b6b. 1st Ringtone Visual Data Storage Area H722b6a stores the 1st ringtone visual data which is the visual data displayed as a visual ringtone on LCD 201 (FIG. 1). 2nd Ringtone Visual Data Storage Area H722b6b stores the 2nd ringtone visual data which is another visual data displayed as a visual ringtone on LCD 201 (FIG. 1).

This Paragraph [0066] illustrates the storage area(s) included in Entire Current Location Icon Data Storage Area H722b8 (Paragraph [0060]). In the present embodiment, Entire Current Location Icon Data Storage Area H722b8 includes Caller's Current Location Icon Data Storage Area H722b8a and Callee's Current Location Icon Data Storage Area H722b8b. Caller's Current Location Icon Data Storage Area H722b8a stores the caller's current location icon data which is the image of the icon utilized to indicate the caller's current location data on the map data. Callee's Current Location Icon Data Storage Area H722b8b stores the callee's current location icon data which is the image of the icon utilized to indicate the callee's current location data on the map data.

This Paragraph [0067] illustrates the software program(s) stored in Caller's Distance Dependent Ringtone Modifying Software Storage Area H722c (Paragraph [0059]). In the present embodiment, Caller's Distance Dependent Ringtone Modifying Software Storage Area H722c stores Callee's Current Location Data Producing Software H722c1, 1st Ringtone Audio Data Outputting Software H722c2, and 2nd Ringtone Audio Data Outputting Software H722c3. Callee's Current Location Data Producing Software H722c1 is the software program described in Paragraph [0079]. 1st Ringtone Audio Data Outputting Software H722c2 is the software program described in Paragraph [0080]. 2nd Ringtone Audio Data Outputting Software H722c3 is the software program described in Paragraph [0081].

This Paragraph [0068] illustrates the storage area included in RAM 206 (FIG. 1) of Communication Device 200. In the present embodiment, RAM 206 includes Caller's Distance Dependent Ringtone Modifying Info Storage Area 206722a of which the data and the software program(s) stored therein are described in Paragraph [0070].

The data and/or the software program(s) necessary to implement the present function may be downloaded from Host H (Paragraph [0025]) to Communication Device 200.

This Paragraph [0070] illustrates the storage area(s) included in Caller's Distance Dependent Ringtone Modifying Info Storage Area 206722a (Paragraph [0068]). In the present embodiment, Caller's Distance Dependent Ringtone Modifying Info Storage Area 206722a includes Caller's Distance Dependent Ringtone Modifying Data Storage Area 206722b and Caller's Distance Dependent Ringtone Modifying Software Storage Area 206722c. Caller's Distance Dependent Ringtone Modifying Data Storage Area 206722b stores the data necessary to implement the present function on the side of Communication Device 200, such as the one(s) described in Paragraph [0071]. Caller's Distance Dependent Ringtone Modifying Software Storage Area 206722c stores the software program(s) necessary to implement the present function on the side of Communication Device 200, such as the one(s) described in Paragraph [0078].

This Paragraph [0071] illustrates the storage area(s) included in Caller's Distance Dependent Ringtone Modifying Data Storage Area 206722b (Paragraph [0070]). In the present embodiment, Caller's Distance Dependent Ringtone Modifying Data Storage Area 206722b includes Entire Current Location Data Storage Area 206722b1, Entire Distance Data Storage Area 206722b2, Current Distance Data Storage Area 206722b3, Entire Ringtone Audio Data Storage Area 206722b4, Entire Ringtone Sound Volume Data Storage Area 206722b5, Entire Ringtone Visual Data Storage Area 206722b6, Map Data Storage Area 206722b7, Entire Current Location Icon Data Storage Area 206722b8, and Work Area 206722b9. Entire Current Location Data Storage Area 206722b1 stores the data described in Paragraph [0072]. Entire Distance Data Storage Area 206722b2 stores the data described in Paragraph [0073]. Current Distance Data Storage Area 206722b3 stores the current distance data which indicates the current distance between the caller's device and the callee's device, i.e., Communication Device 200. Entire Ringtone Audio Data Storage Area 206722b4 stores the data described in Paragraph [0074]. Entire Ringtone Sound Volume Data Storage Area 206722b5 stores the data described in Paragraph [0075]. Entire Ringtone Visual Data Storage Area 206722b6 stores the data described in Paragraph [0076]. Map Data Storage Area 206722b7 stores the map data which is the image data indicating a map. Entire Current Location Icon Data Storage Area 206722b8 stores the data described in Paragraph [0077]. Work Area 206722b9 is utilized as a work area to perform calculation and temporarily store data to implement the present function.

This Paragraph [0072] illustrates the storage area(s) included in Entire Current Location Data Storage Area 206722b1 (Paragraph [0071]). In the present embodiment, Entire Current Location Data Storage Area 206722b1 includes Caller's Current Location Data Storage Area 206722b1a and Callee's Current Location Data Storage Area 206722b1b. Caller's Current Location Data Storage Area 206722b1a stores the caller's current location data which indicates the current geographic location of the caller's device (not shown) in (x,y,z,) format. Callee's Current Location Data Storage Area 206722b1b stores the callee's current location data which indicates the current geographic location of the callee's device, i.e., Communication Device 200, in (x,y,z,) format.

This Paragraph [0073] illustrates the storage area(s) included in Entire Distance Data Storage Area 206722b2 (Paragraph [0071]). In the present embodiment, Entire Distance Data Storage Area 206722b2 includes 1st Distance Data Storage Area 206722b2a and 2nd Distance Data Storage Area 206722b2b. 1st Distance Data Storage Area 206722b2a stores the 1st distance data which indicates a certain distance between Communication Device 200 and the caller's device (e.g., 100 meters). 2nd Distance Data Storage Area 206722b2b stores the 2nd distance data which indicates another certain distance between Communication Device 200 and the caller's device (e.g., 200 meters).

This Paragraph [0074] illustrates the storage area(s) included in Entire Ringtone Audio Data Storage Area 206722b4 (Paragraph [0071]). In the present embodiment, Entire Ringtone Audio Data Storage Area 206722b4 includes 1st Ringtone Audio Data Storage Area 206722b4a and 2nd Ringtone Audio Data Storage Area 206722b4b. 1st Ringtone Audio Data Storage Area 206722b4a stores the 1st ringtone audio data which is the audio data output as a ringtone from Speaker 216 (FIG. 1). 2nd Ringtone Audio Data Storage Area 206722b4b stores the 2nd ringtone audio data which is another audio data output as a ringtone from Speaker 216 (FIG. 1).

This Paragraph [0075] illustrates the storage area(s) included in Entire Ringtone Sound Volume Data Storage Area 206722b5 (Paragraph [0071]). In the present embodiment, Entire Ringtone Sound Volume Data Storage Area 206722b5 includes 1st Ringtone Sound Volume Data Storage Area 206722b5a and 2nd Ringtone Sound Volume Data Storage Area 206722b5b. 1st Ringtone Sound Volume Data Storage Area 206722b5a stores the 1st ringtone sound volume data which indicates the sound volume of the ringtone output from Speaker 216 (FIG. 1). 2nd Ringtone Sound Volume Data Storage Area 206722b5b stores the 2nd ringtone sound volume data which indicates another sound volume of the ringtone output from Speaker 216 (FIG. 1).

This Paragraph [0076] illustrates the storage area(s) included in Entire Ringtone Visual Data Storage Area 206722b6 (Paragraph [0071]). In the present embodiment, Entire Ringtone Visual Data Storage Area 206722b6 includes 1st Ringtone Visual Data Storage Area 206722b6a and 2nd Ringtone Visual Data Storage Area 206722b6b. 1st Ringtone Visual Data Storage Area 206722b6a stores the 1st ringtone visual data which is the visual data displayed as a visual ringtone on LCD 201 (FIG. 1). 2nd Ringtone Visual Data Storage Area 206722b6b stores the 2nd ringtone visual data which is another visual data displayed as a visual ringtone on LCD 201 (FIG. 1).

This Paragraph [0077] illustrates the storage area(s) included in Entire Current Location Icon Data Storage Area 206722b8 (Paragraph [0071]). In the present embodiment, Entire Current Location Icon Data Storage Area 206722b8 includes Caller's Current Location Icon Data Storage Area 206722b8a and Callee's Current Location Icon Data Storage Area 206722b8b. Caller's Current Location Icon Data Storage Area 206722b8a stores the caller's current location icon data which is the image of the icon utilized to indicate the caller's current location data on the map data. Callee's Current Location Icon Data Storage Area 206722b8b stores the callee's current location icon data which is the image of the icon utilized to indicate the callee's current location data on the map data.

This Paragraph [0078] illustrates the software program(s) stored in Caller's Distance Dependent Ringtone Modifying Software Storage Area 206722c (Paragraph [0070]). In the present embodiment, Caller's Distance Dependent Ringtone Modifying Software Storage Area 206722c stores Callee's Current Location Data Producing Software 206722c1, 1st Ringtone Audio Data Outputting Software 206722c2, and 2nd Ringtone Audio Data Outputting Software 206722c3. Callee's Current Location Data Producing Software 206722c1 is the software program described in Paragraph [0079] and Paragraph [0083]. 1st Ringtone Audio Data Outputting Software 206722c2 is the software program described in Paragraph [0080], and Paragraph [0084]. 2nd Ringtone Audio Data Outputting Software 206722c3 is the software program described in Paragraph [0081], and Paragraph [0085].

This Paragraph [0079] illustrate(s) Callee's Current Location Data Producing Software H722c1 (Paragraph [0067]) of Host H (Paragraph [0025]) and Callee's Current Location Data Producing Software 206722c1 (Paragraph [0078]) of Communication Device 200, which produce(s) the callee's current location data. In the present embodiment, CPU 211 (FIG. 1) identifies the current location of Communication Device 200 (S1). CPU 211 (FIG. 1) produces the callee's current location data by referring to the current location identified in the previous step and sends the data to Host H (Paragraph [0025]) in a wireless fashion (S2). Host H (Paragraph [0025]) receives the callee's current location data from Communication Device 200 and stores the data in Callee's Current Location Data Storage Area H722b1b (Paragraph [0061]) (S3). The foregoing sequence is repeated periodically.

This Paragraph [0080] illustrate(s) 1st Ringtone Audio Data Outputting Software H722c2 (Paragraph [0067]) of Host H (Paragraph [0025]) and 1st Ringtone Audio Data Outputting Software 206722c2 (Paragraph [0078]) of Communication Device 200, which output(s) the 1st ringtone audio data and the 1st ringtone visual data. In the present embodiment, Host H (Paragraph [0025]) periodically checks the incoming signal (S1). If the phone communicating request from the caller's device (not shown) is detected in the incoming signal, Host H (Paragraph [0025]) proceeds to the next step (S2). Here, the phone communicating request is the request to implement a phone communication with Communication Device 200. The phone communicating request includes the caller's current location data. Host H (Paragraph [0025]) retrieves the caller's current location data from the phone communicating request detected in the previous step (S3). Host H (Paragraph [0025]) stores the caller's current location data retrieved in the previous step in Caller's Current Location Data Storage Area H722b1a (Paragraph [0061]) (S4). Host H (Paragraph [0025]) retrieves the caller's current location data from Caller's Current Location Data Storage Area H722b1a (Paragraph [0061]) (S5). Host H (Paragraph [0025]) retrieves the callee's current location data from Callee's Current Location Data Storage Area H722b1b (Paragraph [0061]) (S6). Host H (Paragraph [0025]) calculates the current distance data by utilizing the caller's current location data retrieved in S5 and the callee's current location data retrieved in the previous step (S7). Host H (Paragraph [0025]) stores the current distance data calculated in the previous step in Current Distance Data Storage Area H722b3 (Paragraph [0060]) (S8). Host H (Paragraph [0025]) retrieves the current distance data from Current Distance Data Storage Area H722b3 (Paragraph [0060]) (S9). Host H (Paragraph [0025]) retrieves the 1st distance data from 1st Distance Data Storage Area H722b2a (Paragraph [0062]) (S10). If the current distance data retrieved in S9 is smaller than the 1st distance data retrieved in the previous step, Host H (Paragraph [0025]) proceeds to the next step (S11). Host H (Paragraph [0025]) retrieves the 1st ringtone audio data from 1st Ringtone Audio Data Storage Area H722b4a (Paragraph [0063]) and sends the data to Communication Device 200 (S12). CPU 211 (FIG. 1) receives the 1st ringtone audio data from Host H (Paragraph [0025]) in a wireless fashion (S13). Host H (Paragraph [0025]) retrieves the 1st ringtone sound volume data from 1st Ringtone Sound Volume Data Storage Area H722b5a (Paragraph [0064]) and sends the data to Communication Device 200 (S14). CPU 211 (FIG. 1) receives the 1st ringtone sound volume data from Host H (Paragraph [0025]) in a wireless fashion (S15). CPU 211 (FIG. 1) outputs the 1st ringtone audio data received in (S13 with the sound volume indicated by the 1st ringtone sound volume data received in the previous step from Speaker 216 (FIG. 1) (S16). Host H (Paragraph [0025]) retrieves the 1st ringtone visual data from 1st Ringtone Visual Data Storage Area H722b6a (Paragraph [0065]) and sends the data to Communication Device 200 (S17). CPU 211 (FIG. 1) receives the 1st ringtone visual data from Host H (Paragraph [0025]) in a wireless fashion and displays the data on LCD 201 (FIG. 1) (S18). Host H (Paragraph [0025])

retrieves the map data from Map Data Storage Area H722b7 (Paragraph [0060]) and sends the data to Communication Device 200 (S19). CPU 211 (FIG. 1) receives the map data from Host H (Paragraph [0025]) in a wireless fashion and displays the data on LCD 201 (FIG. 1) (S20). Host H (Paragraph [0025]) retrieves the caller's current location data from Caller's Current Location Data Storage Area H722b1a (Paragraph [0061]) and sends the data to Communication Device 200 (S21). CPU 211 (FIG. 1) receives the caller's current location data from Host H (Paragraph [0025]) in a wireless fashion (S22). Host H (Paragraph [0025]) retrieves the caller's current location icon data from Caller's Current Location Icon Data Storage Area H722b8a (Paragraph [0066]) and sends the data to Communication Device 200 (S23). CPU 211 (FIG. 1) receives the caller's current location icon data from Host H (Paragraph [0025]) in a wireless fashion (S24). CPU 211 (FIG. 1) displays the caller's current location icon data received in the previous step at the location corresponding to the caller's current location data received in S22 on the map data displayed in S20 (S25). Host H (Paragraph [0025]) retrieves the callee's current location data from Callee's Current Location Data Storage Area H722b1b (Paragraph [0061]) and sends the data to Communication Device 200 (S26). CPU 211 (FIG. 1) receives the callee's current location data from Host H (Paragraph [0025]) in a wireless fashion (S27). Host H (Paragraph [0025]) retrieves the callee's current location icon data from Callee's Current Location Icon Data Storage Area H722b8b (Paragraph [0066]) and sends the data to Communication Device 200 (S28). CPU 211 (FIG. 1) receives the callee's current location icon data from Host H (Paragraph [0025]) in a wireless fashion (S29). CPU 211 (FIG. 1) displays the callee's current location icon data received in the previous step at the location corresponding to the callee's current location data received in S27 on the map data displayed in S20 (S30). The foregoing sequence is repeated periodically.

This Paragraph [0081] illustrate(s) 2nd Ringtone Audio Data Outputting Software H722c3 (Paragraph [0067]) of Host H (Paragraph [0025]) and 2nd Ringtone Audio Data Outputting Software 206722c3 (Paragraph [0078]) of Communication Device 200, which output(s) the 2nd ringtone audio data and the 2nd ringtone visual data. In the present embodiment, Host H (Paragraph [0025]) periodically checks the incoming signal (S1). If the phone communicating request from the caller's device (not shown) is detected in the incoming signal, Host H (Paragraph [0025]) proceeds to the next step (S2). Here, the phone communicating request is the request to implement a phone communication with Communication Device 200. The phone communicating request includes the caller's current location data. Host H (Paragraph [0025]) retrieves the caller's current location data from the phone communicating request detected in the previous step (S3). Host H (Paragraph [0025]) stores the caller's current location data retrieved in the previous step in Caller's Current Location Data Storage Area H722b1a (Paragraph [0061]) (S4). Host H (Paragraph [0025]) retrieves the caller's current location data from Caller's Current Location Data Storage Area H722b1a (Paragraph [0061]) (S5). Host H (Paragraph [0025]) retrieves the callee's current location data from Callee's Current Location Data Storage Area H722b1b (Paragraph [0061]) (S6). Host H (Paragraph [0025]) calculates the current distance data by utilizing the caller's current location data retrieved in S5 and the callee's current location data retrieved in the previous step (S7). Host H (Paragraph [0025]) stores the current distance data calculated in the previous step in Current Distance Data Storage Area H722b3 (Paragraph [0060]) (S8). Host H (Paragraph [0025]) retrieves the current distance data from Current Distance Data Storage Area H722b3 (Paragraph [0060]) (S9). Host H (Paragraph [0025]) retrieves the 1st distance data from 1st Distance Data Storage Area H722b2a (Paragraph [0062]) (S10). Host H (Paragraph [0025]) retrieves the 2nd distance data from 2nd Distance Data Storage Area H722b2b (Paragraph [0062]) (S11). If the current distance data retrieved in S9 is larger than the 1st distance data retrieved in (S10, Host H (Paragraph [0025]) proceeds to the next step (S12). If the current distance data retrieved in S9 is smaller than the 2nd distance data retrieved in (S11, Host H (Paragraph [0025]) proceeds to the next step (S13). Host H (Paragraph [0025]) retrieves the 2nd ringtone audio data from 2nd Ringtone Audio Data Storage Area H722b4b (Paragraph [0063]) and sends the data to Communication Device 200 (S14). CPU 211 (FIG. 1) receives the 2nd ringtone audio data from Host H (Paragraph [0025]) in a wireless fashion (S15). Host H (Paragraph [0025]) retrieves the 2nd ringtone sound volume data from 2nd Ringtone Sound Volume Data Storage Area H722b5b (Paragraph [0064]) and sends the data to Communication Device 200 (S16). CPU 211 (FIG. 1) receives the 2nd ringtone sound volume data from Host H (Paragraph [0025]) in a wireless fashion (S17). CPU 211 (FIG. 1) outputs the 2nd ringtone audio data received in (S15 with the sound volume indicated by the 2nd ringtone sound volume data received in the previous step from Speaker 216 (FIG. 1) (S18). Host H (Paragraph [0025]) retrieves the 2nd ringtone visual data from 2nd Ringtone Visual Data Storage Area H722b6b (Paragraph [0065]) and sends the data to Communication Device 200 (S19). CPU 211 (FIG. 1) receives the 2nd ringtone visual data from Host H (Paragraph [0025]) in a wireless fashion and displays the data on LCD 201 (FIG. 1) (S20). Host H (Paragraph [0025]) retrieves the map data from Map Data Storage Area H722b7 (Paragraph [0060]) and sends the data to Communication Device 200 (S21). CPU 211 (FIG. 1) receives the map data from Host H (Paragraph [0025]) in a wireless fashion and displays the data on LCD 201 (FIG. 1) (S22). Host H (Paragraph [0025]) retrieves the caller's current location data from Caller's Current Location Data Storage Area H722b1a (Paragraph [0061]) and sends the data to Communication Device 200 (S23). CPU 211 (FIG. 1) receives the caller's current location data from Host H (Paragraph [0025]) in a wireless fashion (S24). Host H (Paragraph [0025]) retrieves the caller's current location icon data from Caller's Current Location Icon Data Storage Area H722b8a (Paragraph [0066]) and sends the data to Communication Device 200 (S25). CPU 211 (FIG. 1) receives the caller's current location icon data from Host H (Paragraph [0025]) in a wireless fashion (S26). CPU 211 (FIG. 1) displays the caller's current location icon data received in the previous step at the location corresponding to the caller's current location data received in S24 on the map data displayed in S22 (S27). Host H (Paragraph [0025]) retrieves the callee's current location data from Callee's Current Location Data Storage Area H722b1b (Paragraph [0061]) and sends the data to Communication Device 200 (S28). CPU 211 (FIG. 1) receives the callee's current location data from Host H (Paragraph [0025]) in a wireless fashion (S29). Host H (Paragraph [0025]) retrieves the callee's current location icon data from Callee's Current Location Icon Data Storage Area H722b8b (Paragraph [0066]) and sends the data to Communication Device 200 (S30). CPU 211 (FIG. 1) receives the callee's current location icon data from Host H (Paragraph [0025]) in a wireless fashion (S31). CPU 211 (FIG. 1) displays the callee's current location icon data received in the previous step at the location corresponding to the callee's current location data received in S29 on the map data displayed in S22 (S32). The foregoing sequence is repeated periodically.

Paragraph [0083] through Paragraph [0085] illustrate another embodiment wherein Communication Device 200 plays the major role in implementing the present function.

This Paragraph [0083] illustrate(s) Callee's Current Location Data Producing Software 206722c1 (Paragraph [0078]) of Communication Device 200, which produce(s) the callee's current location data. In the present embodiment, CPU 211 (FIG. 1) identifies the current location of Communication Device 200 (S1). CPU 211 (FIG. 1) produces the callee's current location data by referring to the current location identified in the previous step (S2). CPU 211 (FIG. 1) stores the callee's current location data produced in the previous step in Callee's Current Location Data Storage Area 206722b1b (Paragraph [0072]) (S3). The foregoing sequence is repeated periodically.

This Paragraph [0084] illustrate(s) 1st Ringtone Audio Data Outputting Software 206722c2 (Paragraph [0078]) of Communication Device 200, which output(s) the 1st ringtone audio data and the 1st ringtone visual data. In the present embodiment, CPU 211 (FIG. 1) periodically checks the incoming signal (S1). If the phone communicating request from the caller's device (not shown) is detected in the incoming signal, CPU 211 (FIG. 1) proceeds to the next step (S2). Here, the phone communicating request is the request to implement a phone communication with Communication Device 200. The phone communicating request includes the caller's current location data. CPU 211 (FIG. 1) retrieves the caller's current location data from the phone communicating request detected in the previous step (S3). CPU 211 (FIG. 1) stores the caller's current location data retrieved in the previous step in Caller's Current Location Data Storage Area 206722b1a (Paragraph [0072]) (S4). CPU 211 (FIG. 1) retrieves the caller's current location data from Caller's Current Location Data Storage Area 206722b1a (Paragraph [0072]) (S5). CPU 211 (FIG. 1) retrieves the callee's current location data from Callee's Current Location Data Storage Area 206722b1b (Paragraph [0072]) (S6). CPU 211 (FIG. 1) calculates the current distance data by utilizing the caller's current location data retrieved in S5 and the callee's current location data retrieved in the previous step (S7). CPU 211 (FIG. 1) stores the current distance data calculated in the previous step in Current Distance Data Storage Area 206722b3 (Paragraph [0071]) (S8). CPU 211 (FIG. 1) retrieves the current distance data from Current Distance Data Storage Area 206722b3 (Paragraph [0071]) (S9). CPU 211 (FIG. 1) retrieves the 1st distance data from 1st Distance Data Storage Area 206722b2a (Paragraph [0073]) (S10). If the current distance data retrieved in S9 is smaller than the 1st distance data retrieved in the previous step, CPU 211 (FIG. 1) proceeds to the next step (S11). CPU 211 (FIG. 1) retrieves the 1st ringtone audio data from 1st Ringtone Audio Data Storage Area 206722b4a (Paragraph [0074]) (S12). CPU 211 (FIG. 1) retrieves the 1st ringtone sound volume data from 1st Ringtone Sound Volume Data Storage Area 206722b5a (Paragraph [0075]) (S13). CPU 211 (FIG. 1) outputs the 1st ringtone audio data retrieved in (S12 with the sound volume indicated by the 1st ringtone sound volume data retrieved in the previous step from Speaker 216 (FIG. 1) (S14). CPU 211 (FIG. 1) retrieves the 1st ringtone visual data from 1st Ringtone Visual Data Storage Area 206722b6a (Paragraph [0076]) (S15). CPU 211 (FIG. 1) displays the 1st ringtone visual data retrieved in the previous step on LCD 201 (FIG. 1) (S16). CPU 211 (FIG. 1) retrieves the map data from Map Data Storage Area 206722b7 (Paragraph [0071]) (S17). CPU 211 (FIG. 1) displays the map data retrieved in the previous step on LCD 201 (FIG. 1) (S18). CPU 211 (FIG. 1) retrieves the caller's current location data from Caller's Current Location Data Storage Area 206722b1a (Paragraph [0072]) (S19). CPU 211 (FIG. 1) retrieves the caller's current location icon data from Caller's Current Location Icon Data Storage Area 206722b8a (Paragraph [0077]) (S20). CPU 211 (FIG. 1) displays the caller's current location icon data retrieved in the previous step at the location corresponding to the caller's current location data retrieved in (S19 on the map data displayed in (S18 (S21). CPU 211 (FIG. 1) retrieves the callee's current location data from Callee's Current Location Data Storage Area 206722b1b (Paragraph [0072]) (S22). CPU 211 (FIG. 1) retrieves the callee's current location icon data from Callee's Current Location Icon Data Storage Area 206722b8b (Paragraph [0077]) (S23). CPU 211 (FIG. 1) displays the callee's current location icon data retrieved in the previous step at the location corresponding to the callee's current location data retrieved in S22 on the map data displayed in (S18 (S24). The foregoing sequence is repeated periodically.

This Paragraph [0085] illustrate(s) 2nd Ringtone Audio Data Outputting Software 206722c3 (Paragraph [0078]) of Communication Device 200, which output(s) the 2nd ringtone audio data and the 2nd ringtone visual data. In the present embodiment, CPU 211 (FIG. 1) periodically checks the incoming signal (S1). If the phone communicating request from the caller's device (not shown) is detected in the incoming signal, CPU 211 (FIG. 1) proceeds to the next step (S2). Here, the phone communicating request is the request to implement a phone communication with Communication Device 200. The phone communicating request includes the caller's current location data. CPU 211 (FIG. 1) retrieves the caller's current location data from the phone communicating request detected in the previous step (S3). CPU 211 (FIG. 1) stores the caller's current location data retrieved in the previous step in Caller's Current Location Data Storage Area 206722b1a (Paragraph [0072]) (S4). CPU 211 (FIG. 1) retrieves the caller's current location data from Caller's Current Location Data Storage Area 206722b1a (Paragraph [0072]) (S5). CPU 211 (FIG. 1) retrieves the callee's current location data from Callee's Current Location Data Storage Area 206722b1b (Paragraph [0072]) (S6). CPU 211 (FIG. 1) calculates the current distance data by utilizing the caller's current location data retrieved in S5 and the callee's current location data retrieved in the previous step (S7). CPU 211 (FIG. 1) stores the current distance data calculated in the previous step in Current Distance Data Storage Area 206722b3 (Paragraph [0071]) (S8). CPU 211 (FIG. 1) retrieves the current distance data from Current Distance Data Storage Area 206722b3 (Paragraph [0071]) (S9). CPU 211 (FIG. 1) retrieves the 1st distance data from 1st Distance Data Storage Area 206722b2a (Paragraph [0073]) (S10). CPU 211 (FIG. 1) retrieves the 2nd distance data from 2nd Distance Data Storage Area 206722b2b (Paragraph [0073]) (S11). If the current distance data retrieved in S9 is larger than the 1st distance data retrieved in (S10, CPU 211 (FIG. 1) proceeds to the next step (S12). If the current distance data retrieved in S9 is smaller than the 2nd distance data retrieved in (S11, CPU 211 (FIG. 1) proceeds to the next step (S13). CPU 211 (FIG. 1) retrieves the 2nd ringtone audio data from 2nd Ringtone Audio Data Storage Area 206722b4b (Paragraph [0074]) (S14). CPU 211 (FIG. 1) retrieves the 2nd ringtone sound volume data from 2nd Ringtone Sound Volume Data Storage Area 206722b5b (Paragraph [0075]) (S15). CPU 211 (FIG. 1) outputs the 2nd ringtone audio data retrieved in (S14 with the sound volume indicated by the 2nd ringtone sound volume data retrieved in the previous step from Speaker 216 (FIG. 1) (S16). CPU 211 (FIG. 1) retrieves the 2nd ringtone visual data from 2nd Ringtone Visual Data Storage Area 206722b6b (Paragraph [0076]) (S17). CPU 211 (FIG. 1) displays the 2nd ringtone visual data retrieved in the previous step on LCD 201 (FIG. 1) (S18). CPU 211 (FIG. 1) retrieves the map data from Map Data Storage Area 206722b7 (Paragraph [0071]) (S19). CPU 211 (FIG. 1) displays the map data retrieved in the previous step on LCD 201 (FIG. 1) (S20). CPU 211 (FIG. 1) retrieves the caller's current location data from Caller's Current Location Data Storage Area 206722b1a (Paragraph [0072]) (S21). CPU 211 (FIG. 1) retrieves the caller's current location icon data from Caller's Current Location Icon Data Storage Area 206722b8a (Paragraph [0077]) (S22). CPU 211 (FIG. 1) displays the caller's current location icon data retrieved in the previous step at the location corresponding to the caller's current location data retrieved in S21 on the map data displayed in S20 (S23). CPU 211 (FIG. 1) retrieves the callee's current location data from Callee's Current Location Data Storage Area 206722b1b (Paragraph [0072]) (S24). CPU 211 (FIG. 1) retrieves the callee's current location icon data from Callee's Current Location Icon Data Storage Area 206722b8b (Paragraph [0077]) (S25). CPU 211 (FIG. 1) displays the callee's current location icon data retrieved in the previous step at the location corresponding to the callee's current location data retrieved in S24 on the map data displayed in S20 (S26). The foregoing sequence is repeated periodically.

<<In-Carrier Device Controlling Function>>

Paragraph [0088] through Paragraph [0158] illustrate the in-carrier device controlling function, wherein a user's device current location which indicates the current geographic location of said communication device is identified, if said user's device current location is identified to be in a driver's seat area, a fasten seat belt message data which is the message to fasten seat belt is output, an email data received is output in a text-to-speech fashion from said speaker, upon receiving a phone call, a voice communication is performed by implementing a speaker phone functionality, and when attempting to replay an audiovisual data, an audiovisual data replay prohibiting message data which is the audio data indicating the message that the audiovisual data is prohibited to be replayed is output from said speaker, and if said user's device current location is identified to be in a passenger's seat area, said fasten seat belt message data is output, said email data is displayed on said display, upon receiving said phone call, said voice communication is performed without implementing said speaker phone functionality, and said audiovisual data is granted to be replayed.

This Paragraph [0088] illustrates the major elements utilized to implement the present function. In the present embodiment, Host H (Paragraph [0025]) is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H (Paragraph [0025]), Device A, and Device B are capable to communicate with each other via Network NT (e.g., the Internet) to implement the present function. Device A and Device B are also capable to communicate with each other directly in a wireless fashion to implement the present function.

This Paragraph [0089] illustrates the relationship between Carrier CR723 and Device A. In the present embodiment, Carrier CR723 includes Device A. Here, Carrier CR723 may be any type of carrier or transportation system designed to carry passenger(s), such as airplane, automobile, motorcycle, railway train, taxi, bus, space ship, or space station. Assuming that the user of Device B boards Carrier CR723 as the driver or passenger thereof.

This Paragraph [0090] illustrates the storage area included in Host H (Paragraph [0025]). In the present embodiment, Host H (Paragraph [0025]) includes In-Carrier Device Controlling Info Storage Area H723a of which the data and the software program(s) stored therein are described in Paragraph [0091].

This Paragraph [0091] illustrates the storage area(s) included in In-Carrier Device Controlling Info Storage Area H723a (Paragraph [0090]). In the present embodiment, In-Carrier Device Controlling Info Storage Area H723a includes In-Carrier Device Controlling Data Storage Area H723b and In-Carrier Device Controlling Software Storage Area H723c. In-Carrier Device Controlling Data Storage Area H723b stores the data necessary to implement the present function on the side of Host H (Paragraph [0025]), such as the one(s) described in Paragraph [0092]. In-Carrier Device Controlling Software Storage Area H723c stores the software program(s) necessary to implement the present function on the side of Host H (Paragraph [0025]), such as the one(s) described in Paragraph [0095].

This Paragraph [0092] illustrates the storage area(s) included in In-Carrier Device Controlling Data Storage Area H723b (Paragraph [0091]). In the present embodiment, In-Carrier Device Controlling Data Storage Area H723b includes Entire Location Data Storage Area H723b1, Fasten Seat Belt Message Data Storage Area H723b2, Email Data Storage Area H723b3, Speaker Phone Data Storage Area H723b4, Audiovisual Data Storage Area H723b5, Audiovisual Data Replay Prohibiting Message Data Storage Area H723b6, Map Data Storage Area H723b7, Entire Location Icon Data Storage Area H723b8, and Work Area H723b9. Entire Location Data Storage Area H723b1 stores the data described in Paragraph [0093]. Fasten Seat Belt Message Data Storage Area H723b2 stores the fasten seat belt message data which is the message to fasten seat belt. Email Data Storage Area H723b3 stores the email data which indicates the email received. Speaker Phone Data Storage Area H723b4 stores the speaker phone data which is the data utilized to implement the speaker phone functionality. Audiovisual Data Storage Area H723b5 stores the audiovisual data. Here, the audiovisual data stored therein may be any type of audiovisual data. Audiovisual Data Replay Prohibiting Message Data Storage Area H723b6 stores the audiovisual data replay prohibiting message data which is the audio data indicating the message that the audiovisual data is prohibited to be replayed. Map Data Storage Area H723b7 stores the map data which is the image data indicating a map. Entire Location Icon Data Storage Area H723b8 stores the data described in Paragraph [0094]. Work Area H723b9 is utilized as a work area to perform calculation and temporarily store data to implement the present function.

This Paragraph [0093] illustrates the storage area(s) included in Entire Location Data Storage Area H723b1 (Paragraph [0092]). In the present embodiment, Entire Location Data Storage Area H723b1 includes Carrier Location Data Storage Area H723b1a, Driver's Seat Area Data Storage Area H723b1b, Passenger's Seat Area Data Storage Area H723b1c, and User's Device Current Location Data Storage Area H723b1d. Carrier Location Data Storage Area H723b1a stores the carrier location data which indicates the current geographic location of Carrier CR723 (Paragraph [0089]) in (x,y,z) format. Driver's Seat Area Data Storage Area H723b1b stores the driver's seat area data which indicates the scope of the driver's seat area (e.g., 50 cm radius from the center of the driver's seat) and the current geographic location of the driver's seat of Carrier CR723 (Paragraph [0089]). Passenger's Seat Area Data Storage Area H723b1c stores the passenger's seat area data which indicates the scope of the passenger's seat area (e.g., 50 cm radius from the center of the passenger's seat) and the current geographic location of the passenger's seat of Carrier CR723 (Paragraph [0089]). User's Device Current Location Data Storage Area H723b1d stores the user's device current location data which indicates the current geographic location of Device B in (x,y,z) format.

This Paragraph [0094] illustrates the storage area(s) included in Entire Location Icon Data Storage Area H723b8 (Paragraph [0092]). In the present embodiment, Entire Location Icon Data Storage Area H723b8 includes Carrier Location Icon Data Storage Area H723b8a, Driver's Seat Area Icon Data Storage Area H723b8b, Passenger's Seat Area Icon Data Storage Area H723b8c, and User's Device Current Location Icon Data Storage Area H723b8d. Carrier Location Icon Data Storage Area H723b8a stores the carrier location icon data which is the image of the icon utilized to indicate the carrier location data on the map data. Driver's Seat Area Icon Data Storage Area H723b8b stores the driver's seat area icon data which is the image of the icon utilized to indicate the driver's seat area data on the map data. Passenger's Seat Area Icon Data Storage Area H723b8c stores the passenger's seat area icon data which is the image of the icon utilized to indicate the passenger's seat area data on the map data. User's Device Current Location Icon Data Storage Area H723b8d stores the user's device current location icon data which is the image of the icon utilized to indicate the user's device current location data on the map data.

This Paragraph [0095] illustrates the software program(s) stored in In-Carrier Device Controlling Software Storage Area H723c (Paragraph [0091]). In the present embodiment, In-Carrier Device Controlling Software Storage Area H723c stores Carrier Location Data Producing Software H723c1, Carrier Location Data Sharing Software H723c1a, Driver's Seat Area Data Producing Software H723c2, Driver's Seat Area Data Sharing Software H723c3, Passenger's Seat Area Data Producing Software H723c4, Passenger's Seat Area Data Sharing Software H723c5, User's Device Current Location Data Sharing Software H723c7, Fasten Seat Belt Message Data Outputting Software H723c8, Driver Email Text-To-Speech Software H723c9, Passenger Email Displaying Software H723c10, Driver Speaker Phone Software H723c11, Passenger Non-Speaker Phone Software H723c12, Driver Audiovisual Data Replay Prohibiting Software H723c13, Passenger Audiovisual Data Replaying Software H723c14, and Location Data Indicating Software H723c15. Carrier Location Data Producing Software H723c1 is the software program described in Paragraph [0110]. Carrier Location Data Sharing Software H723c1a is the software program described in Paragraph [0111]. Driver's Seat Area Data Producing Software H723c2 is the software program described in Paragraph [0112]. Driver's Seat Area Data Sharing Software H723c3 is the software program described in Paragraph [0113]. Passenger's Seat Area Data Producing Software H723c4 is the software program described in Paragraph [0114]. Passenger's Seat Area Data Sharing Software H723c5 is the software program described in Paragraph [0115]. User's Device Current Location Data Sharing Software H723c7 is the software program described in Paragraph [0117]. Fasten Seat Belt Message Data Outputting Software H723c8 is the software program described in Paragraph [0118]. Driver Email Text-To-Speech Software H723c9 is the software program described in Paragraph [0120]. Passenger Email Displaying Software H723c10 is the software program described in Paragraph [0122]. Driver Speaker Phone Software H723c11 is the software program described in Paragraph [0124]. Passenger Non-Speaker Phone Software H723c12 is the software program described in Paragraph [0126]. Driver Audiovisual Data Replay Prohibiting Software H723c13 is the software program described in Paragraph [0128]. Passenger Audiovisual Data Replaying Software H723c14 is the software program described in Paragraph [0130]. Location Data Indicating Software H723c15 is the software program described in Paragraph [0132].

This Paragraph [0096] illustrates the storage area included in RAM 206 (FIG. 1) of Device A. In the present embodiment, RAM 206 includes In-Carrier Device Controlling Info Storage Area 206A723a of which the data and the software program(s) stored therein are described in Paragraph [0098].

The data and/or the software program(s) necessary to implement the present function may be downloaded from Host H (Paragraph [0025]) to Device A.

This Paragraph [0098] illustrates the storage area(s) included in In-Carrier Device Controlling Info Storage Area 206A723a (Paragraph [0096]). In the present embodiment, In-Carrier Device Controlling Info Storage Area 206A723a includes In-Carrier Device Controlling Data Storage Area 206A723b and In-Carrier Device Controlling Software Storage Area 206A723c. In-Carrier Device Controlling Data Storage Area 206A723b stores the data necessary to implement the present function on the side of Device A, such as the one(s) described in Paragraph [0099]. In-Carrier Device Controlling Software Storage Area 206A723c stores the software program(s) necessary to implement the present function on the side of Device A, such as the one(s) described in Paragraph [0102].

This Paragraph [0099] illustrates the storage area(s) included in In-Carrier Device Controlling Data Storage Area 206A723b (Paragraph [0098]). In the present embodiment, In-Carrier Device Controlling Data Storage Area 206A723b includes Entire Location Data Storage Area 206A723b1, Fasten Seat Belt Message Data Storage Area 206A723b2, Email Data Storage Area 206A723b3, Speaker Phone Data Storage Area 206A723b4, Audiovisual Data Storage Area 206A723b5, Audiovisual Data Replay Prohibiting Message Data Storage Area 206A723b6, Map Data Storage Area 206A723b7, Entire Location Icon Data Storage Area 206A723b8, and Work Area 206A723b9. Entire Location Data Storage Area 206A723b1 stores the data described in Paragraph [0100]. Fasten Seat Belt Message Data Storage Area 206A723b2 stores the fasten seat belt message data which is the message to fasten seat belt. Email Data Storage Area 206A723b3 stores the email data which indicates the email received. Speaker Phone Data Storage Area 206A723b4 stores the speaker phone data which is the data utilized to implement the speaker phone functionality. Audiovisual Data Storage Area 206A723b5 stores the audiovisual data. Here, the audiovisual data stored therein may be any type of audiovisual data. Audiovisual Data Replay Prohibiting Message Data Storage Area 206A723b6 stores the audiovisual data replay prohibiting message data which is the audio data indicating the message that the audiovisual data is prohibited to be replayed. Map Data Storage Area 206A723b7 stores the map data which is the image data indicating a map. Entire Location Icon Data Storage Area 206A723b8 stores the data described in Paragraph [0101]. Work Area 206A723b9 is utilized as a work area to perform calculation and temporarily store data to implement the present function.

This Paragraph [0100] illustrates the storage area(s) included in Entire Location Data Storage Area 206A723b1

(Paragraph [0099]). In the present embodiment, Entire Location Data Storage Area 206A723b1 includes Carrier Location Data Storage Area 206A723b1a, Driver's Seat Area Data Storage Area 206A723b1b, Passenger's Seat Area Data Storage Area 206A723b1c, and User's Device Current Location Data Storage Area 206A723b1d. Carrier Location Data Storage Area 206A723b1a stores the carrier location data which indicates the current geographic location of Carrier CR723 (Paragraph [0089]) in (x,y,z) format. Driver's Seat Area Data Storage Area 206A723b1b stores the driver's seat area data which indicates the scope of the driver's seat area (e.g., 50 cm radius from the center of the driver's seat) and the current geographic location of the driver's seat of Carrier CR723 (Paragraph [0089]). Passenger's Seat Area Data Storage Area 206A723b1c stores the passenger's seat area data which indicates the scope of the passenger's seat area (e.g., 50 cm radius from the center of the passenger's seat) and the current geographic location of the passenger's seat of Carrier CR723 (Paragraph [0089]). User's Device Current Location Data Storage Area 206A723b1d stores the user's device current location data which indicates the current geographic location of Device B in (x,y,z) format.

This Paragraph [0101] illustrates the storage area(s) included in Entire Location Icon Data Storage Area 206A723b8 (Paragraph [0099]). In the present embodiment, Entire Location Icon Data Storage Area 206A723b8 includes Carrier Location Icon Data Storage Area 206A723b8a, Driver's Seat Area Icon Data Storage Area 206A723b8b, Passenger's Seat Area Icon Data Storage Area 206A723b8c, and User's Device Current Location Icon Data Storage Area 206A723b8d. Carrier Location Icon Data Storage Area 206A723b8a stores the carrier location icon data which is the image of the icon utilized to indicate the carrier location data on the map data. Driver's Seat Area Icon Data Storage Area 206A723b8b stores the driver's seat area icon data which is the image of the icon utilized to indicate the driver's seat area data on the map data. Passenger's Seat Area Icon Data Storage Area 206A723b8c stores the passenger's seat area icon data which is the image of the icon utilized to indicate the passenger's seat area data on the map data. User's Device Current Location Icon Data Storage Area 206A723b8d stores the user's device current location icon data which is the image of the icon utilized to indicate the user's device current location data on the map data.

This Paragraph [0102] illustrates the software program(s) stored in In-Carrier Device Controlling Software Storage Area 206A723c (Paragraph [0098]). In the present embodiment, In-Carrier Device Controlling Software Storage Area 206A723c stores Carrier Location Data Producing Software 206A723c1, Carrier Location Data Sharing Software 206A723c1a, Driver's Seat Area Data Producing Software 206A723c2, Driver's Seat Area Data Sharing Software 206A723c3, Passenger's Seat Area Data Producing Software 206A723c4, Passenger's Seat Area Data Sharing Software 206A723c5, User's Device Current Location Data Sharing Software 206A723c7, Fasten Seat Belt Message Data Outputting Software 206A723c8, Driver Email Text-To-Speech Software 206A723c9, Passenger Email Displaying Software 206A723c10, Driver Speaker Phone Software 206A723c11, Passenger Non-Speaker Phone Software 206A723c12, Driver Audiovisual Data Replay Prohibiting Software 206A723c13, Passenger Audiovisual Data Replaying Software 206A723c14, and Location Data Indicating Software 206A723c15. Carrier Location Data Producing Software 206A723c1 is the software program described in Paragraph [0110] and Paragraph [0135]. Carrier Location Data Sharing Software 206A723c1a is the software program described in Paragraph [0136]. Driver's Seat Area Data Producing Software 206A723c2 is the software program described in Paragraph [0137]. Driver's Seat Area Data Sharing Software 206A723c3 is the software program described in Paragraph [0138]. Passenger's Seat Area Data Producing Software 206A723c4 is the software program described in Paragraph [0114] and Paragraph [0139]. Passenger's Seat Area Data Sharing Software 206A723c5 is the software program described in Paragraph [0140]. User's Device Current Location Data Sharing Software 206A723c7 is the software program described in Paragraph [0142]. Fasten Seat Belt Message Data Outputting Software 206A723c8 is the software program described in Paragraph [0118], and Paragraph [0143]. Driver Email Text-To-Speech Software 206A723c9 is the software program described in Paragraph [0120], and Paragraph [0145]. Passenger Email Displaying Software 206A723c10 is the software program described in Paragraph [0122], and Paragraph [0147]. Driver Speaker Phone Software 206A723c11 is the software program described in Paragraph [0124], and Paragraph [0149]. Passenger Non-Speaker Phone Software 206A723c12 is the software program described in Paragraph [0126], and Paragraph [0151]. Driver Audiovisual Data Replay Prohibiting Software 206A723c13 is the software program described in Paragraph [0128], and Paragraph [0153]. Passenger Audiovisual Data Replaying Software 206A723c14 is the software program described in Paragraph [0130], and Paragraph [0155]. Location Data Indicating Software 206A723c15 is the software program described in Paragraph [0132], and Paragraph [0157].

This Paragraph [0103] illustrates the storage area included in RAM 206 (FIG. 1) of Device B. In the present embodiment, RAM 206 includes In-Carrier Device Controlling Info Storage Area 206B723a of which the data and the software program(s) stored therein are described in Paragraph [0105].

The data and/or the software program(s) necessary to implement the present function may be downloaded from Host H (Paragraph [0025]) to Device B.

This Paragraph [0105] illustrates the storage area(s) included in In-Carrier Device Controlling Info Storage Area 206B723a (Paragraph [0103]). In the present embodiment, In-Carrier Device Controlling Info Storage Area 206B723a includes In-Carrier Device Controlling Data Storage Area 206B723b and In-Carrier Device Controlling Software Storage Area 206B723c. In-Carrier Device Controlling Data Storage Area 206B723b stores the data necessary to implement the present function on the side of Device B, such as the one(s) described in Paragraph [0106]. In-Carrier Device Controlling Software Storage Area 206B723c stores the software program(s) necessary to implement the present function on the side of Device B, such as the one(s) described in Paragraph [0109].

This Paragraph [0106] illustrates the storage area(s) included in In-Carrier Device Controlling Data Storage Area 206B723b (Paragraph [0105]). In the present embodiment, In-Carrier Device Controlling Data Storage Area 206B723b includes Entire Location Data Storage Area 206B723b1, Fasten Seat Belt Message Data Storage Area 206B723b2, Email Data Storage Area 206B723b3, Speaker Phone Data Storage Area 206B723b4, Audiovisual Data Storage Area 206B723b5, Audiovisual Data Replay Prohibiting Message Data Storage Area 206B723b6, Map Data Storage Area 206B723b7, Entire Location Icon Data Storage Area 206B723b8, and Work Area 206B723b9. Entire Location Data Storage Area 206B723b1 stores the data described in Paragraph [0107]. Fasten Seat Belt Message Data Storage Area 206B723b2 stores the fasten seat belt message data which is the message to fasten seat belt. Email Data Storage Area 206B723b3 stores the email data which indicates the email received. Speaker Phone Data Storage Area 206B723b4 stores the speaker phone data which is the data utilized to implement the speaker phone functionality. Audiovisual Data Storage Area 206B723b5 stores the audiovisual data. Here, the audiovisual data stored therein may be any type of audiovisual data. Audiovisual Data Replay Prohibiting Message Data Storage Area 206B723b6 stores the audiovisual data replay prohibiting message data which is the audio data indicating the message that the audiovisual data is prohibited to be replayed. Map Data Storage Area 206B723b7 stores the map data which is the image data indicating a map. Entire Location Icon Data Storage Area 206B723b8 stores the data described in Paragraph [0108]. Work Area 206B723b9 is utilized as a work area to perform calculation and temporarily store data to implement the present function.

This Paragraph [0107] illustrates the storage area(s) included in Entire Location Data Storage Area 206B723b1 (Paragraph [0106]). In the present embodiment, Entire Location Data Storage Area 206B723b1 includes Carrier Location Data Storage Area 206B723b1a, Driver's Seat Area Data Storage Area 206B723b1b, Passenger's Seat Area Data Storage Area 206B723b1c, and User's Device Current Location Data Storage Area 206B723b1d. Carrier Location Data Storage Area 206B723b1 a stores the carrier location data which indicates the current geographic location of Carrier CR723 (Paragraph [0089]) in (x,y,z) format. Driver's Seat Area Data Storage Area 206B723b1b stores the driver's seat area data which indicates the scope of the driver's seat area (e.g., 50 cm radius from the center of the driver's seat) and the current geographic location of the driver's seat of Carrier CR723 (Paragraph [0089]). Passenger's Seat Area Data Storage Area 206B723b1c stores the passenger's seat area data which indicates the scope of the passenger's seat area (e.g., 50 cm radius from the center of the passenger's seat) and the current geographic location of the passenger's seat of Carrier CR723 (Paragraph [0089]). User's Device Current Location Data Storage Area 206B723b1d stores the user's device current location data which indicates the current geographic location of Device B in (x,y,z) format.

This Paragraph [0108] illustrates the storage area(s) included in Entire Location Icon Data Storage Area 206B723b8 (Paragraph [0106]). In the present embodiment, Entire Location Icon Data Storage Area 206B723b8 includes Carrier Location Icon Data Storage Area 206B723b8a, Driver's Seat Area Icon Data Storage Area 206B723b8b, Passenger's Seat Area Icon Data Storage Area 206B723b8c, and User's Device Current Location Icon Data Storage Area 206B723b8d. Carrier Location Icon Data Storage Area 206B723b8a stores the carrier location icon data which is the image of the icon utilized to indicate the carrier location data on the map data. Driver's Seat Area Icon Data Storage Area 206B723b8b stores the driver's seat area icon data which is the image of the icon utilized to indicate the driver's seat area data on the map data. Passenger's Seat Area Icon Data Storage Area 206B723b8c stores the passenger's seat area icon data which is the image of the icon utilized to indicate the passenger's seat area data on the map data. User's Device Current Location Icon Data Storage Area 206B723b8d stores the user's device current location icon data which is the image of the icon utilized to indicate the user's device current location data on the map data.

This Paragraph [0109] illustrates the software program(s) stored in In-Carrier Device Controlling Software Storage Area 206B723c (Paragraph [0105]). In the present embodiment, In-Carrier Device Controlling Software Storage Area 206B723c stores Carrier Location Data Sharing Software 206B723c1a, Driver's Seat Area Data Sharing Software 206B723c3, Passenger's Seat Area Data Sharing Software 206B723c5, User's Device Current Location Data Producing Software 206B723c6, User's Device Current Location Data Sharing Software 206B723c7, Fasten Seat Belt Message Data Outputting Software 206B723c8, Driver Email Text-To-Speech Software 206B723c9, Passenger Email Displaying Software 206B723c10, Driver Speaker Phone Software 206B723c11, Passenger Non-Speaker Phone Software 206B723c12, Driver Audiovisual Data Replay Prohibiting Software 206B723c13, Passenger Audiovisual Data Replaying Software 206B723c14, and Location Data Indicating Software 206B723c15. Carrier Location Data Sharing Software 206B723c1a is the software program described in Paragraph [0111] and Paragraph [0136]. Driver's Seat Area Data Sharing Software 206B723c3 is the software program described in Paragraph [0113] and Paragraph [0138]. Passenger's Seat Area Data Sharing Software 206B723c5 is the software program described in Paragraph [0115] and Paragraph [0140]. User's Device Current Location Data Producing Software 206B723c6 is the software program described in Paragraph [0116] and Paragraph [0141]. User's Device Current Location Data Sharing Software 206B723c7 is the software program described in Paragraph [0117] and Paragraph [0142]. Fasten Seat Belt Message Data Outputting Software 206B723c8 is the software program described in Paragraph [0119], and Paragraph [0144]. Driver Email Text-To-Speech Software 206B723c9 is the software program described in Paragraph [0121], and Paragraph [0146]. Passenger Email Displaying Software 206B723c10 is the software program described in Paragraph [0123], and Paragraph [0148]. Driver Speaker Phone Software 206B723c11 is the software program described in Paragraph [0125], and Paragraph [0150]. Passenger Non-Speaker Phone Software 206B723c12 is the software program described in Paragraph [0127], and Paragraph [0152]. Driver Audiovisual Data Replay Prohibiting Software 206B723c13 is the software program described in Paragraph [0129], and Paragraph [0154]. Passenger Audiovisual Data Replaying Software 206B723c14 is the software program described in Paragraph [0131], and Paragraph [0156]. Location Data Indicating Software 206B723c15 is the software program described in Paragraph [0133], and Paragraph [0158].

This Paragraph [0110] illustrate(s) Carrier Location Data Producing Software H723c1 (Paragraph [0095]) of Host H (Paragraph [0025]) and Carrier Location Data Producing Software 206A723c1 (Paragraph [0102]) of Device A, which produce(s) the carrier location data. In the present embodiment, CPU 211 (FIG. 1) of Device A identifies the current location of Carrier CR723 (Paragraph [0089]) (S1). CPU 211 (FIG. 1) of Device A produces the carrier location data by referring to the current location identified in the previous step and sends the data to Host H (Paragraph [0025]) in a wireless fashion (S2). Host H (Paragraph [0025]) receives the carrier location data from Device A and stores the data in Carrier Location Data Storage Area H723b1a (Paragraph [0093]) (S3). The foregoing sequence is repeated periodically.

This Paragraph [0111] illustrate(s) Carrier Location Data Sharing Software H723c1a (Paragraph [0095]) of Host H (Paragraph [0025]) and Carrier Location Data Sharing Software 206B723c1a (Paragraph [0109]) of Device B, which share(s) the carrier location data. In the present embodiment, Host H (Paragraph [0025]) retrieves the carrier location data from Carrier Location Data Storage Area H723b1a (Paragraph [0093]) and sends the data to Device B (S1). CPU 211 (FIG. 1) of Device B receives the carrier location data from Host H (Paragraph [0025]) in a wireless fashion and stores the data in Carrier Location Data Storage Area 206B723b1a (Paragraph [0107]) (S2). The foregoing sequence is repeated periodically.

This Paragraph [0112] illustrate(s) Driver's Seat Area Data Producing Software H723c2 (Paragraph [0095]) of Host H (Paragraph [0025]), which produce(s) the driver's seat area data. In the present embodiment, Host H (Paragraph [0025]) retrieves the carrier location data from Carrier Location Data Storage Area H723b1a (Paragraph [0093]) (S1). Host H (Paragraph [0025]) identifies the current driver's seat area by referring to the carrier location data retrieved in the previous step (S2). Host H (Paragraph [0025]) produces the driver's seat area data by referring to the current driver's seat area identified in the previous step (S3). Host H (Paragraph [0025]) stores the driver's seat area data produced in the previous step in Driver's Seat Area Data Storage Area H723b1b (Paragraph [0093]) (S4). The foregoing sequence is repeated periodically.

This Paragraph [0113] illustrate(s) Driver's Seat Area Data Sharing Software H723c3 (Paragraph [0095]) of Host H (Paragraph [0025]) and Driver's Seat Area Data Sharing Software 206B723c3 (Paragraph [0109]) of Device B, which share(s) the driver's seat area data. In the present embodiment, Host H (Paragraph [0025]) retrieves the driver's seat area data from Driver's Seat Area Data Storage Area H723b1b (Paragraph [0093]) and sends the data to Device B (S1). CPU 211 (FIG. 1) of Device B receives the driver's seat area data from Host H (Paragraph [0025]) in a wireless fashion and stores the data in Driver's Seat Area Data Storage Area 206B723b1b (Paragraph [0107]) (S2). The foregoing sequence is repeated periodically.

This Paragraph [0114] illustrate(s) Passenger's Seat Area Data Producing Software H723c4 (Paragraph [0095]) of Host H (Paragraph [0025]) and Passenger's Seat Area Data Producing Software 206A723c4 (Paragraph [0102]) of Device A, which produce(s) the passenger's seat area data. In the present embodiment, Host H (Paragraph [0025]) retrieves the carrier location data from Carrier Location Data Storage Area H723b1a (Paragraph [0093]) (S1). Host H (Paragraph [0025]) identifies the current passenger's seat area by referring to the carrier location data retrieved in the previous step (S2). Host H (Paragraph [0025]) produces the passenger's seat area data by referring to the current passenger's seat area identified in the previous step (S3). Host H (Paragraph [0025]) stores the passenger's seat area data produced in the previous step in Passenger's Seat Area Data Storage Area H723b1c (Paragraph [0093]) (S4). The foregoing sequence is repeated periodically.

This Paragraph [0115] illustrate(s) Passenger's Seat Area Data Sharing Software H723c5 (Paragraph [0095]) of Host H (Paragraph [0025]) and Passenger's Seat Area Data Sharing Software 206B723c5 (Paragraph [0109]) of Device B, which share(s) the passenger's seat area data. In the present embodiment, Host H (Paragraph [0025]) retrieves the passenger's seat area data from Passenger's Seat Area Data Storage Area H723b1c (Paragraph [0093]) and sends the data to Device B (S1). CPU 211 (FIG. 1) of Device B receives the passenger's seat area data from Host H (Paragraph [0025]) in a wireless fashion and stores the data in Passenger's Seat Area Data Storage Area 206B723b1c (Paragraph [0107]) (S2). The foregoing sequence is repeated periodically.

This Paragraph [0116] illustrate(s) User's Device Current Location Data Producing Software 206B723c6 (Paragraph [0109]) of Device B, which produce(s) the user's device current location data. In the present embodiment, CPU 211 (FIG. 1) of Device B identifies the current location of Device B (S1). CPU 211 (FIG. 1) of Device B produces the user's device current location data by referring to the current location identified in the previous step (S2). CPU 211 (FIG. 1) of Device B stores the user's device current location data produced in the previous step in User's Device Current Location Data Storage Area 206B723b1d (Paragraph [0107]) (S3). The foregoing sequence is repeated periodically.

This Paragraph [0117] illustrate(s) User's Device Current Location Data Sharing Software H723c7 (Paragraph [0095]) of Host H (Paragraph [0025]) and User's Device Current Location Data Sharing Software 206B723c7 (Paragraph [0109]) of Device B, which share(s) the user's device current location data. In the present embodiment, CPU 211 (FIG. 1) of Device B retrieves the user's device current location data from User's Device Current Location Data Storage Area 206B723b1d (Paragraph [0107]) and sends the data to Host H (Paragraph [0025]) in a wireless fashion (S1). Host H (Paragraph [0025]) receives the user's device current location data from Device B and stores the data in User's Device Current Location Data Storage Area H723b1d (Paragraph [0093]) (S2). The foregoing sequence is repeated periodically.

This Paragraph [0118] illustrate(s) Fasten Seat Belt Message Data Outputting Software H723c8 (Paragraph [0095]) of Host H (Paragraph [0025]) and Fasten Seat Belt Message Data Outputting Software 206A723c8 (Paragraph [0102]) of Device A, which output(s) the fasten seat belt message data from Device A. In the present embodiment, Host H (Paragraph [0025]) retrieves the driver's seat area data from Driver's Seat Area Data Storage Area H723b1b (Paragraph [0093]) (S1). Host H (Paragraph [0025]) retrieves the passenger's seat area data from Passenger's Seat Area Data Storage Area H723b1c (Paragraph [0093]) (S2). Host H (Paragraph [0025]) retrieves the user's device current location data from User's Device Current Location Data Storage Area H723b1d (Paragraph [0093]) (S3). If the user's device current location data retrieved in the previous step is within the driver's seat area data retrieved in (S1 or the passenger's seat area data retrieved in S2, Host H (Paragraph [0025]) proceeds to the next step (S4). Host H (Paragraph [0025]) retrieves the fasten seat belt message data from Fasten Seat Belt Message Data Storage Area H723b2 (Paragraph [0092]) and sends the data to Device A (S5). CPU 211 (FIG. 1) of Device A receives the fasten seat belt message data from Host H (Paragraph [0025]) in a wireless fashion and displays the data on LCD 201 (FIG. 1) of Device A (S6). The foregoing sequence is repeated periodically.

This Paragraph [0119] illustrate(s) Fasten Seat Belt Message Data Outputting Software 206B723c8 (Paragraph [0109]) of Device B, which output(s) the fasten seat belt message data from Device B. In the present embodiment, CPU 211 (FIG. 1) of Device B retrieves the driver's seat area data from Driver's Seat Area Data Storage Area 206B723b1b (Paragraph [0107]) (S1). CPU 211 (FIG. 1) of Device B retrieves the passenger's seat area data from Passenger's Seat Area Data Storage Area 206B723b1c (Paragraph [0107]) (S2). CPU 211 (FIG. 1) of Device B retrieves the user's device current location data from User's Device Current Location Data Storage Area 206B723b1d (Paragraph [0107]) (S3). If the user's device current location data retrieved in the previous step is within the driver's seat area data retrieved in (S1 or the passenger's seat area data retrieved in S2, CPU 211 (FIG. 1) of Device B proceeds to the next step (S4). CPU 211 (FIG. 1) of Device B retrieves the fasten seat belt message data from Fasten Seat Belt Message Data Storage Area 206B723b2 (Paragraph [0106]) (S5). CPU 211 (FIG. 1) of Device B displays the fasten seat belt message data retrieved in the previous step on LCD 201 (FIG. 1) of Device B (S6). The foregoing sequence is repeated periodically.

This Paragraph [0120] illustrate(s) Driver Email Text-To-Speech Software H723c9 (Paragraph [0095]) of Host H (Paragraph [0025]) and Driver Email Text-To-Speech Software 206A723c9 (Paragraph [0102]) of Device A, which read(s) aloud the email addressed to Device A. In the present embodiment, Host H (Paragraph [0025]) periodically checks the incoming signal addressed to Device A (S1). If an email data is detected in the incoming signal, Host H (Paragraph [0025]) proceeds to the next step (S2). Host H (Paragraph [0025]) stores the email data detected in the previous step in Email Data Storage Area H723b3 (Paragraph [0092]) (S3). Host H (Paragraph [0025]) retrieves the driver's seat area data from Driver's Seat Area Data Storage Area H723b1b (Paragraph [0093]) (S4). Host H (Paragraph [0025]) retrieves the user's device current location data from User's Device Current Location Data Storage Area H723b1d (Paragraph [0093]) (S5). If the user's device current location data retrieved in the previous step is within the driver's seat area data retrieved in S4, Host H (Paragraph [0025]) proceeds to the next step (S6). Host H (Paragraph [0025]) retrieves the email data from Email Data Storage Area H723b3 (Paragraph [0092]) (S7). Host H (Paragraph [0025]) identifies the alphanumeric data included in the email data retrieved in the previous step (S8). Host H (Paragraph [0025]) converts the alphanumeric data identified in the previous step to the audio data and sends the data to Device A (S9). CPU 211 (FIG. 1) of Device A receives the audio data from Host H (Paragraph [0025]) in a wireless fashion and outputs the data from Speaker 216 (FIG. 1) of Device A (S10). The foregoing sequence is repeated periodically.

This Paragraph [0121] illustrate(s) Driver Email Text-To-Speech Software 206B723c9 (Paragraph [0109]) of Device B, which read(s) aloud the email addressed to Device B. In the present embodiment, CPU 211 (FIG. 1) of Device B periodically checks the incoming signal addressed to Device B (S1). If an email data is detected in the incoming signal, CPU 211 (FIG. 1) of Device B proceeds to the next step (S2). CPU 211 (FIG. 1) of Device B stores the email data detected in the previous step in Email Data Storage Area 206B723b3 (Paragraph [0106]) (S3). CPU 211 (FIG. 1) of Device B retrieves the driver's seat area data from Driver's Seat Area Data Storage Area 206B723b1b (Paragraph [0107]) (S4). CPU 211 (FIG. 1) of Device B retrieves the user's device current location data from User's Device Current Location Data Storage Area 206B723b1d (Paragraph [0107]) (S5). If the user's device current location data retrieved in the previous step is within the driver's seat area data retrieved in S4, CPU 211 (FIG. 1) of Device B proceeds to the next step (S6). CPU 211 (FIG. 1) of Device B retrieves the email data from Email Data Storage Area 206B723b3 (Paragraph [0106]) (S7). CPU 211 (FIG. 1) of Device B identifies the alphanumeric data included in the email data retrieved in the previous step (S8). CPU 211 (FIG. 1) of Device B converts the alphanumeric data identified in the previous step to audio data (S9). CPU 211 (FIG. 1) of Device B outputs the audio data converted in the previous step from Speaker 216 (FIG. 1) of Device B (S10). The foregoing sequence is repeated periodically.

This Paragraph [0122] illustrate(s) Passenger Email Displaying Software H723c10 (Paragraph [0095]) of Host H (Paragraph [0025]) and Passenger Email Displaying Software 206A723c10 (Paragraph [0102]) of Device A, which display(s) the email addressed to Device A. In the present embodiment, Host H (Paragraph [0025]) periodically checks the incoming signal addressed to Device A (S1). If an email data is detected in the incoming signal, Host H (Paragraph [0025]) proceeds to the next step (S2). Host H (Paragraph [0025]) stores the email data detected in the previous step in Email Data Storage Area H723b3 (Paragraph [0092]) (S3). Host H (Paragraph [0025]) retrieves the passenger's seat area data from Passenger's Seat Area Data Storage Area H723b1c (Paragraph [0093]) (S4). Host H (Paragraph [0025]) retrieves the user's device current location data from User's Device Current Location Data Storage Area H723b1d (Paragraph [0093]) (S5). If the user's device current location data retrieved in the previous step is within the passenger's seat area data retrieved in S4, Host H (Paragraph [0025]) proceeds to the next step (S6). Host H (Paragraph [0025]) retrieves the email data from Email Data Storage Area H723b3 (Paragraph [0092]) and sends the data to Device A (S7). CPU 211 (FIG. 1) of Device A receives the email data from Host H (Paragraph [0025]) in a wireless fashion and displays the data on LCD 201 (FIG. 1) of Device A (S8). The foregoing sequence is repeated periodically.

This Paragraph [0123] illustrate(s) Passenger Email Displaying Software 206B723c10 (Paragraph [0109]) of Device B, which display(s) the email addressed to Device B. In the present embodiment, CPU 211 (FIG. 1) of Device B periodically checks the incoming signal addressed to Device B (S1). If an email data is detected in the incoming signal, CPU 211 (FIG. 1) of Device B proceeds to the next step (S2). CPU 211 (FIG. 1) of Device B stores the email data detected in the previous step in Email Data Storage Area 206B723b3 (Paragraph [0106]) (S3). CPU 211 (FIG. 1) of Device B retrieves the passenger's seat area data from Passenger's Seat Area Data Storage Area 206B723b1c (Paragraph [0107]) (S4). CPU 211 (FIG. 1) of Device B retrieves the user's device current location data from User's Device Current Location Data Storage Area 206B723b1d (Paragraph [0107]) (S5). If the user's device current location data retrieved in the previous step is within the passenger's seat area data retrieved in S4, CPU 211 (FIG. 1) of Device B proceeds to the next step (S6). CPU 211 (FIG. 1) of Device B retrieves the email data from Email Data Storage Area 206B723b3 (Paragraph [0106]) (S7). CPU 211 (FIG. 1) of Device B displays the email data retrieved in the previous step on LCD 201 (FIG. 1) of Device B (S8). The foregoing sequence is repeated periodically.

This Paragraph [0124] illustrate(s) Driver Speaker Phone Software H723c11 (Paragraph [0095]) of Host H (Paragraph [0025]) and Driver Speaker Phone Software 206A723c11 (Paragraph [0102]) of Device A, which perform(s) voice communication by implementing the speaker phone functionality by Device A. In the present embodiment, Host H (Paragraph [0025]) periodically checks the incoming signal addressed to Device A (S1). If a phone call is detected in the incoming signal, Host H (Paragraph [0025]) proceeds to the next step (S2). Host H (Paragraph [0025]) retrieves the driver's seat area data from Driver's Seat Area Data Storage Area H723b1b (Paragraph [0093]) (S3). Host H (Paragraph [0025]) retrieves the user's device current location data from User's Device Current Location Data Storage Area H723b1d (Paragraph [0093]) (S4). If the user's device current location data retrieved in the previous step is within the driver's seat area data retrieved in S3, Host H (Paragraph [0025]) proceeds to the next step (S5). Host H (Paragraph [0025]) retrieves the speaker phone data from Speaker Phone Data Storage Area H723b4 (Paragraph [0092]) and sends the data to Device A (S6). CPU 211 (FIG. 1) of Device A receives the speaker phone data from Host H (Paragraph [0025]) in a wireless fashion (S7). CPU 211 (FIG. 1) of Device A performs voice communication with the caller by implementing the speaker phone functionality by utilizing the speaker phone data received in the previous step (S8). Here, a voice communication with the caller by implementing the speaker phone functionality is performed. The foregoing sequence is repeated periodically.

This Paragraph [0125] illustrate(s) Driver Speaker Phone Software 206B723c11 (Paragraph [0109]) of Device B, which perform(s) voice communication by implementing the speaker phone functionality by Device B. In the present embodiment, CPU 211 (FIG. 1) of Device B periodically checks the incoming signal addressed to Device B (S1). If a phone call is detected in the incoming signal, CPU 211 (FIG. 1) of Device B proceeds to the next step (S2). CPU 211 (FIG. 1) of Device B retrieves the driver's seat area data from Driver's Seat Area Data Storage Area 206B723b1b (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the driver's seat area data retrieved in S3, CPU 211 (FIG. 1) of Device B proceeds to the next step (S5). CPU 211 (FIG. 1) of Device B retrieves the speaker phone data from Speaker Phone Data Storage Area 206B723b4 (Paragraph [0106]) (S6). CPU 211 (FIG. 1) of Device B performs voice communication with the caller by implementing the speaker phone functionality by utilizing the speaker phone data retrieved in the previous step (S7). Here, a voice communication with the caller by implementing the speaker phone functionality is performed. The foregoing sequence is repeated periodically.

This Paragraph [0126] illustrate(s) Passenger Non-Speaker Phone Software H723c12 (Paragraph [0095]) of Host H (Paragraph [0025]) and Passenger Non-Speaker Phone Software 206A723c12 (Paragraph [0102]) of Device A, which perform(s) voice communication without implementing the speaker phone functionality by Device A. In the present embodiment, Host H (Paragraph [0025]) periodically checks the incoming signal addressed to Device A (S1). If a phone call is detected in the incoming signal, Host H (Paragraph [0025]) proceeds to the next step (S2). Host H (Paragraph [0025]) retrieves the passenger's seat area data from Passenger's Seat Area Data Storage Area H723b1c (Paragraph [0093]) (S3). Host H (Paragraph [0025]) retrieves the user's device current location data from User's Device Current Location Data Storage Area H723b1d (Paragraph [0093]) (S4). If the user's device current location data retrieved in the previous step is within the passenger's seat area data retrieved in S3, Host H (Paragraph [0025]) proceeds to the next step (S5). CPU 211 (FIG. 1) of Device A performs voice communication with the caller without implementing the speaker phone functionality (S6). Here, a voice communication with the caller is performed without implementing the speaker phone functionality. The foregoing sequence is repeated periodically.

This Paragraph [0127] illustrate(s) Passenger Non-Speaker Phone Software 206B723c12 (Paragraph [0109]) of Device B, which perform(s) voice communication without implementing the speaker phone functionality by Device B. In the present embodiment, CPU 211 (FIG. 1) of Device B periodically checks the incoming signal addressed to Device B (S1). If a phone call is detected in the incoming signal, CPU 211 (FIG. 1) of Device B proceeds to the next step (S2). CPU 211 (FIG. 1) of Device B retrieves the passenger's seat area data from Passenger's Seat Area Data Storage Area 206B723b1c (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the passenger's seat area data retrieved in S3, CPU 211 (FIG. 1) of Device B proceeds to the next step (S5). CPU 211 (FIG. 1) of Device B performs voice communication with the caller without implementing the speaker phone functionality (S6). Here, a voice communication with the caller is performed without implementing the speaker phone functionality. The foregoing sequence is repeated periodically.

This Paragraph [0128] illustrate(s) Driver Audiovisual Data Replay Prohibiting Software H723c13 (Paragraph [0095]) of Host H (Paragraph [0025]) and Driver Audiovisual Data Replay Prohibiting Software 206A723c13 (Paragraph [0102]) of Device A, which prohibit(s) to output audiovisual data from Device A. In the present embodiment, Host H (Paragraph [0025]) checks the input signal (S1). If the input signal detected in the previous step indicates to replay the audiovisual data, Host H (Paragraph [0025]) proceeds to the next step (S2). Host H (Paragraph [0025]) retrieves the driver's seat area data from Driver's Seat Area Data Storage Area H723b1b (Paragraph [0093]) (S3). Host H (Paragraph [0025]) retrieves the user's device current location data from User's Device Current Location Data Storage Area H723b1d (Paragraph [0093]) (S4). If the user's device current location data retrieved in the previous step is within the driver's seat area data retrieved in S3, Host H (Paragraph [0025]) proceeds to the next step (S5). Host H (Paragraph [0025]) retrieves the audiovisual data replay prohibiting message data from Audiovisual Data Replay Prohibiting Message Data Storage Area H723b6 (Paragraph [0092]) and sends the data to Device A (S6). CPU 211 (FIG. 1) of Device A receives the audiovisual data replay prohibiting message data from Host H (Paragraph [0025]) in a wireless fashion and outputs the data from Speaker 216 (FIG. 1) of Device A (S7). The foregoing sequence is repeated periodically.

This Paragraph [0129] illustrate(s) Driver Audiovisual Data Replay Prohibiting Software 206B723c13 (Paragraph [0109]) of Device B, which prohibit(s) to output audiovisual data from Device B. In the present embodiment, CPU 211 (FIG. 1) of Device B checks the input signal (S1). If the input signal detected in the previous step indicates to replay the audiovisual data, CPU 211 (FIG. 1) of Device B proceeds to the next step (S2). CPU 211 (FIG. 1) of Device B retrieves the driver's seat area data from Driver's Seat Area Data Storage Area 206B723b1b (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the driver's seat area data retrieved in S3, CPU 211 (FIG. 1) of Device B proceeds to the next step (S5). CPU 211 (FIG. 1) of Device B retrieves the audiovisual data replay prohibiting message data from Audiovisual Data Replay Prohibiting Message Data Storage Area 206B723b6 (Paragraph [0106]) (S6). CPU 211 (FIG. 1) of Device B outputs the audiovisual data replay prohibiting message data retrieved in the previous step from Speaker 216 (FIG. 1) of Device B (S7). The foregoing sequence is repeated periodically.

This Paragraph [0130] illustrate(s) Passenger Audiovisual Data Replaying Software H723c14 (Paragraph [0095]) of Host H (Paragraph [0025]) and Passenger Audiovisual Data Replaying Software 206A723c14 (Paragraph [0102]) of Device A, which output(s) audiovisual data from Device A. In the present embodiment, Host H (Paragraph [0025]) checks the input signal (S1). If the input signal detected in the previous step indicates to replay the audiovisual data, Host H (Paragraph [0025]) proceeds to the next step (S2). Host H (Paragraph [0025]) retrieves the passenger's seat area data from Passenger's Seat Area Data Storage Area H723b1c (Paragraph [0093]) (S3). Host H (Paragraph [0025]) retrieves the user's device current location data from User's Device Current Location Data Storage Area H723b1d (Paragraph [0093]) (S4). If the user's device current location data retrieved in the previous step is within the passenger's seat area data retrieved in S3, Host H (Paragraph [0025]) proceeds to the next step (S5). Host H (Paragraph [0025]) retrieves the audiovisual data from Audiovisual Data Storage Area H723b5 (Paragraph [0092]) and sends the data to Device A (S6). CPU 211 (FIG. 1) of Device A receives the audiovisual data from Host H (Paragraph [0025]) in a wireless fashion and outputs the data from Speaker 216 (FIG. 1) and LCD 201 (FIG. 1) of Device A (S7). The foregoing sequence is repeated periodically.

This Paragraph [0131] illustrate(s) Passenger Audiovisual Data Replaying Software 206B723c14 (Paragraph [0109]) of Device B, which output(s) audiovisual data from Device B. In the present embodiment, CPU 211 (FIG. 1) of Device B checks the input signal (S1). If the input signal detected in the previous step indicates to replay the audiovisual data, CPU 211 (FIG. 1) of Device B proceeds to the next step (S2). CPU 211 (FIG. 1) of Device B retrieves the passenger's seat area data from Passenger's Seat Area Data Storage Area 206B723b1c (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the passenger's seat area data retrieved in S3, CPU 211 (FIG. 1) of Device B proceeds to the next step (S5). CPU 211 (FIG. 1) of Device B retrieves the audiovisual data from Audiovisual Data Storage Area 206B723b5 (Paragraph [0106]) (S6). CPU 211 (FIG. 1) of Device B outputs the audiovisual data retrieved in the previous step from Speaker 216 (FIG. 1) and LCD 201 (FIG. 1) of Device B (S7). The foregoing sequence is repeated periodically.

This Paragraph [0132] illustrate(s) Location Data Indicating Software H723c15 (Paragraph [0095]) of Host H (Paragraph [0025]) and Location Data Indicating Software 206A723c15 (Paragraph [0102]) of Device A, which indicate (s) the carrier location data, the driver's seat area data, the passenger's seat area data, and the user's device current location data on the map data. In the present embodiment, Host H (Paragraph [0025]) retrieves the map data from Map Data Storage Area H723b7 (Paragraph [0092]) and sends the data to Device A (S1). CPU 211 (FIG. 1) of Device A receives the map data from Host H (Paragraph [0025]) in a wireless fashion and displays the data on LCD 201 (FIG. 1) of Device A (S2). Host H (Paragraph [0025]) retrieves the carrier location data from Carrier Location Data Storage Area H723b1a (Paragraph [0093]) and sends the data to Device A (S3). CPU 211 (FIG. 1) of Device A receives the carrier location data from Host H (Paragraph [0025]) in a wireless fashion (S4). Host H (Paragraph [0025]) retrieves the carrier location icon data from Carrier Location Icon Data Storage Area H723b8a (Paragraph [0094]) and sends the data to Device A (S5). CPU 211 (FIG. 1) of Device A receives the carrier location icon data from Host H (Paragraph [0025]) in a wireless fashion (S6). CPU 211 (FIG. 1) of Device A displays the carrier location icon data received in the previous step at the location corresponding to the carrier location data received in S4 on the map data displayed in S2 (S7). Host H (Paragraph [0025]) retrieves the driver's seat area data from Driver's Seat Area Data Storage Area H723b1b (Paragraph [0093]) and sends the data to Device A (S8). CPU 211 (FIG. 1) of Device A receives the driver's seat area data from Host H (Paragraph [0025]) in a wireless fashion (S9). Host H (Paragraph [0025]) retrieves the driver's seat area icon data from Driver's Seat Area Icon Data Storage Area H723b8b (Paragraph [0094]) and sends the data to Device A (S10). CPU 211 (FIG. 1) of Device A receives the driver's seat area icon data from Host H (Paragraph [0025]) in a wireless fashion (S11). CPU 211 (FIG. 1) of Device A displays the driver's seat area icon data received in the previous step at the location corresponding to the driver's seat area data received in S9 on the map data displayed in S2 (S12). Host H (Paragraph [0025]) retrieves the passenger's seat area data from Passenger's Seat Area Data Storage Area H723b1c (Paragraph [0093]) and sends the data to Device A (S13). CPU 211 (FIG. 1) of Device A receives the passenger's seat area data from Host H (Paragraph [0025]) in a wireless fashion (S14). Host H (Paragraph [0025]) retrieves the passenger's seat area icon data from Passenger's Seat Area Icon Data Storage Area H723b8c (Paragraph [0094]) and sends the data to Device A (S15). CPU 211 (FIG. 1) of Device A receives the passenger's seat area icon data from Host H (Paragraph [0025]) in a wireless fashion (S16). CPU 211 (FIG. 1) of Device A displays the passenger's seat area icon data received in the previous step at the location corresponding to the passenger's seat area data received in (S14 on the map data displayed in S2 (S17). Host H (Paragraph [0025]) retrieves the user's device current location data from User's Device Current Location Data Storage Area H723b1d (Paragraph [0093]) and sends the data to Device A (S18). CPU 211 (FIG. 1) of Device A receives the user's device current location data from Host H (Paragraph [0025]) in a wireless fashion (S19). Host H (Paragraph [0025]) retrieves the user's device current location icon data from User's Device Current Location Icon Data Storage Area H723b8d (Paragraph [0094]) and sends the data to Device A (S20). CPU 211 (FIG. 1) of Device A receives the user's device current location icon data from Host H (Paragraph [0025]) in a wireless fashion (S21). CPU 211 (FIG. 1) of Device A displays the user's device current location icon data received in the previous step at the location corresponding to the user's device current location data received in (S19 on the map data displayed in S2 (S22). The foregoing sequence is repeated periodically.

This Paragraph [0133] illustrate(s) Location Data Indicating Software 206B723c15 (Paragraph [0109]) of Device B, which indicate(s) the carrier location data, the driver's seat area data, the passenger's seat area data, and the user's device current location data on the map data. In the present embodiment, CPU 211 (FIG. 1) of Device B retrieves the map data from Map Data Storage Area 206B723b7 (Paragraph [0106]) (S1). CPU 211 (FIG. 1) of Device B displays the map data retrieved in the previous step on LCD 201 (FIG. 1) of Device B (S2). CPU 211 (FIG. 1) of Device B retrieves the carrier location data from Carrier Location Data Storage Area 206B723b1a (Paragraph [0107]) (S3). CPU 211 (FIG. 1) of Device B retrieves the carrier location icon data from Carrier Location Icon Data Storage Area 206B723b8a (Paragraph [0108]) (S4). CPU 211 (FIG. 1) of Device B displays the carrier location icon data retrieved in the previous step at the location corresponding to the carrier location data retrieved in S3 on the map data displayed in S2 (S5). CPU 211 (FIG. 1) of Device B retrieves the driver's seat area data from Driver's Seat Area Data Storage Area 206B723b1b (Paragraph [0107]) (S6). CPU 211 (FIG. 1) of Device B retrieves the driver's seat area icon data from Driver's Seat Area Icon Data Storage Area 206B723b8b (Paragraph [0108]) (S7). CPU 211 (FIG. 1) of Device B displays the driver's seat area icon data retrieved in the previous step at the location corresponding to the driver's seat area data retrieved in S6 on the map data displayed in S2 (S8). CPU 211 (FIG. 1) of Device B retrieves the passenger's seat area data from Passenger's Seat Area Data Storage Area 206B723b1c (Paragraph [0107]) (S9). CPU 211 (FIG. 1) of Device B retrieves the passenger's seat area icon data from Passenger's Seat Area Icon Data Storage Area 206B723b8c (Paragraph [0108]) (S10). CPU 211 (FIG. 1) of Device B displays the passenger's seat area icon data retrieved in the previous step at the location corresponding to the passenger's seat area data retrieved in S9 on the map data displayed in S2 (S11). CPU 211 (FIG. 1) of Device B retrieves the user's device current location data from User's Device Current Location Data Storage Area 206B723b1d (Paragraph [0107]) (S12). CPU 211 (FIG. 1) of Device B retrieves the user's device current location icon data from User's Device Current Location Icon Data Storage Area 206B723b8d (Paragraph [0108]) (S13). CPU 211 (FIG. 1) of Device B displays the user's device current location icon data retrieved in the previous step at the location corresponding to the user's device current location data retrieved in (S12 on the map data displayed in S2 (S14). The foregoing sequence is repeated periodically.

Paragraph [0135] through Paragraph [0158] illustrate another embodiment wherein Device A plays the major role in implementing the present function.

This Paragraph [0135] illustrate(s) Carrier Location Data Producing Software 206A723c1 (Paragraph [0102]) of Device A, which produce(s) the carrier location data. In the present embodiment, CPU 211 (FIG. 1) of Device A identifies the current location of Carrier CR723 (Paragraph [0089]) (S1). CPU 211 (FIG. 1) of Device A produces the carrier location data by referring to the current location identified in the previous step (S2). CPU 211 (FIG. 1) of Device A stores the carrier location data produced in the previous step in Carrier Location Data Storage Area 206A723b1a (Paragraph [0100]) (S3). The foregoing sequence is repeated periodically.

This Paragraph [0136] illustrate(s) Carrier Location Data Sharing Software 206A723c1a (Paragraph [0102]) of Device A and Carrier Location Data Sharing Software 206B723c1a (Paragraph [0109]) of Device B, which share(s) the carrier location data. In the present embodiment, CPU 211 (FIG. 1) of Device A retrieves the carrier location data from Carrier Location Data Storage Area 206A723b1a (Paragraph [0100]) and sends the data to Device B in a wireless fashion (S1). CPU 211 (FIG. 1) of Device B receives the carrier location data from Device A in a wireless fashion and stores the data in Carrier Location Data Storage Area 206B723b1a (Paragraph [0107]) (S2). The foregoing sequence is repeated periodically.

This Paragraph [0137] illustrate(s) Driver's Seat Area Data Producing Software 206A723c2 (Paragraph [0102]) of Device A, which produce(s) the driver's seat area data. In the present embodiment, CPU 211 (FIG. 1) of Device A retrieves the carrier location data from Carrier Location Data Storage Area 206A723b1a (Paragraph [0100]) (S1). CPU 211 (FIG. 1) of Device A identifies the current driver's seat area by referring to the carrier location data retrieved in the previous step (S2). CPU 211 (FIG. 1) of Device A produces the driver's seat area data by referring to the current driver's seat area identified in the previous step (S3). CPU 211 (FIG. 1) of Device A stores the driver's seat area data produced in the previous step in Driver's Seat Area Data Storage Area 206A723b1b (Paragraph [0100]) (S4). The foregoing sequence is repeated periodically.

This Paragraph [0138] illustrate(s) Driver's Seat Area Data Sharing Software 206A723c3 (Paragraph [0102]) of Device A and Driver's Seat Area Data Sharing Software 206B723c3 (Paragraph [0109]) of Device B, which share(s) the driver's seat area data. In the present embodiment, CPU 211 (FIG. 1) of Device A retrieves the driver's seat area data from Driver's Seat Area Data Storage Area 206A723b1b (Paragraph [0100]) and sends the data to Device B in a wireless fashion (S1). CPU 211 (FIG. 1) of Device B receives the driver's seat area data from Device A in a wireless fashion and stores the data in Driver's Seat Area Data Storage Area 206B723b1b (Paragraph [0107]) (S2). The foregoing sequence is repeated periodically.

This Paragraph [0139] illustrate(s) Passenger's Seat Area Data Producing Software 206A723c4 (Paragraph [0102]) of Device A, which produce(s) the passenger's seat area data. In the present embodiment, CPU 211 (FIG. 1) of Device A retrieves the carrier location data from Carrier Location Data Storage Area 206A723b1 a (Paragraph [0100]) (S1). CPU 211 (FIG. 1) of Device A identifies the current passenger's seat area by referring to the carrier location data retrieved in the previous step (S2). CPU 211 (FIG. 1) of Device A produces the passenger's seat area data by referring to the current passenger's seat area identified in the previous step (S3). CPU 211 (FIG. 1) of Device A stores the passenger's seat area data produced in the previous step in Passenger's Seat Area Data Storage Area 206A723b1c (Paragraph [0100]) (S4). The foregoing sequence is repeated periodically.

This Paragraph [0140] illustrate(s) Passenger's Seat Area Data Sharing Software 206A723c5 (Paragraph [0102]) of Device A and Passenger's Seat Area Data Sharing Software 206B723c5 (Paragraph [0109]) of Device B, which share(s) the passenger's seat area data. In the present embodiment, CPU 211 (FIG. 1) of Device A retrieves the passenger's seat area data from Passenger's Seat Area Data Storage Area 206A723b1c (Paragraph [0100]) and sends the data to Device B in a wireless fashion (S1). CPU 211 (FIG. 1) of Device B receives the passenger's seat area data from Device A in a wireless fashion and stores the data in Passenger's Seat Area Data Storage Area 206B723b1c (Paragraph [0107]) (S2). The foregoing sequence is repeated periodically.

This Paragraph [0141] illustrate(s) User's Device Current Location Data Producing Software 206B723c6 (Paragraph [0109]) of Device B, which produce(s) the user's device current location data. In the present embodiment, CPU 211 (FIG. 1) of Device B identifies the current location of Device B (S1). CPU 211 (FIG. 1) of Device B produces the user's device current location data by referring to the current location identified in the previous step (S2). CPU 211 (FIG. 1) of Device B stores the user's device current location data produced in the previous step in User's Device Current Location Data Storage Area 206B723b1d (Paragraph [0107]) (S3). The foregoing sequence is repeated periodically.

This Paragraph [0142] illustrate(s) User's Device Current Location Data Sharing Software 206A723c7 (Paragraph [0102]) of Device A and User's Device Current Location Data Sharing Software 206B723c7 (Paragraph [0109]) of Device B, which share(s) the user's device current location data. In the present embodiment, CPU 211 (FIG. 1) of Device B retrieves the user's device current location data from User's Device Current Location Data Storage Area 206B723b1d (Paragraph [0107]) and sends the data to Device A in a wireless fashion (S1). CPU 211 (FIG. 1) of Device A receives the user's device current location data from Device B in a wireless fashion and stores the data in User's Device Current Location Data Storage Area 206A723b1d (Paragraph [0100]) (S2). The foregoing sequence is repeated periodically.

This Paragraph [0143] illustrate(s) Fasten Seat Belt Message Data Outputting Software 206A723c8 (Paragraph [0102]) of Device A, which output(s) the fasten seat belt message data from Device A. In the present embodiment, CPU 211 (FIG. 1) of Device A retrieves the driver's seat area data from Driver's Seat Area Data Storage Area 206A723b1b (Paragraph [0100]) (S1). CPU 211 (FIG. 1) of Device A retrieves the passenger's seat area data from Passenger's Seat Area Data Storage Area 206A723b1c (Paragraph [0100]) (S2). CPU 211 (FIG. 1) of Device A retrieves the user's device current location data from User's Device Current Location Data Storage Area 206A723b1d (Paragraph [0100]) (S3). If the user's device current location data retrieved in the previous step is within the driver's seat area data retrieved in (S1 or the passenger's seat area data retrieved in S2, CPU 211 (FIG. 1) of Device A proceeds to the next step (S4). CPU 211 (FIG. 1) of Device A retrieves the fasten seat belt message data from Fasten Seat Belt Message Data Storage Area 206A723b2 (Paragraph [0099]) (S5). CPU 211 (FIG. 1) of Device A displays the fasten seat belt message data retrieved in the previous step on LCD 201 (FIG. 1) of Device A (S6). The foregoing sequence is repeated periodically.

This Paragraph [0144] illustrate(s) Fasten Seat Belt Message Data Outputting Software 206B723c8 (Paragraph [0109]) of Device B, which output(s) the fasten seat belt message data from Device B. In the present embodiment, CPU 211 (FIG. 1) of Device B retrieves the driver's seat area data from Driver's Seat Area Data Storage Area 206B723b1b (Paragraph [0107]) (S1). CPU 211 (FIG. 1) of Device B retrieves the passenger's seat area data from Passenger's Seat Area Data Storage Area 206B723b1c (Paragraph [0107]) (S2). CPU 211 (FIG. 1) of Device B retrieves the user's device current location data from User's Device Current Location Data Storage Area 206B723b1d (Paragraph [0107]) (S3). If the user's device current location data retrieved in the previous step is within the driver's seat area data retrieved in (S1 or the passenger's seat area data retrieved in S2, CPU 211 (FIG. 1) of Device B proceeds to the next step (S4). CPU 211 (FIG. 1) of Device B retrieves the fasten seat belt message data from Fasten Seat Belt Message Data Storage Area 206B723b2 (Paragraph [0106]) (S5). CPU 211 (FIG. 1) of Device B displays the fasten seat belt message data retrieved in the previous step on LCD 201 (FIG. 1) of Device B (S6). The foregoing sequence is repeated periodically.

This Paragraph [0145] illustrate(s) Driver Email Text-To-Speech Software 206A723c9 (Paragraph [0102]) of Device A, which read(s) aloud the email addressed to Device A. In the present embodiment, CPU 211 (FIG. 1) of Device A periodically checks the incoming signal addressed to Device A (S1). If an email data is detected in the incoming signal, CPU 211 (FIG. 1) of Device A proceeds to the next step (S2). CPU 211 (FIG. 1) of Device A stores the email data detected in the previous step in Email Data Storage Area 206A723b3 (Paragraph [0099]) (S3). CPU 211 (FIG. 1) of Device A retrieves the driver's seat area data from Driver's Seat Area Data Storage Area 206A723b1b (Paragraph [0100]) (S4). CPU 211 (FIG. 1) of Device A retrieves the user's device current location data from User's Device Current Location Data Storage Area 206A723b1d (Paragraph [0100]) (S5). If the user's device current location data retrieved in the previous step is within the driver's seat area data retrieved in S4, CPU 211 (FIG. 1) of Device A proceeds to the next step (S6). CPU 211 (FIG. 1) of Device A retrieves the email data from Email Data Storage Area 206A723b3 (Paragraph [0099]) (S7). CPU 211 (FIG. 1) of Device A identifies the alphanumeric data included in the email data retrieved in the previous step (S8). CPU 211 (FIG. 1) of Device A converts the alphanumeric data identified in the previous step to audio data (S9). CPU 211 (FIG. 1) of Device A outputs the audio data converted in the previous step from Speaker 216 (FIG. 1) of Device A (S10). The foregoing sequence is repeated periodically.

This Paragraph [0146] illustrate(s) Driver Email Text-To-Speech Software 206B723c9 (Paragraph [0109]) of Device B, which read(s) aloud the email addressed to Device B. In the present embodiment, CPU 211 (FIG. 1) of Device B periodically checks the incoming signal addressed to Device B (S1). If an email data is detected in the incoming signal, CPU 211 (FIG. 1) of Device B proceeds to the next step (S2). CPU 211 (FIG. 1) of Device B stores the email data detected in the previous step in Email Data Storage Area 206B723b3 (Paragraph [0106]) (S3). CPU 211 (FIG. 1) of Device B retrieves the driver's seat area data from Driver's Seat Area Data Storage Area 206B723b1b (Paragraph [0107]) (S4). CPU 211 (FIG. 1) of Device B retrieves the user's device current location data from User's Device Current Location Data Storage Area 206B723b1d (Paragraph [0107]) (S5). If the user's device current location data retrieved in the previous step is within the driver's seat area data retrieved in S4, CPU 211 (FIG. 1) of Device B proceeds to the next step (S6). CPU 211 (FIG. 1) of Device B retrieves the email data from Email Data Storage Area 206B723b3 (Paragraph [0106]) (S7). CPU 211 (FIG. 1) of Device B identifies the alphanumeric data included in the email data retrieved in the previous step (S8). CPU 211 (FIG. 1) of Device B converts the alphanumeric data identified in the previous step to audio data (S9). CPU 211 (FIG. 1) of Device B outputs the audio data converted in the previous step from Speaker 216 (FIG. 1) of Device B (S10). The foregoing sequence is repeated periodically.

This Paragraph [0147] illustrate(s) Passenger Email Displaying Software 206A723c10 (Paragraph [0102]) of Device A, which display(s) the email addressed to Device A. In the present embodiment, CPU 211 (FIG. 1) of Device A periodically checks the incoming signal addressed to Device A (S1). If an email data is detected in the incoming signal, CPU 211 (FIG. 1) of Device A proceeds to the next step (S2). CPU 211 (FIG. 1) of Device A stores the email data detected in the previous step in Email Data Storage Area 206A723b3 (Paragraph [0099]) (S3). CPU 211 (FIG. 1) of Device A retrieves the passenger's seat area data from Passenger's Seat Area Data Storage Area 206A723b1c (Paragraph [0100]) (S4). CPU 211 (FIG. 1) of Device A retrieves the user's device current location data from User's Device Current Location Data Storage Area 206A723b1d (Paragraph [0100]) (S5). If the user's device current location data retrieved in the previous step is within the passenger's seat area data retrieved in S4, CPU 211 (FIG. 1) of Device A proceeds to the next step (S6). CPU 211 (FIG. 1) of Device A retrieves the email data from Email Data Storage Area 206A723b3 (Paragraph [0099]) (S7). CPU 211 (FIG. 1) of Device A displays the email data retrieved in the previous step on LCD 201 (FIG. 1) of Device A (S8). The foregoing sequence is repeated periodically.

This Paragraph [0148] illustrate(s) Passenger Email Displaying Software 206B723c10 (Paragraph [0109]) of Device B, which display(s) the email addressed to Device B. In the present embodiment, CPU 211 (FIG. 1) of Device B periodically checks the incoming signal addressed to Device B (S1). If an email data is detected in the incoming signal, CPU 211 (FIG. 1) of Device B proceeds to the next step (S2). CPU 211 (FIG. 1) of Device B stores the email data detected in the previous step in Email Data Storage Area 206B723b3 (Paragraph [0106]) (S3). CPU 211 (FIG. 1) of Device B retrieves the passenger's seat area data from Passenger's Seat Area Data Storage Area 206B723b1c (Paragraph [0107]) (S4). CPU 211 (FIG. 1) of Device B retrieves the user's device current location data from User's Device Current Location Data Storage Area 206B723b1d (Paragraph [0107]) (S5). If the user's device current location data retrieved in the previous step is within the passenger's seat area data retrieved in S4, CPU 211 (FIG. 1) of Device B proceeds to the next step (S6). CPU 211 (FIG. 1) of Device B retrieves the email data from Email Data Storage Area 206B723b3 (Paragraph [0106]) (S7). CPU 211 (FIG. 1) of Device B displays the email data retrieved in the previous step on LCD 201 (FIG. 1) of Device B (S8). The foregoing sequence is repeated periodically.

This Paragraph [0149] illustrate(s) Driver Speaker Phone Software 206A723c11 (Paragraph [0102]) of Device A, which perform(s) voice communication by implementing the speaker phone functionality by Device A. In the present embodiment, CPU 211 (FIG. 1) of Device A periodically checks the incoming signal addressed to Device A (S1). If a phone call is detected in the incoming signal, CPU 211 (FIG. 1) of Device A proceeds to the next step (S2). CPU 211 (FIG. 1) of Device A retrieves the driver's seat area data from Driver's Seat Area Data Storage Area 206A723b1b (Paragraph [0100]) (S3). CPU 211 (FIG. 1) of Device A retrieves the user's device current location data from User's Device Current Location Data Storage Area 206A723b1d (Paragraph [0100]) (S4). If the user's device current location data retrieved in the previous step is within the driver's seat area data retrieved in S3, CPU 211 (FIG. 1) of Device A proceeds to the next step (S5). CPU 211 (FIG. 1) of Device A retrieves the speaker phone data from Speaker Phone Data Storage Area 206A723b4 (Paragraph [0099]) (S6). CPU 211 (FIG. 1) of Device A performs voice communication with the caller by implementing the speaker phone functionality by utilizing the speaker phone data retrieved in the previous step (S7). Here, a voice communication with the caller by implementing the speaker phone functionality is performed. The foregoing sequence is repeated periodically.

This Paragraph [0150] illustrate(s) Driver Speaker Phone Software 206B723c11 (Paragraph [0109]) of Device B, which perform(s) voice communication by implementing the speaker phone functionality by Device B. In the present embodiment, CPU 211 (FIG. 1) of Device B periodically checks the incoming signal addressed to Device B (S1). If a phone call is detected in the incoming signal, CPU 211 (FIG. 1) of Device B proceeds to the next step (S2). CPU 211 (FIG. 1) of Device B retrieves the driver's seat area data from Driver's Seat Area Data Storage Area 206B723b1b (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the driver's seat area data retrieved in S3, CPU 211 (FIG. 1) of Device B proceeds to the next step (S5). CPU 211 (FIG. 1) of Device B retrieves the speaker phone data from Speaker Phone Data Storage Area 206B723b4 (Paragraph [0106]) (S6). CPU 211 (FIG. 1) of Device B performs voice communication with the caller by implementing the speaker phone functionality by utilizing the speaker phone data retrieved in the previous step (S7). Here, a voice communication with the caller by implementing the speaker phone functionality is performed. The foregoing sequence is repeated periodically.

This Paragraph [0151] illustrate(s) Passenger Non-Speaker Phone Software 206A723c12 (Paragraph [0102]) of Device A, which perform(s) voice communication without implementing the speaker phone functionality by Device A. In the present embodiment, CPU 211 (FIG. 1) of Device A periodically checks the incoming signal addressed to Device A (S1). If a phone call is detected in the incoming signal, CPU 211 (FIG. 1) of Device A proceeds to the next step (S2). CPU 211 (FIG. 1) of Device A retrieves the passenger's seat area data from Passenger's Seat Area Data Storage Area 206A723b1c (Paragraph [0100]) (S3). CPU 211 (FIG. 1) of Device A retrieves the user's device current location data from User's Device Current Location Data Storage Area 206A723b1d (Paragraph [0100]) (S4). If the user's device current location data retrieved in the previous step is within the passenger's seat area data retrieved in S3, CPU 211 (FIG. 1) of Device A proceeds to the next step (S5). CPU 211 (FIG. 1) of Device A performs voice communication with the caller without implementing the speaker phone functionality (S6). Here, a voice communication with the caller is performed without implementing the speaker phone functionality. The foregoing sequence is repeated periodically.

This Paragraph [0152] illustrate(s) Passenger Non-Speaker Phone Software 206B723c12 (Paragraph [0109]) of Device B, which perform(s) voice communication without implementing the speaker phone functionality by Device B. In the present embodiment, CPU 211 (FIG. 1) of Device B periodically checks the incoming signal addressed to Device B (S1). If a phone call is detected in the incoming signal, CPU 211 (FIG. 1) of Device B proceeds to the next step (S2). CPU 211 (FIG. 1) of Device B retrieves the passenger's seat area data from Passenger's Seat Area Data Storage Area 206B723b1c (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the passenger's seat area data retrieved in S3, CPU 211 (FIG. 1) of Device B proceeds to the next step (S5). CPU 211 (FIG. 1) of Device B performs voice communication with the caller without implementing the speaker phone functionality (S6). Here, a voice communication with the caller is performed without implementing the speaker phone functionality. The foregoing sequence is repeated periodically.

This Paragraph [0153] illustrate(s) Driver Audiovisual Data Replay Prohibiting Software 206A723c13 (Paragraph [0102]) of Device A, which prohibit(s) to output audiovisual data from Device A. In the present embodiment, CPU 211 (FIG. 1) of Device A checks the input signal (S1). If the input signal detected in the previous step indicates to replay the audiovisual data, CPU 211 (FIG. 1) of Device A proceeds to the next step (S2). CPU 211 (FIG. 1) of Device A retrieves the driver's seat area data from Driver's Seat Area Data Storage Area 206A723b1b (Paragraph [0100]) (S3). CPU 211 (FIG. 1) of Device A retrieves the user's device current location data from User's Device Current Location Data Storage Area 206A723b1d (Paragraph [0100]) (S4). If the user's device current location data retrieved in the previous step is within the driver's seat area data retrieved in S3, CPU 211 (FIG. 1) of Device A proceeds to the next step (S5). CPU 211 (FIG. 1) of Device A retrieves the audiovisual data replay prohibiting message data from Audiovisual Data Replay Prohibiting Message Data Storage Area 206A723b6 (Paragraph [0099]) (S6). CPU 211 (FIG. 1) of Device A outputs the audiovisual data replay prohibiting message data retrieved in the previous step from Speaker 216 (FIG. 1) of Device A (S7). The foregoing sequence is repeated periodically.

This Paragraph [0154] illustrate(s) Driver Audiovisual Data Replay Prohibiting Software 206B723c13 (Paragraph [0109]) of Device B, which prohibit(s) to output audiovisual data from Device B. In the present embodiment, CPU 211 (FIG. 1) of Device B checks the input signal (S1). If the input signal detected in the previous step indicates to replay the audiovisual data, CPU 211 (FIG. 1) of Device B proceeds to the next step (S2). CPU 211 (FIG. 1) of Device B retrieves the driver's seat area data from Driver's Seat Area Data Storage Area 206B723b1b (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the driver's seat area data retrieved in S3, CPU 211 (FIG. 1) of Device B proceeds to the next step (S5). CPU 211 (FIG. 1) of Device B retrieves the audiovisual data replay prohibiting message data from Audiovisual Data Replay Prohibiting Message Data Storage Area 206B723b6 (Paragraph [0106]) (S6). CPU 211 (FIG. 1) of Device B outputs the audiovisual data replay prohibiting message data retrieved in the previous step from Speaker 216 (FIG. 1) of Device B (S7). The foregoing sequence is repeated periodically.

This Paragraph [0155] illustrate(s) Passenger Audiovisual Data Replaying Software 206A723c14 (Paragraph [0102]) of Device A, which output(s) audiovisual data from Device A. In the present embodiment, CPU 211 (FIG. 1) of Device A checks the input signal (S1). If the input signal detected in the previous step indicates to replay the audiovisual data, CPU 211 (FIG. 1) of Device A proceeds to the next step (S2). CPU 211 (FIG. 1) of Device A retrieves the passenger's seat area data from Passenger's Seat Area Data Storage Area 206A723b1c (Paragraph [0100]) (S3). CPU 211 (FIG. 1) of Device A retrieves the user's device current location data from User's Device Current Location Data Storage Area 206A723b1d (Paragraph [0100]) (S4). If the user's device current location data retrieved in the previous step is within the passenger's seat area data retrieved in S3, CPU 211 (FIG. 1) of Device A proceeds to the next step (S5). CPU 211 (FIG. 1) of Device A retrieves the audiovisual data from Audiovisual Data Storage Area 206A723b5 (Paragraph [0099]) (S6). CPU 211 (FIG. 1) of Device A outputs the audiovisual data retrieved in the previous step from Speaker 216 (FIG. 1) and LCD 201 (FIG. 1) of Device A (S7). The foregoing sequence is repeated periodically.

This Paragraph [0156] illustrate(s) Passenger Audiovisual Data Replaying Software 206B723c14 (Paragraph [0109]) of Device B, which output(s) audiovisual data from Device B. In the present embodiment, CPU 211 (FIG. 1) of Device B checks the input signal (S1). If the input signal detected in the previous step indicates to replay the audiovisual data, CPU 211 (FIG. 1) of Device B proceeds to the next step (S2). CPU 211 (FIG. 1) of Device B retrieves the passenger's seat area data from Passenger's Seat Area Data Storage Area 206B723b1c (Paragraph [0107]) (S3). CPU 211 (FIG. 1) of Device B retrieves the user's device current location data from User's Device Current Location Data Storage Area 206B723b1d (Paragraph [0107]) (S4). If the user's device current location data retrieved in the previous step is within the passenger's seat area data retrieved in S3, CPU 211 (FIG. 1) of Device B proceeds to the next step (S5). CPU 211 (FIG. 1) of Device B retrieves the audiovisual data from Audiovisual Data Storage Area 206B723b5 (Paragraph [0106]) (S6). CPU 211 (FIG. 1) of Device B outputs the audiovisual data retrieved in the previous step from Speaker 216 (FIG. 1) and LCD 201 (FIG. 1) of Device B (S7). The foregoing sequence is repeated periodically.

This Paragraph [0157] illustrate(s) Location Data Indicating Software 206A723c15 (Paragraph [0102]) of Device A, which indicate(s) the carrier location data, the driver's seat area data, the passenger's seat area data, and the user's device current location data on the map data. In the present embodiment, CPU 211 (FIG. 1) of Device A retrieves the map data from Map Data Storage Area 206A723b7 (Paragraph [0099]) (S1). CPU 211 (FIG. 1) of Device A displays the map data retrieved in the previous step on LCD 201 (FIG. 1) of Device A (S2). CPU 211 (FIG. 1) of Device A retrieves the carrier location data from Carrier Location Data Storage Area 206A723b1a (Paragraph [0100]) (S3). CPU 211 (FIG. 1) of Device A retrieves the carrier location icon data from Carrier Location Icon Data Storage Area 206A723b8a (Paragraph [0101]) (S4). CPU 211 (FIG. 1) of Device A displays the carrier location icon data retrieved in the previous step at the location corresponding to the carrier location data retrieved in S3 on the map data displayed in S2 (S5). CPU 211 (FIG. 1) of Device A retrieves the driver's seat area data from Driver's Seat Area Data Storage Area 206A723b1b (Paragraph [0100]) (S6). CPU 211 (FIG. 1) of Device A retrieves the driver's seat area icon data from Driver's Seat Area Icon Data Storage Area 206A723b8b (Paragraph [0101]) (S7). CPU 211 (FIG. 1) of Device A displays the driver's seat area icon data retrieved in the previous step at the location corresponding to the driver's seat area data retrieved in S6 on the map data displayed in S2 (S8). CPU 211 (FIG. 1) of Device A retrieves the passenger's seat area data from Passenger's Seat Area Data Storage Area 206A723b1c (Paragraph [0100]) (S9). CPU 211 (FIG. 1) of Device A retrieves the passenger's seat area icon data from Passenger's Seat Area Icon Data Storage Area 206A723b8c (Paragraph [0101]) (S10). CPU 211 (FIG. 1) of Device A displays the passenger's seat area icon data retrieved in the previous step at the location corresponding to the passenger's seat area data retrieved in S9 on the map data displayed in S2 (S11). CPU 211 (FIG. 1) of Device A retrieves the user's device current location data from User's Device Current Location Data Storage Area 206A723b1d (Paragraph [0100]) (S12). CPU 211 (FIG. 1) of Device A retrieves the user's device current location icon data from User's Device Current Location Icon Data Storage Area 206A723b8d (Paragraph [0101]) (S13). CPU 211 (FIG. 1) of Device A displays the user's device current location icon data retrieved in the previous step at the location corresponding to the user's device current location data retrieved in (S12 on the map data displayed in S2 (S14). The foregoing sequence is repeated periodically.

This Paragraph [0158] illustrate(s) Location Data Indicating Software 206B723c15 (Paragraph [0109]) of Device B, which indicate(s) the carrier location data, the driver's seat area data, the passenger's seat area data, and the user's device current location data on the map data. In the present embodiment, CPU 211 (FIG. 1) of Device B retrieves the map data from Map Data Storage Area 206B723b7 (Paragraph [0106]) (S1). CPU 211 (FIG. 1) of Device B displays the map data retrieved in the previous step on LCD 201 (FIG. 1) of Device B (S2). CPU 211 (FIG. 1) of Device B retrieves the carrier location data from Carrier Location Data Storage Area 206B723b1a (Paragraph [0107]) (S3). CPU 211 (FIG. 1) of Device B retrieves the carrier location icon data from Carrier Location Icon Data Storage Area 206B723b8a (Paragraph [0108]) (S4). CPU 211 (FIG. 1) of Device B displays the carrier location icon data retrieved in the previous step at the location corresponding to the carrier location data retrieved in S3 on the map data displayed in S2 (S5). CPU 211 (FIG. 1) of Device B retrieves the driver's seat area data from Driver's Seat Area Data Storage Area 206B723b1b (Paragraph [0107]) (S6). CPU 211 (FIG. 1) of Device B retrieves the driver's seat area icon data from Driver's Seat Area Icon Data Storage Area 206B723b8b (Paragraph [0108]) (S7). CPU 211 (FIG. 1) of Device B displays the driver's seat area icon data retrieved in the previous step at the location corresponding to the driver's seat area data retrieved in S6 on the map data displayed in S2 (S8). CPU 211 (FIG. 1) of Device B retrieves the passenger's seat area data from Passenger's Seat Area Data Storage Area 206B723b1c (Paragraph [0107]) (S9). CPU 211 (FIG. 1) of Device B retrieves the passenger's seat area icon data from Passenger's Seat Area Icon Data Storage Area 206B723b8c (Paragraph [0108]) (S10). CPU 211 (FIG. 1) of Device B displays the passenger's seat area icon data retrieved in the previous step at the location corresponding to the passenger's seat area data retrieved in S9 on the map data displayed in S2 (S11). CPU 211 (FIG. 1) of Device B retrieves the user's device current location data from User's Device Current Location Data Storage Area 206B723b1d (Paragraph [0107]) (S12). CPU 211 (FIG. 1) of Device B retrieves the user's device current location icon data from User's Device Current Location Icon Data Storage Area 206B723b8d (Paragraph [0108]) (S13). CPU 211 (FIG. 1) of Device B displays the user's device current location icon data retrieved in the previous step at the location corresponding to the user's device current location data retrieved in (S12 on the map data displayed in S2 (S14). The foregoing sequence is repeated periodically.

<<Area Dependent Video Phone Auto Activating Function>>

Paragraph [0161] through Paragraph [0188] illustrate the area dependent video phone auto activating function, wherein when said communication device enters a 1st geographic area, a phone call is automatically implemented to a 1st phone number and a 1st phone number called location data which indicates the geographic location at which a phone call was made to said 1st phone number is produced, when said communication device enters a 2nd geographic area, a phone call is automatically implemented to a 2nd phone number and a 2nd phone number called location data which indicates the geographic location at which a phone call was made to said 2nd phone number is produced, and said 1st phone number called location data, said 2nd phone number called location data, and a current location data which indicates the current geographic location of said communication device are indicated on said display.

This Paragraph [0161] illustrates the storage area included in Host H (Paragraph [0025]). In the present embodiment, Host H (Paragraph [0025]) includes Area Dependent Video Phone Auto Activating Info Storage Area H724a of which the data and the software program(s) stored therein are described in Paragraph [0162].

This Paragraph [0162] illustrates the storage area(s) included in Area Dependent Video Phone Auto Activating Info Storage Area H724a (Paragraph [0161]). In the present embodiment, Area Dependent Video Phone Auto Activating Info Storage Area H724a includes Area Dependent Video Phone Auto Activating Data Storage Area H724b and Area Dependent Video Phone Auto Activating Software Storage Area H724c. Area Dependent Video Phone Auto Activating Data Storage Area H724b stores the data necessary to implement the present function on the side of Host H (Paragraph [0025]), such as the one(s) described in Paragraph [0163]. Area Dependent Video Phone Auto Activating Software Storage Area H724c stores the software program(s) necessary to implement the present function on the side of Host H (Paragraph [0025]), such as the one(s) described in Paragraph [0169].

This Paragraph [0163] illustrates the storage area(s) included in Area Dependent Video Phone Auto Activating Data Storage Area H724b (Paragraph [0162]). In the present embodiment, Area Dependent Video Phone Auto Activating Data Storage Area H724b includes Current Location Data Storage Area H724b1, Entire Geographic Area Data Storage Area H724b2, Entire Geographic Dependent Phone Number Data Storage Area H724b3, Entire Phone Number Called Location Data Storage Area H724b4, Map Data Storage Area H724b5, Entire Location Icon Data Storage Area H724b6, Entire Audiovisual Data Storage Area H724b7, and Work Area H724b8. Current Location Data Storage Area H724b1 stores the current location data which indicates the current geographic location of Communication Device 200 in (x,y,z) format. Entire Geographic Area Data Storage Area H724b2 stores the data described in Paragraph [0164]. Entire Geographic Dependent Phone Number Data Storage Area H724b3 stores the data described in Paragraph [0165]. Entire Phone Number Called Location Data Storage Area H724b4 stores the data described in Paragraph [0166]. Map Data Storage Area H724b5 stores the map data which is the image data indicating a map. Entire Location Icon Data Storage Area H724b6 stores the data described in Paragraph [0167]. Entire Audiovisual Data Storage Area H724b7 stores the data described in Paragraph [0168]. Work Area H724b8 is utilized as a work area to perform calculation and temporarily store data to implement the present function.

This Paragraph [0164] illustrates the storage area(s) included in Entire Geographic Area Data Storage Area H724b2 (Paragraph [0163]). In the present embodiment, Entire Geographic Area Data Storage Area H724b2 includes 1st Geographic Area Data Storage Area H724b2a and 2nd Geographic Area Data Storage Area H724b2b. 1st Geographic Area Data Storage Area H724b2a stores the 1st geographic area data which indicates a certain geographic area (e.g., Sacramento Calif.). Here, the certain geographic area may be as small as the geographic area of 50 cm radius or as large as that of 500 km radius. 2nd Geographic Area Data Storage Area H724b2b stores the 2nd geographic area data which indicates another certain geographic area (e.g., San Jose Calif.). Here, the certain geographic area may be as small as the geographic area of 50 cm radius or as large as that of 500 km radius.

This Paragraph [0165] illustrates the storage area(s) included in Entire Geographic Dependent Phone Number Data Storage Area H724b3 (Paragraph [0163]). In the present embodiment, Entire Geographic Dependent Phone Number Data Storage Area H724b3 includes 1st Geographic Dependent Phone Number Data Storage Area H724b3a and 2nd Geographic Dependent Phone Number Data Storage Area H724b3b. 1st Geographic Dependent Phone Number Data Storage Area H724b3a stores the 1st geographic dependent phone number data which indicates a phone number. 2nd Geographic Dependent Phone Number Data Storage Area H724b3b stores the 2nd geographic dependent phone number data which indicates another phone number.

This Paragraph [0166] illustrates the storage area(s) included in Entire Phone Number Called Location Data Storage Area H724b4 (Paragraph [0163]). In the present embodiment, Entire Phone Number Called Location Data Storage Area H724b4 includes 1st Phone Number Called Location Data Storage Area H724b4a and 2nd Phone Number Called Location Data Storage Area H724b4b. 1st Phone Number Called Location Data Storage Area H724b4a stores the 1st phone number called location data which indicates the geographic location at which a phone call was made to the 1st geographic dependent phone number data. 2nd Phone Number Called Location Data Storage Area H724b4b stores the 2nd phone number called location data which indicates the geographic location at which a phone call was made to the 2nd geographic dependent phone number data.

This Paragraph [0167] illustrates the storage area(s) included in Entire Location Icon Data Storage Area H724b6

(Paragraph [0163]). In the present embodiment, Entire Location Icon Data Storage Area H724b6 includes 1st Phone Number Called Location Icon Data Storage Area H724b6a, 2nd Phone Number Called Location Icon Data Storage Area H724b6b, and Current Location Icon Data Storage Area H724b6c. 1st Phone Number Called Location Icon Data Storage Area H724b6a stores the 1st phone number called location icon data which is the image of the icon utilized to indicate the 1st phone number called location data on the map data. 2nd Phone Number Called Location Icon Data Storage Area H724b6b stores the 2nd phone number called location icon data which is the image of the icon utilized to indicate the 2nd phone number called location data on the map data. Current Location Icon Data Storage Area H724b6c stores the current location icon data which is the image of the icon utilized to indicate the current location data on the map data.

This Paragraph [0168] illustrates the storage area(s) included in Entire Audiovisual Data Storage Area H724b7 (Paragraph [0163]). In the present embodiment, Entire Audiovisual Data Storage Area H724b7 includes Caller's Audiovisual Data Storage Area H724b7a and Callee's Audiovisual Data Storage Area H724b7b. Caller's Audiovisual Data Storage Area H724b7a stores the caller's audiovisual data which indicates the audiovisual data retrieved from Microphone 215 (FIG. 1) and CCD Unit 214 (FIG. 1) of Communication Device 200. Callee's Audiovisual Data Storage Area H724b7b stores the callee's audiovisual data which indicates the audiovisual data received from the callee's device (not shown).

This Paragraph [0169] illustrates the software program(s) stored in Area Dependent Video Phone Auto Activating Software Storage Area H724c (Paragraph [0162]). In the present embodiment, Area Dependent Video Phone Auto Activating Software Storage Area H724c stores Current Location Data Producing Software H724c1, 1st Geographic Dependent Phone Number Data Auto Dialing Software H724c2, 2nd Geographic Dependent Phone Number Data Auto Dialing Software H724c3, and Phone Number Called Location Log Displaying Software H724c4. Current Location Data Producing Software H724c1 is the software program described in Paragraph [0180]. 1st Geographic Dependent Phone Number Data Auto Dialing Software H724c2 is the software program described in Paragraph [0181]. 2nd Geographic Dependent Phone Number Data Auto Dialing Software H724c3 is the software program described in Paragraph [0182]. Phone Number Called Location Log Displaying Software H724c4 is the software program described in Paragraph [0183].

This Paragraph [0170] illustrates the storage area included in RAM 206 (FIG. 1) of Communication Device 200. In the present embodiment, RAM 206 includes Area Dependent Video Phone Auto Activating Info Storage Area 206724a of which the data and the software program(s) stored therein are described in Paragraph [0172].

The data and/or the software program(s) necessary to implement the present function may be downloaded from Host H (Paragraph [0025]) to Communication Device 200.

This Paragraph [0172] illustrates the storage area(s) included in Area Dependent Video Phone Auto Activating Info Storage Area 206724a (Paragraph [0170]). In the present embodiment, Area Dependent Video Phone Auto Activating Info Storage Area 206724a includes Area Dependent Video Phone Auto Activating Data Storage Area 206724b and Area Dependent Video Phone Auto Activating Software Storage Area 206724c. Area Dependent Video Phone Auto Activating Data Storage Area 206724b stores the data necessary to implement the present function on the side of Communication Device 200, such as the one(s) described in Paragraph [0173]. Area Dependent Video Phone Auto Activating Software Storage Area 206724c stores the software program(s) necessary to implement the present function on the side of Communication Device 200, such as the one(s) described in Paragraph [0179].

This Paragraph [0173] illustrates the storage area(s) included in Area Dependent Video Phone Auto Activating Data Storage Area 206724b (Paragraph [0172]). In the present embodiment, Area Dependent Video Phone Auto Activating Data Storage Area 206724b includes Current Location Data Storage Area 206724b1, Entire Geographic Area Data Storage Area 206724b2, Entire Geographic Dependent Phone Number Data Storage Area 206724b3, Entire Phone Number Called Location Data Storage Area 206724b4, Map Data Storage Area 206724b5, Entire Location Icon Data Storage Area 206724b6, Entire Audiovisual Data Storage Area 206724b7, and Work Area 206724b8. Current Location Data Storage Area 206724b1 stores the current location data which indicates the current geographic location of Communication Device 200 in (x,y,z) format. Entire Geographic Area Data Storage Area 206724b2 stores the data described in Paragraph [0174]. Entire Geographic Dependent Phone Number Data Storage Area 206724b3 stores the data described in Paragraph [0175]. Entire Phone Number Called Location Data Storage Area 206724b4 stores the data described in Paragraph [0176]. Map Data Storage Area 206724b5 stores the map data which is the image data indicating a map. Entire Location Icon Data Storage Area 206724b6 stores the data described in Paragraph [0177]. Entire Audiovisual Data Storage Area 206724b7 stores the data described in Paragraph [0178]. Work Area 206724b8 is utilized as a work area to perform calculation and temporarily store data to implement the present function.

This Paragraph [0174] illustrates the storage area(s) included in Entire Geographic Area Data Storage Area 206724b2 (Paragraph [0173]). In the present embodiment, Entire Geographic Area Data Storage Area 206724b2 includes 1st Geographic Area Data Storage Area 206724b2a and 2nd Geographic Area Data Storage Area 206724b2b. 1st Geographic Area Data Storage Area 206724b2a stores the 1st geographic area data which indicates a certain geographic area (e.g., Sacramento Calif.). Here, the certain geographic area may be as small as the geographic area of 50 cm radius or as large as that of 500 km radius. 2nd Geographic Area Data Storage Area 206724b2b stores the 2nd geographic area data which indicates another certain geographic area (e.g., San Jose Calif.). Here, the certain geographic area may be as small as the geographic area of 50 cm radius or as large as that of 500 km radius.

This Paragraph [0175] illustrates the storage area(s) included in Entire Geographic Dependent Phone Number Data Storage Area 206724b3 (Paragraph [0173]). In the present embodiment, Entire Geographic Dependent Phone Number Data Storage Area 206724b3 includes 1st Geographic Dependent Phone Number Data Storage Area 206724b3a and 2nd Geographic Dependent Phone Number Data Storage Area 206724b3b. 1st Geographic Dependent Phone Number Data Storage Area 206724b3a stores the 1st geographic dependent phone number data which indicates a phone number. 2nd Geographic Dependent Phone Number Data Storage Area 206724b3b stores the 2nd geographic dependent phone number data which indicates another phone number.

This Paragraph [0176] illustrates the storage area(s) included in Entire Phone Number Called Location Data Storage Area 206724b4 (Paragraph [0173]). In the present embodiment, Entire Phone Number Called Location Data Storage Area 206724b4 includes 1st Phone Number Called Location Data Storage Area 206724b4a and 2nd Phone Number Called Location Data Storage Area 206724b4b. 1st Phone Number Called Location Data Storage Area 206724b4a stores the 1st phone number called location data which indicates the geographic location at which a phone call was made to the 1st geographic dependent phone number data. 2nd Phone Number Called Location Data Storage Area 206724b4b stores the 2nd phone number called location data which indicates the geographic location at which a phone call was made to the 2nd geographic dependent phone number data.

This Paragraph [0177] illustrates the storage area(s) included in Entire Location Icon Data Storage Area 206724b6 (Paragraph [0173]). In the present embodiment, Entire Location Icon Data Storage Area 206724b6 includes 1st Phone Number Called Location Icon Data Storage Area 206724b6a, 2nd Phone Number Called Location Icon Data Storage Area 206724b6b, and Current Location Icon Data Storage Area 206724b6c. 1st Phone Number Called Location Icon Data Storage Area 206724b6a stores the 1st phone number called location icon data which is the image of the icon utilized to indicate the 1st phone number called location data on the map data. 2nd Phone Number Called Location Icon Data Storage Area 206724b6b stores the 2nd phone number called location icon data which is the image of the icon utilized to indicate the 2nd phone number called location data on the map data. Current Location Icon Data Storage Area 206724b6c stores the current location icon data which is the image of the icon utilized to indicate the current location data on the map data.

This Paragraph [0178] illustrates the storage area(s) included in Entire Audiovisual Data Storage Area 206724b7 (Paragraph [0173]). In the present embodiment, Entire Audiovisual Data Storage Area 206724b7 includes Caller's Audiovisual Data Storage Area 206724b7a and Callee's Audiovisual Data Storage Area 206724b7b. Caller's Audiovisual Data Storage Area 206724b7a stores the caller's audiovisual data which indicates the audiovisual data retrieved from Microphone 215 (FIG. 1) and CCD Unit 214 (FIG. 1) of Communication Device 200. Callee's Audiovisual Data Storage Area 206724b7b stores the callee's audiovisual data which indicates the audiovisual data received from the callee's device (not shown).

This Paragraph [0179] illustrates the software program(s) stored in Area Dependent Video Phone Auto Activating Software Storage Area 206724c (Paragraph [0172]). In the present embodiment, Area Dependent Video Phone Auto Activating Software Storage Area 206724c stores Current Location Data Producing Software 206724c1, 1st Geographic Dependent Phone Number Data Auto Dialing Software 206724c2, 2nd Geographic Dependent Phone Number Data Auto Dialing Software 206724c3, and Phone Number Called Location Log Displaying Software 206724c4. Current Location Data Producing Software 206724c1 is the software program described in Paragraph [0180] and Paragraph [0185]. 1st Geographic Dependent Phone Number Data Auto Dialing Software 206724c2 is the software program described in Paragraph [0181], and Paragraph [0186]. 2nd Geographic Dependent Phone Number Data Auto Dialing Software 206724c3 is the software program described in Paragraph [0182], and Paragraph [0187]. Phone Number Called Location Log Displaying Software 206724c4 is the software program described in Paragraph [0183], and Paragraph [0188].

This Paragraph [0180] illustrate(s) Current Location Data Producing Software H724c1 (Paragraph [0169]) of Host H (Paragraph [0025]) and Current Location Data Producing Software 206724c1 (Paragraph [0179]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H (Paragraph [0025]) in a wireless fashion (S2). Host H (Paragraph [0025]) receives the current location data from Communication Device 200 and stores the data in Current Location Data Storage Area H724b1 (Paragraph [0163]) (S3). The foregoing sequence is repeated periodically.

This Paragraph [0181] illustrate(s) 1st Geographic Dependent Phone Number Data Auto Dialing Software H724c2 (Paragraph [0169]) of Host H (Paragraph [0025]) and 1st Geographic Dependent Phone Number Data Auto Dialing Software 206724c2 (Paragraph [0179]) of Communication Device 200, which automatically dial(s) the 1st geographic dependent phone number data. In the present embodiment, Host H (Paragraph [0025]) retrieves the current location data from Current Location Data Storage Area H724b1 (Paragraph [0163]) (S1). Host H (Paragraph [0025]) retrieves the 1st geographic area data from 1st Geographic Area Data Storage Area H724b2a (Paragraph [0164]) (S2). If the current location data retrieved in (S1 is within the 1st geographic area data retrieved in the previous step, Host H (Paragraph [0025]) proceeds to the next step (S3). Host H (Paragraph [0025]) retrieves the 1st geographic dependent phone number data from 1st Geographic Dependent Phone Number Data Storage Area H724b3a (Paragraph [0165]) (S4). Host H (Paragraph [0025]) dials the 1st geographic dependent phone number data retrieved in the previous step (S5). If the callee answers the phone call, Host H (Paragraph [0025]) proceeds to the next step (S6). Host H (Paragraph [0025]) retrieves the current location data from Current Location Data Storage Area H724b1 (Paragraph [0163]) (S7). Host H (Paragraph [0025]) stores the current location data retrieved in the previous step as the 1st phone number called location data in 1st Phone Number Called Location Data Storage Area H724b4a (Paragraph [0166]) (S8). CPU 211 (FIG. 1) implements audiovisual communication with the callee's device (S9). Here, the caller's audiovisual data which indicates the audiovisual data retrieved from Microphone 215 (FIG. 1) and CCD Unit 214 (FIG. 1) is stored in Caller's Audiovisual Data Storage Area H724b7a (Paragraph [0168]), from which the data is retrieved and sent to the callee's device (not shown) in a wireless fashion, and the callee's audiovisual data which is received from the callee's device in a wireless fashion is stored in Callee's Audiovisual Data Storage Area H724b7b (Paragraph [0168]), from which the data is retrieved and output from Speaker 216 (FIG. 1) and LCD 201 (FIG. 1). The foregoing sequence is repeated until the audiovisual communication is ended. The foregoing sequence is repeated periodically.

This Paragraph [0182] illustrate(s) 2nd Geographic Dependent Phone Number Data Auto Dialing Software H724c3 (Paragraph [0169]) of Host H (Paragraph [0025]) and 2nd Geographic Dependent Phone Number Data Auto Dialing Software 206724c3 (Paragraph [0179]) of Communication Device 200, which automatically dial(s) the 2nd geographic dependent phone number data. In the present embodiment, Host H (Paragraph [0025]) retrieves the current location data from Current Location Data Storage Area H724b1 (Paragraph [0163]) (S1). Host H (Paragraph [0025]) retrieves the 2nd geographic area data from 2nd Geographic Area Data Storage Area H724b2b (Paragraph [0164]) (S2). If the current location data retrieved in (S1 is within the 2nd geographic area data retrieved in the previous step, Host H (Paragraph [0025]) proceeds to the next step (S3). Host H (Paragraph [0025]) retrieves the 2nd geographic dependent phone number data from 2nd Geographic Dependent Phone Number Data Storage Area H724b3b (Paragraph [0165]) (S4). Host H (Paragraph [0025]) dials the 2nd geographic dependent phone number data retrieved in the previous step (S5). If the callee answers the phone call, Host H (Paragraph [0025]) proceeds to the next step (S6). Host H (Paragraph [0025]) retrieves the current location data from Current Location Data Storage Area H724b1 (Paragraph [0163]) (S7). Host H (Paragraph [0025]) stores the current location data retrieved in the previous step as the 2nd phone number called location data in 2nd Phone Number Called Location Data Storage Area H724b4b (Paragraph [0166]) (S8). CPU 211 (FIG. 1) implements audiovisual communication with the callee's device (S9). Here, the caller's audiovisual data which indicates the audiovisual data retrieved from Microphone 215 (FIG. 1) and CCD Unit 214 (FIG. 1) is stored in Caller's Audiovisual Data Storage Area H724b7a (Paragraph [0168]), from which the data is retrieved and sent to the callee's device (not shown) in a wireless fashion, and the callee's audiovisual data which is received from the callee's device in a wireless fashion is stored in Callee's Audiovisual Data Storage Area H724b7b (Paragraph [0168]), from which the data is retrieved and output from Speaker 216 (FIG. 1) and LCD 201 (FIG. 1). The foregoing sequence is repeated until the audiovisual communication is ended. The foregoing sequence is repeated periodically.

This Paragraph [0183] illustrate(s) Phone Number Called Location Log Displaying Software H724c4 (Paragraph [0169]) of Host H (Paragraph [0025]) and Phone Number Called Location Log Displaying Software 206724c4 (Paragraph [0179]) of Communication Device 200, which display (s) the log of phone calls made. In the present embodiment, Host H (Paragraph [0025]) retrieves the 1st geographic area data from 1st Geographic Area Data Storage Area H724b2a (Paragraph [0164]) and sends the data to Communication Device 200 (S1). CPU 211 (FIG. 1) receives the 1st geographic area data from Host H (Paragraph [0025]) in a wireless fashion and displays the data on LCD 201 (FIG. 1) (S2). Host H (Paragraph [0025]) retrieves the 2nd geographic area data from 2nd Geographic Area Data Storage Area H724b2b (Paragraph [0164]) and sends the data to Communication Device 200 (S3). CPU 211 (FIG. 1) receives the 2nd geographic area data from Host H (Paragraph [0025]) in a wireless fashion and displays the data on LCD 201 (FIG. 1) (S4). Host H (Paragraph [0025]) retrieves the 1st geographic dependent phone number data from 1st Geographic Dependent Phone Number Data Storage Area H724b3a (Paragraph [0165]) and sends the data to Communication Device 200 (S5). CPU 211 (FIG. 1) receives the 1st geographic dependent phone number data from Host H (Paragraph [0025]) in a wireless fashion and displays the data on LCD 201 (FIG. 1) (S6). Host H (Paragraph [0025]) retrieves the 2nd geographic dependent phone number data from 2nd Geographic Dependent Phone Number Data Storage Area H724b3b (Paragraph [0165]) and sends the data to Communication Device 200 (S7). CPU 211 (FIG. 1) receives the 2nd geographic dependent phone number data from Host H (Paragraph [0025]) in a wireless fashion and displays the data on LCD 201 (FIG. 1) (S8). Host H (Paragraph [0025]) retrieves the map data from Map Data Storage Area H724b5 (Paragraph [0163]) and sends the data to Communication Device 200 (S9). CPU 211 (FIG. 1) receives the map data from Host H (Paragraph [0025]) in a wireless fashion and displays the data on LCD 201 (FIG. 1) (S10). Host H (Paragraph [0025]) retrieves the 1st phone number called location data from 1st Phone Number Called Location Data Storage Area H724b4a (Paragraph [0166]) and sends the data to Communication Device 200 (S11). CPU 211 (FIG. 1) receives the 1st phone number called location data from Host H (Paragraph [0025]) in a wireless fashion (S12). Host H (Paragraph [0025]) retrieves the 1st phone number called location icon data from 1st Phone Number Called Location Icon Data Storage Area H724b6a (Paragraph [0167]) and sends the data to Communication Device 200 (S13). CPU 211 (FIG. 1) receives the 1st phone number called location icon data from Host H (Paragraph [0025]) in a wireless fashion (S14). CPU 211 (FIG. 1) displays the 1st phone number called location icon data received in the previous step at the location corresponding to the 1st phone number called location data received in (S12 on the map data displayed in (S10 (S15). Host H (Paragraph [0025]) retrieves the 2nd phone number called location data from 2nd Phone Number Called Location Data Storage Area H724b4b (Paragraph [0166]) and sends the data to Communication Device 200 (S16). CPU 211 (FIG. 1) receives the 2nd phone number called location data from Host H (Paragraph [0025]) in a wireless fashion (S17). Host H (Paragraph [0025]) retrieves the 2nd phone number called location icon data from 2nd Phone Number Called Location Icon Data Storage Area H724b6b (Paragraph [0167]) and sends the data to Communication Device 200 (S18). CPU 211 (FIG. 1) receives the 2nd phone number called location icon data from Host H (Paragraph [0025]) in a wireless fashion (S19). CPU 211 (FIG. 1) displays the 2nd phone number called location icon data received in the previous step at the location corresponding to the 2nd phone number called location data received in (S17 on the map data displayed in (S10 (S20). Host H (Paragraph [0025]) retrieves the current location data from Current Location Data Storage Area H724b1 (Paragraph [0163]) and sends the data to Communication Device 200 (S21). CPU 211 (FIG. 1) receives the current location data from Host H (Paragraph [0025]) in a wireless fashion (S22). Host H (Paragraph [0025]) retrieves the current location icon data from Current Location Icon Data Storage Area H724b6c (Paragraph [0167]) and sends the data to Communication Device 200 (S23). CPU 211 (FIG. 1) receives the current location icon data from Host H (Paragraph [0025]) in a wireless fashion (S24). CPU 211 (FIG. 1) displays the current location icon data received in the previous step at the location corresponding to the current location data received in S22 on the map data displayed in (S10 (S25). The foregoing sequence is repeated periodically.

Paragraph [0185] through Paragraph [0188] illustrate another embodiment wherein Communication Device 200 plays the major role in implementing the present function.

This Paragraph [0185] illustrate(s) Current Location Data Producing Software 206724c1 (Paragraph [0179]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206724b1 (Paragraph [0173]) (S3). The foregoing sequence is repeated periodically.

This Paragraph [0186] illustrate(s) 1st Geographic Dependent Phone Number Data Auto Dialing Software 206724c2 (Paragraph [0179]) of Communication Device 200, which automatically dial(s) the 1st geographic dependent phone number data. In the present embodiment, CPU 211 (FIG. 1) retrieves the current location data from Current Location Data Storage Area 206724b1 (Paragraph [0173]) (S1). CPU 211

(FIG. 1) retrieves the 1st geographic area data from 1st Geographic Area Data Storage Area 206724b2a (Paragraph [0174]) (S2). If the current location data retrieved in (S1 is within the 1st geographic area data retrieved in the previous step, CPU 211 (FIG. 1) proceeds to the next step (S3). CPU 211 (FIG. 1) retrieves the 1st geographic dependent phone number data from 1st Geographic Dependent Phone Number Data Storage Area 206724b3a (Paragraph [0175]) (S4). CPU 211 (FIG. 1) dials the 1st geographic dependent phone number data retrieved in the previous step (S5). If the callee answers the phone call, CPU 211 (FIG. 1) proceeds to the next step (S6). CPU 211 (FIG. 1) retrieves the current location data from Current Location Data Storage Area 206724b1 (Paragraph [0173]) (S7). CPU 211 (FIG. 1) stores the current location data retrieved in the previous step as the 1st phone number called location data in 1st Phone Number Called Location Data Storage Area 206724b4a (Paragraph [0176]) (S8). CPU 211 (FIG. 1) implements audiovisual communication with the callee's device (S9). Here, the caller's audiovisual data which indicates the audiovisual data retrieved from Microphone 215 (FIG. 1) and CCD Unit 214 (FIG. 1) is stored in Caller's Audiovisual Data Storage Area 206724b7a (Paragraph [0178]), from which the data is retrieved and sent to the callee's device (not shown) in a wireless fashion, and the callee's audiovisual data which is received from the callee's device in a wireless fashion is stored in Callee's Audiovisual Data Storage Area 206724b7b (Paragraph [0178]), from which the data is retrieved and output from Speaker 216 (FIG. 1) and LCD 201 (FIG. 1). The foregoing sequence is repeated until the audiovisual communication is ended. The foregoing sequence is repeated periodically.

This Paragraph [0187] illustrate(s) 2nd Geographic Dependent Phone Number Data Auto Dialing Software 206724c3 (Paragraph [0179]) of Communication Device 200, which automatically dial(s) the 2nd geographic dependent phone number data. In the present embodiment, CPU 211 (FIG. 1) retrieves the current location data from Current Location Data Storage Area 206724b1 (Paragraph [0173]) (S1). CPU 211 (FIG. 1) retrieves the 2nd geographic area data from 2nd Geographic Area Data Storage Area 206724b2b (Paragraph [0174]) (S2). If the current location data retrieved in (S1 is within the 2nd geographic area data retrieved in the previous step, CPU 211 (FIG. 1) proceeds to the next step (S3). CPU 211 (FIG. 1) retrieves the 2nd geographic dependent phone number data from 2nd Geographic Dependent Phone Number Data Storage Area 206724b3b (Paragraph [0175]) (S4). CPU 211 (FIG. 1) dials the 2nd geographic dependent phone number data retrieved in the previous step (S5). If the callee answers the phone call, CPU 211 (FIG. 1) proceeds to the next step (S6). CPU 211 (FIG. 1) retrieves the current location data from Current Location Data Storage Area 206724b1 (Paragraph [0173]) (S7). CPU 211 (FIG. 1) stores the current location data retrieved in the previous step as the 2nd phone number called location data in 2nd Phone Number Called Location Data Storage Area 206724b4b (Paragraph [0176]) (S8). CPU 211 (FIG. 1) implements audiovisual communication with the callee's device (S9). Here, the caller's audiovisual data which indicates the audiovisual data retrieved from Microphone 215 (FIG. 1) and CCD Unit 214 (FIG. 1) is stored in Caller's Audiovisual Data Storage Area 206724b7a (Paragraph [0178]), from which the data is retrieved and sent to the callee's device (not shown) in a wireless fashion, and the callee's audiovisual data which is received from the callee's device in a wireless fashion is stored in Callee's Audiovisual Data Storage Area 206724b7b (Paragraph [0178]), from which the data is retrieved and output from Speaker 216 (FIG. 1) and LCD 201 (FIG. 1). The foregoing sequence is repeated until the audiovisual communication is ended. The foregoing sequence is repeated periodically.

This Paragraph [0188] illustrate(s) Phone Number Called Location Log Displaying Software 206724c4 (Paragraph [0179]) of Communication Device 200, which display(s) the log of phone calls made. In the present embodiment, CPU 211 (FIG. 1) retrieves the 1st geographic area data from 1st Geographic Area Data Storage Area 206724b2a (Paragraph [0174]) (S1). CPU 211 (FIG. 1) displays the 1st geographic area data retrieved in the previous step on LCD 201 (FIG. 1) (S2). CPU 211 (FIG. 1) retrieves the 2nd geographic area data from 2nd Geographic Area Data Storage Area 206724b2b (Paragraph [0174]) (S3). CPU 211 (FIG. 1) displays the 2nd geographic area data retrieved in the previous step on LCD 201 (FIG. 1) (S4). CPU 211 (FIG. 1) retrieves the 1st geographic dependent phone number data from 1st Geographic Dependent Phone Number Data Storage Area 206724b3a (Paragraph [0175]) (S5). CPU 211 (FIG. 1) displays the 1st geographic dependent phone number data retrieved in the previous step on LCD 201 (FIG. 1) (S6). CPU 211 (FIG. 1) retrieves the 2nd geographic dependent phone number data from 2nd Geographic Dependent Phone Number Data Storage Area 206724b3b (Paragraph [0175]) (S7). CPU 211 (FIG. 1) displays the 2nd geographic dependent phone number data retrieved in the previous step on LCD 201 (FIG. 1) (S8). CPU 211 (FIG. 1) retrieves the map data from Map Data Storage Area 206724b5 (Paragraph [0173]) (S9). CPU 211 (FIG. 1) displays the map data retrieved in the previous step on LCD 201 (FIG. 1) (S10). CPU 211 (FIG. 1) retrieves the 1st phone number called location data from 1st Phone Number Called Location Data Storage Area 206724b4a (Paragraph [0176]) (S11). CPU 211 (FIG. 1) retrieves the 1st phone number called location icon data from 1st Phone Number Called Location Icon Data Storage Area 206724b6a (Paragraph [0177]) (S12). CPU 211 (FIG. 1) displays the 1st phone number called location icon data retrieved in the previous step at the location corresponding to the 1st phone number called location data retrieved in (S11 on the map data displayed in (S10 (S13). CPU 211 (FIG. 1) retrieves the 2nd phone number called location data from 2nd Phone Number Called Location Data Storage Area 206724b4b (Paragraph [0176]) (S14). CPU 211 (FIG. 1) retrieves the 2nd phone number called location icon data from 2nd Phone Number Called Location Icon Data Storage Area 206724b6b (Paragraph [0177]) (S15). CPU 211 (FIG. 1) displays the 2nd phone number called location icon data retrieved in the previous step at the location corresponding to the 2nd phone number called location data retrieved in (S14 on the map data displayed in (S10 (S16). CPU 211 (FIG. 1) retrieves the current location data from Current Location Data Storage Area 206724b1 (Paragraph [0173]) (S17). CPU 211 (FIG. 1) retrieves the current location icon data from Current Location Icon Data Storage Area 206724b6c (Paragraph [0177]) (S18). CPU 211 (FIG. 1) displays the current location icon data retrieved in the previous step at the location corresponding to the current location data retrieved in (S17 on the map data displayed in (S10 (S19). The foregoing sequence is repeated periodically.

<<Area Dependent Shortcut Icon Function>>

Paragraph [0191] through Paragraph [0234] illustrate the area dependent shortcut icon function, wherein a shortcut icon image which indicates a shortcut icon of a digital data is displayed on said display, when said shortcut icon image is selected by said input device, said digital data is implemented, a current location data which indicates the current geographic location of said communication device is identified, when said current location is determined to be within a 1st geographic area, said shortcut icon image of a 1st pattern, a 1st color, and a 1st size is displayed at a 1st location on said display, and when said current location is determined to be within a 2nd geographic area, said shortcut icon image of a 2nd pattern, a 2nd color, and a 2nd size is displayed at a 2nd location on said display.

This Paragraph [0191] illustrates the storage area included in Host H (Paragraph [0025]). In the present embodiment, Host H (Paragraph [0025]) includes Area Dependent Shortcut Icon Info Storage Area H725a of which the data and the software program(s) stored therein are described in Paragraph [0192].

This Paragraph [0192] illustrates the storage area(s) included in Area Dependent Shortcut Icon Info Storage Area H725a (Paragraph [0191]). In the present embodiment, Area Dependent Shortcut Icon Info Storage Area H725a includes Area Dependent Shortcut Icon Data Storage Area H725b and Area Dependent Shortcut Icon Software Storage Area H725c. Area Dependent Shortcut Icon Data Storage Area H725b stores the data necessary to implement the present function on the side of Host H (Paragraph [0025]), such as the one(s) described in Paragraph [0193]. Area Dependent Shortcut Icon Software Storage Area H725c stores the software program(s) necessary to implement the present function on the side of Host H (Paragraph [0025]), such as the one(s) described in Paragraph [0202].

This Paragraph [0193] illustrates the storage area(s) included in Area Dependent Shortcut Icon Data Storage Area H725b (Paragraph [0192]). In the present embodiment, Area Dependent Shortcut Icon Data Storage Area H725b includes Current Location Data Storage Area H725b1, Entire Geographic Area Data Storage Area H725b2, Digital Data Storage Area H725b3, Shortcut Icon Image Data Storage Area H725b4, Shortcut Icon Relating Data Storage Area H725b5, Entire Shortcut Icon Pattern Data Storage Area H725b6, Entire Shortcut Icon Color Data Storage Area H725b7, Entire Shortcut Icon Size Data Storage Area H725b8, Entire Shortcut Icon Displaying Location Data Storage Area H725b9, Entire Digital Data Implemented Location Data Storage Area H725b10, Map Data Storage Area H725b11, Entire Location Icon Data Storage Area H725b12, and Work Area H725b13. Current Location Data Storage Area H725b1 stores the current location data which indicates the current geographic location of Communication Device 200 in (x,y,z) format. Entire Geographic Area Data Storage Area H725b2 stores the data described in Paragraph [0194]. Digital Data Storage Area H725b3 stores the digital data which may be any type of digital data, such as MS Word, MS Excel, MS PowerPoint, audio data, visual data, or audiovisual data. Shortcut Icon Image Data Storage Area H725b4 stores the shortcut icon image data which is the image of the shortcut icon of the digital data displayed on LCD 201 (FIG. 1). Shortcut Icon Relating Data Storage Area H725b5 stores the data described in Paragraph [0195]. Entire Shortcut Icon Pattern Data Storage Area H725b6 stores the data described in Paragraph [0196]. Entire Shortcut Icon Color Data Storage Area H725b7 stores the data described in Paragraph [0197]. Entire Shortcut Icon Size Data Storage Area H725b8 stores the data described in Paragraph [0198]. Entire Shortcut Icon Displaying Location Data Storage Area H725b9 stores the data described in Paragraph [0199]. Entire Digital Data Implemented Location Data Storage Area H725b10 stores the data described in Paragraph [0200]. Map Data Storage Area H725b11 stores the map data which is the image data indicating a map. Entire Location Icon Data Storage Area H725b12 stores the data described in Paragraph [0201]. Work Area H725b13 is utilized as a work area to perform calculation and temporarily store data to implement the present function.

This Paragraph [0194] illustrates the storage area(s) included in Entire Geographic Area Data Storage Area H725b2 (Paragraph [0193]). In the present embodiment, Entire Geographic Area Data Storage Area H725b2 includes 1st Geographic Area Data Storage Area H725b2a and 2nd Geographic Area Data Storage Area H725b2b. 1st Geographic Area Data Storage Area H725b2a stores the 1st geographic area data which indicates a certain geographic area (e.g., Sacramento Calif.). Here, the certain geographic area may be as small as the geographic area of 50 cm radius or as large as that of 500 km radius. 2nd Geographic Area Data Storage Area H725b2b stores the 2nd geographic area data which indicates another certain geographic area (e.g., San Jose Calif.). Here, the certain geographic area may be as small as the geographic area of 50 cm radius or as large as that of 500 km radius.

This Paragraph [0195] illustrates the storage area(s) included in Shortcut Icon Relating Data Storage Area H725b5 (Paragraph [0193]). In the present embodiment, Shortcut Icon Relating Data Storage Area H725b5 includes Current Shortcut Icon Pattern Data Storage Area H725b5a, Current Shortcut Icon Color Data Storage Area H725b5b, Current Shortcut Icon Size Data Storage Area H725b5c, and Current Shortcut Icon Displaying Location Data Storage Area H725b5d. Current Shortcut Icon Pattern Data Storage Area H725b5a stores the current shortcut icon pattern data which indicates the pattern or design of the shortcut icon image data displayed on LCD 201 (FIG. 1). Current Shortcut Icon Color Data Storage Area H725b5b stores the current shortcut icon color data which indicates the colors utilized for the shortcut icon image data displayed on LCD 201 (FIG. 1). Current Shortcut Icon Size Data Storage Area H725b5c stores the current shortcut icon size data which indicates the size of the shortcut icon image data displayed on LCD 201 (FIG. 1). Current Shortcut Icon Displaying Location Data Storage Area H725b5d stores the current shortcut icon displaying location data which indicates the location of the shortcut icon image data displayed on LCD 201 (FIG. 1).

This Paragraph [0196] illustrates the storage area(s) included in Entire Shortcut Icon Pattern Data Storage Area H725b6 (Paragraph [0193]). In the present embodiment, Entire Shortcut Icon Pattern Data Storage Area H725b6 includes 1st Shortcut Icon Pattern Data Storage Area H725b6a and 2nd Shortcut Icon Pattern Data Storage Area H725b6b. 1st Shortcut Icon Pattern Data Storage Area H725b6a stores the 1st shortcut icon pattern data which indicates a certain pattern or design capable to be utilized for the shortcut icon image data. 2nd Shortcut Icon Pattern Data Storage Area H725b6b stores the 2nd shortcut icon pattern data which indicates another certain pattern or design capable to be utilized for the shortcut icon image data.

This Paragraph [0197] illustrates the storage area(s) included in Entire Shortcut Icon Color Data Storage Area H725b7 (Paragraph [0193]). In the present embodiment, Entire Shortcut Icon Color Data Storage Area H725b7 includes 1st Shortcut Icon Color Data Storage Area H725b7a and 2nd Shortcut Icon Color Data Storage Area H725b7b. 1st Shortcut Icon Color Data Storage Area H725b7a stores the 1st shortcut icon color data which indicates the 1st set of colors capable to be utilized for the shortcut icon image data. 2nd Shortcut Icon Color Data Storage Area H725b7b stores the 2nd shortcut icon color data which indicates the 2nd set of colors capable to be utilized for the shortcut icon image data.

This Paragraph [0198] illustrates the storage area(s) included in Entire Shortcut Icon Size Data Storage Area H725b8 (Paragraph [0193]). In the present embodiment, Entire Shortcut Icon Size Data Storage Area H725b8 includes 1st Shortcut Icon Size Data Storage Area H725b8a and 2nd Shortcut Icon Size Data Storage Area H725b8b. 1st Shortcut Icon Size Data Storage Area H725b8a stores the 1st shortcut icon size data which indicates the 1st size of the shortcut icon image data. 2nd Shortcut Icon Size Data Storage Area H725b8b stores the 2nd shortcut icon size data which indicates the 2nd size of the shortcut icon image data.

This Paragraph [0199] illustrates the storage area(s) included in Entire Shortcut Icon Displaying Location Data Storage Area H725b9 (Paragraph [0193]). In the present embodiment, Entire Shortcut Icon Displaying Location Data Storage Area H725b9 includes 1st Shortcut Icon Displaying Location Data Storage Area H725b9a and 2nd Shortcut Icon Displaying Location Data Storage Area H725b9b. 1st Shortcut Icon Displaying Location Data Storage Area H725b9a stores the 1st shortcut icon displaying location data which indicates the 1st location on LCD 201 (FIG. 1) at which the shortcut icon image data is displayed. 2nd Shortcut Icon Displaying Location Data Storage Area H725b9b stores the 2nd shortcut icon displaying location data which indicates the 2nd location on LCD 201 (FIG. 1) at which the shortcut icon image data is displayed.

This Paragraph [0200] illustrates the storage area(s) included in Entire Digital Data Implemented Location Data Storage Area H725b10 (Paragraph [0193]). In the present embodiment, Entire Digital Data Implemented Location Data Storage Area H725b10 includes 1st Digital Data Implemented Location Data Storage Area H725b10a and 2nd Digital Data Implemented Location Data Storage Area H725b10b. 1st Digital Data Implemented Location Data Storage Area H725b10a stores the 1st digital data implemented location data which indicates the geographic location at which the digital data is implemented when Communication Device 200 is located in the geographic area indicated by the 1st geographic area data. 2nd Digital Data Implemented Location Data Storage Area H725b10b stores the 2nd digital data implemented location data which indicates the geographic location at which the digital data is implemented when Communication Device 200 is located in the geographic area indicated by the 2nd geographic area data.

This Paragraph [0201] illustrates the storage area(s) included in Entire Location Icon Data Storage Area H725b12 (Paragraph [0193]). In the present embodiment, Entire Location Icon Data Storage Area H725b12 includes Current Location Icon Data Storage Area H725b12a, 1st Digital Data Implemented Location Icon Data Storage Area H725b12b, and 2nd Digital Data Implemented Location Icon Data Storage Area H725b12c. Current Location Icon Data Storage Area H725b12a stores the current location icon data which is the image of the icon utilized to indicate the current location data on the map data. 1st Digital Data Implemented Location Icon Data Storage Area H725b12b stores the 1st digital data implemented location icon data which is the image of the icon utilized to indicate the 1st digital data implemented location data on the map data. 2nd Digital Data Implemented Location Icon Data Storage Area H725b12c stores the 2nd digital data implemented location icon data which is the image of the icon utilized to indicate the 2nd digital data implemented location data on the map data.

This Paragraph [0202] illustrates the software program(s) stored in Area Dependent Shortcut Icon Software Storage Area H725c (Paragraph [0192]). In the present embodiment, Area Dependent Shortcut Icon Software Storage Area H725c stores Current Location Data Producing Software H725c1, 1st Geographic Area Shortcut Icon Generating Software H725c2, 2nd Geographic Area Shortcut Icon Generating Software H725c3, Shortcut Icon Image Data Producing Software H725c4, Shortcut Icon Image Data Displaying Software H725c5, Digital Data Implementing Software H725c6, 1st Digital Data Implemented Location Data Producing Software H725c7, 2nd Digital Data Implemented Location Data Producing Software H725c8, and Digital Data Implemented Location Data Indicating Software H725c9. Current Location Data Producing Software H725c1 is the software program described in Paragraph [0216]. 1st Geographic Area Shortcut Icon Generating Software H725c2 is the software program described in Paragraph [0217]. 2nd Geographic Area Shortcut Icon Generating Software H725c3 is the software program described in Paragraph [0218]. Shortcut Icon Image Data Producing Software H725c4 is the software program described in Paragraph [0219]. Shortcut Icon Image Data Displaying Software H725c5 is the software program described in Paragraph [0220]. Digital Data Implementing Software H725c6 is the software program described in Paragraph [0221]. 1st Digital Data Implemented Location Data Producing Software H725c7 is the software program described in Paragraph [0222]. 2nd Digital Data Implemented Location Data Producing Software H725c8 is the software program described in Paragraph [0223]. Digital Data Implemented Location Data Indicating Software H725c9 is the software program described in Paragraph [0224].

This Paragraph [0203] illustrates the storage area included in RAM 206 (FIG. 1) of Communication Device 200. In the present embodiment, RAM 206 includes Area Dependent Shortcut Icon Info Storage Area 206725a of which the data and the software program(s) stored therein are described in Paragraph [0205].

The data and/or the software program(s) necessary to implement the present function may be downloaded from Host H (Paragraph [0025]) to Communication Device 200.

This Paragraph [0205] illustrates the storage area(s) included in Area Dependent Shortcut Icon Info Storage Area 206725a (Paragraph [0203]). In the present embodiment, Area Dependent Shortcut Icon Info Storage Area 206725a includes Area Dependent Shortcut Icon Data Storage Area 206725b and Area Dependent Shortcut Icon Software Storage Area 206725c. Area Dependent Shortcut Icon Data Storage Area 206725b stores the data necessary to implement the present function on the side of Communication Device 200, such as the one(s) described in Paragraph [0206]. Area Dependent Shortcut Icon Software Storage Area 206725c stores the software program(s) necessary to implement the present function on the side of Communication Device 200, such as the one(s) described in Paragraph [0215].

This Paragraph [0206] illustrates the storage area(s) included in Area Dependent Shortcut Icon Data Storage Area 206725b (Paragraph [0205]). In the present embodiment, Area Dependent Shortcut Icon Data Storage Area 206725b includes Current Location Data Storage Area 206725b1, Entire Geographic Area Data Storage Area 206725b2, Digital Data Storage Area 206725b3, Shortcut Icon Image Data Storage Area 206725b4, Shortcut Icon Relating Data Storage Area 206725b5, Entire Shortcut Icon Pattern Data Storage Area 206725b6, Entire Shortcut Icon Color Data Storage Area 206725b7, Entire Shortcut Icon Size Data Storage Area 206725b8, Entire Shortcut Icon Displaying Location Data Storage Area 206725b9, Entire Digital Data Implemented Location Data Storage Area 206725b10, Map Data Storage Area 206725b11, Entire Location Icon Data Storage Area 206725b12, and Work Area 206725b13. Current Location Data Storage Area 206725b1 stores the current location data which indicates the current geographic location of Communication Device 200 in (x,y,z) format. Entire Geographic Area Data Storage Area 206725b2 stores the data described in Paragraph [0207]. Digital Data Storage Area 206725b3 stores the digital data which may be any type of digital data, such as MS Word, MS Excel, MS PowerPoint, audio data, visual data, or audiovisual data. Shortcut Icon Image Data Storage Area 206725b4 stores the shortcut icon image data which is the image of the shortcut icon of the digital data displayed on LCD 201 (FIG. 1). Shortcut Icon Relating Data Storage Area 206725b5 stores the data described in Paragraph [0208]. Entire Shortcut Icon Pattern Data Storage Area 206725b6 stores the data described in Paragraph [0209]. Entire Shortcut Icon Color Data Storage Area 206725b7 stores the data described in Paragraph [0210]. Entire Shortcut Icon Size Data Storage Area 206725b8 stores the data described in Paragraph [0211]. Entire Shortcut Icon Displaying Location Data Storage Area 206725b9 stores the data described in Paragraph [0212]. Entire Digital Data Implemented Location Data Storage Area 206725b10 stores the data described in Paragraph [0213]. Map Data Storage Area 206725b11 stores the map data which is the image data indicating a map. Entire Location Icon Data Storage Area 206725b12 stores the data described in Paragraph [0214]. Work Area 206725b13 is utilized as a work area to perform calculation and temporarily store data to implement the present function.

This Paragraph [0207] illustrates the storage area(s) included in Entire Geographic Area Data Storage Area 206725b2 (Paragraph [0206]). In the present embodiment, Entire Geographic Area Data Storage Area 206725b2 includes 1st Geographic Area Data Storage Area 206725b2a and 2nd Geographic Area Data Storage Area 206725b2b. 1st Geographic Area Data Storage Area 206725b2a stores the 1st geographic area data which indicates a certain geographic area (e.g., Sacramento Calif.). Here, the certain geographic area may be as small as the geographic area of 50 cm radius or as large as that of 500 km radius. 2nd Geographic Area Data Storage Area 206725b2b stores the 2nd geographic area data which indicates another certain geographic area (e.g., San Jose Calif.). Here, the certain geographic area may be as small as the geographic area of 50 cm radius or as large as that of 500 km radius.

This Paragraph [0208] illustrates the storage area(s) included in Shortcut Icon Relating Data Storage Area 206725b5 (Paragraph [0206]). In the present embodiment, Shortcut Icon Relating Data Storage Area 206725b5 includes Current Shortcut Icon Pattern Data Storage Area 206725b5a, Current Shortcut Icon Color Data Storage Area 206725b5b, Current Shortcut Icon Size Data Storage Area 206725b5c, and Current Shortcut Icon Displaying Location Data Storage Area 206725b5d. Current Shortcut Icon Pattern Data Storage Area 206725b5a stores the current shortcut icon pattern data which indicates the pattern or design of the shortcut icon image data displayed on LCD 201 (FIG. 1). Current Shortcut Icon Color Data Storage Area 206725b5b stores the current shortcut icon color data which indicates the colors utilized for the shortcut icon image data displayed on LCD 201 (FIG. 1). Current Shortcut Icon Size Data Storage Area 206725b5c stores the current shortcut icon size data which indicates the size of the shortcut icon image data displayed on LCD 201 (FIG. 1). Current Shortcut Icon Displaying Location Data Storage Area 206725b5d stores the current shortcut icon displaying location data which indicates the location of the shortcut icon image data displayed on LCD 201 (FIG. 1).

This Paragraph [0209] illustrates the storage area(s) included in Entire Shortcut Icon Pattern Data Storage Area 206725b6 (Paragraph [0206]). In the present embodiment, Entire Shortcut Icon Pattern Data Storage Area 206725b6 includes 1st Shortcut Icon Pattern Data Storage Area 206725b6a and 2nd Shortcut Icon Pattern Data Storage Area 206725b6b. 1st Shortcut Icon Pattern Data Storage Area 206725b6a stores the 1st shortcut icon pattern data which indicates a certain pattern or design capable to be utilized for the shortcut icon image data. 2nd Shortcut Icon Pattern Data Storage Area 206725b6b stores the 2nd shortcut icon pattern data which indicates another certain pattern or design capable to be utilized for the shortcut icon image data.

This Paragraph [0210] illustrates the storage area(s) included in Entire Shortcut Icon Color Data Storage Area 206725b7 (Paragraph [0206]). In the present embodiment, Entire Shortcut Icon Color Data Storage Area 206725b7 includes 1st Shortcut Icon Color Data Storage Area 206725b7a and 2nd Shortcut Icon Color Data Storage Area 206725b7b. 1st Shortcut Icon Color Data Storage Area 206725b7a stores the 1st shortcut icon color data which indicates the 1st set of colors capable to be utilized for the shortcut icon image data. 2nd Shortcut Icon Color Data Storage Area 206725b7b stores the 2nd shortcut icon color data which indicates the 2nd set of colors capable to be utilized for the shortcut icon image data.

This Paragraph [0211] illustrates the storage area(s) included in Entire Shortcut Icon Size Data Storage Area 206725b8 (Paragraph [0206]). In the present embodiment, Entire Shortcut Icon Size Data Storage Area 206725b8 includes 1st Shortcut Icon Size Data Storage Area 206725b8a and 2nd Shortcut Icon Size Data Storage Area 206725b8b. 1st Shortcut Icon Size Data Storage Area 206725b8a stores the 1st shortcut icon size data which indicates the 1st size of the shortcut icon image data. 2nd Shortcut Icon Size Data Storage Area 206725b8b stores the 2nd shortcut icon size data which indicates the 2nd size of the shortcut icon image data.

This Paragraph [0212] illustrates the storage area(s) included in Entire Shortcut Icon Displaying Location Data Storage Area 206725b9 (Paragraph [0206]). In the present embodiment, Entire Shortcut Icon Displaying Location Data Storage Area 206725b9 includes 1st Shortcut Icon Displaying Location Data Storage Area 206725b9a and 2nd Shortcut Icon Displaying Location Data Storage Area 206725b9b. 1st Shortcut Icon Displaying Location Data Storage Area 206725b9a stores the 1st shortcut icon displaying location data which indicates the 1st location on LCD 201 (FIG. 1) at which the shortcut icon image data is displayed. 2nd Shortcut Icon Displaying Location Data Storage Area 206725b9b stores the 2nd shortcut icon displaying location data which indicates the 2nd location on LCD 201 (FIG. 1) at which the shortcut icon image data is displayed.

This Paragraph [0213] illustrates the storage area(s) included in Entire Digital Data Implemented Location Data Storage Area 206725b10 (Paragraph [0206]). In the present embodiment, Entire Digital Data Implemented Location Data Storage Area 206725b10 includes 1st Digital Data Implemented Location Data Storage Area 206725b10a and 2nd Digital Data Implemented Location Data Storage Area 206725b10b. 1st Digital Data Implemented Location Data Storage Area 206725b10a stores the 1st digital data implemented location data which indicates the geographic location at which the digital data is implemented when Communication Device 200 is located in the geographic area indicated by the 1st geographic area data. 2nd Digital Data Implemented Location Data Storage Area 206725b10b stores the 2nd digital data implemented location data which indicates the geographic location at which the digital data is implemented when Communication Device 200 is located in the geographic area indicated by the 2nd geographic area data.

This Paragraph [0214] illustrates the storage area(s) included in Entire Location Icon Data Storage Area 206725b12 (Paragraph [0206]). In the present embodiment, Entire Location Icon Data Storage Area 206725b12 includes Current Location Icon Data Storage Area 206725b12a, 1st Digital Data Implemented Location Icon Data Storage Area 206725b12b, and 2nd Digital Data Implemented Location Icon Data Storage Area 206725b12c. Current Location Icon Data Storage Area 206725b12a stores the current location icon data which is the image of the icon utilized to indicate the current location data on the map data. 1st Digital Data Implemented Location Icon Data Storage Area 206725b12b stores the 1st digital data implemented location icon data which is the image of the icon utilized to indicate the 1st digital data implemented location data on the map data. 2nd Digital Data Implemented Location Icon Data Storage Area 206725b12c stores the 2nd digital data implemented location icon data which is the image of the icon utilized to indicate the 2nd digital data implemented location data on the map data.

This Paragraph [0215] illustrates the software program(s) stored in Area Dependent Shortcut Icon Software Storage Area 206725c (Paragraph [0205]). In the present embodiment, Area Dependent Shortcut Icon Software Storage Area 206725c stores Current Location Data Producing Software 206725c1, 1st Geographic Area Shortcut Icon Generating Software 206725c2, 2nd Geographic Area Shortcut Icon Generating Software 206725c3, Shortcut Icon Image Data Producing Software 206725c4, Shortcut Icon Image Data Displaying Software 206725c5, Digital Data Implementing Software 206725c6, 1st Digital Data Implemented Location Data Producing Software 206725c7, 2nd Digital Data Implemented Location Data Producing Software 206725c8, and Digital Data Implemented Location Data Indicating Software 206725c9. Current Location Data Producing Software 206725c1 is the software program described in Paragraph [0216] and Paragraph [0226]. 1st Geographic Area Shortcut Icon Generating Software 206725c2 is the software program described in Paragraph [0227]. 2nd Geographic Area Shortcut Icon Generating Software 206725c3 is the software program described in Paragraph [0228]. Shortcut Icon Image Data Producing Software 206725c4 is the software program described in Paragraph [0229]. Shortcut Icon Image Data Displaying Software 206725c5 is the software program described in Paragraph [0220] and Paragraph [0230]. Digital Data Implementing Software 206725c6 is the software program described in Paragraph [0221], and Paragraph [0231]. 1st Digital Data Implemented Location Data Producing Software 206725c7 is the software program described in Paragraph [0222], and Paragraph [0232]. 2nd Digital Data Implemented Location Data Producing Software 206725c8 is the software program described in Paragraph [0223], and Paragraph [0233]. Digital Data Implemented Location Data Indicating Software 206725c9 is the software program described in Paragraph [0224], and Paragraph [0234].

This Paragraph [0216] illustrate(s) Current Location Data Producing Software H725c1 (Paragraph [0202]) of Host H (Paragraph [0025]) and Current Location Data Producing Software 206725c1 (Paragraph [0215]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H (Paragraph [0025]) in a wireless fashion (S2). Host H (Paragraph [0025]) receives the current location data from Communication Device 200 and stores the data in Current Location Data Storage Area H725b1 (Paragraph [0193]) (S3). The foregoing sequence is repeated periodically.

This Paragraph [0217] illustrate(s) 1st Geographic Area Shortcut Icon Generating Software H725c2 (Paragraph [0202]) of Host H (Paragraph [0025]), which generate(s) the unique shortcut icon image data at which Communication Device 200 is located in the 1st geographic area. In the present embodiment, Host H (Paragraph [0025]) retrieves the current location data from Current Location Data Storage Area H725b1 (Paragraph [0193]) (S1). Host H (Paragraph [0025]) retrieves the 1st geographic area data from 1st Geographic Area Data Storage Area H725b2a (Paragraph [0194]) (S2). If the current location data retrieved in (S1 is within the 1st geographic area data retrieved in the previous step, Host H (Paragraph [0025]) proceeds to the next step (S3). Host H (Paragraph [0025]) retrieves the 1st shortcut icon pattern data from 1st Shortcut Icon Pattern Data Storage Area H725b6a (Paragraph [0196]) (S4). Host H (Paragraph [0025]) stores the 1st shortcut icon pattern data retrieved in the previous step as the current shortcut icon pattern data in Current Shortcut Icon Pattern Data Storage Area H725b5a (Paragraph [0195]) (S5). Host H (Paragraph [0025]) retrieves the 1st shortcut icon color data from 1st Shortcut Icon Color Data Storage Area H725b7a (Paragraph [0197]) (S6). Host H (Paragraph [0025]) stores the 1st shortcut icon color data retrieved in the previous step as the current shortcut icon color data in Current Shortcut Icon Color Data Storage Area H725b5b (Paragraph [0195]) (S7). Host H (Paragraph [0025]) retrieves the 1st shortcut icon size data from 1st Shortcut Icon Size Data Storage Area H725b8a (Paragraph [0198]) (S8). Host H (Paragraph [0025]) stores the 1st shortcut icon size data retrieved in the previous step as the current shortcut icon size data in Current Shortcut Icon Size Data Storage Area H725b5c (Paragraph [0195]) (S9). Host H (Paragraph [0025]) retrieves the 1st shortcut icon displaying location data from 1st Shortcut Icon Displaying Location Data Storage Area H725b9a (Paragraph [0199]) (S10). Host H (Paragraph [0025]) stores the 1st shortcut icon displaying location data retrieved in the previous step as the current shortcut icon displaying location data in Current Shortcut Icon Displaying Location Data Storage Area H725b5d (Paragraph [0195]) (S11). The foregoing sequence is repeated periodically.

This Paragraph [0218] illustrate(s) 2nd Geographic Area Shortcut Icon Generating Software H725c3 (Paragraph [0202]) of Host H (Paragraph [0025]), which generate(s) the unique shortcut icon image data at which Communication Device 200 is located in the 2nd geographic area. In the present embodiment, Host H (Paragraph [0025]) retrieves the current location data from Current Location Data Storage Area H725b1 (Paragraph [0193]) (S1). Host H (Paragraph [0025]) retrieves the 2nd geographic area data from 2nd Geographic Area Data Storage Area H725b2b (Paragraph [0194]) (S2). If the current location data retrieved in (S1 is within the 2nd geographic area data retrieved in the previous step, Host H (Paragraph [0025]) proceeds to the next step (S3). Host H (Paragraph [0025]) retrieves the 2nd shortcut icon pattern data from 2nd Shortcut Icon Pattern Data Storage Area H725b6b (Paragraph [0196]) (S4). Host H (Paragraph [0025]) stores the 2nd shortcut icon pattern data retrieved in the previous step as the current shortcut icon pattern data in Current Shortcut Icon Pattern Data Storage Area H725b5a (Paragraph [0195]) (S5). Host H (Paragraph [0025]) retrieves the 2nd shortcut icon color data from 2nd Shortcut Icon Color Data Storage Area H725b7b (Paragraph [0197]) (S6). Host H (Paragraph [0025]) stores the 2nd shortcut icon color data retrieved in the previous step as the current shortcut icon color data in Current Shortcut Icon Color Data Storage Area H725b5b (Paragraph [0195]) (S7). Host H (Paragraph [0025]) retrieves the 2nd shortcut icon size data from 2nd Shortcut Icon Size Data Storage Area H725b8b (Paragraph [0198]) (S8). Host H (Paragraph [0025]) stores the 2nd shortcut icon size data retrieved in the previous step as the current shortcut icon size data in Current Shortcut Icon Size Data Storage Area H725b5c (Paragraph [0195]) (S9). Host H (Paragraph [0025]) retrieves the 2nd shortcut icon displaying location data from 2nd Shortcut Icon Displaying Location Data Storage Area H725b9b (Paragraph [0199]) (S10). Host H (Paragraph [0025]) stores the 2nd shortcut icon displaying location data retrieved in the previous step as the current shortcut icon displaying location data in Current Shortcut Icon Displaying Location Data Storage Area H725b5d (Paragraph [0195]) (S11). The foregoing sequence is repeated periodically.

This Paragraph [0219] illustrate(s) (Shortcut Icon Image Data Producing Software H725c4 (Paragraph [0202]) of Host H (Paragraph [0025]), which produce(s) the shortcut icon image data. In the present embodiment, Host H (Paragraph [0025]) retrieves the current shortcut icon pattern data from Current Shortcut Icon Pattern Data Storage Area H725b5a (Paragraph [0195]) (S1). Host H (Paragraph [0025]) retrieves the current shortcut icon color data from Current Shortcut Icon Color Data Storage Area H725b5b (Paragraph [0195]) (S2). Host H (Paragraph [0025]) retrieves the current shortcut icon size data from Current Shortcut Icon Size Data Storage Area H725b5c (Paragraph [0195]) (S3). Host H (Paragraph [0025]) produces the shortcut icon image data by utilizing the current shortcut icon pattern data retrieved in (S1, the current shortcut icon color data retrieved in S2, and the current shortcut icon size data retrieved in the previous step (S4). Host H (Paragraph [0025]) stores the shortcut icon image data produced in the previous step in Shortcut Icon Image Data Storage Area H725b4 (Paragraph [0193]) (S5). The foregoing sequence is repeated periodically.

This Paragraph [0220] illustrate(s) (Shortcut Icon Image Data Displaying Software H725c5 (Paragraph [0202]) of Host H (Paragraph [0025]) and Shortcut Icon Image Data Displaying Software 206725c5 (Paragraph [0215]) of Communication Device 200, which display(s) the shortcut icon image data. In the present embodiment, Host H (Paragraph [0025]) retrieves the shortcut icon image data from Shortcut Icon Image Data Storage Area H725b4 (Paragraph [0193]) and sends the data to Communication Device 200 (S1). CPU 211 (FIG. 1) receives the shortcut icon image data from Host H (Paragraph [0025]) in a wireless fashion (S2). Host H (Paragraph [0025]) retrieves the current shortcut icon displaying location data from Current Shortcut Icon Displaying Location Data Storage Area H725b5d (Paragraph [0195]) and sends the data to Communication Device 200 (S3). CPU 211 (FIG. 1) receives the current shortcut icon displaying location data from Host H (Paragraph [0025]) in a wireless fashion (S4). CPU 211 (FIG. 1) displays the shortcut icon image data received in S2 at the location corresponding to the current shortcut icon displaying location data received in the previous step on LCD 201 (FIG. 1) (S5). The foregoing sequence is repeated periodically.

This Paragraph [0221] illustrate(s) Digital Data Implementing Software H725c6 (Paragraph [0202]) of Host H (Paragraph [0025]) and Digital Data Implementing Software 206725c6 (Paragraph [0215]) of Communication Device 200, which implement(s) the digital data. In the present embodiment, CPU 211 (FIG. 1) checks the input signal (S1). If the input signal indicates to select the shortcut icon image data and implement the digital data, CPU 211 (FIG. 1) proceeds to the next step (S2). CPU 211 (FIG. 1) sends the digital data implementing request to Host H (Paragraph [0025]) in a wireless fashion (S3). Here, the digital data implementing request is the request to implement the digital data. Host H (Paragraph [0025]) receives the digital data implementing request from Communication Device 200 (S4). Host H (Paragraph [0025]) retrieves the digital data from Digital Data Storage Area H725b3 (Paragraph [0193]) (S5). Host H (Paragraph [0025]) implements the digital data retrieved in the previous step (S6). Here, as another embodiment, the digital data may be sent to Communication Device 200 and Communication Device 200 may implement the digital data. As another embodiment, the digital data may be implemented by both Host H (Paragraph [0025]) and Communication Device 200. The foregoing sequence is repeated periodically.

This Paragraph [0222] illustrate(s) 1st Digital Data Implemented Location Data Producing Software H725c7 (Paragraph [0202]) of Host H (Paragraph [0025]) and 1st Digital Data Implemented Location Data Producing Software 206725c7 (Paragraph [0215]) of Communication Device 200, which produce(s) the 1st digital data implemented location data. In the present embodiment, CPU 211 (FIG. 1) checks the input signal (S1). If the input signal indicates to select the shortcut icon image data and implement the digital data, CPU 211 (FIG. 1) proceeds to the next step (S2). CPU 211 (FIG. 1) sends the digital data implementing request to Host H (Paragraph [0025]) in a wireless fashion (S3). Here, the digital data implementing request is the request to implement the digital data. Host H (Paragraph [0025]) receives the digital data implementing request from Communication Device 200 (S4). Host H (Paragraph [0025]) retrieves the current location data from Current Location Data Storage Area H725b1 (Paragraph [0193]) (S5). Host H (Paragraph [0025]) retrieves the 1st geographic area data from 1st Geographic Area Data Storage Area H725b2a (Paragraph [0194]) (S6). If the current location data retrieved in S5 is within the 1st geographic area data retrieved in the previous step, Host H (Paragraph [0025]) proceeds to the next step (S7). Host H (Paragraph [0025]) stores the current location data retrieved in S5 as the 1st digital data implemented location data in 1st Digital Data Implemented Location Data Storage Area H725b10a (Paragraph [0200]) (S8). The foregoing sequence is repeated periodically.

This Paragraph [0223] illustrate(s) 2nd Digital Data Implemented Location Data Producing Software H725c8 (Paragraph [0202]) of Host H (Paragraph [0025]) and 2nd Digital Data Implemented Location Data Producing Software 206725c8 (Paragraph [0215]) of Communication Device 200, which produce(s) the 2nd digital data implemented location data. In the present embodiment, CPU 211 (FIG. 1) checks the input signal (S1). If the input signal indicates to select the shortcut icon image data and implement the digital data, CPU 211 (FIG. 1) proceeds to the next step (S2). CPU 211 (FIG. 1) sends the digital data implementing request to Host H (Paragraph [0025]) in a wireless fashion (S3). Here, the digital data implementing request is the request to implement the digital data. Host H (Paragraph [0025]) receives the digital data implementing request from Communication Device 200 (S4). Host H (Paragraph [0025]) retrieves the current location data from Current Location Data Storage Area H725b1 (Paragraph [0193]) (S5). Host H (Paragraph [0025]) retrieves the 2nd geographic area data from 2nd Geographic Area Data Storage Area H725b2b (Paragraph [0194]) (S6). If the current location data retrieved in S5 is within the 2nd geographic area data retrieved in the previous step, Host H (Paragraph [0025]) proceeds to the next step (S7). Host H (Paragraph [0025]) stores the current location data retrieved in S5 as the 2nd digital data implemented location data in 2nd Digital Data Implemented Location Data Storage Area H725b10b (Paragraph [0200]) (S8). The foregoing sequence is repeated periodically.

This Paragraph [0224] illustrate(s) Digital Data Implemented Location Data Indicating Software H725c9 (Paragraph [0202]) of Host H (Paragraph [0025]) and Digital Data Implemented Location Data Indicating Software 206725c9 (Paragraph [0215]) of Communication Device 200, which indicate(s) the 1st and 2nd digital data implemented location data on the map data. In the present embodiment, Host H (Paragraph [0025]) retrieves the map data from Map Data Storage Area H725b11 (Paragraph [0193]) and sends the data to Communication Device 200 (S1). CPU 211 (FIG. 1) receives the map data from Host H (Paragraph [0025]) in a wireless fashion and displays the data on LCD 201 (FIG. 1) (S2). Host H (Paragraph [0025]) retrieves the current location data from Current Location Data Storage Area H725b1 (Paragraph [0193]) and sends the data to Communication Device 200 (S3). CPU 211 (FIG. 1) receives the current location data from Host H (Paragraph [0025]) in a wireless fashion (S4). Host H (Paragraph [0025]) retrieves the current location icon data from Current Location Icon Data Storage Area H725b12a (Paragraph [0201]) and sends the data to Communication Device 200 (S5). CPU 211 (FIG. 1) receives the current location icon data from Host H (Paragraph [0025]) in a wireless fashion (S6). CPU 211 (FIG. 1) displays the current location icon data received in the previous step at the location corresponding to the current location data received in S4 on the map data displayed in S2 (S7). Host H (Paragraph [0025]) retrieves the 1st digital data implemented location data from 1st Digital Data Implemented Location Data Storage Area H725b10a (Paragraph [0200]) and sends the data to Communication Device 200 (S8). CPU 211 (FIG. 1) receives the 1st digital data implemented location data from Host H (Paragraph [0025]) in a wireless fashion (S9). Host H (Paragraph [0025]) retrieves the 1st digital data implemented location icon data from 1st Digital Data Implemented Location Icon Data Storage Area H725b12b (Paragraph [0201]) and sends the data to Communication Device 200 (S10). CPU 211 (FIG. 1) receives the 1st digital data implemented location icon data from Host H (Paragraph [0025]) in a wireless fashion (S11). CPU 211 (FIG. 1) displays the 1st digital data implemented location icon data received in the previous step at the location corresponding to the 1st digital data implemented location data received in S9 on the map data displayed in S2 (S12). Host H (Paragraph [0025]) retrieves the 2nd digital data implemented location data from 2nd Digital Data Implemented Location Data Storage Area H725b10b (Paragraph [0200]) and sends the data to Communication Device 200 (S13). CPU 211 (FIG. 1) receives the 2nd digital data implemented location data from Host H (Paragraph [0025]) in a wireless fashion (S14). Host H (Paragraph [0025]) retrieves the 2nd digital data implemented location icon data from 2nd Digital Data Implemented Location Icon Data Storage Area H725b12c (Paragraph [0201]) and sends the data to Communication Device 200 (S15). CPU 211 (FIG. 1) receives the 2nd digital data implemented location icon data from Host H (Paragraph [0025]) in a wireless fashion (S16). CPU 211 (FIG. 1) displays the 2nd digital data implemented location icon data received in the previous step at the location corresponding to the 2nd digital data implemented location data received in (S14 on the map data displayed in S2 (S17). The foregoing sequence is repeated periodically.

Paragraph [0226] through Paragraph [0234] illustrate another embodiment wherein Communication Device 200 plays the major role in implementing the present function.

This Paragraph [0226] illustrate(s) Current Location Data Producing Software 206725c1 (Paragraph [0215]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206725b1 (Paragraph [0206]) (S3). The foregoing sequence is repeated periodically.

This Paragraph [0227] illustrate(s) 1st Geographic Area Shortcut Icon Generating Software 206725c2 (Paragraph [0215]) of Communication Device 200, which generate(s) the unique shortcut icon image data at which Communication Device 200 is located in the 1st geographic area. In the present embodiment, CPU 211 (FIG. 1) retrieves the current location data from Current Location Data Storage Area 206725b1 (Paragraph [0206]) (S1). CPU 211 (FIG. 1) retrieves the 1st geographic area data from 1st Geographic Area Data Storage Area 206725b2a (Paragraph [0207]) (S2). If the current location data retrieved in (S1 is within the 1st geographic area data retrieved in the previous step, CPU 211 (FIG. 1) proceeds to the next step (S3). CPU 211 (FIG. 1) retrieves the 1st shortcut icon pattern data from 1st Shortcut Icon Pattern Data Storage Area 206725b6a (Paragraph [0209]) (S4). CPU 211 (FIG. 1) stores the 1st shortcut icon pattern data retrieved in the previous step as the current shortcut icon pattern data in Current Shortcut Icon Pattern Data Storage Area 206725b5a (Paragraph [0208]) (S5). CPU 211 (FIG. 1) retrieves the 1st shortcut icon color data from 1st Shortcut Icon Color Data Storage Area 206725b7a (Paragraph [0210]) (S6). CPU 211 (FIG. 1) stores the 1st shortcut icon color data retrieved in the previous step as the current shortcut icon color data in Current Shortcut Icon Color Data Storage Area 206725b5b (Paragraph [0208]) (S7). CPU 211 (FIG. 1) retrieves the 1st shortcut icon size data from 1st Shortcut Icon Size Data Storage Area 206725b8a (Paragraph [0211]) (S8). CPU 211 (FIG. 1) stores the 1st shortcut icon size data retrieved in the previous step as the current shortcut icon size data in Current Shortcut Icon Size Data Storage Area 206725b5c (Paragraph [0208]) (S9). CPU 211 (FIG. 1) retrieves the 1st shortcut icon displaying location data from 1st Shortcut Icon Displaying Location Data Storage Area 206725b9a (Paragraph [0212]) (S10). CPU 211 (FIG. 1) stores the 1st shortcut icon displaying location data retrieved in the previous step as the current shortcut icon displaying location data in Current Shortcut Icon Displaying Location Data Storage Area 206725b5d (Paragraph [0208]) (S11). The foregoing sequence is repeated periodically.

This Paragraph [0228] illustrate(s) 2nd Geographic Area Shortcut Icon Generating Software 206725c3 (Paragraph [0215]) of Communication Device 200, which generate(s) the unique shortcut icon image data at which Communication Device 200 is located in the 2nd geographic area. In the present embodiment, CPU 211 (FIG. 1) retrieves the current location data from Current Location Data Storage Area 206725b1 (Paragraph [0206]) (S1). CPU 211 (FIG. 1) retrieves the 2nd geographic area data from 2nd Geographic Area Data Storage Area 206725b2b (Paragraph [0207]) (S2). If the current location data retrieved in (S1 is within the 2nd geographic area data retrieved in the previous step, CPU 211 (FIG. 1) proceeds to the next step (S3). CPU 211 (FIG. 1) retrieves the 2nd shortcut icon pattern data from 2nd Shortcut Icon Pattern Data Storage Area 206725b6b (Paragraph [0209]) (S4). CPU 211 (FIG. 1) stores the 2nd shortcut icon pattern data retrieved in the previous step as the current shortcut icon pattern data in Current Shortcut Icon Pattern Data Storage Area 206725b5a (Paragraph [0208]) (S5). CPU 211 (FIG. 1) retrieves the 2nd shortcut icon color data from 2nd Shortcut Icon Color Data Storage Area 206725b7b (Paragraph [0210]) (S6). CPU 211 (FIG. 1) stores the 2nd shortcut icon color data retrieved in the previous step as the current shortcut icon color data in Current Shortcut Icon Color Data Storage Area 206725b5b (Paragraph [0208]) (S7). CPU 211 (FIG. 1) retrieves the 2nd shortcut icon size data from 2nd Shortcut Icon Size Data Storage Area 206725b8b (Paragraph [0211]) (S8). CPU 211 (FIG. 1) stores the 2nd shortcut icon size data retrieved in the previous step as the current shortcut icon size data in Current Shortcut Icon Size Data Storage Area 206725b5c (Paragraph [0208]) (S9). CPU 211 (FIG. 1) retrieves the 2nd shortcut icon displaying location data from 2nd Shortcut Icon Displaying Location Data Storage Area 206725b9b (Paragraph [0212]) (S10). CPU 211 (FIG. 1) stores the 2nd shortcut icon displaying location data retrieved in the previous step as the current shortcut icon displaying location data in Current Shortcut Icon Displaying Location Data Storage Area 206725b5d (Paragraph [0208]) (S11). The foregoing sequence is repeated periodically.

This Paragraph [0229] illustrate(s) (Shortcut Icon Image Data Producing Software 206725c4 (Paragraph [0215]) of Communication Device 200, which produce(s) the shortcut icon image data. In the present embodiment, CPU 211 (FIG. 1) retrieves the current shortcut icon pattern data from Current Shortcut Icon Pattern Data Storage Area 206725b5a (Paragraph [0208]) (S1). CPU 211 (FIG. 1) retrieves the current shortcut icon color data from Current Shortcut Icon Color Data Storage Area 206725b5b (Paragraph [0208]) (S2). CPU 211 (FIG. 1) retrieves the current shortcut icon size data from Current Shortcut Icon Size Data Storage Area 206725b5c (Paragraph [0208]) (S3). CPU 211 (FIG. 1) produces the shortcut icon image data by utilizing the current shortcut icon pattern data retrieved in (S1, the current shortcut icon color data retrieved in S2, and the current shortcut icon size data retrieved in the previous step (S4). CPU 211 (FIG. 1) stores the shortcut icon image data produced in the previous step in Shortcut Icon Image Data Storage Area 206725b4 (Paragraph [0206]) (S5). The foregoing sequence is repeated periodically.

This Paragraph [0230] illustrate(s) (Shortcut Icon Image Data Displaying Software 206725c5 (Paragraph [0215]) of Communication Device 200, which display(s) the shortcut icon image data. In the present embodiment, CPU 211 (FIG. 1) retrieves the shortcut icon image data from Shortcut Icon Image Data Storage Area 206725b4 (Paragraph [0206]) (S1). CPU 211 (FIG. 1) retrieves the current shortcut icon displaying location data from Current Shortcut Icon Displaying Location Data Storage Area 206725b5d (Paragraph [0208]) (S2). CPU 211 (FIG. 1) displays the shortcut icon image data retrieved in (S1 at the location corresponding to the current shortcut icon displaying location data retrieved in the previous step on LCD 201 (FIG. 1) (S3). The foregoing sequence is repeated periodically.

This Paragraph [0231] illustrate(s) Digital Data Implementing Software 206725c6 (Paragraph [0215]) of Communication Device 200, which implement(s) the digital data. In the present embodiment, CPU 211 (FIG. 1) checks the input signal (S1). If the input signal indicates to select the shortcut icon image data and implement the digital data, CPU 211 (FIG. 1) proceeds to the next step (S2). CPU 211 (FIG. 1) retrieves the digital data from Digital Data Storage Area 206725b3 (Paragraph [0206]) (S3). CPU 211 (FIG. 1) implements the digital data retrieved in the previous step (S4). The foregoing sequence is repeated periodically.

This Paragraph [0232] illustrate(s) 1st Digital Data Implemented Location Data Producing Software 206725c7 (Paragraph [0215]) of Communication Device 200, which produce (s) the 1st digital data implemented location data. In the present embodiment, CPU 211 (FIG. 1) checks the input signal (S1). If the input signal indicates to select the shortcut icon image data and implement the digital data, CPU 211 (FIG. 1) proceeds to the next step (S2). CPU 211 (FIG. 1) retrieves the current location data from Current Location Data Storage Area 206725b1 (Paragraph [0206]) (S3). CPU 211 (FIG. 1) retrieves the 1st geographic area data from 1st Geographic Area Data Storage Area 206725b2a (Paragraph [0207]) (S4). If the current location data retrieved in S3 is within the 1st geographic area data retrieved in the previous step, CPU 211 (FIG. 1) proceeds to the next step (S5). CPU 211 (FIG. 1) stores the current location data retrieved in S3 as the 1st digital data implemented location data in 1st Digital Data Implemented Location Data Storage Area 206725b10a (Paragraph [0213]) (S6). The foregoing sequence is repeated periodically.

This Paragraph [0233] illustrate(s) 2nd Digital Data Implemented Location Data Producing Software 206725c8 (Paragraph [0215]) of Communication Device 200, which produce (s) the 2nd digital data implemented location data. In the present embodiment, CPU 211 (FIG. 1) checks the input signal (S1). If the input signal indicates to select the shortcut icon image data and implement the digital data, CPU 211 (FIG. 1) proceeds to the next step (S2). CPU 211 (FIG. 1) retrieves the current location data from Current Location Data Storage Area 206725b1 (Paragraph [0206]) (S3). CPU 211 (FIG. 1) retrieves the 2nd geographic area data from 2nd Geographic Area Data Storage Area 206725b2b (Paragraph [0207]) (S4). If the current location data retrieved in S3 is within the 2nd geographic area data retrieved in the previous step, CPU 211 (FIG. 1) proceeds to the next step (S5). CPU 211 (FIG. 1) stores the current location data retrieved in S3 as the 2nd digital data implemented location data in 2nd Digital Data Implemented Location Data Storage Area 206725b10b (Paragraph [0213]) (S6). The foregoing sequence is repeated periodically.

This Paragraph [0234] illustrate(s) Digital Data Implemented Location Data Indicating Software 206725c9 (Paragraph [0215]) of Communication Device 200, which indicate (s) the 1st and 2nd digital data implemented location data on the map data. In the present embodiment, CPU 211 (FIG. 1) retrieves the map data from Map Data Storage Area 206725b11 (Paragraph [0206]) (S1). CPU 211 (FIG. 1) displays the map data retrieved in the previous step on LCD 201 (FIG. 1) (S2). CPU 211 (FIG. 1) retrieves the current location data from Current Location Data Storage Area 206725b1 (Paragraph [0206]) (S3). CPU 211 (FIG. 1) retrieves the current location icon data from Current Location Icon Data Storage Area 206725b12a (Paragraph [0214]) (S4). CPU 211 (FIG. 1) displays the current location icon data retrieved in the previous step at the location corresponding to the current location data retrieved in S3 on the map data displayed in S2 (S5). CPU 211 (FIG. 1) retrieves the 1st digital data implemented location data from 1st Digital Data Implemented Location Data Storage Area 206725b10a (Paragraph [0213]) (S6). CPU 211 (FIG. 1) retrieves the 1st digital data implemented location icon data from 1st Digital Data Implemented Location Icon Data Storage Area 206725b12b (Paragraph [0214]) (S7). CPU 211 (FIG. 1) displays the 1st digital data implemented location icon data retrieved in the previous step at the location corresponding to the 1st digital data implemented location data retrieved in S6 on the map data displayed in S2 (S8). CPU 211 (FIG. 1) retrieves the 2nd digital data implemented location data from 2nd Digital Data Implemented Location Data Storage Area 206725b10b (Paragraph [0213]) (S9). CPU 211 (FIG. 1) retrieves the 2nd digital data implemented location icon data from 2nd Digital Data Implemented Location Icon Data Storage Area 206725b12c (Paragraph [0214]) (S10). CPU 211 (FIG. 1) displays the 2nd digital data implemented location icon data retrieved in the previous step at the location corresponding to the 2nd digital data implemented location data retrieved in S9 on the map data displayed in S2 (S11). The foregoing sequence is repeated periodically.

<<Weather Dependent Shortcut Icon Function>>

Paragraph [0237] through Paragraph [0288] illustrate the weather dependent shortcut icon function, wherein a shortcut icon image which indicates a shortcut icon of a digital data is displayed on said display, when said shortcut icon image is selected by said input device, said digital data is implemented, a current location data which indicates the current geographic location of said communication device is identified, when a current weather data which indicates the current weather of the geographic area in which said communication device is located indicates a sunny weather, said shortcut icon image of a 1st pattern, a 1st color, and a 1st size is displayed at a 1st location on said display, when said current weather data indicates a cloudy weather, said shortcut icon image of a 2nd pattern, a 2nd color, and a 2nd size is displayed at a 2nd location on said display, and when said current weather data indicates a rainy weather, said shortcut icon image of a 3rd pattern, a 3rd color, and a 3rd size is displayed at a 3rd location on said display.

This Paragraph [0237] illustrates the storage area included in Host H (Paragraph [0025]). In the present embodiment, Host H (Paragraph [0025]) includes Weather Dependent Shortcut Icon Info Storage Area H726a of which the data and the software program(s) stored therein are described in Paragraph [0238].

This Paragraph [0238] illustrates the storage area(s) included in Weather Dependent Shortcut Icon Info Storage Area H726a (Paragraph [0237]). In the present embodiment, Weather Dependent Shortcut Icon Info Storage Area H726a includes Weather Dependent Shortcut Icon Data Storage Area H726b and Weather Dependent Shortcut Icon Software Storage Area H726c. Weather Dependent Shortcut Icon Data Storage Area H726b stores the data necessary to implement the present function on the side of Host H (Paragraph [0025]), such as the one(s) described in Paragraph [0239]. Weather Dependent Shortcut Icon Software Storage Area H726c stores the software program(s) necessary to implement the present function on the side of Host H (Paragraph [0025]), such as the one(s) described in Paragraph [0247].

This Paragraph [0239] illustrates the storage area(s) included in Weather Dependent Shortcut Icon Data Storage Area H726b (Paragraph [0238]). In the present embodiment, Weather Dependent Shortcut Icon Data Storage Area H726b includes Current Location Data Storage Area H726b1, Current Weather Data Storage Area H726b2, Digital Data Storage Area H726b3, Shortcut Icon Image Data Storage Area H726b4, Shortcut Icon Relating Data Storage Area H726b5, Entire Shortcut Icon Pattern Data Storage Area H726b6, Entire Shortcut Icon Color Data Storage Area H726b7, Entire Shortcut Icon Size Data Storage Area H726b8, Entire Shortcut Icon Displaying Location Data Storage Area H726b9, Entire Digital Data Implemented Location Data Storage Area H726b10, Map Data Storage Area H726b11, Entire Location Icon Data Storage Area H726b12, and Work Area H726b13. Current Location Data Storage Area H726b1 stores the current location data which indicates the current geographic location of Communication Device 200 in (x,y,z) format. Current Weather Data Storage Area H726b2 stores the current weather data which indicates the current weather of the geographic area in which Communication Device 200 is located. One of the following is stored herein: the sunny weather data which indicates that the current weather is sunny, the cloudy weather data which indicates that the current weather is cloudy, and the rainy weather data which indicates that the current weather is rainy. Digital Data Storage Area H726b3 stores the digital data which may be any type of digital data, such as MS Word, MS Excel, MS PowerPoint, audio data, visual data, or audiovisual data. Shortcut Icon Image Data Storage Area H726b4 stores the shortcut icon image data which is the image of the shortcut icon of the digital data displayed on LCD 201 (FIG. 1). Shortcut Icon Relating Data Storage Area H726b5 stores the data described in Paragraph [0240]. Entire Shortcut Icon Pattern Data Storage Area H726b6 stores the data described in Paragraph [0241]. Entire Shortcut Icon Color Data Storage Area H726b7 stores the data described in Paragraph [0242]. Entire Shortcut Icon Size Data Storage Area H726b8 stores the data described in Paragraph [0243]. Entire Shortcut Icon Displaying Location Data Storage Area H726b9 stores the data described in Paragraph [0244]. Entire Digital Data Implemented Location Data Storage Area H726b10 stores the data described in Paragraph [0245]. Map Data Storage Area H726b11 stores the map data which is the image data indicating a map. Entire Location Icon Data Storage Area H726b12 stores the data described in Paragraph [0246]. Work Area H726b13 is utilized as a work area to perform calculation and temporarily store data to implement the present function.

This Paragraph [0240] illustrates the storage area(s) included in Shortcut Icon Relating Data Storage Area H726b5 (Paragraph [0239]). In the present embodiment, Shortcut Icon Relating Data Storage Area H726b5 includes Current Shortcut Icon Pattern Data Storage Area H726b5a, Current Shortcut Icon Color Data Storage Area H726b5b, Current Shortcut Icon Size Data Storage Area H726b5c, and Current Shortcut Icon Displaying Location Data Storage Area H726b5d. Current Shortcut Icon Pattern Data Storage Area H726b5a stores the current shortcut icon pattern data which indicates the pattern or design of the shortcut icon image data displayed on LCD 201 (FIG. 1). Current Shortcut Icon Color Data Storage Area H726b5b stores the current shortcut icon color data which indicates the colors utilized for the shortcut icon image data displayed on LCD 201 (FIG. 1). Current Shortcut Icon Size Data Storage Area H726b5c stores the current shortcut icon size data which indicates the size of the shortcut icon image data displayed on LCD 201 (FIG. 1). Current Shortcut Icon Displaying Location Data Storage Area H726b5d stores the current shortcut icon displaying location data which indicates the location of the shortcut icon image data displayed on LCD 201 (FIG. 1).

This Paragraph [0241] illustrates the storage area(s) included in Entire Shortcut Icon Pattern Data Storage Area H726b6 (Paragraph [0239]). In the present embodiment, Entire Shortcut Icon Pattern Data Storage Area H726b6 includes 1st Shortcut Icon Pattern Data Storage Area H726b6a, 2nd Shortcut Icon Pattern Data Storage Area H726b6b, and 3rd Shortcut Icon Pattern Data Storage Area H726b6c. 1st Shortcut Icon Pattern Data Storage Area H726b6a stores the 1st shortcut icon pattern data which indicates the 1st pattern or design capable to be utilized for the shortcut icon image data. 2nd Shortcut Icon Pattern Data Storage Area H726b6b stores the 2nd shortcut icon pattern data which indicates the 2nd pattern or design capable to be utilized for the shortcut icon image data. 3rd Shortcut Icon Pattern Data Storage Area H726b6c stores the 3rd shortcut icon pattern data which indicates the 3rd pattern or design capable to be utilized for the shortcut icon image data.

This Paragraph [0242] illustrates the storage area(s) included in Entire Shortcut Icon Color Data Storage Area H726b7 (Paragraph [0239]). In the present embodiment, Entire Shortcut Icon Color Data Storage Area H726b7 includes 1st Shortcut Icon Color Data Storage Area H726b7a, 2nd Shortcut Icon Color Data Storage Area H726b7b, and 3rd Shortcut Icon Color Data Storage Area H726b7c. 1st Shortcut Icon Color Data Storage Area H726b7a stores the 1st shortcut icon color data which indicates the 1st set of colors capable to be utilized for the shortcut icon image data. 2nd Shortcut Icon Color Data Storage Area H726b7b stores the 2nd shortcut icon color data which indicates the 2nd set of colors capable to be utilized for the shortcut icon image data. 3rd Shortcut Icon Color Data Storage Area H726b7c stores the 3rd shortcut icon color data which indicates the 3rd set of colors capable to be utilized for the shortcut icon image data.

This Paragraph [0243] illustrates the storage area(s) included in Entire Shortcut Icon Size Data Storage Area H726b8 (Paragraph [0239]). In the present embodiment, Entire Shortcut Icon Size Data Storage Area H726b8 includes 1st Shortcut Icon Size Data Storage Area H726b8a, 2nd Shortcut Icon Size Data Storage Area H726b8b, and 3rd Shortcut Icon Size Data Storage Area H726b8c. 1st Shortcut Icon Size Data Storage Area H726b8a stores the 1st shortcut icon size data which indicates the 1st size of the shortcut icon image data. 2nd Shortcut Icon Size Data Storage Area H726b8b stores the 2nd shortcut icon size data which indicates the 2nd size of the shortcut icon image data. 3rd Shortcut Icon Size Data Storage Area H726b8c stores the 3rd shortcut icon size data which indicates the 3rd size of the shortcut icon image data.

This Paragraph [0244] illustrates the storage area(s) included in Entire Shortcut Icon Displaying Location Data Storage Area H726b9 (Paragraph [0239]). In the present embodiment, Entire Shortcut Icon Displaying Location Data Storage Area H726b9 includes 1st Shortcut Icon Displaying Location Data Storage Area H726b9a, 2nd Shortcut Icon Displaying Location Data Storage Area H726b9b, and 3rd Shortcut Icon Displaying Location Data Storage Area H726b9c. 1st Shortcut Icon Displaying Location Data Storage Area H726b9a stores the 1st shortcut icon displaying location data which indicates the 1st location on LCD 201 (FIG. 1) at which the shortcut icon image data is displayed. 2nd Shortcut Icon Displaying Location Data Storage Area H726b9b stores the 2nd shortcut icon displaying location data which indicates the 2nd location on LCD 201 (FIG. 1) at which the shortcut icon image data is displayed. 3rd Shortcut Icon Displaying Location Data Storage Area H726b9c stores the 3rd shortcut icon displaying location data which indicates the 3rd location on LCD 201 (FIG. 1) at which the shortcut icon image data is displayed.

This Paragraph [0245] illustrates the storage area(s) included in Entire Digital Data Implemented Location Data Storage Area H726b10 (Paragraph [0239]). In the present embodiment, Entire Digital Data Implemented Location Data Storage Area H726b10 includes Sunny Digital Data Implemented Location Data Storage Area H726b10a, Cloudy Digital Data Implemented Location Data Storage Area H726b10b, and Rainy Digital Data Implemented Location Data Storage Area H726b10c. Sunny Digital Data Implemented Location Data Storage Area H726b10a stores the sunny digital data implemented location data which indicates the geographic location at which the digital data was implemented when the sunny weather data was stored in Current Weather Data Storage Area H726b2 (Paragraph [0239]). Cloudy Digital Data Implemented Location Data Storage Area H726b10b stores the cloudy digital data implemented location data which indicates the geographic location at which the digital data was implemented when the cloudy weather data was stored in Current Weather Data Storage Area H726b2 (Paragraph [0239]). Rainy Digital Data Implemented Location Data Storage Area H726b10c stores the rainy digital data implemented location data which indicates the geographic location at which the digital data was implemented when the rainy weather data was stored in Current Weather Data Storage Area H726b2 (Paragraph [0239]).

This Paragraph [0246] illustrates the storage area(s) included in Entire Location Icon Data Storage Area H726b12 (Paragraph [0239]). In the present embodiment, Entire Location Icon Data Storage Area H726b12 includes Current Location Icon Data Storage Area H726b12a, Sunny Digital Data Implemented Location Icon Data Storage Area H726b12b, Cloudy Digital Data Implemented Location Icon Data Storage Area H726b12c, and Rainy Digital Data Implemented Location Icon Data Storage Area H726b12d. Current Location Icon Data Storage Area H726b12a stores the current location icon data which is the image of the icon utilized to indicate the current location data on the map data Sunny Digital Data Implemented Location Icon Data Storage Area H726b12b stores the sunny digital data implemented location icon data which is the image of the icon utilized to indicate the sunny digital data implemented location data. Cloudy Digital Data Implemented Location Icon Data Storage Area H726b12c stores the cloudy digital data implemented location icon data which is the image of the icon utilized to indicate the cloudy digital data implemented location data. Rainy Digital Data Implemented Location Icon Data Storage Area H726b12d stores the rainy digital data implemented location icon data which is the image of the icon utilized to indicate the rainy digital data implemented location data.

This Paragraph [0247] illustrates the software program(s) stored in Weather Dependent Shortcut Icon Software Storage Area H726c (Paragraph [0238]). In the present embodiment, Weather Dependent Shortcut Icon Software Storage Area H726c stores Current Location Data Producing Software H726c1, Sunny Weather Data Storing Software H726c2, Cloudy Weather Data Storing Software H726c3, Rainy Weather Data Storing Software H726c4, Sunny Shortcut Icon Generating Software H726c5, Cloudy Shortcut Icon Generating Software H726c6, Rainy Shortcut Icon Generating Software H726c7, Shortcut Icon Image Data Producing Software H726c8, Shortcut Icon Image Data Displaying Software H726c9, Digital Data Implementing Software H726c10, Sunny Digital Data Implemented Location Data Producing Software H726c11, Cloudy Digital Data Implemented Location Data Producing Software H726c12, Rainy Digital Data Implemented Location Data Producing Software H726c13, and Digital Data Implemented Location Data Indicating Software H726c14. Current Location Data Producing Software H726c1 is the software program described in Paragraph [0260]. Sunny Weather Data Storing Software H726c2 is the software program described in Paragraph [0261]. Cloudy Weather Data Storing Software H726c3 is the software program described in Paragraph [0262]. Rainy Weather Data Storing Software H726c4 is the software program described in Paragraph [0263] Sunny Shortcut Icon Generating Software H726c5 is the software program described in Paragraph [0264]. Cloudy Shortcut Icon Generating Software H726c6 is the software program described in Paragraph [0265]. Rainy Shortcut Icon Generating Software H726c7 is the software program described in Paragraph [0266]. Shortcut Icon Image Data Producing Software H726c8 is the software program described in Paragraph [0267]. Shortcut Icon Image Data Displaying Software H726c9 is the software program described in Paragraph [0268]. Digital Data Implementing Software H726c10 is the software program described in Paragraph [0269]. Sunny Digital Data Implemented Location Data Producing Software H726c11 is the software program described in Paragraph [0270]. Cloudy Digital Data Implemented Location Data Producing Software H726c12 is the software program described in Paragraph [0271]. Rainy Digital Data Implemented Location Data Producing Software H726c13 is the software program described in Paragraph [0272]. Digital Data Implemented Location Data Indicating Software H726c14 is the software program described in Paragraph [0273].

This Paragraph [0248] illustrates the storage area included in RAM 206 (FIG. 1) of Communication Device 200. In the present embodiment, RAM 206 includes Weather Dependent Shortcut Icon Info Storage Area 206726a of which the data and the software program(s) stored therein are described in Paragraph [0250].

The data and/or the software program(s) necessary to implement the present function may be downloaded from Host H (Paragraph [0025]) to Communication Device 200.

This Paragraph [0250] illustrates the storage area(s) included in Weather Dependent Shortcut Icon Info Storage Area 206726a (Paragraph [0248]). In the present embodiment, Weather Dependent Shortcut Icon Info Storage Area 206726a includes Weather Dependent Shortcut Icon Data Storage Area 206726b and Weather Dependent Shortcut Icon Software Storage Area 206726c. Weather Dependent Shortcut Icon Data Storage Area 206726b stores the data necessary to implement the present function on the side of Communication Device 200, such as the one(s) described in Paragraph [0251]. Weather Dependent Shortcut Icon Software Storage Area 206726c stores the software program(s) necessary to implement the present function on the side of Communication Device 200, such as the one(s) described in Paragraph [0259].

This Paragraph [0251] illustrates the storage area(s) included in Weather Dependent Shortcut Icon Data Storage Area 206726b (Paragraph [0250]). In the present embodiment, Weather Dependent Shortcut Icon Data Storage Area 206726b includes Current Location Data Storage Area 206726b1, Current Weather Data Storage Area 206726b2, Digital Data Storage Area 206726b3, Shortcut Icon Image Data Storage Area 206726b4, Shortcut Icon Relating Data Storage Area 206726b5, Entire Shortcut Icon Pattern Data Storage Area 206726b6, Entire Shortcut Icon Color Data Storage Area 206726b7, Entire Shortcut Icon Size Data Storage Area 206726b8, Entire Shortcut Icon Displaying Location Data Storage Area 206726b9, Entire Digital Data Implemented Location Data Storage Area 206726b10, Map Data Storage Area 206726b11, Entire Location Icon Data Storage Area 206726b12, and Work Area 206726b13. Current Location Data Storage Area 206726b1 stores the current location data which indicates the current geographic location of Communication Device 200 in (x,y,z) format. Current Weather Data Storage Area 206726b2 stores the current weather data which indicates the current weather of the geographic area in which Communication Device 200 is located. One of the following is stored herein: the sunny weather data which indicates that the current weather is sunny, the cloudy weather data which indicates that the current weather is cloudy, and the rainy weather data which indicates that the current weather is rainy. Digital Data Storage Area 206726b3 stores the digital data which may be any type of digital data, such as MS Word, MS Excel, MS PowerPoint, audio data, visual data, or audiovisual data. Shortcut Icon Image Data Storage Area 206726b4 stores the shortcut icon image data which is the image of the shortcut icon of the digital data displayed on LCD 201 (FIG. 1). Shortcut Icon Relating Data Storage Area 206726b5 stores the data described in Paragraph [0252]. Entire Shortcut Icon Pattern Data Storage Area 206726b6 stores the data described in Paragraph [0253]. Entire Shortcut Icon Color Data Storage Area 206726b7 stores the data described in Paragraph [0254]. Entire Shortcut Icon Size Data Storage Area 206726b8 stores the data described in Paragraph [0255]. Entire Shortcut Icon Displaying Location Data Storage Area 206726b9 stores the data described in Paragraph [0256]. Entire Digital Data Implemented Location Data Storage Area 206726b10 stores the data described in Paragraph [0257]. Map Data Storage Area 206726b11 stores the map data which is the image data indicating a map. Entire Location Icon Data Storage Area 206726b12 stores the data described in Paragraph [0258]. Work Area 206726b13 is utilized as a work area to perform calculation and temporarily store data to implement the present function.

This Paragraph [0252] illustrates the storage area(s) included in Shortcut Icon Relating Data Storage Area 206726b5 (Paragraph [0251]). In the present embodiment, Shortcut Icon Relating Data Storage Area 206726b5 includes Current Shortcut Icon Pattern Data Storage Area 206726b5a, Current Shortcut Icon Color Data Storage Area 206726b5b, Current Shortcut Icon Size Data Storage Area 206726b5c, and Current Shortcut Icon Displaying Location Data Storage Area 206726b5d. Current Shortcut Icon Pattern Data Storage Area 206726b5a stores the current shortcut icon pattern data which indicates the pattern or design of the shortcut icon image data displayed on LCD 201 (FIG. 1). Current Shortcut Icon Color Data Storage Area 206726b5b stores the current shortcut icon color data which indicates the colors utilized for the shortcut icon image data displayed on LCD 201 (FIG. 1). Current Shortcut Icon Size Data Storage Area 206726b5c stores the current shortcut icon size data which indicates the size of the shortcut icon image data displayed on LCD 201 (FIG. 1). Current Shortcut Icon Displaying Location Data Storage Area 206726b5d stores the current shortcut icon displaying location data which indicates the location of the shortcut icon image data displayed on LCD 201 (FIG. 1).

This Paragraph [0253] illustrates the storage area(s) included in Entire Shortcut Icon Pattern Data Storage Area 206726b6 (Paragraph [0251]). In the present embodiment, Entire Shortcut Icon Pattern Data Storage Area 206726b6 includes 1st Shortcut Icon Pattern Data Storage Area 206726b6a, 2nd Shortcut Icon Pattern Data Storage Area 206726b6b, and 3rd Shortcut Icon Pattern Data Storage Area 206726b6c. 1st Shortcut Icon Pattern Data Storage Area 206726b6a stores the 1st shortcut icon pattern data which indicates the 1st pattern or design capable to be utilized for the shortcut icon image data. 2nd Shortcut Icon Pattern Data Storage Area 206726b6b stores the 2nd shortcut icon pattern data which indicates the 2nd pattern or design capable to be utilized for the shortcut icon image data. 3rd Shortcut Icon Pattern Data Storage Area 206726b6c stores the 3rd shortcut icon pattern data which indicates the 3rd pattern or design capable to be utilized for the shortcut icon image data.

This Paragraph [0254] illustrates the storage area(s) included in Entire Shortcut Icon Color Data Storage Area 206726b7 (Paragraph [0251]). In the present embodiment, Entire Shortcut Icon Color Data Storage Area 206726b7 includes 1st Shortcut Icon Color Data Storage Area 206726b7a, 2nd Shortcut Icon Color Data Storage Area 206726b7b, and 3rd Shortcut Icon Color Data Storage Area 206726b7c. 1st Shortcut Icon Color Data Storage Area 206726b7a stores the 1st shortcut icon color data which indicates the 1st set of colors capable to be utilized for the shortcut icon image data. 2nd Shortcut Icon Color Data Storage Area 206726b7b stores the 2nd shortcut icon color data which indicates the 2nd set of colors capable to be utilized for the shortcut icon image data. 3rd Shortcut Icon Color Data Storage Area 206726b7c stores the 3rd shortcut icon color data which indicates the 3rd set of colors capable to be utilized for the shortcut icon image data.

This Paragraph [0255] illustrates the storage area(s) included in Entire Shortcut Icon Size Data Storage Area 206726b8 (Paragraph [0251]). In the present embodiment, Entire Shortcut Icon Size Data Storage Area 206726b8 includes 1st Shortcut Icon Size Data Storage Area 206726b8a, 2nd Shortcut Icon Size Data Storage Area 206726b8b, and 3rd Shortcut Icon Size Data Storage Area 206726b8c. 1st Shortcut Icon Size Data Storage Area 206726b8a stores the 1st shortcut icon size data which indicates the 1st size of the shortcut icon image data. 2nd Shortcut Icon Size Data Storage Area 206726b8b stores the 2nd shortcut icon size data which indicates the 2nd size of the shortcut icon image data. 3rd Shortcut Icon Size Data Storage Area 206726b8c stores the 3rd shortcut icon size data which indicates the 3rd size of the shortcut icon image data.

This Paragraph [0256] illustrates the storage area(s) included in Entire Shortcut Icon Displaying Location Data Storage Area 206726b9 (Paragraph [0251]). In the present embodiment, Entire Shortcut Icon Displaying Location Data Storage Area 206726b9 includes 1st Shortcut Icon Displaying Location Data Storage Area 206726b9a, 2nd Shortcut Icon Displaying Location Data Storage Area 206726b9b, and 3rd Shortcut Icon Displaying Location Data Storage Area 206726b9c. 1st Shortcut Icon Displaying Location Data Storage Area 206726b9a stores the 1st shortcut icon displaying location data which indicates the 1st location on LCD 201 (FIG. 1) at which the shortcut icon image data is displayed. 2nd Shortcut Icon Displaying Location Data Storage Area 206726b9b stores the 2nd shortcut icon displaying location data which indicates the 2nd location on LCD 201 (FIG. 1) at which the shortcut icon image data is displayed. 3rd Shortcut Icon Displaying Location Data Storage Area 206726b9c stores the 3rd shortcut icon displaying location data which indicates the 3rd location on LCD 201 (FIG. 1) at which the shortcut icon image data is displayed.

This Paragraph [0257] illustrates the storage area(s) included in Entire Digital Data Implemented Location Data Storage Area 206726b10 (Paragraph [0251]). In the present embodiment, Entire Digital Data Implemented Location Data Storage Area 206726b10 includes Sunny Digital Data Implemented Location Data Storage Area 206726b10a, Cloudy Digital Data Implemented Location Data Storage Area 206726b10b, and Rainy Digital Data Implemented Location Data Storage Area 206726b10c. Sunny Digital Data Implemented Location Data Storage Area 206726b10a stores the sunny digital data implemented location data which indicates the geographic location at which the digital data was implemented when the sunny weather data was stored in Current Weather Data Storage Area 206726b2 (Paragraph [0251]). Cloudy Digital Data Implemented Location Data Storage Area 206726b10b stores the cloudy digital data implemented location data which indicates the geographic location at which the digital data was implemented when the cloudy weather data was stored in Current Weather Data Storage Area 206726b2 (Paragraph [0251]). Rainy Digital Data Implemented Location Data Storage Area 206726b10c stores the rainy digital data implemented location data which indicates the geographic location at which the digital data was implemented when the rainy weather data was stored in Current Weather Data Storage Area 206726b2 (Paragraph [0251]).

This Paragraph [0258] illustrates the storage area(s) included in Entire Location Icon Data Storage Area 206726b12 (Paragraph [0251]). In the present embodiment, Entire Location Icon Data Storage Area 206726b12 includes Current Location Icon Data Storage Area 206726b12a, Sunny Digital Data Implemented Location Icon Data Storage Area 206726b12b, Cloudy Digital Data Implemented Location Icon Data Storage Area 206726b12c, and Rainy Digital Data Implemented Location Icon Data Storage Area 206726b12d. Current Location Icon Data Storage Area 206726b12a stores the current location icon data which is the image of the icon utilized to indicate the current location data on the map data. Sunny Digital Data Implemented Location Icon Data Storage Area 206726b12b stores the sunny digital data implemented location icon data which is the image of the icon utilized to indicate the sunny digital data implemented location data. Cloudy Digital Data Implemented Location Icon Data Storage Area 206726b12c stores the cloudy digital data implemented location icon data which is the image of the icon utilized to indicate the cloudy digital data implemented location data. Rainy Digital Data Implemented Location Icon Data Storage Area 206726b12d stores the rainy digital data implemented location icon data which is the image of the icon utilized to indicate the rainy digital data implemented location data.

This Paragraph [0259] illustrates the software program(s) stored in Weather Dependent Shortcut Icon Software Storage Area 206726c (Paragraph [0250]). In the present embodiment, Weather Dependent Shortcut Icon Software Storage Area 206726c stores Current Location Data Producing Software 206726c1, Sunny Weather Data Storing Software 206726c2, Cloudy Weather Data Storing Software 206726c3, Rainy Weather Data Storing Software 206726c4, Sunny Shortcut Icon Generating Software 206726c5, Cloudy Shortcut Icon Generating Software 206726c6, Rainy Shortcut Icon Generating Software 206726c7, Shortcut Icon Image Data Producing Software 206726c8, Shortcut Icon Image Data Displaying Software 206726c9, Digital Data Implementing Software 206726c10, Sunny Digital Data Implemented Location Data Producing Software 206726c11, Cloudy Digital Data Implemented Location Data Producing Software 206726c12, Rainy Digital Data Implemented Location Data Producing Software 206726c13, and Digital Data Implemented Location Data Indicating Software 206726c14. Current Location Data Producing Software 206726c1 is the software program described in Paragraph [0260] and Paragraph [0275] Sunny Weather Data Storing Software 206726c2 is the software program described in Paragraph [0276]. Cloudy Weather Data Storing Software 206726c3 is the software program described in Paragraph [0277]. Rainy Weather Data Storing Software 206726c4 is the software program described in Paragraph [0278] Sunny Shortcut Icon Generating Software 206726c5 is the software program described in Paragraph [0279]. Cloudy Shortcut Icon Generating Software 206726c6 is the software program described in Paragraph [0280]. Rainy Shortcut Icon Generating Software 206726c7 is the software program described in Paragraph [0281]. Shortcut Icon Image Data Producing Software 206726c8 is the software program described in Paragraph [0282]. Shortcut Icon Image Data Displaying Software 206726c9 is the software program described in Paragraph [0268] and Paragraph [0283]. Digital Data Implementing Software 206726c10 is the software program described in Paragraph [0269] and Paragraph [0284] Sunny Digital Data Implemented Location Data Producing Software 206726c11 is the software program described in Paragraph [0270], and Paragraph [0285]. Cloudy Digital Data Implemented Location Data Producing Software 206726c12 is the software program described in Paragraph [0271], and Paragraph [0286]. Rainy Digital Data Implemented Location Data Producing Software 206726c13 is the software program described in Paragraph [0272], and Paragraph [0287]. Digital Data Implemented Location Data Indicating Software 206726c14 is the software program described in Paragraph [0273], and Paragraph [0288].

This Paragraph [0260] illustrate(s) Current Location Data Producing Software H726c1 (Paragraph [0247]) of Host H (Paragraph [0025]) and Current Location Data Producing Software 206726c1 (Paragraph [0259]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H (Paragraph [0025]) in a wireless fashion (S2). Host H (Paragraph [0025]) receives the current location data from Communication Device 200 and stores the data in Current Location Data Storage Area H726b1 (Paragraph [0239]) (S3). The foregoing sequence is repeated periodically.

This Paragraph [0261] illustrate(s) (Sunny Weather Data Storing Software H726c2 (Paragraph [0247]) of Host H (Paragraph [0025]), which store(s) the sunny weather data. In the present embodiment, Host H (Paragraph [0025]) retrieves the current location data from Current Location Data Storage Area H726b1 (Paragraph [0239]) (S1). Host H (Paragraph [0025]) identifies the current weather of the geographic area in which the geographic location indicated by the current location data retrieved in the previous step is included (S2). Here, the current weather may be identified by accessing a specific website relating to weather. If the current weather identified in the previous step indicates sunny weather, Host H (Paragraph [0025]) proceeds to the next step (S3). Host H (Paragraph [0025]) stores the sunny weather data in Current Weather Data Storage Area H726b2 (Paragraph [0239]) (S4). The foregoing sequence is repeated periodically.

This Paragraph [0262] illustrate(s) Cloudy Weather Data Storing Software H726c3 (Paragraph [0247]) of Host H (Paragraph [0025]), which store(s) the cloudy weather data. In the present embodiment, Host H (Paragraph [0025]) retrieves the current location data from Current Location Data Storage Area H726b1 (Paragraph [0239]) (S1). Host H (Paragraph [0025]) identifies the current weather of the geographic area in which the geographic location indicated by the current location data retrieved in the previous step is included (S2). If the current weather identified in the previous step indicates cloudy weather, Host H (Paragraph [0025]) proceeds to the next step (S3). Host H (Paragraph [0025]) stores the cloudy weather data in Current Weather Data Storage Area H726b2 (Paragraph [0239]) (S4). The foregoing sequence is repeated periodically.

This Paragraph [0263] illustrate(s) Rainy Weather Data Storing Software H726c4 (Paragraph [0247]) of Host H (Paragraph [0025]), which store(s) the rainy weather data. In the present embodiment, Host H (Paragraph [0025]) retrieves the current location data from Current Location Data Storage Area H726b1 (Paragraph [0239]) (S1). Host H (Paragraph [0025]) identifies the current weather of the geographic area in which the geographic location indicated by the current location data retrieved in the previous step is included (S2). If the current weather identified in the previous step indicates rainy weather, Host H (Paragraph [0025]) proceeds to the next step (S3). Host H (Paragraph [0025]) stores the rainy weather data in Current Weather Data Storage Area H726b2 (Paragraph [0239]) (S4). The foregoing sequence is repeated periodically.

This Paragraph [0264] illustrate(s) (Sunny Shortcut Icon Generating Software H726c5 (Paragraph [0247]) of Host H (Paragraph [0025]), which generate(s) the unique shortcut icon image data indicating that the currently weather is sunny. In the present embodiment, Host H (Paragraph [0025]) identifies the data stored in Current Weather Data Storage Area H726b2 (Paragraph [0239])(S1). If the sunny weather data is stored in Current Weather Data Storage Area H726b2 (Paragraph [0239]), Host H (Paragraph [0025]) proceeds to the next step (S2). CPU 211 (FIG. 1) retrieves the 1st shortcut icon pattern data from 1st Shortcut Icon Pattern Data Storage Area H726b6a (Paragraph [0241]) (S3). Host H (Paragraph [0025]) stores the 1st shortcut icon pattern data retrieved in the previous step as the current shortcut icon pattern data in Current Shortcut Icon Pattern Data Storage Area H726b5a (Paragraph [0240]) (S4). Host H (Paragraph [0025]) retrieves the 1st shortcut icon color data from 1st Shortcut Icon Color Data Storage Area H726b7a (Paragraph [0242]) (S5). Host H (Paragraph [0025]) stores the 1st shortcut icon color data retrieved in the previous step as the current shortcut icon color data in Current Shortcut Icon Color Data Storage Area H726b5b (Paragraph [0240]) (S6). Host H (Paragraph [0025]) retrieves the 1st shortcut icon size data from 1st Shortcut Icon Size Data Storage Area H726b8a (Paragraph [0243]) (S7). Host H (Paragraph [0025]) stores the 1st shortcut icon size data retrieved in the previous step as the current shortcut icon size data in Current Shortcut Icon Size Data Storage Area H726b5c (Paragraph [0240]) (S8). Host H (Paragraph [0025]) retrieves the 1st shortcut icon displaying location data from 1st Shortcut Icon Displaying Location Data Storage Area H726b9a (Paragraph [0244]) (S9). Host H (Paragraph [0025]) stores the 1st shortcut icon displaying location data retrieved in the previous step as the current shortcut icon displaying location data in Current Shortcut Icon Displaying Location Data Storage Area H726b5d (Paragraph [0240]) (S10). The foregoing sequence is repeated periodically.

This Paragraph [0265] illustrate(s) Cloudy Shortcut Icon Generating Software H726c6 (Paragraph [0247]) of Host H (Paragraph [0025]), which generate(s) the unique shortcut icon image data indicating that the currently weather is cloudy. In the present embodiment, Host H (Paragraph [0025]) identifies the data stored in Current Weather Data Storage Area H726b2 (Paragraph [0239])(S1). If the cloudy weather data is stored in Current Weather Data Storage Area H726b2 (Paragraph [0239]), Host H (Paragraph [0025]) proceeds to the next step (S2). Host H (Paragraph [0025]) retrieves the 2nd shortcut icon pattern data from 2nd Shortcut Icon Pattern Data Storage Area H726b6b (Paragraph [0241]) (S3). Host H (Paragraph [0025]) stores the 2nd shortcut icon pattern data retrieved in the previous step as the current shortcut icon pattern data in Current Shortcut Icon Pattern Data Storage Area H726b5a (Paragraph [0240]) (S4). Host H (Paragraph [0025]) retrieves the 2nd shortcut icon color data from 2nd Shortcut Icon Color Data Storage Area H726b7b (Paragraph [0242]) (S5). Host H (Paragraph [0025]) stores the 2nd shortcut icon color data retrieved in the previous step as the current shortcut icon color data in Current Shortcut Icon Color Data Storage Area H726b5b (Paragraph [0240])

(S6). Host H (Paragraph [0025]) retrieves the 2nd shortcut icon size data from 2nd Shortcut Icon Size Data Storage Area H726b8b (Paragraph [0243]) (S7). Host H (Paragraph [0025]) stores the 2nd shortcut icon size data retrieved in the previous step as the current shortcut icon size data in Current Shortcut Icon Size Data Storage Area H726b5c (Paragraph [0240]) (S8). Host H (Paragraph [0025]) retrieves the 2nd shortcut icon displaying location data from 2nd Shortcut Icon Displaying Location Data Storage Area H726b9b (Paragraph [0244]) (S9). Host H (Paragraph [0025]) stores the 2nd shortcut icon displaying location data retrieved in the previous step as the current shortcut icon displaying location data in Current Shortcut Icon Displaying Location Data Storage Area H726b5d (Paragraph [0240]) (S10). The foregoing sequence is repeated periodically.

This Paragraph [0266] illustrate(s) Rainy Shortcut Icon Generating Software H726c7 (Paragraph [0247]) of Host H (Paragraph [0025]), which generate(s) the unique shortcut icon image data indicating that the currently weather is rainy. In the present embodiment, Host H (Paragraph [0025]) identifies the data stored in Current Weather Data Storage Area H726b2 (Paragraph [0239])(S1). If the rainy weather data is stored in Current Weather Data Storage Area H726b2 (Paragraph [0239]), Host H (Paragraph [0025]) proceeds to the next step (S2). Host H (Paragraph [0025]) retrieves the 3rd shortcut icon pattern data from 3rd Shortcut Icon Pattern Data Storage Area H726b6c (Paragraph [0241]) (S3). Host H (Paragraph [0025]) stores the 3rd shortcut icon pattern data retrieved in the previous step as the current shortcut icon pattern data in Current Shortcut Icon Pattern Data Storage Area H726b5a (Paragraph [0240]) (S4). Host H (Paragraph [0025]) retrieves the 3rd shortcut icon color data from 3rd Shortcut Icon Color Data Storage Area H726b7c (Paragraph [0242]) (S5). Host H (Paragraph [0025]) stores the 3rd shortcut icon color data retrieved in the previous step as the current shortcut icon color data in Current Shortcut Icon Color Data Storage Area H726b5b (Paragraph [0240]) (S6). Host H (Paragraph [0025]) retrieves the 3rd shortcut icon size data from 3rd Shortcut Icon Size Data Storage Area H726b8c (Paragraph [0243]) (S7). Host H (Paragraph [0025]) stores the 3rd shortcut icon size data retrieved in the previous step as the current shortcut icon size data in Current Shortcut Icon Size Data Storage Area H726b5c (Paragraph [0240]) (S8). Host H (Paragraph [0025]) retrieves the 3rd shortcut icon displaying location data from 3rd Shortcut Icon Displaying Location Data Storage Area H726b9c (Paragraph [0244]) (S9). Host H (Paragraph [0025]) stores the 3rd shortcut icon displaying location data retrieved in the previous step as the current shortcut icon displaying location data in Current Shortcut Icon Displaying Location Data Storage Area H726b5d (Paragraph [0240]) (S10). The foregoing sequence is repeated periodically.

This Paragraph [0267] illustrate(s) (Shortcut Icon Image Data Producing Software H726c8 (Paragraph [0247]) of Host H (Paragraph [0025]), which produce(s) the shortcut icon image data. In the present embodiment, Host H (Paragraph [0025]) retrieves the current shortcut icon pattern data from Current Shortcut Icon Pattern Data Storage Area H726b5a (Paragraph [0240]) (S1). Host H (Paragraph [0025]) retrieves the current shortcut icon color data from Current Shortcut Icon Color Data Storage Area H726b5b (Paragraph [0240]) (S2). Host H (Paragraph [0025]) retrieves the current shortcut icon size data from Current Shortcut Icon Size Data Storage Area H726b5c (Paragraph [0240]) (S3). Host H (Paragraph [0025]) produces the shortcut icon image data by utilizing the current shortcut icon pattern data retrieved in (S1, the current shortcut icon color data retrieved in S2, and the current shortcut icon size data retrieved in the previous step (S4). Host H (Paragraph [0025]) stores the shortcut icon image data produced in the previous step in Shortcut Icon Image Data Storage Area H726b4 (Paragraph [0239]) (S5). The foregoing sequence is repeated periodically.

This Paragraph [0268] illustrate(s) (Shortcut Icon Image Data Displaying Software H726c9 (Paragraph [0247]) of Host H (Paragraph [0025]) and Shortcut Icon Image Data Displaying Software 206726c9 (Paragraph [0259]) of Communication Device 200, which display(s) the shortcut icon image data. In the present embodiment, Host H (Paragraph [0025]) retrieves the shortcut icon image data from Shortcut Icon Image Data Storage Area H726b4 (Paragraph [0239]) and sends the data to Communication Device 200 (S1). CPU 211 (FIG. 1) receives the shortcut icon image data from Host H (Paragraph [0025]) in a wireless fashion (S2). Host H (Paragraph [0025]) retrieves the current shortcut icon displaying location data from Current Shortcut Icon Displaying Location Data Storage Area H726b5d (Paragraph [0240]) and sends the data to Communication Device 200 (S3). CPU 211 (FIG. 1) receives the current shortcut icon displaying location data from Host H (Paragraph [0025]) in a wireless fashion (S4). CPU 211 (FIG. 1) displays the shortcut icon image data received in S2 at the location corresponding to the current shortcut icon displaying location data received in the previous step on LCD 201 (FIG. 1) (S5). The foregoing sequence is repeated periodically.

This Paragraph [0269] illustrate(s) Digital Data Implementing Software H726c10 (Paragraph [0247]) of Host H (Paragraph [0025]) and Digital Data Implementing Software 206726c10 (Paragraph [0259]) of Communication Device 200, which implement(s) the digital data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) sends the digital data implementing request to Host H (Paragraph [0025]) in a wireless fashion (S3). Here, the digital data implementing request is the request to implement the digital data. Host H (Paragraph [0025]) receives the digital data implementing request from Communication Device 200 (S4). Host H (Paragraph [0025]) retrieves the digital data from Digital Data Storage Area H726b3 (Paragraph [0239]) (S5). Host H (Paragraph [0025]) implements the digital data retrieved in the previous step (S6). The foregoing sequence is repeated periodically.

This Paragraph [0270] illustrate(s) (Sunny Digital Data Implemented Location Data Producing Software H726c11 (Paragraph [0247]) of Host H (Paragraph [0025]) and Sunny Digital Data Implemented Location Data Producing Software 206726c11 (Paragraph [0259]) of Communication Device 200, which produce(s) the sunny digital data implemented location data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) sends the digital data implementing request to Host H (Paragraph [0025]) in a wireless fashion (S3). Here, the digital data implementing request is the request to implement the digital data. Host H (Paragraph [0025]) receives the digital data implementing request from Communication Device 200 (S4). Host H (Paragraph [0025]) identifies the data stored in Current Weather Data Storage Area H726b2 (Paragraph [0239]) (S5). If the sunny weather data is stored in Current Weather Data Storage Area H726b2 (Paragraph [0239]), Host H (Paragraph [0025]) proceeds to the next step (S6). Host H (Paragraph [0025]) retrieves the current location data from Current Location Data Storage Area H726b1 (Paragraph

[0239]) (S7). Host H (Paragraph [0025]) stores the current location data retrieved in the previous step as the sunny digital data implemented location data in Sunny Digital Data Implemented Location Data Storage Area H726b10a (Paragraph [0245]) (S8). The foregoing sequence is repeated periodically.

This Paragraph [0271] illustrate(s) Cloudy Digital Data Implemented Location Data Producing Software H726c12 (Paragraph [0247]) of Host H (Paragraph [0025]) and Cloudy Digital Data Implemented Location Data Producing Software 206726c12 (Paragraph [0259]) of Communication Device 200, which produce(s) the cloudy digital data implemented location data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) sends the digital data implementing request to Host H (Paragraph [0025]) in a wireless fashion (S3). Here, the digital data implementing request is the request to implement the digital data. Host H (Paragraph [0025]) receives the digital data implementing request from Communication Device 200 (S4). Host H (Paragraph [0025]) identifies the data stored in Current Weather Data Storage Area H726b2 (Paragraph [0239]) (S5). If the cloudy weather data is stored in Current Weather Data Storage Area H726b2 (Paragraph [0239]), Host H (Paragraph [0025]) proceeds to the next step (S6). Host H (Paragraph [0025]) retrieves the current location data from Current Location Data Storage Area H726b1 (Paragraph [0239]) (S7). Host H (Paragraph [0025]) stores the current location data retrieved in the previous step as the cloudy digital data implemented location data in Cloudy Digital Data Implemented Location Data Storage Area H726b10b (Paragraph [0245]) (S8). The foregoing sequence is repeated periodically.

This Paragraph [0272] illustrate(s) Rainy Digital Data Implemented Location Data Producing Software H726c13 (Paragraph [0247]) of Host H (Paragraph [0025]) and Rainy Digital Data Implemented Location Data Producing Software 206726c13 (Paragraph [0259]) of Communication Device 200, which produce(s) the rainy digital data implemented location data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) sends the digital data implementing request to Host H (Paragraph [0025]) in a wireless fashion (S3). Here, the digital data implementing request is the request to implement the digital data. Host H (Paragraph [0025]) receives the digital data implementing request from Communication Device 200 (S4). Host H (Paragraph [0025]) identifies the data stored in Current Weather Data Storage Area H726b2 (Paragraph [0239]) (S5). If the rainy weather data is stored in Current Weather Data Storage Area H726b2 (Paragraph [0239]), Host H (Paragraph [0025]) proceeds to the next step (S6). Host H (Paragraph [0025]) retrieves the current location data from Current Location Data Storage Area H726b1 (Paragraph [0239]) (S7). Host H (Paragraph [0025]) stores the current location data retrieved in the previous step as the rainy digital data implemented location data in Rainy Digital Data Implemented Location Data Storage Area H726b10c (Paragraph [0245]) (S8). The foregoing sequence is repeated periodically.

This Paragraph [0273] illustrate(s) Digital Data Implemented Location Data Indicating Software H726c14 (Paragraph [0247]) of Host H (Paragraph [0025]) and Digital Data Implemented Location Data Indicating Software 206726c14 (Paragraph [0259]) of Communication Device 200, which indicate(s) the digital data implemented location data on the map data. In the present embodiment, Host H (Paragraph [0025]) retrieves the map data from Map Data Storage Area H726b11 (Paragraph [0239]) and sends the data to Communication Device 200 (S1). CPU 211 (FIG. 1) receives the map data from Host H (Paragraph [0025]) in a wireless fashion and displays the data on LCD 201 (FIG. 1) (S2). Host H (Paragraph [0025]) retrieves the current location data from Current Location Data Storage Area H726b1 (Paragraph [0239]) and sends the data to Communication Device 200 (S3). CPU 211 (FIG. 1) receives the current location data from Host H (Paragraph [0025]) in a wireless fashion (S4). Host H (Paragraph [0025]) retrieves the current location icon data from Current Location Icon Data Storage Area H726b12a (Paragraph [0246]) and sends the data to Communication Device 200 (S5). CPU 211 (FIG. 1) receives the current location icon data from Host H (Paragraph [0025]) in a wireless fashion (S6). CPU 211 (FIG. 1) displays the current location icon data received in the previous step at the location corresponding to the current location data received in S4 on the map data displayed in S2 (S7). Host H (Paragraph [0025]) retrieves the sunny digital data implemented location data from Sunny Digital Data Implemented Location Data Storage Area H726b10a (Paragraph [0245]) and sends the data to Communication Device 200 (S8). CPU 211 (FIG. 1) receives the sunny digital data implemented location data from Host H (Paragraph [0025]) in a wireless fashion (S9). Host H (Paragraph [0025]) retrieves the sunny digital data implemented location icon data from Sunny Digital Data Implemented Location Icon Data Storage Area H726b12b (Paragraph [0246]) and sends the data to Communication Device 200 (S10). CPU 211 (FIG. 1) receives the sunny digital data implemented location icon data from Host H (Paragraph [0025]) in a wireless fashion (S11). CPU 211 (FIG. 1) displays the sunny digital data implemented location icon data received in the previous step at the location corresponding to the sunny digital data implemented location data received in S9 on the map data displayed in S2 (S12). Host H (Paragraph [0025]) retrieves the cloudy digital data implemented location data from Cloudy Digital Data Implemented Location Data Storage Area H726b10b (Paragraph [0245]) and sends the data to Communication Device 200 (S13). CPU 211 (FIG. 1) receives the cloudy digital data implemented location data from Host H (Paragraph [0025]) in a wireless fashion (S14). Host H (Paragraph [0025]) retrieves the cloudy digital data implemented location icon data from Cloudy Digital Data Implemented Location Icon Data Storage Area H726b12c (Paragraph [0246]) and sends the data to Communication Device 200 (S15). CPU 211 (FIG. 1) receives the cloudy digital data implemented location icon data from Host H (Paragraph [0025]) in a wireless fashion (S16). CPU 211 (FIG. 1) displays the cloudy digital data implemented location icon data received in the previous step at the location corresponding to the cloudy digital data implemented location data received in (S14 on the map data displayed in S2 (S17). Host H (Paragraph [0025]) retrieves the rainy digital data implemented location data from Rainy Digital Data Implemented Location Data Storage Area H726b10c (Paragraph [0245]) and sends the data to Communication Device 200 (S18). CPU 211 (FIG. 1) receives the rainy digital data implemented location data from Host H (Paragraph [0025]) in a wireless fashion (S19). Host H (Paragraph [0025]) retrieves the rainy digital data implemented location icon data from Rainy Digital Data Implemented Location Icon Data Storage Area H726b12d (Paragraph [0246]) and sends the data to Communication Device 200 (S20). CPU 211 (FIG. 1) receives the rainy digital data implemented location icon data from Host H (Paragraph [0025]) in a wireless fashion (S21). CPU 211 (FIG. 1) displays the rainy digital data implemented location icon data received in the previous step at the location corresponding to the rainy digital data implemented location data received in (S19 on the map data displayed in S2 (S22). The foregoing sequence is repeated periodically.

Paragraph [0275] through Paragraph [0288] illustrate another embodiment wherein Communication Device 200 plays the major role in implementing the present function.

This Paragraph [0275] illustrate(s) Current Location Data Producing Software 206726c1 (Paragraph [0259]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206726b1 (Paragraph [0251]) (S3). The foregoing sequence is repeated periodically.

This Paragraph [0276] illustrate(s) (Sunny Weather Data Storing Software 206726c2 (Paragraph [0259]) of Communication Device 200, which store(s) the sunny weather data. In the present embodiment, CPU 211 (FIG. 1) retrieves the current location data from Current Location Data Storage Area 206726b1 (Paragraph [0251]) (S1). CPU 211 (FIG. 1) identifies the current weather of the geographic area in which the geographic location indicated by the current location data retrieved in the previous step is included (S2). Here, the current weather may be identified by accessing a specific website relating to weather. If the current weather identified in the previous step indicates sunny weather, CPU 211 (FIG. 1) proceeds to the next step (S3). CPU 211 (FIG. 1) stores the sunny weather data in Current Weather Data Storage Area 206726b2 (Paragraph [0251]) (S4). The foregoing sequence is repeated periodically.

This Paragraph [0277] illustrate(s) Cloudy Weather Data Storing Software 206726c3 (Paragraph [0259]) of Communication Device 200, which store(s) the cloudy weather data. In the present embodiment, CPU 211 (FIG. 1) retrieves the current location data from Current Location Data Storage Area 206726b1 (Paragraph [0251]) (S1). CPU 211 (FIG. 1) identifies the current weather of the geographic area in which the geographic location indicated by the current location data retrieved in the previous step is included (S2). If the current weather identified in the previous step indicates cloudy weather, CPU 211 (FIG. 1) proceeds to the next step (S3). CPU 211 (FIG. 1) stores the cloudy weather data in Current Weather Data Storage Area 206726b2 (Paragraph [0251]) (S4). The foregoing sequence is repeated periodically.

This Paragraph [0278] illustrate(s) Rainy Weather Data Storing Software 206726c4 (Paragraph [0259]) of Communication Device 200, which store(s) the rainy weather data. In the present embodiment, CPU 211 (FIG. 1) retrieves the current location data from Current Location Data Storage Area 206726b1 (Paragraph [0251]) (S1). CPU 211 (FIG. 1) identifies the current weather of the geographic area in which the geographic location indicated by the current location data retrieved in the previous step is included (S2). If the current weather identified in the previous step indicates rainy weather, CPU 211 (FIG. 1) proceeds to the next step (S3). CPU 211 (FIG. 1) stores the rainy weather data in Current Weather Data Storage Area 206726b2 (Paragraph [0251]) (S4). The foregoing sequence is repeated periodically.

This Paragraph [0279] illustrate(s) (Sunny Shortcut Icon Generating Software 206726c5 (Paragraph [0259]) of Communication Device 200, which generate(s) the unique shortcut icon image data indicating that the currently weather is sunny. In the present embodiment, CPU 211 (FIG. 1) identifies the data stored in Current Weather Data Storage Area 206726b2 (Paragraph [0251]) (S1). If the sunny weather data is stored in Current Weather Data Storage Area 206726b2 (Paragraph [0251]), CPU 211 (FIG. 1) proceeds to the next step (S2). CPU 211 (FIG. 1) retrieves the 1st shortcut icon pattern data from 1st Shortcut Icon Pattern Data Storage Area 206726b6a (Paragraph [0253]) (S3). CPU 211 (FIG. 1) stores the 1st shortcut icon pattern data retrieved in the previous step as the current shortcut icon pattern data in Current Shortcut Icon Pattern Data Storage Area 206726b5a (Paragraph [0252]) (S4). CPU 211 (FIG. 1) retrieves the 1st shortcut icon color data from 1st Shortcut Icon Color Data Storage Area 206726b7a (Paragraph [0254]) (S5). CPU 211 (FIG. 1) stores the 1st shortcut icon color data retrieved in the previous step as the current shortcut icon color data in Current Shortcut Icon Color Data Storage Area 206726b5b (Paragraph [0252]) (S6). CPU 211 (FIG. 1) retrieves the 1st shortcut icon size data from 1st Shortcut Icon Size Data Storage Area 206726b8a (Paragraph [0255]) (S7). CPU 211 (FIG. 1) stores the 1st shortcut icon size data retrieved in the previous step as the current shortcut icon size data in Current Shortcut Icon Size Data Storage Area 206726b5c (Paragraph [0252]) (S8). CPU 211 (FIG. 1) retrieves the 1st shortcut icon displaying location data from 1st Shortcut Icon Displaying Location Data Storage Area 206726b9a (Paragraph [0256]) (S9). CPU 211 (FIG. 1) stores the 1st shortcut icon displaying location data retrieved in the previous step as the current shortcut icon displaying location data in Current Shortcut Icon Displaying Location Data Storage Area 206726b5d (Paragraph [0252]) (S10). The foregoing sequence is repeated periodically.

This Paragraph [0280] illustrate(s) Cloudy Shortcut Icon Generating Software 206726c6 (Paragraph [0259]) of Communication Device 200, which generate(s) the unique shortcut icon image data indicating that the currently weather is cloudy. In the present embodiment, CPU 211 (FIG. 1) identifies the data stored in Current Weather Data Storage Area 206726b2 (Paragraph [0251]) (S1). If the cloudy weather data is stored in Current Weather Data Storage Area 206726b2 (Paragraph [0251]), CPU 211 (FIG. 1) proceeds to the next step (S2). CPU 211 (FIG. 1) retrieves the 2nd shortcut icon pattern data from 2nd Shortcut Icon Pattern Data Storage Area 206726b6b (Paragraph [0253]) (S3). CPU 211 (FIG. 1) stores the 2nd shortcut icon pattern data retrieved in the previous step as the current shortcut icon pattern data in Current Shortcut Icon Pattern Data Storage Area 206726b5a (Paragraph [0252]) (S4). CPU 211 (FIG. 1) retrieves the 2nd shortcut icon color data from 2nd Shortcut Icon Color Data Storage Area 206726b7b (Paragraph [0254]) (S5). CPU 211 (FIG. 1) stores the 2nd shortcut icon color data retrieved in the previous step as the current shortcut icon color data in Current Shortcut Icon Color Data Storage Area 206726b5b (Paragraph [0252]) (S6). CPU 211 (FIG. 1) retrieves the 2nd shortcut icon size data from 2nd Shortcut Icon Size Data Storage Area 206726b8b (Paragraph [0255]) (S7). CPU 211 (FIG. 1) stores the 2nd shortcut icon size data retrieved in the previous step as the current shortcut icon size data in Current Shortcut Icon Size Data Storage Area 206726b5c (Paragraph [0252]) (S8). CPU 211 (FIG. 1) retrieves the 2nd shortcut icon displaying location data from 2nd Shortcut Icon Displaying Location Data Storage Area 206726b9b (Paragraph [0256]) (S9). CPU 211 (FIG. 1) stores the 2nd shortcut icon displaying location data retrieved in the previous step as the current shortcut icon displaying location data in Current Shortcut Icon Displaying Location Data Storage Area 206726b5d (Paragraph [0252]) (S10). The foregoing sequence is repeated periodically.

This Paragraph [0281] illustrate(s) Rainy Shortcut Icon Generating Software 206726c7 (Paragraph [0259]) of Communication Device 200, which generate(s) the unique shortcut icon image data indicating that the currently weather is rainy. In the present embodiment, CPU 211 (FIG. 1) identifies the data stored in Current Weather Data Storage Area 206726b2 (Paragraph [0251]) (S1). If the rainy weather data is stored in Current Weather Data Storage Area 206726b2 (Paragraph [0251]), CPU 211 (FIG. 1) proceeds to the next step (S2). CPU 211 (FIG. 1) retrieves the 3rd shortcut icon pattern data from 3rd Shortcut Icon Pattern Data Storage Area 206726b6c (Paragraph [0253]) (S3). CPU 211 (FIG. 1) stores the 3rd shortcut icon pattern data retrieved in the previous step as the current shortcut icon pattern data in Current Shortcut Icon Pattern Data Storage Area 206726b5a (Paragraph [0252]) (S4). CPU 211 (FIG. 1) retrieves the 3rd shortcut icon color data from 3rd Shortcut Icon Color Data Storage Area 206726b7c (Paragraph [0254]) (S5). CPU 211 (FIG. 1) stores the 3rd shortcut icon color data retrieved in the previous step as the current shortcut icon color data in Current Shortcut Icon Color Data Storage Area 206726b5b (Paragraph [0252]) (S6). CPU 211 (FIG. 1) retrieves the 3rd shortcut icon size data from 3rd Shortcut Icon Size Data Storage Area 206726b8c (Paragraph [0255]) (S7). CPU 211 (FIG. 1) stores the 3rd shortcut icon size data retrieved in the previous step as the current shortcut icon size data in Current Shortcut Icon Size Data Storage Area 206726b5c (Paragraph [0252]) (S8). CPU 211 (FIG. 1) retrieves the 3rd shortcut icon displaying location data from 3rd Shortcut Icon Displaying Location Data Storage Area 206726b9c (Paragraph [0256]) (S9). CPU 211 (FIG. 1) stores the 3rd shortcut icon displaying location data retrieved in the previous step as the current shortcut icon displaying location data in Current Shortcut Icon Displaying Location Data Storage Area 206726b5d (Paragraph [0252]) (S10). The foregoing sequence is repeated periodically.

This Paragraph [0282] illustrate(s) (Shortcut Icon Image Data Producing Software 206726c8 (Paragraph [0259]) of Communication Device 200, which produce(s) the shortcut icon image data. In the present embodiment, CPU 211 (FIG. 1) retrieves the current shortcut icon pattern data from Current Shortcut Icon Pattern Data Storage Area 206726b5a (Paragraph [0252]) (S1). CPU 211 (FIG. 1) retrieves the current shortcut icon color data from Current Shortcut Icon Color Data Storage Area 206726b5b (Paragraph [0252]) (S2). CPU 211 (FIG. 1) retrieves the current shortcut icon size data from Current Shortcut Icon Size Data Storage Area 206726b5c (Paragraph [0252]) (S3). CPU 211 (FIG. 1) produces the shortcut icon image data by utilizing the current shortcut icon pattern data retrieved in (S1, the current shortcut icon color data retrieved in S2, and the current shortcut icon size data retrieved in the previous step (S4). CPU 211 (FIG. 1) stores the shortcut icon image data produced in the previous step in Shortcut Icon Image Data Storage Area 206726b4 (Paragraph [0251]) (S5). The foregoing sequence is repeated periodically.

This Paragraph [0283] illustrate(s) (Shortcut Icon Image Data Displaying Software 206726c9 (Paragraph [0259]) of Communication Device 200, which display(s) the shortcut icon image data. In the present embodiment, CPU 211 (FIG. 1) retrieves the shortcut icon image data from Shortcut Icon Image Data Storage Area 206726b4 (Paragraph [0251]) (S1). CPU 211 (FIG. 1) retrieves the current shortcut icon displaying location data from Current Shortcut Icon Displaying Location Data Storage Area 206726b5d (Paragraph [0252]) (S2). CPU 211 (FIG. 1) displays the shortcut icon image data retrieved in (S1 at the location corresponding to the current shortcut icon displaying location data retrieved in the previous step on LCD 201 (FIG. 1) (S3). The foregoing sequence is repeated periodically.

This Paragraph [0284] illustrate(s) Digital Data Implementing Software 206726c10 (Paragraph [0259]) of Communication Device 200, which implement(s) the digital data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) retrieves the digital data from Digital Data Storage Area 206726b3 (Paragraph [0251]) (S3). CPU 211 (FIG. 1) implements the digital data retrieved in the previous step (S4). The foregoing sequence is repeated periodically.

This Paragraph [0285] illustrate(s) (Sunny Digital Data Implemented Location Data Producing Software 206726c11 (Paragraph [0259]) of Communication Device 200, which produce(s) the sunny digital data implemented location data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) identifies the data stored in Current Weather Data Storage Area 206726b2 (Paragraph [0251]) (S3). If the sunny weather data is stored in Current Weather Data Storage Area 206726b2 (Paragraph [0251]), CPU 211 (FIG. 1) proceeds to the next step (S4). CPU 211 (FIG. 1) retrieves the current location data from Current Location Data Storage Area 206726b1 (Paragraph [0251]) (S5). CPU 211 (FIG. 1) stores the current location data retrieved in the previous step as the sunny digital data implemented location data in Sunny Digital Data Implemented Location Data Storage Area 206726b10a (Paragraph [0257]) (S6). The foregoing sequence is repeated periodically.

This Paragraph [0286] illustrate(s) Cloudy Digital Data Implemented Location Data Producing Software 206726c12 (Paragraph [0259]) of Communication Device 200, which produce(s) the cloudy digital data implemented location data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) identifies the data stored in Current Weather Data Storage Area 206726b2 (Paragraph [0251]) (S3). If the cloudy weather data is stored in Current Weather Data Storage Area 206726b2 (Paragraph [0251]), CPU 211 (FIG. 1) proceeds to the next step (S4). CPU 211 (FIG. 1) retrieves the current location data from Current Location Data Storage Area 206726b1 (Paragraph [0251]) (S5). CPU 211 (FIG. 1) stores the current location data retrieved in the previous step as the cloudy digital data implemented location data in Cloudy Digital Data Implemented Location Data Storage Area 206726b10b (Paragraph [0257]) (S6). The foregoing sequence is repeated periodically.

This Paragraph [0287] illustrate(s) Rainy Digital Data Implemented Location Data Producing Software 206726c13 (Paragraph [0259]) of Communication Device 200, which produce(s) the rainy digital data implemented location data. In the present embodiment, CPU 211 (FIG. 1) checks the input signal (S1). If the input signal indicates to select shortcut icon image data and implement digital data, CPU 211 (FIG. 1) proceeds to the next step (S2). CPU 211 (FIG. 1) identifies the data stored in Current Weather Data Storage Area 206726b2 (Paragraph [0251]) (S3). If the rainy weather data is stored in Current Weather Data Storage Area 206726b2 (Paragraph [0251]), CPU 211 (FIG. 1) proceeds to the next step (S4). CPU 211 (FIG. 1) retrieves the current location data from Current Location Data Storage Area 206726b1 (Paragraph [0251]) (S5). CPU 211 (FIG. 1) stores the current location data retrieved in the previous step as the rainy digital data implemented location data in Rainy Digital Data Implemented Location Data Storage Area 206726b10c (Paragraph [0257]) (S6). The foregoing sequence is repeated periodically.

This Paragraph [0288] illustrate(s) Digital Data Implemented Location Data Indicating Software 206726c14 (Paragraph [0259]) of Communication Device 200, which indicate (s) the digital data implemented location data on the map data. In the present embodiment, CPU 211 (FIG. 1) retrieves the map data from Map Data Storage Area 206726b11 (Paragraph [0251]) (S1). CPU 211 (FIG. 1) displays the map data retrieved in the previous step on LCD 201 (FIG. 1) (S2). CPU 211 (FIG. 1) retrieves the current location data from Current Location Data Storage Area 206726b1 (Paragraph [0251]) (S3). CPU 211 (FIG. 1) retrieves the current location icon data from Current Location Icon Data Storage Area 206726b12a (Paragraph [0258]) (S4). CPU 211 (FIG. 1) displays the current location icon data retrieved in the previous step at the location corresponding to the current location data retrieved in S3 on the map data displayed in S2 (S5). CPU 211 (FIG. 1) retrieves the sunny digital data implemented location data from Sunny Digital Data Implemented Location Data Storage Area 206726b10a (Paragraph [0257]) (S6). CPU 211 (FIG. 1) retrieves the sunny digital data implemented location icon data from Sunny Digital Data Implemented Location Icon Data Storage Area 206726b12b (Paragraph [0258]) (S7). CPU 211 (FIG. 1) displays the sunny digital data implemented location icon data retrieved in the previous step at the location corresponding to the sunny digital data implemented location data retrieved in S6 on the map data displayed in S2 (S8). CPU 211 (FIG. 1) retrieves the cloudy digital data implemented location data from Cloudy Digital Data Implemented Location Data Storage Area 206726b10b (Paragraph [0257]) (S9). CPU 211 (FIG. 1) retrieves the cloudy digital data implemented location icon data from Cloudy Digital Data Implemented Location Icon Data Storage Area 206726b12c (Paragraph [0258]) (S10). CPU 211 (FIG. 1) displays the cloudy digital data implemented location icon data retrieved in the previous step at the location corresponding to the cloudy digital data implemented location data retrieved in S9 on the map data displayed in S2 (S11). CPU 211 (FIG. 1) retrieves the rainy digital data implemented location data from Rainy Digital Data Implemented Location Data Storage Area 206726b10c (Paragraph [0257]) (S12). CPU 211 (FIG. 1) retrieves the rainy digital data implemented location icon data from Rainy Digital Data Implemented Location Icon Data Storage Area 206726b12d (Paragraph [0258]) (S13). CPU 211 (FIG. 1) displays the rainy digital data implemented location icon data retrieved in the previous step at the location corresponding to the rainy digital data implemented location data retrieved in (S12 on the map data displayed in S2 (S14). The foregoing sequence is repeated periodically.

<<Actual Three Dimensional Space Near Focal Point Image Displaying Function>>

Paragraph [0291] through Paragraph [0345] illustrate the actual three dimensional space near focal point image displaying function, wherein a actual three dimensional space which indicates a computer-generated three dimensional space is produced, said actual three dimensional space reflects the real world perceived by said communication device, a focal point which indicates the user's eye focal point in said actual three dimensional space is identified, a focal point icon is located at said focal point in said actual three dimensional space, a mouse pointer icon which is movable by said user is located in said actual three dimensional space, a digital material shortcut icon is located at a 1st specific location adjacent to said focal point, when said digital material shortcut icon is selected by said mouse pointer icon, a digital material which is represented by said digital material shortcut icon is located at a 2nd specific location adjacent to said focal point, a three dimensional map is located in said actual three dimensional space, a current location icon which indicates the current geographic location of said communication device, a focal point map icon which indicates the current location of said focal point, a focal point adjacent displaying material shortcut map icon which indicates the current location of said 1st specific location, a mouse pointer map icon which indicates the current location of said mouse pointer icon are located on said three dimensional map, and said actual three dimensional space with said focal point icon, said mouse pointer icon, said digital material shortcut icon, said digital material, and/or said three dimensional map with said current location icon, said focal point map icon, said focal point adjacent displaying material shortcut map icon, and/or said mouse pointer map icon are displayed in a stereo fashion.

This Paragraph [0291] illustrates the eye tracking devices connected to Communication Device 200 via Data Bus 203 (FIG. 1). In the present embodiment, Left Camera LC728 and Right Camera RC728 are connected to Data Bus 203 (FIG. 1). Left Camera LC728 and Right Camera RC728 are cameras, and visual data is retrieved thereby in a stereo fashion.

This Paragraph [0292] illustrates the eye tracking devices connected to Communication Device 200 via Data Bus 203 (FIG. 1). In the present embodiment, Left Eye Tracking Device LETD728 and Right Eye Tracking Device RETD728 are connected to Data Bus 203 (FIG. 1). Left Eye Tracking Device LETD728 is the device which tracks the movement of the user's left eye (not shown). Right Eye Tracking Device RETD728 is the device which tracks the movement of the user's right eye (not shown).

This Paragraph [0293] illustrates the displaying devices connected to Communication Device 200 via Data Bus 203 (FIG. 1). In the present embodiment, Left Eye Displaying Device LEDD728 and Right Eye Displaying Device REDD728 are connected to Data Bus 203 (FIG. 1). Left Eye Displaying Device LEDD728 is the device which displays visual data to the user's left eye (not shown). Right Eye Displaying Device REDD728 is the device which displays visual data to the user's right eye (not shown).

This Paragraph [0294] illustrates the storage area included in Host H (Paragraph [0025]). In the present embodiment, Host H (Paragraph [0025]) includes Actual Three Dimensional Space Near Focal Point Image Displaying Info Storage Area H728a of which the data and the software program(s) stored therein are described in Paragraph [0295].

This Paragraph [0295] illustrates the storage area(s) included in Actual Three Dimensional Space Near Focal Point Image Displaying Info Storage Area H728a (Paragraph [0294]). In the present embodiment, Actual Three Dimensional Space Near Focal Point Image Displaying Info Storage Area H728a includes Actual Three Dimensional Space Near Focal Point Image Displaying Data Storage Area H728b and Actual Three Dimensional Space Near Focal Point Image Displaying Software Storage Area H728c. Actual Three Dimensional Space Near Focal Point Image Displaying Data Storage Area H728b stores the data necessary to implement the present function on the side of Host H (Paragraph [0025]), such as the one(s) described in Paragraph [0296]. Actual Three Dimensional Space Near Focal Point Image Displaying Software Storage Area H728c stores the software program(s) necessary to implement the present function on the side of Host H (Paragraph [0025]), such as the one(s) described in Paragraph [0302].

This Paragraph [0296] illustrates the storage area(s) included in Actual Three Dimensional Space Near Focal Point Image Displaying Data Storage Area H728b (Paragraph [0295]). In the present embodiment, Actual Three Dimensional Space Near Focal Point Image Displaying Data Storage Area H728b includes Actual Three Dimensional Space Data Storage Area H728b1, Entire Actual Three Dimensional Space Internal Location Data Storage Area H728b2, Focal Point Adjacent Displaying Material Overall Data Storage Area H728b3, Focal Point Adjacent Displaying Material Displaying Property Data Storage Area H728b4, Entire Actual Eye Location Data Storage Area H728b5, Entire Perspective View Data Storage Area H728b6, Current Location Data Storage Area H728b7, Map Data Storage Area H728b8, Entire Map Icon Data Storage Area H728b9, and Work Area H728b10. Actual Three Dimensional Space Data Storage Area H728b1 stores the actual three dimensional space data which indicates a computer-generated 3D space of the real world currently perceived by Left Camera LC728 (Paragraph [0291]) and Right Camera RC728 (Paragraph [0291]). The actual three dimensional space data is produced by the visual data retrieved from Left Camera LC728 (Paragraph [0291]) and Right Camera RC728 (Paragraph [0291]) in a stereo fashion. Entire Actual Three Dimensional Space Internal Location Data Storage Area H728b2 stores the data described in Paragraph [0297]. Focal Point Adjacent Displaying Material Overall Data Storage Area H728b3 stores the data described in Paragraph [0298]. Focal Point Adjacent Displaying Material Displaying Property Data Storage Area H728b4 stores the focal point adjacent displaying material displaying property data which is either the focal point adjacent displaying material displaying positive data or the focal point adjacent displaying material displaying negative data. When the focal point adjacent displaying material displaying positive data is stored therein, the focal point adjacent displaying material data is activated and/or located in the actual three dimensional space data. When the focal point adjacent displaying material displaying negative data is stored therein, the focal point adjacent displaying material data is not activated and/or not located in the actual three dimensional space data. The default data stored therein is the focal point adjacent displaying material displaying negative data. Entire Actual Eye Location Data Storage Area H728b5 stores the data described in Paragraph [0299]. Entire Perspective View Data Storage Area H728b6 stores the data described in Paragraph [0300]. Current Location Data Storage Area H728b7 stores the current location data which indicates the current geographic location of Communication Device 200 in (x,y,z) format. Map Data Storage Area H728b8 stores the map data which is the three dimensional image data indicating a map. Entire Map Icon Data Storage Area H728b9 stores the data described in Paragraph [0301]. Work Area H728b10 is utilized as a work area to perform calculation and temporarily store data to implement the present function.

This Paragraph [0297] illustrates the storage area(s) included in Entire Actual Three Dimensional Space Internal Location Data Storage Area H728b2 (Paragraph [0296]). In the present embodiment, Entire Actual Three Dimensional Space Internal Location Data Storage Area H728b2 includes Focal Point Icon Location Data Storage Area H728b2a, Focal Point Adjacent Displaying Material Shortcut Icon Location Data Storage Area H728b2b, Focal Point Adjacent Displaying Material Location Data Storage Area H728b2c, and Mouse Pointer Location Data Storage Area H728b2d. Focal Point Icon Location Data Storage Area H728b2a stores the focal point icon location data which indicates the location in the actual three dimensional space data in (x,y,z) format at which the focal point icon data is located. In other words, the focal point icon location data indicates the focal point of the user's eye in the actual three dimensional space data in (x,y,z) format. For the avoidance of doubt, the focal point icon location data may indicate any location within the actual three dimensional space data. The focal point icon location data indicates the geographic location in the real world in (x,y,z) format at which the user is currently gazing. Focal Point Adjacent Displaying Material Shortcut Icon Location Data Storage Area H728b2b stores the focal point adjacent displaying material shortcut icon location data which indicates a specific location in the actual three dimensional space data in (x,y,z) format at which the focal point adjacent displaying material shortcut icon data is displayed. The focal point adjacent displaying material shortcut icon location data indicates the location adjacent to the location indicated by the focal point icon location data (e.g., the location on the left hand side of the focal point icon location data at a pre-determined distance therefrom). The focal point adjacent displaying material shortcut icon location data indicates the geographic location in the real world in (x,y,z) format. Focal Point Adjacent Displaying Material Location Data Storage Area H728b2c stores the focal point adjacent displaying material location data which indicates the location in the actual three dimensional space data in (x,y,z) format at which the focal point adjacent displaying material data is displayed. The focal point adjacent displaying material location data indicates the location adjacent to the location indicated by the focal point icon location data (e.g., the location on the right hand side of the focal point icon location data at a pre-determined distance therefrom). The focal point adjacent displaying material location data indicates the geographic location in the real world in (x,y,z) format. Mouse Pointer Location Data Storage Area H728b2d stores the mouse pointer location data which indicates the location in the actual three dimensional space data in (x,y,z) format at which the mouse pointer data is displayed. The mouse pointer location data may indicate any location within the actual three dimensional space data. The mouse pointer location data indicates the geographic location in the real world in (x,y,z) format.

This Paragraph [0298] illustrates the storage area(s) included in Focal Point Adjacent Displaying Material Overall Data Storage Area H728b3 (Paragraph [0296]). In the present embodiment, Focal Point Adjacent Displaying Material Overall Data Storage Area H728b3 includes Focal Point Icon Data Storage Area H728b3a, Focal Point Adjacent Displaying Material Shortcut Icon Data Storage Area H728b3b, Focal Point Adjacent Displaying Material Data Storage Area H728b3c, and Mouse Pointer Data Storage Area H728b3d. Focal Point Icon Data Storage Area H728b3a stores the focal point icon data which is the three dimensional image of the icon utilized to indicate the focal point of the user's eye in the actual three dimensional space data. Focal Point Adjacent Displaying Material Shortcut Icon Data Storage Area H728b3b stores the focal point adjacent displaying material shortcut icon data which is the three dimensional image of the icon utilized to indicate the shortcut icon of the focal point adjacent displaying material data in the actual three dimensional space data. Focal Point Adjacent Displaying Material Data Storage Area H728b3c stores the focal point adjacent displaying material data which indicates the data displayed adjacent to the focal point indicated by the focal point icon location data. Here, the focal point adjacent displaying material data may be any type of digital data, such as a text data, fixed picture data, or moving picture data. The focal point adjacent displaying material data may be a three dimensional data. Mouse Pointer Data Storage Area H728b3d stores the mouse pointer data which is the three dimensional image of the mouse pointer.

This Paragraph [0299] illustrates the storage area(s) included in Entire Actual Eye Location Data Storage Area H728b5 (Paragraph [0296]). In the present embodiment, Entire Actual Eye Location Data Storage Area H728b5 includes Left Actual Eye Location Data Storage Area H728b5a and Right Actual Eye Location Data Storage Area H728b5b. Left Actual Eye Location Data Storage Area H728b5a stores the left actual eye location data which indicates the user's left eye in the actual three dimensional space data in (x,y,z) format. The left actual eye location data indicates the geographic location in the real world in (x,y,z) format. Right Actual Eye Location Data Storage Area H728b5b stores the right actual eye location data which indicates the user's right eye in the actual three dimensional space data in (x,y,z) format. The right actual eye location data indicates the geographic location in the real world in (x,y,z) format.

This Paragraph [0300] illustrates the storage area(s) included in Entire Perspective View Data Storage Area H728b6 (Paragraph [0296]). In the present embodiment, Entire Perspective View Data Storage Area H728b6 includes Left Perspective View Data Storage Area H728b6a and Right Perspective View Data Storage Area H728b6b. Left Perspective View Data Storage Area H728b6a stores the left perspective view data which indicates the perspective view of the actual three dimensional space data and the focal point adjacent displaying material data to display on Left Eye Displaying Device LEDD728 (Paragraph [0293]). Right Perspective View Data Storage Area H728b6b stores the right perspective view data which indicates the perspective view of the actual three dimensional space data and the focal point adjacent displaying material data to display on Right Eye Displaying Device REDD728 (Paragraph [0293]).

This Paragraph [0301] illustrates the storage area(s) included in Entire Map Icon Data Storage Area H728b9 (Paragraph [0296]). In the present embodiment, Entire Map Icon Data Storage Area H728b9 includes Current Location Map Icon Data Storage Area H728b9a, Focal Point Map Icon Data Storage Area H728b9b, Focal Point Adjacent Displaying Material Shortcut Map Icon Data Storage Area H728b9c, and Mouse Pointer Map Icon Data Storage Area H728b9d. Current Location Map Icon Data Storage Area H728b9a stores the current location icon data which is the three dimensional image of the icon utilized to indicate the current location data on the map data. Focal Point Map Icon Data Storage Area H728b9b stores the focal point map icon data which is the three dimensional image of the icon utilized to indicate the focal point icon location data on the map data. Focal Point Adjacent Displaying Material Shortcut Map Icon Data Storage Area H728b9c stores the focal point adjacent displaying material shortcut map icon data which is the three dimensional image of the icon utilized to indicate the focal point adjacent displaying material shortcut icon location data on the map data. Mouse Pointer Map Icon Data Storage Area H728b9d stores the mouse pointer map icon data which is the three dimensional image of the icon utilized to indicate the mouse pointer location data on the map data.

This Paragraph [0302] illustrates the software program(s) stored in Actual Three Dimensional Space Near Focal Point Image Displaying Software Storage Area H728c (Paragraph [0295]). In the present embodiment, Actual Three Dimensional Space Near Focal Point Image Displaying Software Storage Area H728c stores Actual Three Dimensional Space Data Producing Software H728c1, Focal Point Icon Location Data Producing Software H728c2, Focal Point Icon Data Locating Software H728c3, Focal Point Adjacent Displaying Material Shortcut Icon Location Data Producing Software H728c4, Focal Point Adjacent Displaying Material Shortcut Icon Data Locating Software H728c5, Mouse Pointer Location Data Producing Software H728c6, Mouse Pointer Data Locating Software H728c7, Focal Point Adjacent Displaying Material Location Data Producing Software H728c8, Focal Point Adjacent Displaying Material Data Implementing Software H728c9, Focal Point Adjacent Displaying Material Data Locating Software H728c10, Current Location Data Producing Software H728c11, Real World Location Map Icon Data Locating Software H728c12, Left Perspective View Data Producing Software H728c13, Right Perspective View Data Producing Software H728c14, Left Perspective View Data Displaying Software H728c15, and Right Perspective View Data Displaying Software H728c16. Actual Three Dimensional Space Data Producing Software H728c1 is the software program described in Paragraph [0313]. Focal Point Icon Location Data Producing Software H728c2 is the software program described in Paragraph [0314]. Focal Point Icon Data Locating Software H728c3 is the software program described in Paragraph [0315]. Focal Point Adjacent Displaying Material Shortcut Icon Location Data Producing Software H728c4 is the software program described in Paragraph [0316]. Focal Point Adjacent Displaying Material Shortcut Icon Data Locating Software H728c5 is the software program described in Paragraph [0317]. Mouse Pointer Location Data Producing Software H728c6 is the software program described in Paragraph [0318]. Mouse Pointer Data Locating Software H728c7 is the software program described in Paragraph [0319]. Focal Point Adjacent Displaying Material Location Data Producing Software H728c8 is the software program described in Paragraph [0320]. Focal Point Adjacent Displaying Material Data Implementing Software H728c9 is the software program described in Paragraph [0321]. Focal Point Adjacent Displaying Material Data Locating Software H728c10 is the software program described in Paragraph [0322]. Current Location Data Producing Software H728c11 is the software program described in Paragraph [0323]. Real World Location Map Icon Data Locating Software H728c12 is the software program described in Paragraph [0324]. Left Perspective View Data Producing Software H728c13 is the software program described in Paragraph [0325]. Right Perspective View Data Producing Software H728c14 is the software program described in Paragraph [0326]. Left Perspective View Data Displaying Software H728c15 is the software program described in Paragraph [0327]. Right Perspective View Data Displaying Software H728c16 is the software program described in Paragraph [0328].

This Paragraph [0303] illustrates the storage area included in RAM 206 (FIG. 1) of Communication Device 200. In the present embodiment, RAM 206 includes Actual Three Dimensional Space Near Focal Point Image Displaying Info Storage Area 206728a of which the data and the software program(s) stored therein are described in Paragraph [0305].

The data and/or the software program(s) necessary to implement the present function may be downloaded from Host H (Paragraph [0025]) to Communication Device 200.

This Paragraph [0305] illustrates the storage area(s) included in Actual Three Dimensional Space Near Focal Point Image Displaying Info Storage Area 206728a (Paragraph [0303]). In the present embodiment, Actual Three Dimensional Space Near Focal Point Image Displaying Info Storage Area 206728a includes Actual Three Dimensional Space Near Focal Point Image Displaying Data Storage Area 206728b and Actual Three Dimensional Space Near Focal Point Image Displaying Software Storage Area 206728c. Actual Three Dimensional Space Near Focal Point Image Displaying Data Storage Area 206728b stores the data necessary to implement the present function on the side of Communication Device 200, such as the one(s) described in Paragraph [0306]. Actual Three Dimensional Space Near Focal Point Image Displaying Software Storage Area 206728c stores the software program(s) necessary to implement the present function on the side of Communication Device 200, such as the one(s) described in Paragraph [0312].

This Paragraph [0306] illustrates the storage area(s) included in Actual Three Dimensional Space Near Focal Point Image Displaying Data Storage Area 206728b (Paragraph [0305]). In the present embodiment, Actual Three Dimensional Space Near Focal Point Image Displaying Data Storage Area 206728b includes Actual Three Dimensional Space Data Storage Area 206728b1, Entire Actual Three Dimensional Space Internal Location Data Storage Area 206728b2, Focal Point Adjacent Displaying Material Overall Data Storage Area 206728b3, Focal Point Adjacent Displaying Material Displaying Property Data Storage Area 206728b4, Entire Actual Eye Location Data Storage Area 206728b5, Entire Perspective View Data Storage Area 206728b6, Current Location Data Storage Area 206728b7, Map Data Storage Area 206728b8, Entire Map Icon Data Storage Area 206728b9, and Work Area 206728b10. Actual Three Dimensional Space Data Storage Area 206728b1 stores the actual three dimensional space data which indicates a computer-generated 3D space of the real world currently perceived by Left Camera LC728 (Paragraph [0291]) and Right Camera RC728 (Paragraph [0291]). The actual three dimensional space data is produced by the visual data retrieved from Left Camera LC728 (Paragraph [0291]) and Right Camera RC728 (Paragraph [0291]) in a stereo fashion. Entire Actual Three Dimensional Space Internal Location Data Storage Area 206728b2 stores the data described in Paragraph [0307]. Focal Point Adjacent Displaying Material Overall Data Storage Area 206728b3 stores the data described in Paragraph [0308]. Focal Point Adjacent Displaying Material Displaying Property Data Storage Area 206728b4 stores the focal point adjacent displaying material displaying property data which is either the focal point adjacent displaying material displaying positive data or the focal point adjacent displaying material displaying negative data. When the focal point adjacent displaying material displaying positive data is stored therein, the focal point adjacent displaying material data is activated and/or located in the actual three dimensional space data. When the focal point adjacent displaying material displaying negative data is stored therein, the focal point adjacent displaying material data is not activated and/or not located in the actual three dimensional space data. The default data stored therein is the focal point adjacent displaying material displaying negative data. Entire Actual Eye Location Data Storage Area 206728b5 stores the data described in Paragraph [0309]. Entire Perspective View Data Storage Area 206728b6 stores the data described in Paragraph [0310]. Current Location Data Storage Area 206728b7 stores the current location data which indicates the current geographic location of Communication Device 200 in (x,y,z) format. Map Data Storage Area 206728b8 stores the map data which is the three dimensional image data indicating a map. Entire Map Icon Data Storage Area 206728b9 stores the data described in Paragraph [0311]. Work Area 206728b10 is utilized as a work area to perform calculation and temporarily store data to implement the present function.

This Paragraph [0307] illustrates the storage area(s) included in Entire Actual Three Dimensional Space Internal Location Data Storage Area 206728b2 (Paragraph [0306]). In the present embodiment, Entire Actual Three Dimensional Space Internal Location Data Storage Area 206728b2 includes Focal Point Icon Location Data Storage Area 206728b2a, Focal Point Adjacent Displaying Material Shortcut Icon Location Data Storage Area 206728b2b, Focal Point Adjacent Displaying Material Location Data Storage Area 206728b2c, and Mouse Pointer Location Data Storage Area 206728b2d. Focal Point Icon Location Data Storage Area 206728b2a stores the focal point icon location data which indicates the location in the actual three dimensional space data in (x,y,z) format at which the focal point icon data is located. In other words, the focal point icon location data indicates the focal point of the user's eye in the actual three dimensional space data in (x,y,z) format. For the avoidance of doubt, the focal point icon location data may indicate any location within the actual three dimensional space data. The focal point icon location data indicates the geographic location in the real world in (x,y,z) format at which the user is currently gazing. Focal Point Adjacent Displaying Material Shortcut Icon Location Data Storage Area 206728b2b stores the focal point adjacent displaying material shortcut icon location data which indicates a specific location in the actual three dimensional space data in (x,y,z) format at which the focal point adjacent displaying material shortcut icon data is displayed. The focal point adjacent displaying material shortcut icon location data indicates the location adjacent to the location indicated by the focal point icon location data (e.g., the location on the left hand side of the focal point icon location data at a pre-determined distance therefrom). The focal point adjacent displaying material shortcut icon location data indicates the geographic location in the real world in (x,y,z) format. Focal Point Adjacent Displaying Material Location Data Storage Area 206728b2c stores the focal point adjacent displaying material location data which indicates the location in the actual three dimensional space data in (x,y,z) format at which the focal point adjacent displaying material data is displayed. The focal point adjacent displaying material location data indicates the location adjacent to the location indicated by the focal point icon location data (e.g., the location on the right hand side of the focal point icon location data at a pre-determined distance therefrom). The focal point adjacent displaying material location data indicates the geographic location in the real world in (x,y,z) format. Mouse Pointer Location Data Storage Area 206728b2d stores the mouse pointer location data which indicates the location in the actual three dimensional space data in (x,y,z) format at which the mouse pointer data is displayed. The mouse pointer location data may indicate any location within the actual three dimensional space data. The mouse pointer location data indicates the geographic location in the real world in (x,y,z) format.

This Paragraph [0308] illustrates the storage area(s) included in Focal Point Adjacent Displaying Material Overall Data Storage Area 206728b3 (Paragraph [0306]). In the present embodiment, Focal Point Adjacent Displaying Material Overall Data Storage Area 206728b3 includes Focal Point Icon Data Storage Area 206728b3a, Focal Point Adjacent Displaying Material Shortcut Icon Data Storage Area 206728b3b, Focal Point Adjacent Displaying Material Data Storage Area 206728b3c, and Mouse Pointer Data Storage Area 206728b3d. Focal Point Icon Data Storage Area 206728b3a stores the focal point icon data which is the three dimensional image of the icon utilized to indicate the focal point of the user's eye in the actual three dimensional space data. Focal Point Adjacent Displaying Material Shortcut Icon Data Storage Area 206728b3b stores the focal point adjacent displaying material shortcut icon data which is the three dimensional image of the icon utilized to indicate the shortcut icon of the focal point adjacent displaying material data in the actual three dimensional space data. Focal Point Adjacent Displaying Material Data Storage Area 206728b3c stores the focal point adjacent displaying material data which indicates the data displayed adjacent to the focal point indicated by the focal point icon location data. Here, the focal point adjacent displaying material data may be any type of digital data, such as a text data, fixed picture data, or moving picture data. The focal point adjacent displaying material data may be a three dimensional data. Mouse Pointer Data Storage Area 206728b3d stores the mouse pointer data which is the three dimensional image of the mouse pointer.

This Paragraph [0309] illustrates the storage area(s) included in Entire Actual Eye Location Data Storage Area 206728b5 (Paragraph [0306]). In the present embodiment, Entire Actual Eye Location Data Storage Area 206728b5 includes Left Actual Eye Location Data Storage Area 206728b5a and Right Actual Eye Location Data Storage Area 206728b5b. Left Actual Eye Location Data Storage Area 206728b5a stores the left actual eye location data which indicates the user's left eye in the actual three dimensional space data in (x,y,z) format. The left actual eye location data indicates the geographic location in the real world in (x,y,z) format. Right Actual Eye Location Data Storage Area 206728b5b stores the right actual eye location data which indicates the user's right eye in the actual three dimensional space data in (x,y,z) format. The right actual eye location data indicates the geographic location in the real world in (x,y,z) format.

This Paragraph [0310] illustrates the storage area(s) included in Entire Perspective View Data Storage Area 206728b6 (Paragraph [0306]). In the present embodiment, Entire Perspective View Data Storage Area 206728b6 includes Left Perspective View Data Storage Area 206728b6a and Right Perspective View Data Storage Area 206728b6b. Left Perspective View Data Storage Area 206728b6a stores the left perspective view data which indicates the perspective view of the actual three dimensional space data and the focal point adjacent displaying material data to display on Left Eye Displaying Device LEDD728 (Paragraph [0293]). Right Perspective View Data Storage Area 206728b6b stores the right perspective view data which indicates the perspective view of the actual three dimensional space data and the focal point adjacent displaying material data to display on Right Eye Displaying Device REDD728 (Paragraph [0293]).

This Paragraph [0311] illustrates the storage area(s) included in Entire Map Icon Data Storage Area 206728b9 (Paragraph [0306]). In the present embodiment, Entire Map Icon Data Storage Area 206728b9 includes Current Location Map Icon Data Storage Area 206728b9a, Focal Point Map Icon Data Storage Area 206728b9b, Focal Point Adjacent Displaying Material Shortcut Map Icon Data Storage Area 206728b9c, and Mouse Pointer Map Icon Data Storage Area 206728b9d. Current Location Map Icon Data Storage Area 206728b9a stores the current location icon data which is the three dimensional image of the icon utilized to indicate the current location data on the map data. Focal Point Map Icon Data Storage Area 206728b9b stores the focal point map icon data which is the three dimensional image of the icon utilized to indicate the focal point icon location data on the map data. Focal Point Adjacent Displaying Material Shortcut Map Icon Data Storage Area 206728b9c stores the focal point adjacent displaying material shortcut map icon data which is the three dimensional image of the icon utilized to indicate the focal point adjacent displaying material shortcut icon location data on the map data. Mouse Pointer Map Icon Data Storage Area 206728b9d stores the mouse pointer map icon data which is the three dimensional image of the icon utilized to indicate the mouse pointer location data on the map data.

This Paragraph [0312] illustrates the software program(s) stored in Actual Three Dimensional Space Near Focal Point Image Displaying Software Storage Area 206728c (Paragraph [0305]). In the present embodiment, Actual Three Dimensional Space Near Focal Point Image Displaying Software Storage Area 206728c stores Actual Three Dimensional Space Data Producing Software 206728c1, Focal Point Icon Location Data Producing Software 206728c2, Focal Point Icon Data Locating Software 206728c3, Focal Point Adjacent Displaying Material Shortcut Icon Location Data Producing Software 206728c4, Focal Point Adjacent Displaying Material Shortcut Icon Data Locating Software 206728c5, Mouse Pointer Location Data Producing Software 206728c6, Mouse Pointer Data Locating Software 206728c7, Focal Point Adjacent Displaying Material Location Data Producing Software 206728c8, Focal Point Adjacent Displaying Material Data Implementing Software 206728c9, Focal Point Adjacent Displaying Material Data Locating Software 206728c10, Current Location Data Producing Software 206728c11, Real World Location Map Icon Data Locating Software 206728c12, Left Perspective View Data Producing Software 206728c13, Right Perspective View Data Producing Software 206728c14, Left Perspective View Data Displaying Software 206728c15, and Right Perspective View Data Displaying Software 206728c16. Actual Three Dimensional Space Data Producing Software 206728c1 is the software program described in Paragraph [0313] and Paragraph [0330]. Focal Point Icon Location Data Producing Software 206728c2 is the software program described in Paragraph [0314] and Paragraph [0331]. Focal Point Icon Data Locating Software 206728c3 is the software program described in Paragraph [0332]. Focal Point Adjacent Displaying Material Shortcut Icon Location Data Producing Software 206728c4 is the software program described in Paragraph [0333]. Focal Point Adjacent Displaying Material Shortcut Icon Data Locating Software 206728c5 is the software program described in Paragraph [0334]. Mouse Pointer Location Data Producing Software 206728c6 is the software program described in Paragraph [0318] and Paragraph [0335]. Mouse Pointer Data Locating Software 206728c7 is the software program described in Paragraph [0336]. Focal Point Adjacent Displaying Material Location Data Producing Software 206728c8 is the software program described in Paragraph [0337]. Focal Point Adjacent Displaying Material Data Implementing Software 206728c9 is the software program described in Paragraph [0338]. Focal Point Adjacent Displaying Material Data Locating Software 206728c10 is the software program described in Paragraph [0339]. Current Location Data Producing Software 206728c11 is the software program described in Paragraph [0323] and Paragraph [0340]. Real World Location Map Icon Data Locating Software 206728c12 is the software program described in Paragraph [0341]. Left Perspective View Data Producing Software 206728c13 is the software program described in Paragraph [0342]. Right Perspective View Data Producing Software 206728c14 is the software program described in Paragraph [0343]. Left Perspective View Data Displaying Software 206728c15 is the software program described in Paragraph [0327] and Paragraph [0344]. Right Perspective View Data Displaying Software 206728c16 is the software program described in Paragraph [0328] and Paragraph [0345].

This Paragraph [0313] illustrate(s) Actual Three Dimensional Space Data Producing Software H728c1 (Paragraph [0302]) of Host H (Paragraph [0025]) and Actual Three Dimensional Space Data Producing Software 206728c1 (Paragraph [0312]) of Communication Device 200, which produce(s) the actual three dimensional space data. In the present embodiment, CPU 211 (FIG. 1) retrieves the visual data from Left Camera LC728 (Paragraph [0291]) (S1). CPU 211 (FIG. 1) retrieves the visual data from Right Camera RC728 (Paragraph [0291]) (S2). CPU 211 (FIG. 1) produces the actual three dimensional space data by utilizing the visual data retrieved in (S1 and the previous step and sends the data to Host H (Paragraph [0025]) in a wireless fashion (S3). Host H (Paragraph [0025]) receives the actual three dimensional space data from Communication Device 200 and stores the data in Actual Three Dimensional Space Data Storage Area H728b1 (Paragraph [0296]) (S4). The foregoing sequence is repeated periodically.

This Paragraph [0314] illustrate(s) Focal Point Icon Location Data Producing Software H728c2 (Paragraph [0302]) of Host H (Paragraph [0025]) and Focal Point Icon Location Data Producing Software 206728c2 (Paragraph [0312]) of Communication Device 200, which produce(s) the focal point icon location data. In the present embodiment, CPU 211 (FIG. 1) identifies the direction to which the left eye of the user is currently perceiving by utilizing Left Eye Tracking Device LETD728 (Paragraph [0292]) (S1). CPU 211 (FIG. 1) identifies the direction to which the right eye of the user is currently perceiving by utilizing Right Eye Tracking Device RETD728 (Paragraph [0292]) (S2). CPU 211 (FIG. 1) identifies the focal point of the user's eye in the actual three dimensional space data stored in Actual Three Dimensional Space Data Storage Area H728b1 (Paragraph [0296]) by referring to the directions identified in (S1 and the previous step (S3). CPU 211 (FIG. 1) produces the focal point icon location data by referring to the focal point of the user's eye identified in the previous step and sends the data to Host H (Paragraph [0025]) in a wireless fashion (S4). Host H (Paragraph [0025]) receives the focal point icon location data from Communication Device 200 and stores the data in Focal Point Icon Location Data Storage Area H728b2a (Paragraph [0297]) (S5). The foregoing sequence is repeated periodically.

This Paragraph [0315] illustrate(s) Focal Point Icon Data Locating Software H728c3 (Paragraph [0302]) of Host H (Paragraph [0025]), which locate(s) the focal point icon data in the actual three dimensional space data. In the present embodiment, Host H (Paragraph [0025]) retrieves the focal point icon data from Focal Point Icon Data Storage Area H728b3a (Paragraph [0298]) (S1). Host H (Paragraph [0025]) retrieves the focal point icon location data from Focal Point Icon Location Data Storage Area H728b2a (Paragraph [0297]) (S2). Host H (Paragraph [0025]) locates the focal point icon data retrieved in (S1 at the location corresponding to the focal point icon location data retrieved in the previous step in the actual three dimensional space data stored in Actual Three Dimensional Space Data Storage Area H728b1 (Paragraph [0296]) (S3). The foregoing sequence is repeated periodically.

This Paragraph [0316] illustrate(s) Focal Point Adjacent Displaying Material Shortcut Icon Location Data Producing Software H728c4 (Paragraph [0302]) of Host H (Paragraph [0025]), which produce(s) the focal point adjacent displaying material shortcut icon location data. In the present embodiment, Host H (Paragraph [0025]) retrieves the focal point icon location data from Focal Point Icon Location Data Storage Area H728b2a (Paragraph [0297]) (S1). Host H (Paragraph [0025]) produces the focal point adjacent displaying material shortcut icon location data by referring to the focal point icon location data retrieved in the previous step (S2). In the present embodiment, the focal point adjacent displaying material shortcut icon location data indicates a certain point located on the left hand side from the focal point icon location data at a certain distance therefrom. Host H (Paragraph [0025]) stores the focal point adjacent displaying material shortcut icon location data produced in the previous step in Focal Point Adjacent Displaying Material Shortcut Icon Location Data Storage Area H728b2b (Paragraph [0297]) (S3). The foregoing sequence is repeated periodically.

This Paragraph [0317] illustrate(s) Focal Point Adjacent Displaying Material Shortcut Icon Data Locating Software H728c5 (Paragraph [0302]) of Host H (Paragraph [0025]), which locate(s) the focal point adjacent displaying material shortcut icon data in the actual three dimensional space data. In the present embodiment, Host H (Paragraph [0025]) retrieves the focal point adjacent displaying material shortcut icon data from Focal Point Adjacent Displaying Material Shortcut Icon Data Storage Area H728b3b (Paragraph [0298]) (S1). Host H (Paragraph [0025]) retrieves the focal point adjacent displaying material shortcut icon location data from Focal Point Adjacent Displaying Material Shortcut Icon Location Data Storage Area H728b2b (Paragraph [0297]) (S2). Host H (Paragraph [0025]) locates the focal point adjacent displaying material shortcut icon data retrieved in (S1 at the location corresponding to the focal point adjacent displaying material shortcut icon location data retrieved in the previous step in the actual three dimensional space data stored in Actual Three Dimensional Space Data Storage Area H728b1 (Paragraph [0296]) (S3). The foregoing sequence is repeated periodically.

This Paragraph [0318] illustrate(s) Mouse Pointer Location Data Producing Software H728c6 (Paragraph [0302]) of Host H (Paragraph [0025]) and Mouse Pointer Location Data Producing Software 206728c6 (Paragraph [0312]) of Communication Device 200, which produce(s) the mouse pointer location data. In the present embodiment, the user of Communication Device 200 inputs, by utilizing Input Device 210 (FIG. 1) or via voice recognition system, the mouse pointer moving command (S1). Here, the mouse pointer moving command is the command to move the mouse pointer data in the actual three dimensional space data. The mouse pointer data may be moved to any direction in the actual three dimensional space data by this command. CPU 211 (FIG. 1) produces the mouse pointer location data by referring to the mouse pointer moving command input in the previous step and sends the data to Host H (Paragraph [0025]) in a wireless fashion (S2). Host H (Paragraph [0025]) receives the mouse pointer location data from Communication Device 200 and stores the data in Mouse Pointer Location Data Storage Area H728b2d (Paragraph [0297]) (S3). The foregoing sequence is repeated periodically.

This Paragraph [0319] illustrate(s) Mouse Pointer Data Locating Software H728c7 (Paragraph [0302]) of Host H (Paragraph [0025]), which locate(s) the mouse pointer data in the actual three dimensional space data. In the present embodiment, Host H (Paragraph [0025]) retrieves the mouse pointer data from Mouse Pointer Data Storage Area H728b3d (Paragraph [0298]) (S1). Host H (Paragraph [0025]) retrieves the mouse pointer location data from Mouse Pointer Location Data Storage Area H728b2d (Paragraph [0297]) (S2). Host H (Paragraph [0025]) locates the mouse pointer data retrieved in (S1 at the location corresponding to the mouse pointer location data retrieved in the previous step in the actual three dimensional space data stored in Actual Three Dimensional Space Data Storage Area H728b1 (Paragraph [0296]) (S3). The foregoing sequence is repeated periodically.

This Paragraph [0320] illustrate(s) Focal Point Adjacent Displaying Material Location Data Producing Software H728c8 (Paragraph [0302]) of Host H (Paragraph [0025]), which produce(s) the focal point adjacent displaying material location data. In the present embodiment, Host H (Paragraph [0025]) retrieves the focal point icon location data from Focal Point Icon Location Data Storage Area H728b2a (Paragraph [0297]) (S1). Host H (Paragraph [0025]) produces the focal point adjacent displaying material location data by referring to the focal point icon location data retrieved in the previous step (S2). In the present embodiment, the focal point adjacent displaying material location data indicates a certain point located on the right hand side from the focal point icon location data at a certain distance therefrom. Host H (Paragraph [0025]) stores the focal point adjacent displaying material location data produced in the previous step in Focal Point Adjacent Displaying Material Location Data Storage Area H728b2c (Paragraph [0297]) (S3). The foregoing sequence is repeated periodically.

This Paragraph [0321] illustrate(s) Focal Point Adjacent Displaying Material Data Implementing Software H728c9 (Paragraph [0302]) of Host H (Paragraph [0025]), which implement(s) the focal point adjacent displaying material data. In the present embodiment, Host H (Paragraph [0025]) retrieves the mouse pointer location data from Mouse Pointer Location Data Storage Area H728b2d (Paragraph [0297]) (S1). Host H (Paragraph [0025]) retrieves the focal point adjacent displaying material shortcut icon location data from Focal Point Adjacent Displaying Material Shortcut Icon Location Data Storage Area H728b2b (Paragraph [0297]) (S2). If the mouse pointer location data retrieved in (S1 and the focal point adjacent displaying material shortcut icon location data retrieved in the previous step matches, Host H (Paragraph [0025]) proceeds to the next step (S3). If the focal point adjacent displaying material data implementing command is input via Input Device 210 (FIG. 1) or voice recognition system, Host H (Paragraph [0025]) proceeds to the next step (S4). Here, the focal point adjacent displaying material data implementing command is the command to implement the focal point adjacent displaying material data. Host H (Paragraph [0025]) stores the focal point adjacent displaying material displaying positive data in Focal Point Adjacent Displaying Material Displaying Property Data Storage Area H728b4 (Paragraph [0296]) (S5). The foregoing sequence is repeated periodically.

This Paragraph [0322] illustrate(s) Focal Point Adjacent Displaying Material Data Locating Software H728c10 (Paragraph [0302]) of Host H (Paragraph [0025]), which locate(s) the focal point adjacent displaying material data in the actual three dimensional space data. In the present embodiment, Host H (Paragraph [0025]) identifies the data stored in Focal Point Adjacent Displaying Material Displaying Property Data Storage Area H728b4 (Paragraph [0296]) (S1). If the focal point adjacent displaying material displaying positive data is stored in Focal Point Adjacent Displaying Material Displaying Property Data Storage Area H728b4 (Paragraph [0296]), Host H (Paragraph [0025]) proceeds to the next step (S2). Host H (Paragraph [0025]) retrieves the focal point adjacent displaying material data from Focal Point Adjacent Displaying Material Data Storage Area H728b3c (Paragraph [0298]) (S3). Host H (Paragraph [0025]) retrieves the focal point adjacent displaying material location data from Focal Point Adjacent Displaying Material Location Data Storage Area H728b2c (Paragraph [0297]) (S4). Host H (Paragraph [0025]) locates the focal point adjacent displaying material data retrieved in S3 at the location corresponding to the focal point adjacent displaying material location data retrieved in the previous step in the actual three dimensional space data stored in Actual Three Dimensional Space Data Storage Area H728b1 (Paragraph [0296]) (S5). The foregoing sequence is repeated periodically.

This Paragraph [0323] illustrate(s) Current Location Data Producing Software H728c11 (Paragraph [0302]) of Host H (Paragraph [0025]) and Current Location Data Producing Software 206728c11 (Paragraph [0312]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step and sends the data to Host H (Paragraph [0025]) in a wireless fashion (S2). Host H (Paragraph [0025]) receives the current location data from Communication Device 200 and stores the data in Current Location Data Storage Area H728b7 (Paragraph [0296]) (S3). The foregoing sequence is repeated periodically.

This Paragraph [0324] illustrate(s) Real World Location Map Icon Data Locating Software H728c12 (Paragraph [0302]) of Host H (Paragraph [0025]), which locate(s) the map data in the actual three dimensional space data and locate(s) the map icons thereon. In the present embodiment, Host H (Paragraph [0025]) retrieves the map data from Map Data Storage Area H728b8 (Paragraph [0296])(S1). Host H (Paragraph [0025]) locates the map data retrieved in the previous step at a certain location in the actual three dimensional space data stored in Actual Three Dimensional Space Data Storage Area H728b1 (Paragraph [0296]) (S2). Host H (Paragraph [0025]) retrieves the current location icon data from Current Location Map Icon Data Storage Area H728b9a (Paragraph [0301]) (S3). Host H (Paragraph [0025]) retrieves the current location data from Current Location Data Storage Area H728b7 (Paragraph [0296]) (S4). Host H (Paragraph [0025]) locates the current location icon data retrieved in S3 at the location corresponding to the current location data retrieved in the previous step on the map data located in S2 (S5). Host H (Paragraph [0025]) retrieves the focal point map icon data from Focal Point Map Icon Data Storage Area H728b9b (Paragraph [0301]) (S6). Host H (Paragraph [0025]) retrieves the focal point icon location data from Focal Point Icon Location Data Storage Area H728b2a (Paragraph [0297]) (S7). Host H (Paragraph [0025]) locates the focal point map icon data retrieved in S6 at the location corresponding to the focal point icon location data retrieved in the previous step on the map data located in S2 (S8). Host H (Paragraph [0025]) retrieves the focal point adjacent displaying material shortcut map icon data from Focal Point Adjacent Displaying Material Shortcut Map Icon Data Storage Area H728b9c (Paragraph [0301]) (S9). Host H (Paragraph [0025]) retrieves the focal point adjacent displaying material shortcut icon location data from Focal Point Adjacent Displaying Material Shortcut Icon Location Data Storage Area H728b2b (Paragraph [0297]) (S10). Host H (Paragraph [0025]) locates the focal point adjacent displaying material shortcut map icon data retrieved in S9 at the location corresponding to the focal point adjacent displaying material shortcut icon location data retrieved in the previous step on the map data located in S2 (S11). Host H (Paragraph [0025]) retrieves the mouse pointer map icon data from Mouse Pointer Map Icon Data Storage Area H728b9d (Paragraph [0301]) (S12). Host H (Paragraph [0025]) retrieves the mouse pointer location data from Mouse Pointer Location Data Storage Area H728b2d (Paragraph [0297])(S13). Host H (Paragraph [0025]) locates the mouse pointer map icon data retrieved in (S12 at the location corresponding to the mouse pointer location data retrieved in the previous step on the map data located in S2 (S14). The foregoing sequence is repeated periodically.

This Paragraph [0325] illustrate(s) Left Perspective View Data Producing Software H728c13 (Paragraph [0302]) of Host H (Paragraph [0025]), which produce(s) the left perspective view data. In the present embodiment, Host H (Paragraph [0025]) retrieves the actual three dimensional space data from Actual Three Dimensional Space Data Storage Area H728b1 (Paragraph [0296]) (S1). Here, the focal point icon data, the focal point adjacent displaying material shortcut icon data, the focal point adjacent displaying material data, the mouse pointer data, and/or the map data (with the map icons located thereon) located in the actual three dimensional space data are also retrieved therefrom. Host H (Paragraph [0025]) retrieves the left actual eye location data from Left Actual Eye Location Data Storage Area H728b5a (Paragraph [0299]) (S2). Host H (Paragraph [0025]) produces the two dimensional image indicating the perspective view of the actual three dimensional space data retrieved in (S1 perceived from the location indicated by the left actual eye location data retrieved in the previous step (S3). Host H (Paragraph [0025]) stores the two dimensional image produced in the previous step as the left perspective view data in Left Perspective View Data Storage Area H728b6a (Paragraph [0300]) (S4). The foregoing sequence is repeated periodically.

This Paragraph [0326] illustrate(s) Right Perspective View Data Producing Software H728c14 (Paragraph [0302]) of Host H (Paragraph [0025]), which produce(s) the right perspective view data. In the present embodiment, Host H (Paragraph [0025]) retrieves the actual three dimensional space data from Actual Three Dimensional Space Data Storage Area H728b1 (Paragraph [0296]) (S1). Here, the focal point icon data, the focal point adjacent displaying material shortcut icon data, the focal point adjacent displaying material data, the mouse pointer data, and/or the map data (with the map icons located thereon) located in the actual three dimensional space data are also retrieved therefrom. Host H (Paragraph [0025]) retrieves the right actual eye location data from Right Actual Eye Location Data Storage Area H728b5b (Paragraph [0299]) (S2). Host H (Paragraph [0025]) produces the two dimensional image indicating the perspective view of the actual three dimensional space data retrieved in (S1 perceived from the location indicated by the right actual eye location data retrieved in the previous step (S3). Host H (Paragraph [0025]) stores the two dimensional image produced in the previous step as the right perspective view data in Right Perspective View Data Storage Area H728b6b (Paragraph [0300]) (S4). The foregoing sequence is repeated periodically.

This Paragraph [0327] illustrate(s) Left Perspective View Data Displaying Software H728c15 (Paragraph [0302]) of Host H (Paragraph [0025]) and Left Perspective View Data Displaying Software 206728c15 (Paragraph [0312]) of Communication Device 200, which display (s) the left perspective view data. In the present embodiment, Host H (Paragraph [0025]) retrieves the left perspective view data from Left Perspective View Data Storage Area H728b6a (Paragraph [0300]) and sends the data to Communication Device 200 (S1). CPU 211 (FIG. 1) receives the left perspective view data from Host H (Paragraph [0025]) in a wireless fashion and displays the data on Left Eye Displaying Device LEDD728 (Paragraph [0293]) (S2). The foregoing sequence is repeated periodically.

This Paragraph [0328] illustrate(s) Right Perspective View Data Displaying Software H728c16 (Paragraph [0302]) of Host H (Paragraph [0025]) and Right Perspective View Data Displaying Software 206728c16 (Paragraph [0312]) of Communication Device 200, which display (s) the right perspective view data. In the present embodiment, Host H (Paragraph [0025]) retrieves the right perspective view data from Right Perspective View Data Storage Area H728b6b (Paragraph [0300]) and sends the data to Communication Device 200 (S1). CPU 211 (FIG. 1) receives the right perspective view data from Host H (Paragraph [0025]) in a wireless fashion and displays the data on Right Eye Displaying Device REDD728 (Paragraph [0293]) (S2). By utilizing the method of binocular disparity, the user perceives the actual three dimensional space data, the focal point icon data, the focal point adjacent displaying material shortcut icon data, the focal point adjacent displaying material data, and/or the mouse pointer data located therein in a three dimensional manner. The foregoing sequence is repeated periodically.

Paragraph [0330] through Paragraph [0345] illustrate another embodiment wherein Communication Device 200 plays the major role in implementing the present function.

This Paragraph [0330] illustrate(s) Actual Three Dimensional Space Data Producing Software 206728c1 (Paragraph [0312]) of Communication Device 200, which produce(s) the actual three dimensional space data. In the present embodiment, CPU 211 (FIG. 1) retrieves the visual data from Left Camera LC728 (Paragraph [0291]) (S1). CPU 211 (FIG. 1) retrieves the visual data from Right Camera RC728 (Paragraph [0291]) (S2). CPU 211 (FIG. 1) produces the actual three dimensional space data by utilizing the visual data retrieved in (S1 and the previous step (S3). CPU 211 (FIG. 1) stores the actual three dimensional space data produced in the previous step in Actual Three Dimensional Space Data Storage Area 206728b1 (Paragraph [0306]) (S4). The foregoing sequence is repeated periodically.

This Paragraph [0331] illustrate(s) Focal Point Icon Location Data Producing Software 206728c2 (Paragraph [0312]) of Communication Device 200, which produce(s) the focal point icon location data. In the present embodiment, CPU 211 (FIG. 1) identifies the direction to which the left eye of the user is currently perceiving by utilizing Left Eye Tracking Device LETD728 (Paragraph [0292]) (S1). CPU 211 (FIG. 1) identifies the direction to which the right eye of the user is currently perceiving by utilizing Right Eye Tracking Device RETD728 (Paragraph [0292]) (S2). CPU 211 (FIG. 1) identifies the focal point of the user's eye in the actual three dimensional space data stored in Actual Three Dimensional Space Data Storage Area 206728b1 (Paragraph [0306]) by referring to the directions identified in (S1 and the previous step (S3). CPU 211 (FIG. 1) produces the focal point icon location data by referring to the focal point of the user's eye identified in the previous step (S4). CPU 211 (FIG. 1) stores the focal point icon location data produced in the previous step in Focal Point Icon Location Data Storage Area 206728b2a (Paragraph [0307]) (S5). The foregoing sequence is repeated periodically.

This Paragraph [0332] illustrate(s) Focal Point Icon Data Locating Software 206728c3 (Paragraph [0312]) of Communication Device 200, which locate(s) the focal point icon data in the actual three dimensional space data. In the present embodiment, CPU 211 (FIG. 1) retrieves the focal point icon data from Focal Point Icon Data Storage Area 206728b3a (Paragraph [0308]) (S1). CPU 211 (FIG. 1) retrieves the focal point icon location data from Focal Point Icon Location Data Storage Area 206728b2a (Paragraph [0307]) (S2). CPU 211 (FIG. 1) locates the focal point icon data retrieved in (S1 at the location corresponding to the focal point icon location data retrieved in the previous step in the actual three dimensional space data stored in Actual Three Dimensional Space Data Storage Area 206728b1 (Paragraph [0306]) (S3). The foregoing sequence is repeated periodically.

This Paragraph [0333] illustrate(s) Focal Point Adjacent Displaying Material Shortcut Icon Location Data Producing Software 206728c4 (Paragraph [0312]) of Communication Device 200, which produce(s) the focal point adjacent displaying material shortcut icon location data. In the present embodiment, CPU 211 (FIG. 1) retrieves the focal point icon location data from Focal Point Icon Location Data Storage Area 206728b2a (Paragraph [0307]) (S1). CPU 211 (FIG. 1) produces the focal point adjacent displaying material shortcut icon location data by referring to the focal point icon location data retrieved in the previous step (S2). In the present embodiment, the focal point adjacent displaying material shortcut icon location data indicates a certain point located on the left hand side from the focal point icon location data at a certain distance therefrom. CPU 211 (FIG. 1) stores the focal point adjacent displaying material shortcut icon location data produced in the previous step in Focal Point Adjacent Displaying Material Shortcut Icon Location Data Storage Area 206728b2b (Paragraph [0307]) (S3). The foregoing sequence is repeated periodically.

This Paragraph [0334] illustrate(s) Focal Point Adjacent Displaying Material Shortcut Icon Data Locating Software 206728c5 (Paragraph [0312]) of Communication Device 200, which locate(s) the focal point adjacent displaying material shortcut icon data in the actual three dimensional space data. In the present embodiment, CPU 211 (FIG. 1) retrieves the focal point adjacent displaying material shortcut icon data from Focal Point Adjacent Displaying Material Shortcut Icon Data Storage Area 206728b3b (Paragraph [0308]) (S1). CPU 211 (FIG. 1) retrieves the focal point adjacent displaying material shortcut icon location data from Focal Point Adjacent Displaying Material Shortcut Icon Location Data Storage Area 206728b2b (Paragraph [0307]) (S2). CPU 211 (FIG. 1) locates the focal point adjacent displaying material shortcut icon data retrieved in (S1 at the location corresponding to the focal point adjacent displaying material shortcut icon location data retrieved in the previous step in the actual three dimensional space data stored in Actual Three Dimensional Space Data Storage Area 206728b1 (Paragraph [0306]) (S3). The foregoing sequence is repeated periodically.

This Paragraph [0335] illustrate(s) Mouse Pointer Location Data Producing Software 206728c6 (Paragraph [0312]) of Communication Device 200, which produce(s) the mouse pointer location data. In the present embodiment, the user of Communication Device 200 inputs, by utilizing Input Device 210 (FIG. 1) or via voice recognition system, the mouse pointer moving command (S1). Here, the mouse pointer moving command is the command to move the mouse pointer data in the actual three dimensional space data. The mouse pointer data may be moved to any direction in the actual three dimensional space data by this command CPU 211 (FIG. 1) produces the mouse pointer location data by referring to the mouse pointer moving command input in the previous step (S2). CPU 211 (FIG. 1) stores the mouse pointer location data produced in the previous step in Mouse Pointer Location Data Storage Area 206728b2d (Paragraph [0307]) (S3). The foregoing sequence is repeated periodically.

This Paragraph [0336] illustrate(s) Mouse Pointer Data Locating Software 206728c7 (Paragraph [0312]) of Communication Device 200, which locate(s) the mouse pointer data in the actual three dimensional space data. In the present embodiment, CPU 211 (FIG. 1) retrieves the mouse pointer data from Mouse Pointer Data Storage Area 206728b3d (Paragraph [0308]) (S1). CPU 211 (FIG. 1) retrieves the mouse pointer location data from Mouse Pointer Location Data Storage Area 206728b2d (Paragraph [0307]) (S2). CPU 211 (FIG. 1) locates the mouse pointer data retrieved in (S1 at the location corresponding to the mouse pointer location data retrieved in the previous step in the actual three dimensional space data stored in Actual Three Dimensional Space Data Storage Area 206728b1 (Paragraph [0306]) (S3). The foregoing sequence is repeated periodically.

This Paragraph [0337] illustrate(s) Focal Point Adjacent Displaying Material Location Data Producing Software 206728c8 (Paragraph [0312]) of Communication Device 200, which produce(s) the focal point adjacent displaying material location data. In the present embodiment, CPU 211 (FIG. 1) retrieves the focal point icon location data from Focal Point Icon Location Data Storage Area 206728b2a (Paragraph [0307]) (S1). CPU 211 (FIG. 1) produces the focal point adjacent displaying material location data by referring to the focal point icon location data retrieved in the previous step (S2). In the present embodiment, the focal point adjacent displaying material location data indicates a certain point located on the right hand side from the focal point icon location data at a certain distance therefrom. CPU 211 (FIG. 1) stores the focal point adjacent displaying material location data produced in the previous step in Focal Point Adjacent Displaying Material Location Data Storage Area 206728b2c (Paragraph [0307]) (S3). The foregoing sequence is repeated periodically.

This Paragraph [0338] illustrate(s) Focal Point Adjacent Displaying Material Data Implementing Software 206728c9 (Paragraph [0312]) of Communication Device 200, which implement(s) the focal point adjacent displaying material data. In the present embodiment, CPU 211 (FIG. 1) retrieves the mouse pointer location data from Mouse Pointer Location Data Storage Area 206728b2d (Paragraph [0307]) (S1). CPU 211 (FIG. 1) retrieves the focal point adjacent displaying material shortcut icon location data from Focal Point Adjacent Displaying Material Shortcut Icon Location Data Storage Area 206728b2b (Paragraph [0307]) (S2). If the mouse pointer location data retrieved in (S1 and the focal point adjacent displaying material shortcut icon location data retrieved in the previous step matches, CPU 211 (FIG. 1) proceeds to the next step (S3). If the focal point adjacent displaying material data implementing command is input via Input Device 210 (FIG. 1) or voice recognition system, CPU 211 (FIG. 1) proceeds to the next step (S4). Here, the focal point adjacent displaying material data implementing command is the command to implement the focal point adjacent displaying material data. CPU 211 (FIG. 1) stores the focal point adjacent displaying material displaying positive data in Focal Point Adjacent Displaying Material Displaying Property Data Storage Area 206728b4 (Paragraph [0306]) (S5). The foregoing sequence is repeated periodically.

This Paragraph [0339] illustrate(s) Focal Point Adjacent Displaying Material Data Locating Software 206728c10 (Paragraph [0312]) of Communication Device 200, which locate(s) the focal point adjacent displaying material data in the actual three dimensional space data. In the present embodiment, CPU 211 (FIG. 1) identifies the data stored in Focal Point Adjacent Displaying Material Displaying Property Data Storage Area 206728b4 (Paragraph [0306]) (S1). If the focal point adjacent displaying material displaying positive data is stored in Focal Point Adjacent Displaying Material Displaying Property Data Storage Area 206728b4 (Paragraph [0306]), CPU 211 (FIG. 1) proceeds to the next step (S2). CPU 211 (FIG. 1) retrieves the focal point adjacent displaying material data from Focal Point Adjacent Displaying Material Data Storage Area 206728b3c (Paragraph [0308]) (S3). CPU 211 (FIG. 1) retrieves the focal point adjacent displaying material location data from Focal Point Adjacent Displaying Material Location Data Storage Area 206728b2c (Paragraph [0307]) (S4). CPU 211 (FIG. 1) locates the focal point adjacent displaying material data retrieved in S3 at the location corresponding to the focal point adjacent displaying material location data retrieved in the previous step in the actual three dimensional space data stored in Actual Three Dimensional Space Data Storage Area 206728b1 (Paragraph [0306]) (S5). The foregoing sequence is repeated periodically.

This Paragraph [0340] illustrate(s) Current Location Data Producing Software 206728c11 (Paragraph [0312]) of Communication Device 200, which produce(s) the current location data. In the present embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206728b7 (Paragraph [0306]) (S3). The foregoing sequence is repeated periodically.

This Paragraph [0341] illustrate(s) Real World Location Map Icon Data Locating Software 206728c12 (Paragraph [0312]) of Communication Device 200, which locate(s) the map data in the actual three dimensional space data and locate(s) the map icons thereon. In the present embodiment, CPU 211 (FIG. 1) retrieves the map data from Map Data Storage Area 206728b8 (Paragraph [0306])(S1). CPU 211 (FIG. 1) locates the map data retrieved in the previous step at a certain location in the actual three dimensional space data stored in Actual Three Dimensional Space Data Storage Area 206728b1 (Paragraph [0306]) (S2). CPU 211 (FIG. 1) retrieves the current location icon data from Current Location Map Icon Data Storage Area 206728b9a (Paragraph [0311]) (S3). CPU 211 (FIG. 1) retrieves the current location data from Current Location Data Storage Area 206728b7 (Paragraph [0306]) (S4). CPU 211 (FIG. 1) locates the current location icon data retrieved in S3 at the location corresponding to the current location data retrieved in the previous step on the map data located in S2 (S5). CPU 211 (FIG. 1) retrieves the focal point map icon data from Focal Point Map Icon Data Storage Area 206728b9b (Paragraph [0311]) (S6). CPU 211 (FIG. 1) retrieves the focal point icon location data from Focal Point Icon Location Data Storage Area 206728b2a (Paragraph [0307]) (S7). CPU 211 (FIG. 1) locates the focal point map icon data retrieved in S6 at the location corresponding to the focal point icon location data retrieved in the previous step on the map data located in S2 (S8). CPU 211 (FIG. 1) retrieves the focal point adjacent displaying material shortcut map icon data from Focal Point Adjacent Displaying Material Shortcut Map Icon Data Storage Area 206728b9c (Paragraph [0311]) (S9). CPU 211 (FIG. 1) retrieves the focal point adjacent displaying material shortcut icon location data from Focal Point Adjacent Displaying Material Shortcut Icon Location Data Storage Area 206728b2b (Paragraph [0307]) (S10). CPU 211 (FIG. 1) locates the focal point adjacent displaying material shortcut map icon data retrieved in S9 at the location corresponding to the focal point adjacent displaying material shortcut icon location data retrieved in the previous step on the map data located in S2 (S11). CPU 211 (FIG. 1) retrieves the mouse pointer map icon data from Mouse Pointer Map Icon Data Storage Area 206728b9d (Paragraph [0311]) (S12). CPU 211 (FIG. 1) retrieves the mouse pointer location data from Mouse Pointer Location Data Storage Area 206728b2d (Paragraph [0307]) (S13). CPU 211 (FIG. 1) locates the mouse pointer map icon data retrieved in (S12 at the location corresponding to the mouse pointer location data retrieved in the previous step on the map data located in S2 (S14). The foregoing sequence is repeated periodically.

This Paragraph [0342] illustrate(s) Left Perspective View Data Producing Software 206728c13 (Paragraph [0312]) of Communication Device 200, which produce(s) the left perspective view data. In the present embodiment, CPU 211 (FIG. 1) retrieves the actual three dimensional space data from Actual Three Dimensional Space Data Storage Area 206728b1 (Paragraph [0306]) (S1). Here, the focal point icon data, the focal point adjacent displaying material shortcut icon data, the focal point adjacent displaying material data, the mouse pointer data, and/or the map data (with the map icons located thereon) located in the actual three dimensional space data are also retrieved therefrom. CPU 211 (FIG. 1) retrieves the left actual eye location data from Left Actual Eye Location Data Storage Area 206728b5a (Paragraph [0309]) (S2). CPU 211 (FIG. 1) produces the two dimensional image indicating the perspective view of the actual three dimensional space data retrieved in (S1 perceived from the location indicated by the left actual eye location data retrieved in the previous step (S3). CPU 211 (FIG. 1) stores the two dimensional image produced in the previous step as the left perspective view data in Left Perspective View Data Storage Area 206728b6a (Paragraph [0310]) (S4). The foregoing sequence is repeated periodically.

This Paragraph [0343] illustrate(s) Right Perspective View Data Producing Software 206728c14 (Paragraph [0312]) of Communication Device 200, which produce(s) the right perspective view data. In the present embodiment, CPU 211 (FIG. 1) retrieves the actual three dimensional space data from Actual Three Dimensional Space Data Storage Area 206728b1 (Paragraph [0306]) (S1). Here, the focal point icon data, the focal point adjacent displaying material shortcut icon data, the focal point adjacent displaying material data, the mouse pointer data, and/or the map data (with the map icons located thereon) located in the actual three dimensional space data are also retrieved therefrom. CPU 211 (FIG. 1) retrieves the right actual eye location data from Right Actual Eye Location Data Storage Area 206728b5b (Paragraph [0309]) (S2). CPU 211 (FIG. 1) produces the two dimensional image indicating the perspective view of the actual three dimensional space data retrieved in (S1 perceived from the location indicated by the right actual eye location data retrieved in the previous step (S3). CPU 211 (FIG. 1) stores the two dimensional image produced in the previous step as the right perspective view data in Right Perspective View Data Storage Area 206728b6b (Paragraph [0310]) (S4). The foregoing sequence is repeated periodically.

This Paragraph [0344] illustrate(s) Left Perspective View Data Displaying Software 206728c15 (Paragraph [0312]) of Communication Device 200, which display(s) the left perspective view data. In the present embodiment, CPU 211 (FIG. 1) retrieves the left perspective view data from Left Perspective View Data Storage Area 206728b6a (Paragraph [0310]) (S1). CPU 211 (FIG. 1) displays the left perspective view data on Left Eye Displaying Device LEDD728 (Paragraph [0293]) (S2). The foregoing sequence is repeated periodically.

This Paragraph [0345] illustrate(s) Right Perspective View Data Displaying Software 206728c16 (Paragraph [0312]) of Communication Device 200, which display(s) the right perspective view data. In the present embodiment, CPU 211 (FIG. 1) retrieves the right perspective view data from Right Perspective View Data Storage Area 206728b6b (Paragraph [0310]) (S1). CPU 211 (FIG. 1) displays the right perspective view data on Right Eye Displaying Device REDD728 (Paragraph [0293]) (S2). By utilizing the method of binocular disparity, the user perceives the actual three dimensional space data, the focal point icon data, the focal point adjacent displaying material shortcut icon data, the focal point adjacent displaying material data, and/or the mouse pointer data located therein in a three dimensional manner. The foregoing sequence is repeated periodically.

<<Incorporation By Reference>>

The following paragraphs and drawings described in U.S. Ser. No. 12/164,218 filed 2008 Jun. 30, are particularly incorporated to this application by reference: the preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror Function (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 950f); Digital Camera Function described in paragraphs [3667] through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); Vital Sign Monitoring Function described in paragraphs [4920] through [5009] (FIGS. 1890a through 1954); Three-Dimensional Map described in (FIGS. 2 and 3); Auto Collision Avoiding Function described in (FIGS. 4 through 7); Remote Controlling System described in (FIG. 8a through FIG. 10); Emergency Landing System described in (FIG. 11 through FIG. 12b); Connection Between Host H And Carrier 300 described in (FIG. 13); 3D Map Data Updating Function described in (FIGS. 16 through 30); Auto Collision Avoiding Function—Other Embodiments described in (FIGS. 31 through 34); Satellite TV Function described in (FIGS. 35 through 50); Wireless Communication Facilitating System described in (FIGS. 51 through 64b); Three-Dimensional Map described in (??); Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs

[5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518f); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); PhonebookAuto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495e); Hybrid Carrier Function described in paragraphs [5009.5073] through [5009.5105] (FIGS. 5496 through 5522b); Carrier Current Condition Monitoring Function described in paragraphs [5009.5106] through [5009.5141] (FIGS. 5523 through 5546c); Memory Defragmenting Function described in paragraphs [5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294] (FIGS. 5630 through 5648c); Alternative TV Program Receiving Function described in paragraphs [5009.5295] through [5009.5325] (FIGS. 5649 through 5670c); Alternative Radio Program Receiving Function described in paragraphs [5009.5326] through [5009.5356] (FIGS. 5671 through 5692c); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747b); Pre-Installed Item Purchasing Function described in paragraphs [5009.5432] through [5009.5470] (FIGS. 5748 through 5775b); Multiple CPU Function described in paragraphs [5009.5471] through [5009.5476] (FIGS. 5776 and 5777); Radio Music Downloading Function described in paragraphs [5009.5477] through [5009.5516] (FIGS. 5778 through 5807); File Auto Saving Function described in paragraphs [5009.5517] through [5009.5559] (FIGS. 5808 through 5837b); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884b); Remote Room Light Controlling Function described in paragraphs [5009.5630] through [5009.5662] (FIGS. 5885 through 5906b); Remote Kitchen Stove Controlling Function described in paragraphs [5009.5663] through [5009.5695] (FIGS. 5907 through 5928b); Remote Refrigerator Controlling Function described in paragraphs [5009.5696] through [5009.5728] (FIGS. 5929 through 5950b); Remote Washing Machine Controlling Function described in paragraphs [5009.5729] through [5009.5761] (FIGS. 5951 through 5972b); Remote Faucet Controlling Function described in paragraphs [5009.5762] through [5009.5794] (FIGS. 5973 through 5994b); Remote Door Lock Controlling Function described in paragraphs [5009.5795] through [5009.5827] (FIGS. 5995 through 6016b); Remote Air Conditioner Controlling Function described in paragraphs [5009.5828] through [5009.5860] (FIGS. 6017 through 6038b); Remote Vending Machine Controlling Function described in paragraphs [5009.5861] through [5009.5893] (FIGS. 6039 through 6060b); Remote Video Recorder Controlling Function described in paragraphs [5009.5894] through [5009.5926] (FIGS. 6061 through 6082b); Remote Printer Controlling Function described in paragraphs [5009.5927] through [5009.5959] (FIGS. 6083 through 6104b); Remote Camera Controlling Function described in paragraphs [5009.5960] through [5009.5992] (FIGS. 6105 through 6126b); Remote TV Tuner Controlling Function described in paragraphs [5009.5993] through [5009.6025] (FIGS. 6127 through 6148b); Remote Radio Tuner Controlling Function described in paragraphs [5009.6026] through [5009.6058] (FIGS. 6149 through 6170b); Remote Computer Controlling Function described in paragraphs [5009.6059] through [5009.6091] (FIGS. 6171 through 6192b); Remote Carrier Controlling Function described in paragraphs [5009.6092] through [5009.6124] (FIGS. 6193 through 6214b); Remote Food Processor Controlling Function described in paragraphs [5009.6125] through [5009.6157] (FIGS. 6215 and 6236b); Remote Dryer Controlling Function described in paragraphs [5009.6158] through [5009.6190] (FIGS. 6237 and 6258b); Remote Rice Cooker Controlling Function described in paragraphs [5009.6191] through [5009.6223] (FIGS. 6259 and 6280b); Remote Sound Outputting Device Controlling Function described in paragraphs [5009.6224] through [5009.6256] (FIGS. 6281 and 6302b); Remote Vacuum Cleaner Controlling Function described in paragraphs [5009.6257] through [5009.6289] (FIGS. 6303 and 6324b); Remote FAX Machine Controlling Function described in paragraphs [5009.6290] through [5009.6322] (FIGS. 6325 and 6346b); Remote Copying Machine Controlling Function described in paragraphs [5009.6323] through [5009.6355] (FIGS. 6347 and 6368b); Remote Coffee Maker Controlling Function described in paragraphs [5009.6356] through [5009.6388] (FIGS. 6369 and 6390b); Remote Scanner Controlling Function described in paragraphs [5009.6389] through [5009.6421] (FIGS. 6391 and 6412b); Remote Clothes Iron Controlling Function described in paragraphs [5009.6422] through [5009.6454] (FIGS. 6413 and 6434b); Remote Escalator Controlling Function described in paragraphs [5009.6455] through [5009.6487] (FIGS. 6435 and 6456b); Vending Machine Accessing Function described in paragraphs [5009.6488] through [5009.6527] (FIGS. 6457 through 6485d); Audiovisual Data Shuffling Function described in paragraphs [5009.6528] through [5009.6551] (FIGS. 6486 through 6503b); Unknown File Icon Displaying Function described in paragraphs [5009.6552] through [5009.6575] (FIGS. 6504 through 6521c); Audiovisual Document Producing Function described in paragraphs [5009.6576] through [5009.6601] (FIGS. 6522 through 6539b); Audiovisual Data Searching Function described in paragraphs [5009.6602] through [5009.6626] (FIGS. 6540 through 6558b); Finger Print Log-on Function described in paragraphs [5009.6627] through [5009.6645] (FIGS. 6559 through 6571c); Voice Print Log-on Function described in paragraphs [5009.6646] through [5009.6663] (FIGS. 6572 through 6583c); Finger Print Screen Saver Deactivating Function described in paragraphs [5009.6664] through [5009.6682] (FIGS. 6584 through 6596c); Voice Print Screen Saver Deactivating Function described in paragraphs [5009.6683] through [5009.6700] (FIGS. 6597 through 6608c); Finger Print Folder Accessing Function described in paragraphs [5009.6701] through [5009.6719] (FIGS. 6609 through 6621c); Voice Print Folder Accessing Function described in paragraphs [5009.6720] through [5009.6737] (FIGS. 6622 through 6633c); Finger Print File Accessing Function described in paragraphs [5009.6738] through

[5009.6756] (FIGS. 6634 through 6646c); Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs [5009.7024] through [5009.7050] (FIGS. 6840 through 6859b); Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs [5009.7134] through [5009.7157] (FIGS. 6917 through 6932b); Audiovisual Data Downloading Function described in paragraphs [5009.7158] through [5009.7218] (FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536] through [5009.7585] (FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8098] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [5009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448] (FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [5009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695] (FIGS. 8036 through 8050b); Electric Cable Networking Function described in paragraphs [5009.8696] through [5009.8707] (FIGS. 8051 through 8057); Shoe Sole Pressure Adjusting Function described in paragraphs [5009.8708] through [5009.8741] (FIGS. 8058 through 8080b); Finger Print Removal Media Accessing Function described in paragraphs [5009.8742] through [5009.8762] (FIGS. 8081 through 8095b); Voice Print Removal Media Accessing Function described in paragraphs [5009.8763] through [5009.8783] (FIGS. 8096 through 8110b); Vein Print Removal Media Accessing Function described in paragraphs [5009.8784] through [5009.8804] (FIGS. 8111 through 8125b); Finger Print PC Removal Media Accessing Function described in paragraphs [5009.8805] through [5009.8833] (FIGS. 8126 through 8145b); Voice Print PC Removal Media Accessing Function described in paragraphs [5009.8834] through [5009.8862] (FIGS. 8146 through 8165b); Vein Print PC Removal Media Accessing Function described in paragraphs [5009.8863] through [5009.8891] (FIGS. 8166 through 8185b); Printer Function described in paragraphs [5009.8892] through [5009.8967] (FIGS. 8186 through 8245f); Scanner Function described in paragraphs [5009.8968] through [5009.9016] (FIGS. 8246 through 8284b); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504b); Noise Reversing Function described in paragraphs [5009.9274] through [5009.9291] (FIGS. 8505 through 8516); Door Status Sensoring Function described in paragraphs [5009.9292] through [5009.9345] (FIGS. 8517 through 8557); Drawer Status Sensoring Function described in paragraphs [5009.9346] through [5009.9399] (FIGS. 8558 through 8598); Window Status Sensoring Function described in paragraphs [5009.9400] through [5009.9453] (FIGS. 8599 through 8639); Curtain Status Sensoring Function described in paragraphs [5009.9454] through [5009.9509] (FIGS. 8640 through 8680); Gate Status Sensoring Function described in paragraphs [5009.9510] through [5009.9563] (FIGS. 8681 through 8721); Stop Watch Function described in paragraphs [5009.9564] through [5009.9584] (FIGS. 8722 through 8736b); Decrementing Time Function described in paragraphs [5009.9585] through [5009.9607] (FIGS. 8737 through 8753b); Energy Efficient Multiple CPU Function described in paragraphs [5009.9608] through [5009.9636] (FIGS. 8754 through 8776b); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958b); Advertisement Auto Outputting Function described in paragraphs [5009.9868] through [5009.9905] (FIGS. 8959 through 8990b); Online RPG Function described in paragraphs [5009.9906] through [5009.10028] (FIGS. 8991 through 9098b); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171c); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258b); Face Feature Log-on Function described in paragraphs [5009.10256] through [5009.10273] (FIGS. 9259 through 9270c); Face Feature Screen Saver Deactivating Function described in paragraphs [5009.10274] through [5009.10291] (FIGS. 9271 through 9282c); Face Feature Folder Accessing Function described in paragraphs [5009.10292] through [5009.10309] (FIGS. 9283 through 9294c); Face Feature File Accessing Function described in paragraphs [5009.10310] through [5009.10327] (FIGS. 9295 through 9306c); Face Feature Internet Accessing Function described in paragraphs [5009.10328] through [5009.10345] (FIGS. 9307 through 9318c); Face Feature PC Log-on Function described in paragraphs [5009.10346] through [5009.10371] (FIGS. 9319 through 9337b); Face Feature PC Screen Saver Deactivating Function described in paragraphs [5009.10372] through [5009.10397] (FIGS. 9338 through 9356b); Face Feature PC Folder Accessing Function described in paragraphs [5009.10398] through [5009.10423] (FIGS. 9357 through 9375b); Face Feature PC File Accessing Function described in paragraphs [5009.10424] through [5009.10449] (FIGS. 9376 through 9394b); Face Feature PC Internet Accessing Function described in paragraphs [5009.10450] through [5009.10475] (FIGS. 9395 through 9413b); Face Feature Removal Media Accessing Function described in paragraphs [5009.10476] through [5009.10496] (FIGS. 9414 through 9428b); Face Feature PC Removal Media Accessing Function described in paragraphs [5009.10497] through [5009.10524] (FIGS. 9429 through 9448b); Security Formatted Removal Media Function described in paragraphs [5009.10525] through [5009.10545] (FIGS. 9449 through 9463b); Lite Security Formatted Removal Media Function described in paragraphs [5009.10546] through [5009.10568] (FIGS. 9464 through 9480b); Security Formatted Folder Function described in paragraphs [5009.10569] through [5009.10605] (FIGS. 9481 through 9509b); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557b); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577 through 9599c); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629b); Secured Email Opening Function described in paragraphs [5009.10771] through [5009.10793] (FIGS. 9630 through 9645b); Secured Email Attached File Opening Function described in paragraphs [5009.10794] through [5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275] through [5009.13320] (FIGS. 11587 through 11622b); QR Code News Clip Communicating Function described in paragraphs [5009.13321] through [5009.13366] (FIGS. 11623 through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs

[5009.13809] through [5009.13858] (FIGS. 12011 through 12050b); RFID Visual Clip Communicating Function described in paragraphs [5009.13859] through [5009.13908] (FIGS. 12051 through 12090b); RFID Weather Forecast Communicating Function described in paragraphs [5009.13909] through [5009.13958] (FIGS. 12091 through 12130b); RFID News Clip Communicating Function described in paragraphs [5009.13959] through [5009.14008] (FIGS. 12131 through 12170b); RFID Map Clip Communicating Function described in paragraphs [5009.14009] through [5009.14058] (FIGS. 12171 through 12210b); RFID Software Activating Function described in paragraphs [5009.14059] through [5009.14108] (FIGS. 12211 through 12250b); RFID Software Auto Activating Function described in paragraphs [5009.14109] through [5009.14158] (FIGS. 12251 through 12290b); Carrier Arrival Time Displaying Function described in paragraphs [5009.14159] through [5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559b); Caller Answering Machine Activating Function described in paragraphs [5009.14475] through [5009.14513] (FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721b); Road Map Displaying Function described in paragraphs [5009.14680] through [5009.14752] (FIGS. 12722 through 12785b); Email Reading Function described in paragraphs [5009.14753] through [5009.14781] (FIGS. 12786 through 12805c); Stand Alone Email Function described in paragraphs [5009.14782] through [5009.14850] (FIGS. 12806 through 12857b); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231c); Lost Com Device Beaconing Function described in paragraphs [5009.15276] through [5009.15353] (FIGS. 13232 through 13296); Area&Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497b); Virtual Folder Displaying Function described in paragraphs [5009.15587] through [5009.15647] (FIGS. 13498 through 13548b); In-carrier Location Notifying Function described in paragraphs [5009.15648] through [5009.15703] (FIGS. 13549 through 13595c); Address Map Auto Displaying Function described in paragraphs [5009.15704] through [5009.15771] (FIGS. 13596 through 13650c); Brain Wave Device Controlling Function described in paragraphs [5009.15772] through [5009.15806] (FIGS. 13651 through 13679b); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through [5009.15952] (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985c); Brain Wave Carrier Controlling Function described in paragraphs [5009.16167] through [5009.16202] (FIGS. 13986 through 14015b); Electronic Billboard Controlling Function described in paragraphs [5009.16203] through [5009.16323] (FIGS. 14016 through 14123e); Common Phone Number Function described in paragraphs [5009.16324] through [5009.16424] (FIGS. 14124 through 14212c); Hybrid Common Phone Number Function described in paragraphs [5009.16425] through [5009.16525] (FIGS. 14213 through 14301c); Ringtone Volume Auto Adjusting Function described in paragraphs [5009.16526] through [5009.16547] (FIGS. 14302 through 14317b); Ringtone Type Auto Selecting Function described in paragraphs [5009.16548] through [5009.16575] (FIGS. 14318 through 14339b); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471b); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878g); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072b); Event Triggered Auto Audio Recording Function described in paragraphs [5009.17403] through [5009.17449] (FIGS. 15073 through 15108b); Audiovisual Message Bulk Transferring Function described in paragraphs [5009.17450] through [5009.17501] (FIGS. 15109 through 15150b); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321b); Window Status Monitoring Function described in paragraphs [5009.17701] through [5009.17730] (FIGS. 15322 through 15343b); Door Monitoring Function described in paragraphs [5009.17731] through [5009.17760] (FIGS. 15344 through 15365b); Door Monitoring Function described in paragraphs [5009.17761] through [5009.17790] (FIGS. 15366 through 15387b); Push-To-Talk Function described in paragraphs [5009.17791] through [5009.18008] (FIGS. 15388 through 15586c Push-To-T); Door Open Monitoring Function described in paragraphs [5009.18009] through [5009.18065] (FIGS. 15587 through 15633b); Window Open Monitoring Function described in paragraphs [5009.18066] through [5009.18122] (FIGS. 15634 through 15680b); Lock Open Monitoring Function described in paragraphs [5009.18123] through [5009.18179] (FIGS. 15681 through 15727b); Destination Proceeding Function described in paragraphs [5009.18180] through [5009.18265] (FIGS. 15728 through 15803d); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932b); Curtain Open Monitoring Function described in paragraphs [5009.18423] through [5009.18479] (FIGS. 15933 through 15979b); Gate Open Monitoring Function described in paragraphs [5009.18480] through [5009.18536] (FIGS. 15980 through 16026b); Faucet Open Monitoring Function described in paragraphs [5009.18537] through [5009.18593] (FIGS. 16027 through 16073b); Hybrid Refrigerator Function described in paragraphs [5009.18594] through [5009.18695] (FIGS. 16074 through 16159b); Multiple Purpose Chamber Function described in paragraphs [5009.18696] through [5009.18869] (FIGS. 16160 through 16312c); Audiovisual Quality Auto Adjusting Function described in paragraphs [5009.18870] through [5009.18930] (FIGS. 16313 through 16363b); Audio Quality Auto Adjusting Function described in paragraphs [5009.18931] through [5009.18991] (FIGS. 16364 through 16414b); TV Phone Quality Auto Adjusting Function described in paragraphs [5009.18992] through [5009.19100] (FIGS. 16415 through 16512); Voice Phone Quality Auto Adjusting Function described in paragraphs [5009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390] through [5009.19464] (FIG. 16765 through FIG. 16826b); Footer Displaying Function described in paragraphs [5009.19465] through [5009.19539] (FIG. 16827 through FIG. 16888b); Location Scheduled Notifying Function described in paragraphs [5009.19540] through [5009.19602] (FIG. 16889 through FIG. 16941e); Zone Leaving Notifying Function described in paragraphs [5009.19603] through [5009.19675] (FIG. 16942 through FIG. 17005d); Zone Entering Notifying Function described in paragraphs [5009.19676] through [5009.19748] (FIG. 17006 through FIG. 17069d); Power Off Notifying Function described in paragraphs [5009.19749] through [5009.19794] (FIG. 17070 through FIG. 17106d); Power On Notifying Function described in paragraphs [5009.19795] through [5009.19840] (FIG. 17107 through FIG. 17143d); Security Alarm On Notifying Function described in paragraphs [5009.19841] through [5009.19886] (FIG. 17144 through FIG. 17180d); Security Alarm Off Notifying Function described in paragraphs [5009.19887] through [5009.19932] (FIG. 17181 through FIG. 17217d); Email Transfer Notifying Function described in paragraphs [5009.19933] through [5009.19978] (FIG. 17218 through FIG. 17254d); Email Reception Notifying Function described in paragraphs [5009.19979] through [5009.20024] (FIG. 17255 through FIG. 17291d); Making Phone Call Notifying Function described in paragraphs [5009.20025] through [5009.20070] (FIG. 17292 through FIG. 17328d); Phone Call Reception Notifying Function described in paragraphs [5009.20071] through [5009.20116] (FIG. 17329 through FIG. 17365d); Key Pressed Notifying Function described in paragraphs [5009.20117] through [5009.20162] (FIG. 17366 through FIG. 17402d); Software Activation Notifying Function described in paragraphs [5009.20163] through [5009.20208] (FIG. 17403 through FIG. 17439d); Document Opening Notifying Function described in paragraphs [5009.20209] through [5009.20254] (FIG. 17440 through FIG. 17476d); Specified Event Notifying Function described in paragraphs [5009.20255] through [5009.20315] (FIG. 17477 through FIG. 17527d); Television Phone Auto Backup Function described in paragraphs [5009.20316] through [5009.20447] (FIG. 17528 through FIG. 17645b); File Auto Saving Function described in paragraphs [5009.20448] through [5009.20495] (FIG. 17646 through FIG. 17678b); File Compressing Function described in paragraphs [5009.20496] through [5009.20559] (FIG. 17679 through FIG. 17727e); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685] (FIG. 17772 through FIG. 17832c); Multiple Device Door Locking Function described in paragraphs [5009.20686] through [5009.20761] (FIG. 17833 through FIG. 17893c); Phone Call Making Log Recording Function described in paragraphs [5009.20762] through [5009.20815] (FIG. 17894 through FIG. 17938d); Phone Call Receiving Log Recording Function described in paragraphs [5009.20816] through [5009.20867] (FIG. 17939 through FIG. 17981d); Phone Call Making Log Exporting Function described in paragraphs [5009.20868] through [5009.20917] (FIG. 17982 through FIG. 18022d); Phone Call Receiving Log Exporting Function described in paragraphs [5009.20918] through [5009.20967] (FIG. 18023 through FIG. 18063d); Phone Call Making Log Synchronizing Function described in paragraphs [5009.20968] through [5009.21021] (FIG. 18064 through FIG. 18106f); Phone Call Receiving Log Synchronizing Function described in paragraphs [5009.21022] through [5009.21075] (FIG. 18107 through FIG. 18149f); 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325c); Location Audio Notifying Function described in paragraphs [5009.21277] through [5009.21319] (FIG. 18326 through FIG. 18359b); Answering Machine Location Recording Function described in paragraphs [5009.21320] through [5009.21388] (FIG. 18360 through FIG. 18417e); Visual Phone File Sharing Function described in paragraphs [5009.21389] through [5009.21526] (FIG. 18418 through FIG. 18540b); Visual Phone Magnifying Function described in paragraphs [5009.21527] through [5009.21629] (FIG. 18541 through FIG. 18631); Multiple Home Page Displaying Function described in paragraphs [5009.21630] through [5009.21700] (FIG. 18632 through FIG. 18693b FIG. 18632 through FIG. 18693b); Multiple Visual Phone Party Location Identifying Function described in paragraphs [5009.21701]

through [5009.21796] (FIG. 18694 through FIG. 18778g); Individual Party Conversation Replaying Function described in paragraphs [5009.21797] through [5009.21962] (FIG. 18779 through FIG. 18929d); Multiple Phone Notifying Function described in paragraphs [5009.21963] through [5009.22050] (FIG. 18930 through FIG. 19004i); Multiple Phone Dial Tone Function described in paragraphs [5009.22051] through [5009.22160] (FIG. 19005 through FIG. 19101f); Multiple Phone New Party Joining Function described in paragraphs [5009.22161] through [5009.22276] (FIG. 19102 through FIG. 19206j); Music Property Setting Function described in paragraphs [5009.22277] through [5009.22302] (FIG. 19207 through FIG. 19226b); Fore/Background Audio Recording Function described in paragraphs [5009.22303] through [5009.22334] (FIGS. 19227 through 19248); Email Address Phone Calling Function described in paragraphs [5009.22335] through [5009.22392] (FIGS. 19249 through 19295c); Night Vision Displaying Carrier Function described in paragraphs [5009.22393] through [5009.22501] (FIGS. 19296 through 19386b); Phone Number Email Function described in paragraphs [5009.22502] through [5009.22561] (FIGS. 19387 through 19436c); No-Answer Auto Emailing Function described in paragraphs [5009.22562] through [5009.22634] (FIGS. 19437 through 19499e); Linked Page Auto Downloading Function described in paragraphs [5009.22635] through [5009.22662] (FIGS. 19500 through 19519); Folder Auto Hiding Function described in paragraphs [5009.22663] through [5009.22692] (FIGS. 19520 through 19543); Folder Time Defined Hiding Function described in paragraphs [5009.22693] through [5009.22746] (FIGS. 19544 through 19591); Folder Time Defined Revealing Function described in paragraphs [5009.22747] through [5009.22800] (FIGS. 19592 through 19639); Common Phone Number Changing Function described in paragraphs [5009.22801] through [5009.22829] (FIGS. 19640 through 19658c); Common Email Address Changing Function described in paragraphs [5009.22830] through [5009.22858] (FIGS. 19659 through 19677c); Multiple Incrementing Counter Function described in paragraphs [5009.22859] through [5009.22896] (FIGS. 19678 through 19709); Multiple Decrementing Counter Function described in paragraphs [5009.22897] through [5009.22934] (FIGS. 19710 through 19741); Multiple Alarm Clock Function described in paragraphs [5009.22935] through [5009.22984] (FIGS. 19742 through 19783); Alarm Clock Current Location Notifying Function described in paragraphs [5009.22985] through [5009.23022] (FIG. 19784 through FIG. 19815b); Camcorder Auto Time Adjusting Function described in paragraphs [5009.23023] through [5009.23047] (FIG. 19816 through FIG. 19833b); Location Identified Device Information Displaying Function described in paragraphs [5009.23048] through [5009.23098] (FIG. 19834 through FIG. 19875b); Folder Message Displaying Function described in paragraphs [5009.23099] through [5009.23126] (FIG. 19876 through FIG. 19897); Folder Audiovisual Outputting Function described in paragraphs [5009.23127] through [5009.23154] (FIG. 19898 through FIG. 19919); Pistol Monitoring Function described in paragraphs [5009.23155] through [5009.23226] (FIG. 19920 through FIG. 19983b); Earthquake Auto Locking Function described in paragraphs [5009.23227] through [5009.23264] (FIG. 19984 through FIG. 20013); Television Resolution Auto Changing Function described in paragraphs [5009.23265] through [5009.23290] (FIG. 20014 through FIG. 20033); Shortcut Auto Creating Function described in paragraphs [5009.23291] through [5009.23312] (FIG. 20034 through FIG. 20049); Auto Zooming Function described in paragraphs [5009.23313] through [5009.23332] (FIG. 20050 through FIG. 20063b); Oxygen Tank Function described in paragraphs [5009.23333] through [5009.23384] (FIG. 20064 through FIG. 20107); In Carrier Server Function described in paragraphs [5009.23385] through [5009.23430] (FIG. 20108 through FIG. 20146); Silent Mode Auto Subtitle Displaying Function described in paragraphs [5009.23431] through [5009.23454] (FIG. 20147 through FIG. 20164b); Silent Mode Auto Answerphone Message Displaying Function described in paragraphs [5009.23455] through [5009.23476] (FIG. 20165 through FIG. 20180b); Midnight Auto Downloading Function described in paragraphs [5009.23477] through [5009.23498] (FIG. 20181 through FIG. 20196); Shortcut Link Auto Updating Function described in paragraphs [5009.23499] through [5009.23522] (FIG. 20197 through FIG. 20214); Web Page Auto Refreshing Function described in paragraphs [5009.23523] through [5009.23560] (FIG. 20215 through FIG. 20246); Vibrator Remote Activation Function described in paragraphs [5009.23561] through [5009.23584] (FIG. 20247 through FIG. 20263b); Scenario Accordance Vibrating Function described in paragraphs [5009.23585] through [5009.23608] (FIG. 20264 through FIG. 20281); Location Dependent Message Outputting Function described in paragraphs [5009.23609] through [5009.23640] (FIG. 20282 through FIG. 20307c); Location Dependent Program Activating Function described in paragraphs [5009.23641] through [5009.23670] (FIG. 20308 through FIG. 20333c); Multiple Answering Machine Function described in paragraphs [5009.23671] through [5009.23716] (FIG. 20334 through FIG. 20373b); Time Dependent Answering Machine Function described in paragraphs [5009.23717] through [5009.23750] (FIG. 20374 through FIG. 20401b); Television Program Data Storage Area Selecting Function described in paragraphs [5009.23751] through [5009.23799] (FIG. 20402 through FIG. 20444c); Street Address Icon Displaying Function described in paragraphs [5009.23800] through [5009.23829] (FIG. 20445 through FIG. 20468c); Audiovisual Multiple Recording/Replaying Function described in paragraphs [5009.23830] through [5009.23867] (FIG. 20469 through FIG. 20500d); Map Editing Function described in paragraphs [5009.23868] through [5009.23901] (FIG. 20501 through FIG. 20528); Enhanced Television Tuner Remote Controlling Function described in paragraphs [5009.23902] through [5009.23940] (FIG. 20529 through FIG. 20560b); Enhanced DVD Player Remote Controlling Function described in paragraphs [5009.23941] through [5009.24002] (FIG. 20561 through FIG. 20615b); Monetary Value Data Auto Charging Function described in paragraphs [5009.24003] through [5009.24030] (FIG. 20616 through FIG. 20637c); Site Viewing Remotely Prohibiting Function described in paragraphs [5009.24031] through [5009.24062] (FIG. 20638 through FIG. 20662d); Remotely Controlled Device Auto Selecting Function described in paragraphs [5009.24063] through [5009.24110] (FIG. 20663 through FIG. 20702d); Driver Alerting Function described in paragraphs [5009.24111] through [5009.24150] (FIG. 20703 through FIG. 20735b); Robot Controlling Macro Function described in paragraphs [5009.24151] through [5009.24224] (FIG. 20736 through FIG. 20799b); Robot Predetermined Location Proceeding Function described in paragraphs [5009.24225] through [5009.24290] (FIG. 20800 through FIG. 20858); Message Leaving Function described in paragraphs [5009.24291] through [5009.24350] (FIG. 20859 through FIG. 20911c); Unique Folder Icon Attaching Function described in paragraphs [5009.24351] through [5009.24380] (FIG. 20912 through FIG. 20935d); Unique File Icon Attaching Function described in paragraphs [5009.24381] through [5009.24410] (FIG. 20936 through FIG. 20959d); Unique Email Icon Attaching Function described in paragraphs [5009.24411] through [5009.24440] (FIG. 20960 through FIG. 20983d); Device Current Condition Notifying Function described in paragraphs [5009.24441] through [5009.24536] (FIG. 20984 through FIG. 21072d); Device Bulk Duplicating Function described in paragraphs [5009.24537] through [5009.24613] (FIG. 21073 through FIG. 21142c); Program Related Audiovisual Data Auto Downloading Function described in paragraphs [5009.24614] through [5009.24643] (FIG. 21143 through FIG. 21166c); Weather Dependent Program Executing Function described in paragraphs [5009.24644] through [5009.24702] (FIG. 21167 through FIG. 21218d); Audiovisual Outputting Function described in paragraphs [5009.24703] through [5009.24745] (FIG. 21219 through FIG. 21254e); Email Outputting Function described in paragraphs [5009.24746] through [5009.24788] (FIG. 21255 through FIG. 21290e); Document Outputting Function described in paragraphs [5009.24789] through [5009.24831] (FIG. 21291 through FIG. 21326e); Program Executing Function described in paragraphs [5009.24832] through [5009.24874] (FIG. 21327 through FIG. 21362e); Electronic Postit Function described in paragraphs [5009.24875] through [5009.24945] (FIG. 21363 through FIG. 21426d); Time Dependent Game Function described in paragraphs [5009.24946] through [5009.24965] (FIG. 21427 through FIG. 21440); Season Dependent Game Function described in paragraphs [5009.24966] through [5009.24985] (FIG. 21441 through FIG. 21454); Location Dependent Game Function described in paragraphs [5009.24986] through [5009.25007] (FIG. 21455 through FIG. 21470); Enhanced Time Dependent Game Function described in paragraphs [5009.25008] through [5009.25035] (FIG. 21471 through FIG. 21492); Enhanced Season Dependent Game Function described in paragraphs [5009.25036] through [5009.25063] (FIG. 21493 through FIG. 21514); Enhanced Location Dependent Game Function described in paragraphs [5009.25064] through [5009.25093] (FIG. 21515 through FIG. 21538); Specific Game Download Prohibiting Function described in paragraphs [5009.25094] through [5009.25141] (FIG. 21539 through FIG. 21579c); Location Dependent Phone Number Function described in paragraphs [5009.25142] through [5009.25206] (FIG. 21580 through FIG. 21637e); Location Dependent Answering Machine Function described in paragraphs [5009.25207] through [5009.25228] (FIG. 21638 through FIG. 21653c); Auto Speaker Phone Function described in paragraphs [5009.25229] through [5009.25266] (FIG. 21654 through FIG. 21684); Object Location Identifying Function described in paragraphs [5009.25267] through [5009.25312] (FIG. 21685 through FIG. 21724c); Area Dependent Answering Machine Function described in paragraphs [5009.25313] through [5009.25332] (FIG. 21725 through FIG. 21738c); Area Dependent Call Receiving Function described in paragraphs [5009.25333] through [5009.25359] (FIG. 21739 through FIG. 21760c); Device Component Distance Searching Function described in paragraphs [5009.25360] through [5009.25377] (FIG. 21761 through FIG. 21772d); Device Component Location Searching Function described in paragraphs [5009.25378] through [5009.25422] (FIG. 21773 through FIG. 21810f); Component Connection Notifying Function described in paragraphs [5009.25423] through [5009.25446] (FIG. 21811 through FIG. 21828); Multiple Phone Number Busy Notifying Function described in paragraphs [5009.25447] through [5009.25478] (FIG. 21829 through FIG. 21854b); Time Identified Incoming Call Refusing Function described in paragraphs [5009.25479] through [5009.25504] (FIG. 21855 through FIG. 21874c); Email Location Log Recording Function described in paragraphs [5009.25505] through [5009.25540] (FIG. 21875 through FIG. 21904e); Rough Location Notifying Function described in paragraphs [5009.25541] through [5009.25598] (FIG. 21905 through FIG. 21955b); Stalker Detecting Function described in paragraphs [5009.25599] through [5009.25638] (FIG. 21956 through FIG. 21989b); Location Indicating Scheduler Function described in paragraphs [5009.25639] through [5009.25742] (FIG. 21990 through FIG. 22086i); Device Program Sync Activating Function described in paragraphs [5009.25743] through [5009.25803] (FIG. 22087 through FIG. 22140c); User Dictionary Sync Function described in paragraphs [5009.25804] through [5009.25866] (FIG. 22141 through FIG. 22196d); Update Synchronizing Function described in paragraphs [5009.25867] through [5009.25916] (FIG. 22197 through FIG. 22241c); Material Viewing Location Notifying Function described in paragraphs [5009.25917] through [5009.25942] (FIG. 22242 through FIG. 22261b); Digital Data Edited Location Notifying Function described in paragraphs [5009.25943] through [5009.25982] (FIG. 22262 through FIG. 22295e); Remote Money Transferring Function described in paragraphs [5009.25983] through [5009.26046] (FIG. 22296 through FIG. 22352c); Remote Device Diagnosing Function described in paragraphs [5009.26047] through [5009.26180] (FIG. 22353 through FIG. 22479c); User Related Data Backuping Function described in paragraphs [5009.26181] through [5009.26249] (FIG. 22480 through FIG. 22542b); User Related Data Sharing Function described in paragraphs [5009.26250] through [5009.26319] (FIG. 22543 through FIG. 22605b); Location Dependent Pistol Controlling Function described in paragraphs [5009.26320] through [5009.26354] (FIG. 22606 through FIG. 22634); Direction Dependent Pistol Controlling Function described in paragraphs [5009.26355] through [5009.26429] (FIG. 22635 through FIG. 22702b); Dual Number Batch Switching Over Function described in paragraphs [5009.26430] through [5009.26485] (FIG. 22703 through FIG. 22752d); Dual Number Auto Switching Over Function described in paragraphs [5009.26486] through [5009.26553] (FIG. 22753 through FIG. 22814c); Audiovisual Text Retrieving Function described in paragraphs [5009.26554] through [5009.26591] (FIG. 22815 through FIG. 22846b); Prepaid Currency Auto Converting Function described in paragraphs [5009.26592] through [5009.26623] (FIG. 22847 through FIG. 22872d); Stereo Odor Sensing Function described in paragraphs [5009.26624] through [5009.26663] (FIG. 22873 through FIG. 22907c); Bone-Conduction Headphone Function described in paragraphs [5009.26664] through [5009.26763] (FIG. 22908 through FIG. 23000); Remote Sound Volume Controlling Function described in paragraphs [5009.26764] through [5009.26803] (FIG. 23000a through FIG. 23032c); Personal Belonging Notifying Function described in paragraphs [5009.26804] through [5009.26839] (FIG. 23033 through FIG. 23061b); Secondary Personal Belonging Notifying Function described in paragraphs [5009.26840] through [5009.26898] (FIG. 23062 through FIG. 23112c); Headphone Auto Content Replaying Function described in paragraphs [5009.26899] through [5009.26948] (FIG. 23113 through FIG. 23155b); Alternative Device Using Function described in paragraphs [5009.26949] through [5009.26987] (FIG. 23156 through FIG. 23188d); Brain Wave Color Selecting Function described in paragraphs [5009.26988] through [5009.27026] (FIG. 23189 through FIG. 23221d); Brain Wave Font Selecting Function described in paragraphs

[5009.27027] through [5009.27065] (FIG. 23222 through FIG. 23254d); Another Device Location Dependent Auto Answering Function described in paragraphs [5009.27066] through [5009.27104] (FIG. 23255 through FIG. 23286d); Rear Carrier Speed Dependent Ideal Distance Maintaining Function described in paragraphs [5009.27105] through [5009.27162] (FIG. 23287 through FIG. 23337c); Front Carrier Speed Dependent Ideal Distance Maintaining Function described in paragraphs [5009.27163] through [5009.27220] (FIG. 23338 through FIG. 23388c); Inter-Carrier Middle Point Maintaining Function described in paragraphs [5009.27221] through [5009.27306] (FIG. 23389 through FIG. 23466e); Front Carrier Activity Notifying Function described in paragraphs [5009.27307] through [5009.27446] (FIG. 23467 through FIG. 23599); Past Accident Occurred Spot Auto Speed Decreasing Function described in paragraphs [5009.27447] through [5009.27473] (FIG. 23600 through FIG. 23620d); Shock Sensored Auto Backing Up Function described in paragraphs [5009.27474] through [5009.27524] (FIG. 23621 through FIG. 23664e); Redialing Data Sharing Function described in paragraphs [5009.27525] through [5009.27589] (FIG. 23665 through FIG. 23722d); Phone Call History Sharing Function described in paragraphs [5009.27590] through [5009.27696] (FIG. 23723 through FIG. 23822h); Specific Sound-Wave Triggered Program Function described in paragraphs [5009.27697] through [5009.27735] (FIG. 23823 through FIG. 23856d); Time Dependent False Location Notifying Function described in paragraphs [5009.27736] through [5009.27779] (FIG. 23857 through FIG. 23894e); Area Dependent False Location Notifying Function described in paragraphs [5009.27780] through [5009.27823] (FIG. 23895 through FIG. 23932e); Area Dependent False Location Notifying Function described in paragraphs [5009.27824] through [5009.27867] (FIG. 23933 through FIG. 23970e); Device Dependent False Location Notifying Function described in paragraphs [5009.27868] through [5009.27911] (FIG. 23971 through FIG. 24008e); Specific Image Triggered Program Function described in paragraphs [5009.27912] through [5009.27942] (FIG. 24009 through FIG. 24034c); Warning Sharing Function described in paragraphs [5009.27943] through [5009.27988] (FIG. 24035 through FIG. 24073c); Incoming Call Rejection Password Nullifying Function described in paragraphs [5009.27989] through [5009.28039] (FIG. 24074 through FIG. 24117c); Incoming Call Rejection Voice Print Nullifying Function described in paragraphs [5009.28040] through [5009.28090] (FIG. 24118 through FIG. 24161c); Incoming Call Rejection Finger Print Nullifying Function described in paragraphs [5009.28091] through [5009.28141] (FIG. 24162 through FIG. 24205c); Facedown Phone Silent Mode Implementing Function described in paragraphs [5009.28142] through [5009.28172] (FIG. 24206 through FIG. 24230c); Facedown Email Silent Mode Implementing Function described in paragraphs [5009.28173] through [5009.28203] (FIG. 24231 through FIG. 24255c); Facedown Auto Answering Mode Implementing Function described in paragraphs [5009.28204] through [5009.28234] (FIG. 24256 through FIG. 24280c); Caller's Area Dependent Ringtone Modifying Function described in paragraphs [5009.28235] through [5009.28266] (FIG. 24281 through FIG. 24306d); Caller's Distance Dependent Ringtone Modifying Function described in paragraphs [5009.28267] through [5009.28298] (FIG. 24307 through FIG. 24332f); In-Carrier Device Controlling Function described in paragraphs [5009.28299] through [5009.28373] (FIG. 24333 through FIG. 24400c); Area Dependent Video Phone Auto Activating Function described in paragraphs [5009.28374] through [5009.28405] (FIG. 24401 through FIG. 24426d); Area Dependent Shortcut Icon Function described in paragraphs [5009.28406] through [5009.28453] (FIG. 24427 through FIG. 24468c); Weather Dependent Shortcut Icon Function described in paragraphs [5009.28454] through [5009.28509] (FIG. 24469 through FIG. 24518c); Actual Three Dimensional Space Near Focal Point Image Displaying Function described in paragraphs [5009.28510] through [5009.28568] (FIG. 24519 through FIG. 24571); Emotion Sensing Function described in paragraphs [5009.28569] through [5009.28643] (FIG. 24572 through FIG. 24636b); Email Reception Conditionally Notifying Function described in paragraphs [5009.28644] through [5009.28675] (FIG. 24637 through FIG. 24662c); Microphone Mounted Headphone Replay Pausing Function described in paragraphs [5009.28676] through [5009.28716] (FIG. 24663 through FIG. 24696c); First Area Dependent Notice Type Changing Function described in paragraphs [5009.28717] through [5009.28768] (FIG. 24697 through FIG. 24742c); Second Area Dependent Notice Type Changing Function described in paragraphs [5009.28769] through [5009.28820] (FIG. 24743 through FIG. 24788c); Time Dependent Location Notifying Type Changing Function described in paragraphs [5009.28821] through [5009.28870] (FIG. 24789 through FIG. 24832b); Caller's Identification Content Sharing Function described in paragraphs [5009.28871] through [5009.28911] (FIG. 24833 through FIG. 24866f); Virtual Three Dimensional Space Near Focal Point Image Displaying Function described in paragraphs [5009.28912] through [5009.28964] (FIG. 24867 through FIG. 24914); Multiple Mode Implementing Function described in paragraphs [5011] through [5018] (FIGS. 395 through 400); Multiple Software Download Function described in paragraphs [5019] through [5028] (FIGS. 401 through 407); Selected Software Distributing Function described in paragraphs [5029] through [5048] (FIGS. 1376 through 1393d); Multiple Software Download And Mode Implementation Function described in paragraphs [5049] through [5056] (FIGS. 408 through 412); and the last sentence described in paragraph [5058] (no drawings).

<<Other Functions>>

For the avoidance of doubt, Communication Device 200 is capable to implement the following functions, modes, and systems: an electronic postit function which displays an electronic postit text data which indicates a text message or memo on said display, said electronic postit text data is displayed at the location identified by the user of said communication device, said electronic postit text data is displayed on a display of another device, when said electronic postit text data is edited by the user of said communication device, said electronic postit text data which is edited by the user of said communication device is displayed on said display of said another device, when said electronic postit text data is edited by the user of said another device, said electronic postit text data which is edited by the user of said another device is displayed on said display of said communication device, a 1st electronic postit text edited time data which indicates the time and date at which said electronic postit text data is edited by the user of said communication device, a 2nd electronic postit text edited time data which indicates the time and date at which said electronic postit text data is edited by the user of said another device, a 1st current location data which indicates the current geographic location of said communication device, a 2nd current location data which indicates the current geographic location of said another device, a 1st electronic postit text edited location data which indicates the geographic location at which said electronic postit text data is edited by the user of said communication device, and/or a 2nd electronic postit text edited location data which indicates the geographic location at which said electronic postit text data is edited by the user of said another device is/are indicated on said display of said communication device and/or said display of said another device; a time dependent game function which displays a game character wearing a 1st clothe during a 1st specific time frame, said game character wearing a 2nd clothe during a 2nd specific time frame, and said game character wearing a 3rd clothe during a 3rd specific time frame; a season dependent game function which displays a game character wearing a 1st clothe during a 1st specific season, said game character wearing a 2nd clothe during a 2nd specific season, said game character wearing a 3rd clothe during a 3rd specific season, and said game character wearing a 4th clothe during a 4th specific season; a location dependent game function which displays a game character wearing a 1st clothe when said communication device is located in a 1st specific geographic area, said game character wearing a 2nd clothe when said communication device is located in a 2nd specific geographic area, and said game character wearing a 3rd clothe when said communication device is located in a 3rd specific geographic area; an enhanced time dependent game function which displays a game character wearing a 1st clothe and a day time background data during a 1st specific time frame, said game character wearing a 2nd clothe and an evening time background data during a 2nd specific time frame, and said game character wearing a 3rd clothe and a night time background data during a 3rd specific time frame; an enhanced season dependent game function which displays a game character wearing a 1st clothe and a 1st season background data during a 1st specific season, said game character wearing a 2nd clothe and a 2nd season background data during a 2nd specific season, said game character wearing a 3rd clothe and a 3rd season background data during a 3rd specific season, and said game character wearing a 4th clothe and a 4th season background data during a 4th specific season; an enhanced location dependent game function which displays a game character wearing a 1st clothe and a 1st area background data when said communication device is located in a 1st specific geographic area, said game character wearing a 2nd clothe and a 2nd area background data when said communication device is located in a 2nd specific geographic area, said game character wearing a 3rd clothe and a 3rd area background data when said communication device is located in a 3rd specific geographic area, and said game character wearing a 4th clothe and a 4th area background data when said communication device is located in a 4th specific geographic area; a specific game download prohibiting function which identifies a specific software program which is prohibited to be downloaded by another device, when said another device attempts to download said specific software program, a download attempting time data which indicates the time and date at which said another device attempted to download said specific software program, a download attempting 1st location data which indicates the geographic location of said communication device at which said another device attempted to download said specific software program and a download attempting 2nd location data which indicates the geographic location of said another device at which said another device attempted to download said specific software program are registered, and a download attempting notice data which is the notice indicating that said another device attempted to download the video game software program identified by the prohibited game identification data is displayed on said display, and said download attempting time data, said download attempting 1st location data, and said download attempting 2nd location data are operable to be indicated on said display; a location dependent phone number function, wherein a 1st phone number and a 2nd phone number is assigned to said communication device, said location dependent phone number function utilizes said 1st phone number when said communication device is located in a 1st geographic area and said 2nd phone number when said communication device is located in a 2nd geographic area, and said location dependent phone number function accepts a phone call to said 1st phone number when said communication device is located in said 1st geographic area and said 2nd phone number when said communication device is located in said 2nd geographic area; a location dependent answering machine function which refrains from answering a phone call if said communication device is not located within a specific geographic area, said location dependent answering machine function stores a message of the caller of said phone call, and when said message is replayed, a current location data which indicates the current geographic location of said communication device and a call received location data which indicates the geographic location of said communication device at the time said phone call was received are indicated on a map displayed on said display; an auto speaker phone function which implements a 1st speaker phone mode, a 2nd speaker phone mode, and a 3rd speaker phone mode, when said communication device is located in a carrier, a 1st audio data which is the audio data of the user of said communication device is input via said microphone of said communication device and a 2nd audio data which is the audio data of the conversing party is output from speaker of said communication device under said 1st speaker phone mode, said 1st audio data is input via said microphone of said communication device and said 2nd audio data is output from a speaker of said carrier under said 2nd speaker phone mode, and said 1st audio data is input via a microphone of said carrier and said 2nd audio data is output from said speaker of said carrier under said 3rd speaker phone mode; an object location identifying function, wherein said communication device is installed in a robot, said robot includes a left camera and a right camera, when said left camera perceives an object and said right camera does not, said robot proceeds to the left direction in order for said right camera to perceive said object, when said right camera perceives said object and said left camera does not, said robot proceeds to the right direction in order for said left camera to perceive said object, and the current geographic locations of said robot and said object are indicated on said robot; an area dependent answering machine function which identifies the current location of said communication device, if said communication device is determined to be not within a specific geographic area when a phone call from a caller's device is received, said communication device transfers an auto answering message data which is the audiovisual data indicating that the user of said communication device can not answer the call to said caller's device and records a caller's message data which is the audiovisual data indicating the message left by the user of said caller's device, when said caller's message data is replayed, the current location of said communication device and a caller's message left location which indicates the geographic location of said communication device when the user of said caller's device made said phone call and left said caller's message data are indicated on said display; an area dependent call receiving function, wherein when said communication device receives a phone call at the time said communication device is located in a 1st geographic area indicated by a 1st area data, said phone call is received by utilizing a 1st phone number data and a 1st call received phone number notice data which is the notice indicating that said phone call is received by utilizing said 1st phone number data is displayed on said display, when said communication device receives said phone call at the time said communication device is located in a 2nd geographic area indicated by a 2nd area data, said phone call is received by utilizing a 2nd phone number data and a 2nd call received phone number notice data which is the notice indicating that said phone call is received by utilizing said 2nd phone number data is displayed on said display, and when said communication device receives said phone call at the time said communication device is located other than in said 1st geographic area and said 2nd geographic area, said phone call is received by utilizing a 3rd phone number data and a 3rd call received phone number notice data which is the notice indicating that said phone call is received by utilizing said 3rd phone number data is displayed on said display; a device component distance searching function, wherein said communication device is connected with a device component in a wireless fashion, said device component is the component of said communication device, when a component distance searching command is input to said communication device via said input device, a distance data which indicates the distance between said communication device and said device component is calculated and displayed on said display and said device component and said device component outputs a 1st notice in order to notify its location in an audiovisual manner, and when a device distance searching command is input to said device component, a distance data which indicates the distance between said communication device and said device component is calculated and displayed on said display and said device component and said communication device outputs a 2nd notice in order to notify its location in an audiovisual manner; a device component location searching function, wherein said communication device is connected to a device component in a wireless fashion, said device component is the component of said communication device, when a component location searching command is input to said communication device via said input device, a 1st current location data which indicates the current geographic location of said communication device, a 2nd current location data which indicates the current geographic location of said device component, a distance data which indicates the distance between said communication device and said device component, and a 1st direction data which indicates the direction to said device component from said communication device are indicated on said display, and said communication device and said device component output a component location search completed notice data which is the audiovisual data indicating that searching the current geographic location of said device component is completed respectively, and when a device location searching command is input to said device component, a 1st current location data which indicates the current geographic location of said communication device, a 2nd current location data which indicates the current geographic location of said device component, a distance data which indicates the distance between said communication device and said device component, and a 2nd direction data which indicates the direction to said communication device from said device component are indicated on said device component, and said communication device and said device component output a device location search completed notice data which is the audiovisual data indicating that searching the current geographic location of said communication device is completed respectively; a component connection notifying function, wherein said communication device is connected to a device component in a wireless fashion, said device component is the component of said communication device, when said communication device and said device component are connected to each other in a wireless fashion a 1st message indicating that said communication device and said device component are connected to each other in a wireless fashion is indicated on said communication device and said device component, and when said communication device and said device component are not connected to each other in a wireless fashion a 2nd message indicating that said communication device and said device component are not connected to each other in a wireless fashion is indicated on said communication device and said device component; a multiple phone number busy notifying function, wherein a 1st phone number and a 2nd phone number are assigned to said communication device, when a phone call made to said 1st phone number is received while said 2nd phone number is currently used for phone conversation by said communication device, a phone busy message is output from a caller's device, and a current location data which indicates the current geographic location of said communication device and a call received location data which indicates the geographic location of said communication device at which said communication device did not answer the call are indicated on said display as a phone conversation log; a time identified incoming call refusing function, wherein a scheduler includes an event entered by the user, if said event indicates an incoming call refusal and an incoming call is received during a specific time/date frame specified by the user, said incoming call is refused, an incoming call refusing message indicating that the user is currently not available to answer the call is transferred to a caller, and an incoming call refusing notice indicating that said incoming call is received which is refused to be answered is displayed on said display; an email location log recording function, wherein when an email is sent, a current location data which indicates the current geographic location of said communication device, a sending email content data which indicates the email authored by the user of said communication device, a sending email time/date data which indicates the time and date at which said sending email content data is sent, a sending email location data which indicates the geographic location at which said sending email content data is sent, a sending email street address data which indicates the street address at which said sending email content data is sent, and a sending email address nickname data which indicates the nickname of the street address at which said sending email content data is sent are produced, said current location data, said sending email content data, said sending email time/date data, said sending email location data, said sending email street address data, and said sending email address nickname data are indicated on said display in response to an sent email log displaying command input via said input device, and when an email is received, said current location data which indicates the current geographic location of said communication device, a receiving email content data which indicates the email received by the user of said communication device, a receiving email time/date data which indicates the time and date at which said receiving email content data is received, a receiving email location data which indicates the geographic location at which said receiving email content data is received, a receiving email street address data which indicates the street address at which said receiving email content data is received, and a receiving email address nickname data which indicates the nickname of the street address at which said receiving email content data is received are produced, said current location data, said receiving email content data, said receiving email time/date data, said receiving email location data, said receiving email street address data, and said receiving email address nickname data are indicated on said display in response to a received email log displaying command input via said input device; a rough location notifying function, wherein the data stored in a pin-point location notifying data storage area is identified, if a pin-point location notifying data is stored in said pin-point location notifying data storage area, a pin-point location of said communication device is notified to another device and a pin-point location indicating message indicating that the pin-point location of said communication device is indicated is displayed on said another device, and if a pin-point location non-notifying data is stored in said pin-point location notifying data storage area, a geographic area of said communication device is notified to said another device and a geographic area indicating message indicating that the geographic area in which said communication device is located is indicated is displayed on said another device; a stalker detecting function, wherein a 1st current location and a 2nd current location are identified, said 1st current location indicates the current geographic location of said communication device, said 2nd current location indicates the current geographic location of another device, a current distance data which indicates the current distance between said communication device and said another device is produced by utilizing said 1st current location and said 2nd current location, if said current distance data is smaller than a certain value for a certain duration of time and an identification of said another device is included in a black list, or if said current distance data is smaller than a certain value for a certain duration of time and said identification of said another device is not included in a white list, a stalker alert message is output from said communication device and said 1st current location and said 2nd current location are indicated on a map displayed on said display; a location indicating scheduler function, wherein a 1st scheduler is entered by the user of said communication device, a 2nd scheduler is entered by the user of another device, said 1st scheduler indicates the specific schedule of the user of said communication device, said 2nd scheduler indicates the specific schedule of the user of said another device, said 1st scheduler and said 2nd scheduler are displayed on both said communication device and said another device, while said 1st scheduler and said 2nd scheduler are displayed, a 1st scheduled location and a 2nd scheduled location, a 1st scheduled street address and a 2nd scheduled street address, a 1st scheduled address nickname and a 2nd scheduled address nickname, a 1st current location and a 2nd current location, a 1st current street address and a 2nd current street address, and a 1st current address nickname and a 2nd current address nickname are displayed on both said communication device and said another device, wherein said 1st scheduled location indicates the geographic location at which said 1st scheduler takes place, said 2nd scheduled location indicates the geographic location at which said 2nd scheduler takes place, said 1st scheduled street address indicates the street address at which said 1st scheduler takes place, said 2nd scheduled street address indicates the street address at which said 2nd scheduler takes place, said 1st scheduled address nickname indicates the nickname or abbreviation of said 1st scheduled street address, said 2nd scheduled address nickname indicates the nickname or abbreviation of said 2nd scheduled street address, said 1st current location indicates the current geographic location of said communication device, said 2nd current location indicates the current geographic location of said another device, said 1st current street address indicates the street address of said 1st current location, said 2nd current street address indicates the street address of said 2nd current location, said 1st current address nickname indicates the nickname or abbreviation of said 1st current street address, and said 2nd current address nickname indicates the nickname or abbreviation of said 2nd current street address; a device program sync activating function, wherein when a 1st software program is activated by said communication device, a 2nd software program is activated by another device, and a 1st software program activated location, a 2nd software program activated location, a 1st current location, and a 2nd current location are displayed on both said communication device and said another device, wherein a 1st software program activated location indicates the geographic location of said communication device at which said 1st software program is activated by said communication device, a 2nd software program activated location indicates the geographic location of said another device at which said 2nd software program is activated by said another device, a 1st current location indicates the current geographic location of said communication device, and a 2nd current location indicates the current geographic location of said another device; a user dictionary sync function, wherein a 1st user dictionary is stored in said communication device, a 2nd user dictionary is stored in another device, when said 1st user dictionary is updated or changed by said communication device, said 2nd user dictionary is updated or changed and a user dictionary shared message is output from both said communication device and said another device respectively, when said 2nd user dictionary is updated or changed by said another device, said 1st user dictionary is updated or changed and a user dictionary shared message is output from both said communication device and said another device respectively, an updated version data which indicates the latest version of said 1st user dictionary and said 2nd user dictionary is output from both said communication device and said another device respectively, a 1st current location data which indicates the current geographic location of said communication device, a 2nd current location data which indicates the current geographic location of said another device, a 1st user dictionary utilized location data which indicates the geographic location at which said user dictionary data is utilized by said communication device, a 2nd user dictionary utilized location data which indicates the geographic location at which said user dictionary data is utilized by said another device, a 1st user dictionary updated location data which indicates the geographic location at which said user dictionary data is updated or changed by said communication device, and a 2nd user dictionary updated location data which indicates the geographic location at which said user dictionary data is updated or changed by said another device are indicated on both said communication device and said another device respectively; an update synchronizing function, wherein when a 1st specific data stored in said communication device is updated, a 2nd specific data which is the same data with said 1st specific data stored in another device is updated, and when said 1st specific data and said 2nd specific data are updated, a sync updated message which indicates that both said 1st specific data and said 2nd specific data are updated is displayed on said communication device and said another device respectively; a material viewing location notifying function, wherein when a specific digital data is opened, replayed, viewed, output, and/or activated by said communication device, a specific digital data viewing location data is produced, said specific digital data viewing location data indicates the geographic location at which said specific digital data is opened, replayed, viewed, output, and/or activated by said communication device, and said specific digital data viewing location data is indicated on said display; a digital data edited location notifying function, wherein when a digital data is edited, an edited content data which indicates an editing activity rendered to said digital data, an edited time/date data which indicates the time and date at which said editing activity is rendered, an edited location data which indicates the geographic location at which said editing activity is rendered are produced, and said edited content data, said edited time/date data, said edited location data, a street address representing said edited location data, and a nickname or abbreviation of said street address are indicated on said display; a remote money transferring function, wherein a monetary value data which is the digital data indicating a certain amount of monetary value is stored in another device, a transferring value data which is the digital data indicating a certain amount of said monetary value data is identified by said communication device, a monetary value data equivalent to said transferring value data is deducted from said another device and added to said communication device manually by said communication device or automatically when a monetary value data stored in said communication device is smaller than a certain value, and a monetary value transferred message which indicates that a monetary value data is transferred from said another device to said communication device is displayed on said display; a remote device diagnosing function, wherein said communication device implements a diagnostic process of a com device software data of another device in a remote fashion, when the result of said diagnostic process is positive, a positive message is output from said communication device and said another device respectively, when the result of said diagnostic process is negative, a negative message is output from said communication device and said another device respectively, wherein said corn device software data is a software program, driver, and/or middleware utilized to identify the current geographic location of said communication device and/or said another device, implement wireless communication, implement voice communication, implement a silent mode or a manner mode, input alphanumeric data via said input device, implement a voice recognition system, and/or display an address book; a user related data backuping function, wherein a removable memory card is connected to said communication device, said removable memory card stores a device usage required data which is the data required to be recognized by said communication device to utilize said communication device, if said device usage required data is not recognized by said communication device, said communication device is prohibited from implementing certain functions, said device usage required data is backed up in an internal memory of said communication device under a first status, said device usage required data is backed up in an internal memory of another device under a second status, and said device usage required data is backed up in an removable memory card of said another device under a third status, a first location data which indicate the geographic locations of said communication device and said another device under said first status are identified, a second location data which indicate the geographic locations of said communication device and said another device under said second status are identified, and a third location data which indicate the geographic locations of said communication device and said another device under said third status are identified, which are operable to be displayed on said communication device and said another device respectively; a user related data sharing function, wherein a removable memory card is connected to said communication device, said removable memory card stores a device usage required data which is the data required to be recognized by said communication device to utilize said communication device, if said device usage required data is not recognized by said communication device, said communication device is prohibited from implementing certain functions, said device usage required data is backed up from said communication device to a host computing system under a first status, said device usage required data is recovered from said host computing system to another device under a second status, a first location data which indicate the geographic locations of said communication device and said another device under said first status are identified, a second location data which indicate the geographic locations of said communication device and said another device under said second status are identified, said first location data and said second location data are operable to be displayed on said communication device and said another device respectively, and said another device is utilized in lieu of said communication device by recovering said device usage required data from said host computing system to said another device; a location dependent pistol controlling function, wherein said communication device is included in a pistol, a current location which indicates the current geographic location of said pistol is identified, said current location is indicated on said display, if said communication device is determined to be located in a 1st geographic area, said pistol is allowed to fire bullets and a 1st message indicating that said pistol is allowed to fire bullets is displayed on said display, and if said communication device is determined to be located in a 2nd geographic area, said pistol is prohibited to fire bullets and a 2nd message indicating that said pistol is prohibited to fire bullets is displayed on said display; a direction dependent pistol controlling function, wherein said communication device is included in a weapon, a 1st current location which indicates the current geographic location of said communication device is identified, a 2nd current location which indicates the current geographic location of another device is identified, a current direction which indicates the current direction of said weapon is identified, and by utilizing said 1st current location, said 2nd current location, and said current direction, if said weapon is determined to be pointing at or adjacent to said another device, said weapon is prohibited from firing bullets and a bullet firing prohibited message is indicated on said display, and if said weapon is determined to be not pointing at or adjacent to said another device, said weapon is allowed to fire bullets and a bullet firing allowed message is indicated on said display, and said 1st current location and said 2nd current location are indicated on said display; a dual number batch switching over function, wherein when said communication device is under a current device 1st status, a 1st status message indicating that said communication device is currently under said current device 1st status is displayed, a 1st phone book is utilized to implement a phone call from said communication device, a phone call is implemented from said communication device by utilizing a 1st phone number, and a 1st phone call making location which indicates the geographic location of said communication device at which said phone call is implemented by utilizing said 1st phone number is identified, and when said communication device is under a current device 2nd status, a 2nd status message indicating that said communication device is currently under said current device 2nd status is displayed, a 2nd phone book is utilized to implement a phone call from said communication device, a phone call is implemented from said communication device by utilizing a 2nd phone number, and a 2nd phone call making location which indicates the geographic location of said communication device at which said phone call is implemented by utilizing said 2nd phone number is identified, and when said communication device receives a phone call to a 2nd phone number when said communication device is under said current device 1st status, a 2nd phone busy message which is the message indicating that the user can not answer the call is output from a caller's device and a 2nd caller left message indicating the message of the caller to the user is recorded, and when said communication device receives a phone call to a 1st phone number when said communication device is under said current device 2nd status, a 1st phone busy message which is the message indicating that the user can not answer the call is output from a caller's device and a 1st caller left message indicating the message of the caller to the user is recorded, and when said 1st caller left message is replayed, a current location which indicates the current geographic location of said communication device and a 1st call received location which indicates the geographic location of said communication device at which a phone call is received by utilizing said 1st phone number are indicated on said display, and when said 2nd caller left message is replayed, said current location which indicates the current geographic location of said communication device and a 2nd call received location which indicates the geographic location of said communication device at which a phone call is received by utilizing said 2nd phone number are indicated on said display; a dual number auto switching over function, wherein said communication device implements under a current device 1st status and a current device 2nd status, when a phone call addressed to a 1st phone number is received, said communication device switches over to said current device 1st status, when a phone call addressed to a 2nd phone number is received, said communication device switches over to said current device 2nd status, a 1st message indicating that said communication device is under said current device 1st status is displayed when said communication device is under said current device 1st status and a 2nd message indicating that said communication device is under said current device 2nd status is displayed when said communication device is under said current device 2nd status, when a phone book opening command is entered, a 1st phone book is opened under said current device 1st status and a phone call is implemented by utilizing said 1st phone number and a 2nd phone book is opened under said current device 2nd status and a phone call is implemented by utilizing said 2nd phone number, when a phone call is received, a 1st ringtone is output if said communication device is under said current device 1st status and a 2nd ringtone is output if said communication device is under said current device 2nd status, when an email address book opening command is entered, a 1st email address book is opened from which a receiver is selected and the authored email is sent by utilizing a 1st email address under said current device 1st status and a 2nd email address book is opened from which a receiver is selected and the authored email is sent by utilizing a 2nd email address under said current device 2nd status, when an email is received, a 1st email received notice is output from said communication device under said current device 1st status and a 2nd email received notice is output from said communication device under said current device 2nd status, a 1st sent email data which indicates the emails sent from said communication device by utilizing said 1st email address is displayed under said current device 1st status and a 2nd sent email data which indicates the emails sent from said communication device by utilizing said 2nd email address is displayed under said current device 2nd status, a 1st received email data which indicates the emails received by said communication device by utilizing said 1st email address is displayed under said current device 1st status and a 2nd received email data which indicates the emails received by said communication device by utilizing said 2nd email address is displayed under said current device 2nd status, and a current location data which indicates the current geographic location of said communication device, a 1st call received location data which indicates the geographic location of said communication device at which a phone call is received by utilizing said 1st phone number data, a 2nd call received location data which indicates the geographic location of said communication device at which a phone call is received by utilizing said 2nd phone number data, a 1st call implemented location data which indicates the geographic location of said communication device at which a phone call is made from said communication device by utilizing said 1st phone number data, a 2nd call implemented location data which indicates the geographic location of said communication device at which a phone call is made from said communication device by utilizing said 2nd phone number data, a 1st email received location data which indicates the geographic location of said communication device at which an email is received by utilizing said 1st email address data, a 2nd email received location data which indicates the geographic location of said communication device at which an email is received by utilizing said 2nd email address data, a 1st email sent location data which indicates the geographic location of said communication device at which an email is sent by utilizing said 1st email address data, and a 2nd email sent location data which indicates the geographic location of said communication device at which an email is sent by utilizing said 2nd email address data are indicated; an audiovisual text retrieving function, wherein an audiovisual data is retrieved, an audio data is retrieved from said audiovisual data, an audio text data is produced by retrieving alphanumeric data from said audio data by utilizing an audio text converting engine data, an audio text location data which indicates the geographic location at which said audio text data is produced is produced, and a visual data is retrieved from said audiovisual data, said visual data includes a plurality of visual frame data, a specific visual frame data is retrieved from said visual data, a visual frame text data is produced by retrieving alphanumeric data from said specific visual frame data by utilizing a visual text converting engine data, a visual frame text location data which indicates the geographic location at which visual frame text data is produced is produced, and said audio text location data is indicated when said audio text data is displayed and said visual frame text location data is indicated when said visual frame text data is displayed; a prepaid currency auto converting function, wherein a local price data which indicates the price based on the currency of the country in which said communication device is currently located is identified, said local price data is converted to a paying value data by utilizing a currency exchange rate data, said currency exchange rate data indicates the exchange rate from one currency to another currency, said paying value data is deducted from a monetary value data, said monetary value data indicates a certain amount of monetary value in the currency of the country in which the user of said communication device resides, a payment process is implemented by transferring said local price data, said monetary value data, said paying value data, said local price data, a country name data which indicates the name of the country in which said communication device is located, said currency exchange rate data, and a current location data which indicates the current geographic location of said communication device are indicated on said display, and a paying value log data which is the log of said paying value data, a local price log data which is the log of said local price data, a country name log data which is the log of said country name data, a currency exchange rate log data which is the log of said currency exchange rate data, said current location data, and a payment location data which indicates the geographic location of said communication device at which said payment process is implemented are indicated on said display; a stereo odor sensing function, wherein a left odor sensing device and a right odor sensing device are connected to said communication device, said left odor sensing device and said right odor sensing device are odor sensing devices, when said left odor sensing device and said right odor sensing device sense a specific odor, an odor origin location data which indicates the current geographic location of the origin of said specific odor is identified by utilizing a left odor sensed location data which indicates the geographic location of said left odor sensing device, a right odor sensed location data which indicates the geographic location of said right odor sensing device, a left odor sensing device direction data which indicates the direction to which said left odor sensing device is facing, and a right odor sensing device direction data which indicates the direction to which said right odor sensing device is facing, and a current location data which indicates the current geographic location of said communication device, said left odor sensed location data, said right odor sensed location data, and said odor origin location data are indicated on said display; a bone-conduction headphone function, wherein said communication device further includes a bone-conduction headphone, a background noise magnitude data which indicates the magnitude of a background noise is identified, an opponent party's voice data which indicates the voice data of the opponent party while implementing said voice communication mode is output from said speaker when said background noise data is within a first range, said opponent party's voice data is output from said bone-conduction headphone when said background noise data is within a second range, and said opponent party's voice data is output from said speaker and said bone-conduction headphone when said background noise data is within a third range, and a music data is output from said speaker when said background noise data is within said first range, said music data is output from said bone-conduction headphone when said background noise data is within said second range, and said music data is output from said speaker and said bone-conduction headphone when said background noise data is within said third range, and a 1st speaker utilizing message data which is the message indicating that said speaker of said communication device is utilized to output audio data is indicated on said communication device and said opponent device when said background noise magnitude data of said communication device is within said first range, a 2nd speaker utilizing message data which is the message indicating that a speaker of said opponent device is utilized to output audio data is indicated on said communication device and said opponent device when a background noise magnitude data of said opponent device is within said first range, a 1st bone-conduction headphone device utilizing message data which is the message indicating that said bone-conduction headphone device of said communication device is utilized to output audio data is indicated on said communication device and said opponent device when said background noise magnitude data of said communication device is within said second range, a 2nd bone-conduction headphone device utilizing message data which is the message indicating that a bone-conduction headphone device of said opponent device is utilized to output audio data is indicated on said communication device and said opponent device when said background noise magnitude data of said opponent device is within said second range, a 1st combined device utilizing message data which is the message indicating that both said speaker and said bone-conduction headphone device of said communication device are utilized to output audio data is indicated on said communication device and said opponent device when said background noise magnitude data of said communication device is within said third range, and a 2nd combined device utilizing message data which is the message indicating that both said speaker and said bone-conduction headphone device of said opponent device are utilized to output audio data is indicated on said communication device and said opponent device when said background noise magnitude data of said opponent device is within said third range; a remote sound volume controlling function, wherein a sound data is transferred to another device, said another device outputs said sound data, said sound data is output in accordance with the sound volume identified by said communication device, a 1st current location which indicates the current geographic location of said communication device and a 2nd current location which indicates the current geographic location of said another device are indicated on said display, and, as a location log, said 1st current location, said 2nd current location, a 1st sound volume controlled location data which indicates the geographic location of said communication device at which said outputting sound data was output from said another device in accordance with the sound volume identified by said communication device, and a 2nd sound volume controlled location data which indicates the geographic location of said another device at which said outputting sound data was output from said another device in accordance with the sound volume identified by said communication device are indicated on said display; a personal belonging notifying function, wherein a 1st current location which indicates the current geographic location of said communication device and a 2nd current location which indicates the current geographic location of a personal belonging property are identified, said personal belonging property is a tangible property which can be carried by a human being, if said 1st current location is determined to be not within a premises and said 2nd current location is within said premises, a personal belonging property forgotten notice is output from said communication device; a secondary personal belonging notifying function, wherein a 1st personal belonging property location which indicates the current geographic location of a 1st personal belonging property and a 2nd personal belonging property location which indicates the current geographic location of a 2nd personal belonging property are identified, each of said 1st personal belonging property and said 2nd personal belonging property is a tangible property which can be carried by a human being, if said 1st personal belonging property location is not within a premises and said 2nd personal belonging property location is within said premises, a personal belonging secondary property forgotten notice which indicates that said 2nd personal belonging property is forgotten to be brought with said 1st personal belonging property when leaving said premises is output from said communication device, and the location of said communication device, said 1st personal belonging property location, and said 2nd personal belonging property location are indicated on said display; a headphone auto content replaying function, wherein said communication device further includes a headphone connector, when a headphone is connected to said headphone connector, a content is automatically replayed and a 1st current location which indicates the current geographic location of said communication device is indicated on said display, and when a location identifying command is input via said input device, said 1st current location and a 2nd current location which indicates the current geographic location of said headphone are indicated on said display; an alternative device using function, wherein a certain data is stored in said communication device, a duplicate data which is the duplicate of said certain data is periodically stored in a host computing system, said duplicate data is downloaded from said host computing system to another device, while said duplicate data is utilized by said another device, said certain data is prohibited to be utilized by said communication device, a device usage prohibited message data which is the message indicating that utilizing said communication device is prohibited while said another device is being utilized in lieu of said communication device is indicated on said communication device, and a device temporality utilized message data which is the message indicating that said another device is temporality utilized in lieu of said communication device is indicated on said another device, when a duplicate data returning command is input to said another device, said duplicate data is transferred to said host computing system and said duplicate data stored in said another device is deleted, said duplicate data is forwarded from said host computing system to said communication device, said certain data is synchronized with said duplicate data, and a 1st current location data which indicates the current geographic location of said communication device, a 2nd current location data which indicates the current geographic location of said another device, a 1st alternative first location data which indicates the geographic location of said communication device at which said duplicate data is downloaded from said host computing system to said another device, a 2nd alternative first location data which indicates the geographic location of said another device at which said duplicate data is downloaded from said host computing system to said another device, a 1st alternative second location data which indicates the geographic location of said communication device at which said duplicate data utilized and updated by said another device is returned to said communication device, and a 2nd alternative second location data which indicates the geographic location of said another device at which said duplicate data utilized and updated by said another device is returned to said communication device are indicated on said communication device and said another device; a brain wave color selecting function, wherein a current brain wave data which indicates the current brain wave of the user of said communication device is identified, a specific color corresponding to said current brain wave data is identified and displayed on said display, a color notice data indicating that said specific color is selected and displayed is output from said communication device, and a current location data which indicates the current geographic location of said communication device and a specific color selected location data which indicates the geographic location at which said specific color is selected are indicated on said display; a brain wave font selecting function, wherein a current brain wave data which indicates the current brain wave of the user of said communication device is identified, a specific font corresponding to said current brain wave data is identified and a text data decorated with said specific font is displayed on said display, a font notice data indicating that said specific font is selected and said text data decorated with said specific font is displayed is output from said communication device, and a current location data which indicates the current geographic location of said communication device and a specific font selected location data which indicates the geographic location at which said specific font is selected are indicated on said display; an another device location dependent auto answering function, wherein when said communication device receives a phone call from another device while said another device is located in a specific geographic area, a first phone call non-answering notice data which indicates that a phone call is received, however, the phone call will not be answered is output from said communication device and an answering auto message data indicating that the callee can not answer the phone call is transferred to and output from said another device, when a caller's left message data which indicates the message left by the caller is replayed, a 1st current location data which indicates the current geographic location of said communication device, a 2nd current location data which indicates the current geographic location of said another device, a 1st caller's message left location data which indicates the geographic location of said communication device at which said caller's left message data is received by said communication device, and a 2nd caller's message left location data which indicates the geographic location of said another device at which said caller's left message data is received by said communication device are indicated on said display; a rear carrier speed dependent ideal distance maintaining function, wherein said communication device is installed in a 2nd carrier, when the current distance between said 2nd carrier and a 1st carrier traveling in front of said 2nd carrier is longer than a current ideal distance, the current speed of said 2nd carrier is increased and a speed increased message is output from said communication device, when the current distance between said 2nd carrier and said 1st carrier is shorter than said current ideal distance, the current speed of said 2nd carrier is decreased and a speed decreased message is output from said communication device, wherein said current ideal distance varies depending on said current speed of said 2nd carrier, said current distance, said current speed, said current ideal distance, a 1st current location which indicates the current location of said 1st carrier, and a 2nd current location which indicates the current location of said 2nd carrier are indicated on said display; a front carrier speed dependent ideal distance maintaining function, wherein said communication device is installed in a 1st carrier, when the current distance between said 1st carrier and a 2nd carrier traveling behind said 1st carrier is longer than a current ideal distance, the current speed of said 1st carrier is decreased and a speed decreased message is output from said communication device, when the current distance between said 1st carrier and said 2nd carrier is shorter than said current ideal distance, the current speed of said 1st carrier is increased and a speed increased message is output from said communication device, wherein said current ideal distance varies depending on said current speed of said 1st carrier, said current distance, said current speed, said current ideal distance, a 1st current location which indicates the current location of said 1st carrier, and a 2nd current location which indicates the current location of said 2nd carrier are indicated on said display; an inter-carrier middle point maintaining function, wherein said communication device is installed in a 2nd carrier, said 2nd carrier is a carrier traveling between a 1st carrier and a 3rd carrier, said 1st carrier is the carrier traveling in front of said 2nd carrier, said 3rd carrier is the carrier traveling behind said 2nd carrier, an ideal middle point data which indicates the ideal middle point location between said 1st carrier and said 3rd carrier is produced, when said 2nd carrier is behind said ideal middle point data, the current speed of said 2nd carrier is increased and a first message is output from said 2nd carrier, when said 2nd carrier is in front of said ideal middle point data, the current speed of said 2nd carrier is decreased and a second message is output from said 2nd carrier, and said ideal middle point data, a 1st current distance data which indicates the current distance between said 1st carrier and said 2nd carrier, a 3rd current distance data which indicates the current distance between said 2nd carrier and said 3rd carrier, a total current distance data which indicates the current distance between said 1st carrier and said 3rd carrier, a current speed data which indicates the current speed of said 2nd carrier, a 1st current location data which indicates the current geographic location of said 1st carrier, a 2nd current location data which indicates the current geographic location of said 2nd carrier, and a 3rd current location data which indicates the current geographic location of said 3rd carrier are output from said 1st carrier, said 2nd carrier, and said 3rd carrier respectively; a front carrier activity notifying function, wherein said communication device is included in a 2nd carrier, said 2nd carrier is a carrier traveling behind a 1st carrier, a license plate number data which indicates the license plate number of said 1st carrier, a driver's name data which indicates the name of the driver of said 1st carrier, a 1st current location data which indicates the current geographic location of said 1st carrier, a 2nd current location data which indicates the current geographic location of said 2nd carrier, a current distance data which indicates the current distance between said 1st carrier and said 2nd carrier, and a current speed data which indicates the current speed of said 1st carrier are indicated on said communication device, when a left blinker of said 1st carrier is on, a left blinker message data is output from said communication device, when a right blinker of said 1st carrier is on, a right blinker message data is output from said communication device, when a brake pedal of said 1st carrier is stepped on, a brake message data is output from said communication device, when a accelerator pedal of said 1st carrier is stepped on, an accelerator message data is output from said communication device, when a steering wheel of said 1st carrier is turned to left, a left steering wheel message data is output from said communication device, and when a steering wheel of said 1st carrier is turned to right, a right steering wheel message data is output from said communication device; a past accident occurred spot auto speed decreasing function, wherein a current location which indicates the current location of a carrier is identified, when said current location is within a certain distance from a past accident occurred location which indicates the geographic location at which an accident occurred in the past, a past accident occurred message data which is the audiovisual data indicating that said carrier is about to approach the location at which accident occurred in the past and a past accident relating data which indicates the data relating to the accident occurred in the past are output from said communication device, and the current speed of said carrier is decreased to a predetermined speed; a shock sensored auto backing up function, wherein said communication device includes a shock sensor which detects a physical shock posed to said communication device, when a physical shock which exceeds a certain level is detected by said shock sensor, a backup data of the data stored in said communication device is produced and transferred to another data storage area in said communication device, a 1st removable memory which is the removable memory connected to said communication device, a host computing system, another device, and/or a 2nd removable memory which is the removable memory connected to said another device, a backup produced message data which is the message indicating that said backup data is produced is indicated on said display, when restoring said backup data to said communication device, said backup data is restored from said another data storage area in said communication device, said 1st removable memory which is the removable memory connected to said communication device, said host computing system, said another device, and/or said 2nd removable memory which is the removable memory connected to said another device by the selection of the user of said communication device, and a 1st current location data which indicates the current geographic location of said communication device, a 2nd current location data which indicates the current geographic location of said another device, a 1st shock sensored back up location data which indicates the geographic location of said communication device at which said backup data is produced, and a 2nd shock sensored back up location data which indicates the geographic location of said another device at which the backup data is produced are indicated on said display; a redialing data sharing function, wherein when a 1st phone call is made by dialing a 1st phone number by said communication device, said 1st phone number is stored as 1st redialing phone number in said communication device, when a 2nd phone call is made by dialing a 2nd phone number by another device, said 2nd phone number is stored as 2nd redialing phone number in said another device, said 1st redialing phone number and said 2nd redialing phone number are shared between said communication device and said another device, when redialing said 1st redialing phone number by said communication device, a 1st first redialing location which indicates the location at which said 1st redialing phone number is redialed by said communication device is produced, when redialing said 1st redialing phone number by said another device, a 1st second redialing location which indicates the location at which said 1st redialing phone number is redialed by said another device is produced, when redialing said 2nd redialing phone number by said communication device, a 2nd first redialing location which indicates the location at which said 2nd redialing phone number is redialed by said communication device is produced, when redialing said 2nd redialing phone number by said another device, a 2nd second redialing location which indicates the location at which said 2nd redialing phone number is redialed by said another device is produced, said 1st first redialing location, said 1st second redialing location, said 2nd first redialing location, and/or said 2nd second redialing location are shared between said communication device and said another device, and a 1st current location which indicates the current location of said communication device, a 2nd current location which indicates the current location of said another device, said 1st first redialing location, said 1st second redialing location, said 2nd first redialing location, and/or said 2nd second redialing location are indicated on said communication device and/or said another device; a phone call history sharing function, wherein said communication device stores a 1st call made phone number data which indicates the phone number to which a phone call was made from said communication device in the past and a 1st call received phone number data which indicates the phone number from which a phone call was received by said communication device in the past, another device stores a 2nd call made phone number data which indicates the phone number to which a phone call was made from said another device in the past and a 2nd call received phone number data which indicates the phone number from which a phone call was received by said another device in the past, said 1st call made phone number data, said 1st call received phone number data, said 2nd call made phone number data, and said 2nd call received phone number data are shared between said communication device and said another device, each of said communication device and said another device is capable to make a phone call from one of said 1st call made phone number data, said 1st call received phone number data, said 2nd call made phone number data, and said 2nd call received phone number data, a 1st first call made dialing location data which indicates the geographic location of said communication device at which a phone call is made by said communication device by utilizing said 1st call made phone number data, a 2nd first call made dialing location data which indicates the geographic location of said communication device at which a phone call is made by said communication device by utilizing said 2nd call made phone number data, a 1st first call received dialing location data which indicates the geographic location of said communication device at which a phone call is made by said communication device by utilizing said 1st call received phone number data, and a 2nd first call received dialing location data which indicates the geographic location of said communication device at which a phone call is made by said communication device by utilizing said 2nd call received phone number data are produced by said communication device, a 1st second call made dialing location data which indicates the geographic location of said another device at which a phone call is made by said another device by utilizing said 1st call made phone number data, a 2nd second call made dialing location data which indicates the geographic location of said another device at which a phone call is made by said another device by utilizing said 2nd call made phone number data, a 1st second call received dialing location data which indicates the geographic location of said another device at which a phone call is made by said another device by utilizing said 1st call received phone number data, and a 2nd second call received dialing location data which indicates the geographic location of said another device at which a phone call is made by said another device by utilizing said 2nd call received phone number data are produced by said another device, said 1st first call made dialing location data, said 2nd first call made dialing location data, said 1st first call received dialing location data, said 2nd first call received dialing location data, said 1st second call made dialing location data, said 2nd second call made dialing location data, said 1st second call received dialing location data, and said 2nd second call received dialing location data are shared between said communication device and said another device, and a 1st current location data which indicates the current geographic location of said communication device, a 2nd current location data which indicates the current geographic location of said another device, said 1st first call made dialing location data, said 2nd first call made dialing location data, said 1st first call received dialing location data, said 2nd first call received dialing location data, said 1st second call made dialing location data, said 2nd second call made dialing location data, said 1st second call received dialing location data, and said 2nd second call received dialing location data are indicated on said communication device and said another device, respectively; a specific sound-wave triggered program function, wherein when a 1st sound data is retrieved from said microphone, a 1st software program is activated, when a 2nd sound data is retrieved from said microphone, a 2nd software program is activated, when a 3rd light data is retrieved from said camera, a 3rd software program is activated, and when a 4th light data is retrieved from said camera, a 4th software program is activated, and a current location which indicates the current location of said communication device, a 1st location which indicates the location of said communication device at which said 1st software program is activated, a 2nd location which indicates the location of said communication device at which said 2nd software program is activated, a 3rd location which indicates the location of said communication device at which said 3rd software program is activated, and a 4th location which indicates the location of said communication device at which said 4th software program is activated are indicated on said display; a time dependent false location notifying function, wherein a 1st false location data and a 2nd false location data are produced by the user of said communication device, a 1st false street address data and a 2nd false street address data are produced by the user of said communication device, each of said 1st false location data and said 2nd false location data indicates a specific geographic location identified by the user, each of said 1st false street address data and said 2nd false street address data indicates a specific street address corresponding to said 1st false location data and said 2nd false location data respectively, when a current location notifying request which is the request to notify the current geographic location of said communication device is received from another device, said 1st false location data and said 1st false street address data are notified to said another device when the current time is within a 1st time frame and a 1st false location notified message data which is the message indicating that said 1st false location data is notified to another device is displayed on said display, said 2nd false location data and said 2nd false street address data are notified to said another device when the current time is within a 2nd time frame and a 2nd false location notified message data which is the message indicating that said 2nd false location data is notified to another device is displayed on said display, a current location data and a true address data which indicates the street address corresponding to said current location data are notified to said another device when the current time is not within said 1st time frame nor said 2nd time frame and a true location notified message data which is the message indicating that the true current geographic location of said communication device is notified to another device is displayed on said display; an area dependent false location notifying function, wherein a 1st false location data and a 2nd false location data are produced by the user of said communication device, a 1st false street address data and a 2nd false street address data are produced by the user of said communication device, each of said 1st false location data and said 2nd false location data indicates a specific geographic location identified by the user, each of said 1st false street address data and said 2nd false street address data indicates a specific street address corresponding to said 1st false location data and said 2nd false location data respectively, when a current location notifying request which is the request to notify the current geographic location of said communication device is received from another device, said 1st false location data and said 1st false street address data are notified to said another device when said communication device is currently located in a 1st geographic area and a 1st false location notified message data which is the message indicating that said 1st false location data is notified to said another device is displayed on said display, said 2nd false location data and said 2nd false street address data are notified to said another device when said communication device is currently located in a 2nd geographic area and a 2nd false location notified message data which is the message indicating that said 2nd false location data is notified to said another device is displayed on said display, a current location data and a true address data which indicates the street address corresponding to said current location data are notified to said another device when said communication device is not currently located in said 1st geographic area nor said 2nd geographic area and a true location notified message data which is the message indicating that the true current geographic location of said communication device is notified to another device is displayed on said display; an area dependent false location notifying function, wherein a 3rd false location data and a 4th false location data are produced by the user of said communication device, a 3rd false street address data and a 4th false street address data are produced by the user of said communication device, each of said 3rd false location data and said 4th false location data indicates a specific geographic location identified by the user, each of said 3rd false street address data and said 4th false street address data indicates a specific street address corresponding to said 3rd false location data and said 4th false location data respectively, when a current location notifying request which is the request to notify the current geographic location of said communication device is received from another device, said 3rd false location data and said 3rd false street address data are notified to said another device when said communication device is currently located in a 3rd geographic area and a 3rd false location notified message data which is the message indicating that said 3rd false location data is notified to said another device is displayed on said display, said 4th false location data and said 4th false street address data are notified to said another device when said communication device is currently located in a 4th geographic area and a 4th false location notified message data which is the message indicating that said 4th false location data is notified to said another device is displayed on said display, a current location data and a true address data which indicates the street address corresponding to said current location data are notified to said another device when said communication device is not currently located in said 3rd geographic area nor said 4th geographic area and a true location notified message data which is the message indicating that the true current geographic location of said communication device is notified to another device is displayed on said display; a device dependent false location notifying function, wherein a 5th false location data and a 6th false location data are produced by the user of said communication device, a 5th false street address data and a 6th false street address data are produced by the user of said communication device, each of said 5th false location data and said 6th false location data indicates a specific geographic location identified by the user, each of said 5th false street address data and said 6th false street address data indicates a specific street address corresponding to said 5th false location data and said 6th false location data respectively, when a current location notifying request which is the request to notify the current geographic location of said communication device is received from another device, said 5th false location data and said 5th false street address data are notified to said another device if the identification of said another device is a 5th device identification and a 5th false location notified message data which is the message indicating that said 5th false location data is notified to said another device is displayed on said display, said 6th false location data and said 6th false street address data are notified to said another device if the identification of said another device is a 6th device identification and a 6th false location notified message data which is the message indicating that said 6th false location data is notified to said another device is displayed on said display, a current location data and a true address data which indicates the street address corresponding to said current location data are notified to said another device if the identification of said another device is not said 5th device identification NOR said 6th device identification and a true location notified message data which is the message indicating that the true current geographic location of said communication device is notified to another device is displayed on said display; a specific image triggered program function, wherein when a 1st image data is retrieved from a camera, a 1st software program is activated, when a 2nd image data is retrieved from said camera, a 2nd software program is activated, and a current location which indicates the current location of said communication device, a 1st location which indicates the location of said communication device at which said 1st software program is activated, and a 2nd location which indicates the location of said communication device at which said 2nd software program is activated, are indicated on said display; a warning sharing function, wherein when a warning audiovisual data which indicates a warning, alarm, and/or notice to the user is received, said warning audiovisual data is output from said communication device, said communication device identifies whether said warning audiovisual data is output from another device, and if said another device has not yet output said warning audiovisual data, said warning audiovisual data is transferred to said another device which outputs said warning audiovisual data, and a 1st current location data which indicates the current geographic location of said communication device, a 2nd current location data which indicates the current geographic location of said another device, a 1st warning acknowledged location data which indicates the geographic location of said communication device at which said warning audiovisual data is output from said communication device, and a 2nd warning acknowledged location data which indicates the geographic location of said another device at which said warning audiovisual data is output from said another device are indicated on said display of said communication device; an incoming call rejection password nullifying function, wherein when a phone call is received, a caller's phone number which is the phone number of the caller's device is compared with an incoming call rejecting phone number, said incoming call rejecting phone number indicates a phone number utilized to determined whether to accept or reject said phone call, if said caller's phone number matches with said incoming call rejecting phone number, a password entering prompt is indicated on said caller's device, a password entered by the caller is compared with a registered password, if said password matches with said registered password, a voice communication between said caller's device and said communication device is granted to be implemented, and a 1st current location which indicates the current geographic location of said communication device, a 2nd current location which indicates the current geographic location of said caller's device, a 1st incoming call rejection nullifying location which indicates the geographic location of said communication device at which said voice communication is granted to be implemented, and/or a 2nd incoming call rejection nullifying location which indicates the geographic location of said caller's device at which said voice communication is granted to be implemented are indicated on said communication device and/or said caller's device; an incoming call rejection voice print nullifying function, wherein when a phone call is received, a caller's phone number which is the phone number of the caller's device is compared with an incoming call rejecting phone number, said incoming call rejecting phone number indicates a phone number utilized to determined whether to accept or reject said phone call, if said caller's phone number matches with said incoming call rejecting phone number, a voice print entering prompt is indicated on said caller's device, a voice print retrieved from the caller's voice is compared with a registered voice print, if said voice print matches with said registered voice print, a voice communication between said caller's device and said communication device is granted to be implemented, and a 1st current location which indicates the current geographic location of said communication device, a 2nd current location which indicates the current geographic location of said caller's device, a 1st incoming call rejection nullifying location which indicates the geographic location of said communication device at which said voice communication is granted to be implemented, and/or a 2nd incoming call rejection nullifying location which indicates the geographic location of said caller's device at which said voice communication is granted to be implemented are indicated on said communication device and/or said caller's device; an incoming call rejection finger print nullifying function, wherein when a phone call is received, a caller's phone number which is the phone number of the caller's device is compared with an incoming call rejecting phone number, said incoming call rejecting phone number indicates a phone number utilized to determined whether to accept or reject said phone call, if said caller's phone number matches with said incoming call rejecting phone number, a finger print scanning prompt is indicated on said caller's device, a finger print retrieved from the caller's finger is compared with a registered finger print, if said finger print matches with said registered finger print, a voice communication between said caller's device and said communication device is granted to be implemented, and a 1st current location which indicates the current geographic location of said communication device, a 2nd current location which indicates the current geographic location of said caller's device, a 1st incoming call rejection nullifying location which indicates the geographic location of said communication device at which said voice communication is granted to be implemented, and/or a 2nd incoming call rejection nullifying location which indicates the geographic location of said caller's device at which said voice communication is granted to be implemented are indicated on said communication device and/or said caller's device; a facedown phone silent mode implementing function, wherein a current direction data which indicates the direction at which said communication device is currently facing is produced, if said current direction data indicates that said communication device is currently facing up, said communication device is in a 1st status, if said current direction data indicates that said communication device is currently facing down, said communication device is in a 2nd status, when a phone call is received under said 1st status, a phone call reception notifying audio data is output from said speaker and a 1st status phone call reception location data is produced, when a phone call is received under said 2nd status, a phone call reception notifying audio data is refrained from being output from said speaker and a 2nd status phone call reception location data is produced, a current location data which indicates the current geographic location of said communication device, said 1st status phone call reception location data, and said 2nd status phone call reception location data are displayed on said display; a facedown email silent mode implementing function, wherein a current direction data which indicates the direction at which said communication device is currently facing is produced, if said current direction data indicates that said communication device is currently facing up, said communication device is in a 1st status, if said current direction data indicates that said communication device is currently facing down, said communication device is in a 2nd status, when an email is received under said 1st status, an email reception notifying audio data is output from said speaker and a 1st status email reception location data is produced, when an email is received under said 2nd status, an email reception notifying audio data is refrained from being output from said speaker and a 2nd status email reception location data is produced, a current location data which indicates the current geographic location of said communication device, said 1st status email reception location data, and said 2nd status email reception location data are displayed on said display; and a facedown auto answering mode implementing function, wherein a current direction data which indicates the direction at which said communication device is currently facing is produced, if said current direction data indicates that said communication device is currently facing up, said communication device is in a 1st status, if said current direction data indicates that said communication device is currently facing down, said communication device is in a 2nd status, when a phone call is received under said 1st status, a phone call reception notifying audio data is output from said speaker, an auto answering message data which induces the caller to leave a message to the user of said communication device is sent to the caller's device, a caller's message data which indicates the message left by the caller to the user of said communication device is received, and a message left notice data which is the notice indicating that a message is left to the user of said communication device is displayed on said display, a 1st status phone call reception location data is produced, when a phone call is received under said 2nd status, a phone call reception notifying audio data is refrained from being output from said speaker and a 2nd status phone call reception location data is produced, a current location data which indicates the current geographic location of said communication device, said 1st status phone call reception location data, and said 2nd status phone call reception location data are displayed on said display while outputting said caller's message data from said speaker.

The invention claimed is:

1. A communication device comprising:

a microphone;

a speaker;

an input device;

a display;

an antenna;

a voice communication implementer, wherein voice communication is implemented by sending and receiving audio data via said antenna;

a first software program implementer, wherein a first digital data is implemented which corresponds to a first shortcut icon selected via said input device, wherein said first shortcut icon is the image data displayed on said display in order for the user to implement said first digital data;

a second software program implementer, wherein a second digital data is implemented which corresponds to a second shortcut icon selected via said input device, wherein said second shortcut icon is the image data displayed on said display in order for the user to implement said second digital data;

an area dependent shortcut icon modification implementer, wherein if the current geographic location of said communication device is determined to be located in a first geographic area, said first shortcut icon is processed to be displayed with a first image, and if the current geographic location of said communication device is determined to be located in a second geographic area, said first shortcut icon is processed to be displayed with a second image, wherein said second geographic area is the geographic area which is different from said first geographic area; and a weather dependent shortcut icon modification implementer, wherein if the weather of the specific geographic area is identified to be a sunny weather, said second shortcut icon is processed to be displayed with a third image, if the weather of the specific geographic area is identified to be a cloudy weather, said second shortcut icon is processed to be displayed with a fourth image, and if the weather of the specific geographic area is identified to be a rainy weather, said second shortcut icon is processed to be displayed with a fifth image;

wherein said first shortcut icon remains unchanged to be the shortcut icon of said first digital data despite said first image displayed as the image of said first shortcut icon is replaced with said second image or said second image displayed as the image of said first shortcut icon is replaced with said first image; and wherein said second shortcut icon remains unchanged to be the shortcut icon of said second digital data despite said third image displayed as the image of said second shortcut icon is replaced with said fourth image, said fourth image displayed as the image of said second shortcut icon is replaced with said fifth image, or said fifth image displayed as the image of said second shortcut icon is replaced with said third image.

2. The communication device of claim 1, wherein said communication device is a handheld device.

3. The communication device of claim 1, wherein said communication device outputs a predetermined ringtone upon receiving a phone call.

4. The communication device of claim 1, wherein said second shortcut icon is one of the multiple icons displayed on said display.

5. The communication device of claim 1, wherein said second shortcut icon is displayed at a predetermined location of said display.

6. The communication device of claim 1, wherein the current location of said communication device is indicated on a map displayed on said display.

7. A system comprising:

a communication device comprising a microphone, a speaker, an input device, a display, and an antenna;

a voice communication implementer, wherein voice communication is implemented by sending and receiving audio data via said antenna;

a first software program implementer, wherein a first digital data is implemented which corresponds to a first shortcut icon selected via said input device, wherein said first shortcut icon is the image data displayed on said display in order for the user to implement said first digital data;

a second software program implementer, wherein a second digital data is implemented which corresponds to a second shortcut icon selected via said input device, wherein said second shortcut icon is the image data displayed on said display in order for the user to implement said second digital data;

an area dependent shortcut icon modification implementer, wherein if the current geographic location of said communication device is determined to be located in a first geographic area, said first shortcut icon is processed to be displayed with a first image, and if the current geographic location of said communication device is determined to be located in a second geographic area, said first shortcut icon is processed to be displayed with a second image, wherein said second geographic area is the geographic area which is different from said first geographic area; and a weather dependent shortcut icon modification implementer, wherein if the weather of the specific geographic area is identified to be a sunny weather, said second shortcut icon is processed to be displayed with a third image, if the weather of the specific geographic area is identified to be a cloudy weather, said second shortcut icon is processed to be displayed with a fourth image, and if the weather of the specific geographic area is identified to be a rainy weather, said second shortcut icon is processed to be displayed with a fifth image;

wherein said first shortcut icon remains unchanged to be the shortcut icon of said first digital data despite said first image displayed as the image of said first shortcut icon is replaced with said second image or said second image displayed as the image of said first shortcut icon is replaced with said first image; and wherein said second shortcut icon remains unchanged to be the shortcut icon of said second digital data despite said third image displayed as the image of said second shortcut icon is replaced with said fourth image, said fourth image displayed as the image of said second shortcut icon is replaced with said fifth image, or said fifth image displayed as the image of said second shortcut icon is replaced with said third image.

8. The system of claim 7, wherein said communication device is a handheld device.

9. The system of claim 7, wherein said communication device outputs a predetermined ringtone upon receiving a phone call.

10. The system of claim 7, wherein said second shortcut icon is one of the multiple icons displayed on said display.

11. The system of claim 7, wherein said second shortcut icon is displayed at a predetermined location of said display.

12. The system of claim 7, wherein the current location of said communication device is indicated on a map displayed on said display.

13. A method for a communication device comprising a microphone, a speaker, an input device, a display, and an antenna, said method comprising:

a voice communication implementing step, wherein voice communication is implemented by sending and receiving audio data via said antenna;

a first software program implementing step, wherein a first digital data is implemented which corresponds to a first shortcut icon selected via said input device, wherein said first shortcut icon is the image data displayed on said display in order for the user to implement said first digital data;

a second software program implementing step, wherein a second digital data is implemented which corresponds to a second shortcut icon selected via said input device, wherein said second shortcut icon is the image data displayed on said display in order for the user to implement said second digital data;

an area dependent shortcut icon modification implementing step, wherein if the current geographic location of said communication device is determined to be located in a first geographic area, said first shortcut icon is processed to be displayed with a first image, and if the current geographic location of said communication device is determined to be located in a second geographic area, said first shortcut icon is processed to be displayed with a second image, wherein said second geographic area is the geographic area which is different from said first geographic area; and a weather dependent shortcut icon modification implementing step, wherein if the weather of the specific geographic area is identified to be a sunny weather, said second shortcut icon is processed to be displayed with a third image, if the weather of the specific geographic area is identified to be a cloudy weather, said second shortcut icon is processed to be displayed with a fourth image, and if the weather of the specific geographic area is identified to be a rainy weather, said second shortcut icon is processed to be displayed with a fifth image;

wherein said first shortcut icon remains unchanged to be the shortcut icon of said first digital data despite said first image displayed as the image of said first shortcut icon is replaced with said second image or said second image displayed as the image of said first shortcut icon is replaced with said first image; and wherein said second shortcut icon remains unchanged to be the shortcut icon of said second digital data despite said third image displayed as the image of said second shortcut icon is replaced with said fourth image, said fourth image displayed as the image of said second shortcut icon is replaced with said fifth image, or said fifth image displayed as the image of said second shortcut icon is replaced with said third image.

14. The method of claim 13, wherein said communication device is a handheld device.

15. The method of claim 13, wherein said communication device outputs a predetermined ringtone upon receiving a phone call.

16. The method of claim 13, wherein said second shortcut icon is one of the multiple icons displayed on said display.

17. The method of claim 13, wherein said second shortcut icon is displayed at a predetermined location of said display.

18. The method of claim 13, wherein the current location of said communication device is indicated on a map displayed on said display.

* * * * *